United States Patent [19]
Tagawa

[11] Patent Number: 5,392,058
[45] Date of Patent: Feb. 21, 1995

[54] DISPLAY-INTEGRATED TYPE TABLET DEVICE

[75] Inventor: Takao Tagawa, Kashihara, Japan

[73] Assignee: Sharp Kabushiki Kaisha, Osaka, Japan

[21] Appl. No.: 883,608

[22] Filed: May 13, 1992

[30] Foreign Application Priority Data

| | | | |
|---|---|---|---|
| May 15, 1991 | [JP] | Japan | 3-110597 |
| May 15, 1991 | [JP] | Japan | 3-110599 |
| Sep. 24, 1991 | [JP] | Japan | 3-243245 |
| Feb. 10, 1992 | [JP] | Japan | 4-023617 |
| Mar. 17, 1992 | [JP] | Japan | 4-060108 |
| Mar. 25, 1992 | [JP] | Japan | 4-066986 |

[51] Int. Cl.⁶ .............................................. G06F 3/03
[52] U.S. Cl. ............................ 345/104; 345/103; 345/173
[58] Field of Search ........... 340/712, 784, 706, 718, 340/719, 783; 178/18, 19; 341/32; 345/173, 174, 175, 177, 179, 103, 104, 100

[56] References Cited

U.S. PATENT DOCUMENTS

| | | | |
|---|---|---|---|
| 4,224,615 | 9/1980 | Penz | 340/784 |
| 4,814,760 | 3/1989 | Johnston et al. | 340/784 |
| 4,841,290 | 6/1989 | Nakano et al. | 340/712 |
| 4,875,036 | 10/1989 | Washizuka et al. | 340/784 |
| 4,875,378 | 10/1989 | Yamazaki et al. | 340/712 |
| 5,122,787 | 6/1992 | Fujita et al. | 340/712 |
| 5,136,404 | 8/1992 | Nobile et al. | 340/784 |
| 5,159,323 | 10/1992 | Mase et al. | 340/784 |

FOREIGN PATENT DOCUMENTS

| | | |
|---|---|---|
| 0375328 | 6/1990 | Europe . |
| 0414999 | 3/1991 | Europe . |
| 3726208 | 4/1988 | Germany . |

Primary Examiner—Ulysses Weldon
Assistant Examiner—Kara A. Farnandez
Attorney, Agent, or Firm—David G. Conlin; Kevin J. Fournier

[57] ABSTRACT

A multiplexer 13 selects the input terminal B side for a display period while it selects the input terminal A side for a coordinate detection period. A lower common drive circuit 2L, based on shift data transmitted from the multiplexer 13, operates in parallel with an upper common drive circuit 2U during the display period while it operates in series with the upper common drive circuit 2U during the coordinate detection period. An upper segment drive circuit 3U and a lower segment drive circuit 3L simultaneously operate to drive upper segment electrodes XU and lower segment electrodes XL simultaneously in the same direction. Thus, during the display period there is displayed an image simultaneously onto the upper half 1wU and the lower half 1wL of a display panel 1w, thereby improving the duty ratio of display. During the coordinate detection period, on the other hand, the upper half 1wU and the lower half 1wL of the display panel 1w are serially scanned during the coordinate detection period, whereby y-coordinates of two points $P_1$ and $P_2$ are detected correctly.

30 Claims, 59 Drawing Sheets

Fig.15

| | U Detection period | L Detection period | Y-coordinate detection period |
|---|---|---|---|
| a | VDU ↓ DU | | ty, Vp1 |
| b | VDU>VDL, VDU ↓ DU | VDL ↓ DL | ty, Vp2, Vp1 |
| c | VDU≒VDL, VDU ↓ DU | VDL ↓ DL | Vp2, Vp1 |
| d | VDU<VDL, VDU ↓ DU | VDL ↓ DL | ty, Vp2, Vp1 |
| e | | VDL ↓ DL | Vp2, ty |

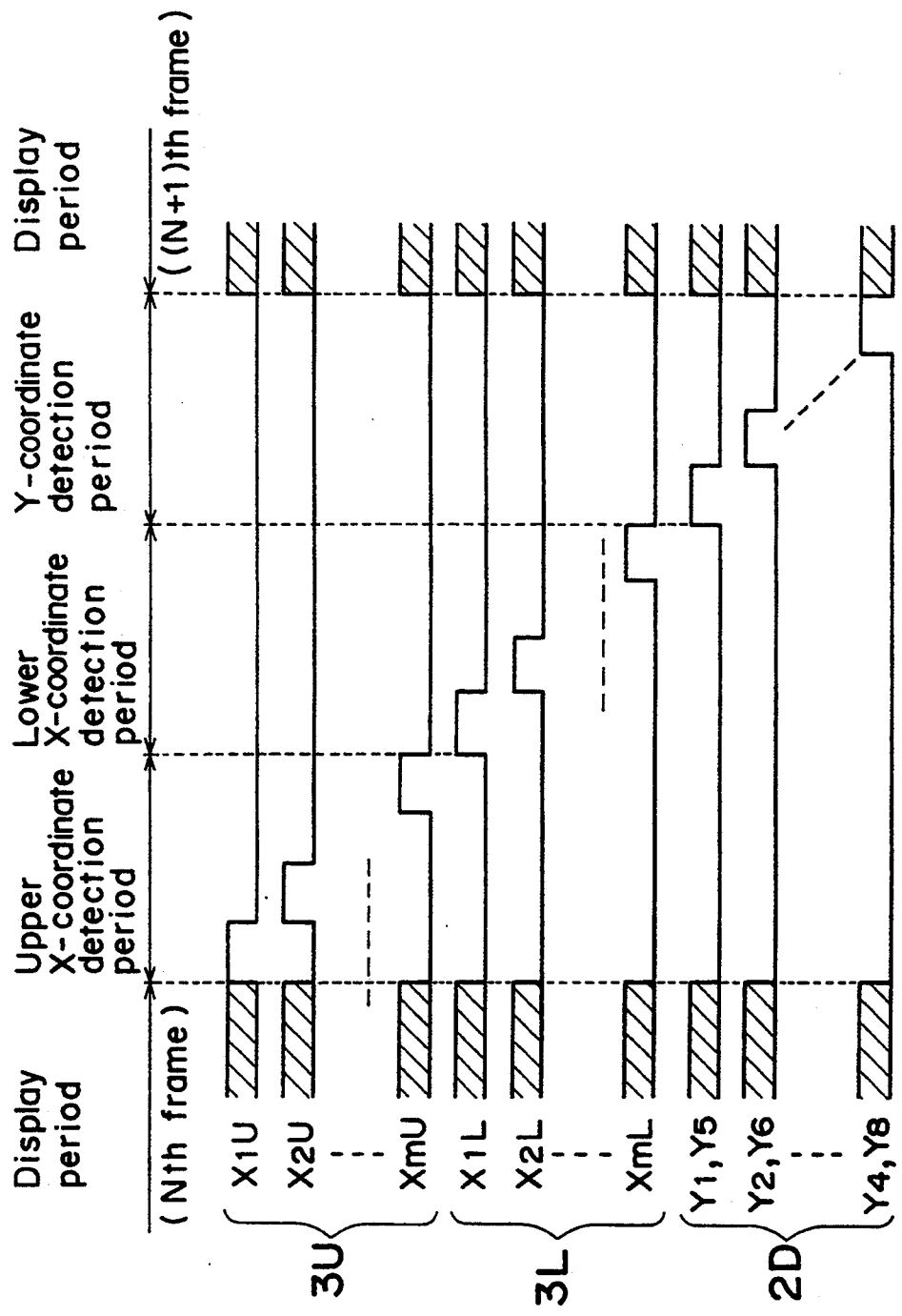

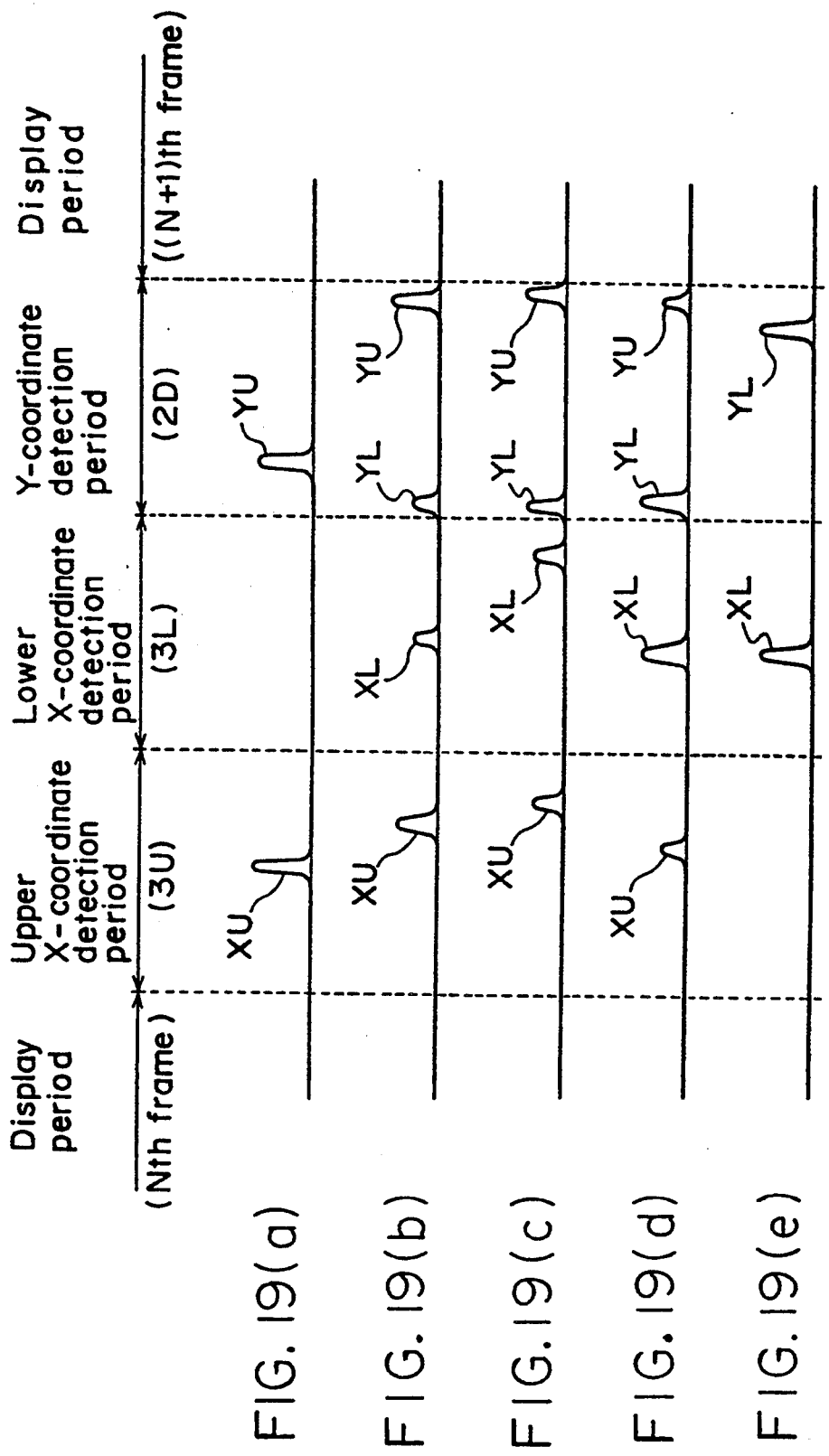

Fig. 20

| Pen position | Pen output | X-coordinate | Y-coordinate |
|---|---|---|---|
| Upside | Peak of XU >> peak of XL<br>Peak of YU >> peak of YL | Calculated from the timing at which XU is generated. | Calculated from the timing at which YU is generated. |
| Lower upside | Peak of XU > peak of XL<br>Peak of YU > peak of YL | Calculated from the timing at which XU is generated; or average value of the calculation result and another calculated from the timing at which XL is generated can substitute. | Calculated from the timing at which YU is generated. |
| Middle | Peak of XU = peak of XL<br>Peak of YU = peak of YL | Calculated from the timig at which XU or XL is generated; or average value of the calculation result from XU-generation timing and another calculated from the timing at which XL is generated can substitute. | Boundary between the upper and lower electrode groups |
| Upper downside | Peak of XU < peak of XL<br>Peak of YU < peak of YL | Calculated from the timing at which XL is generated; or average value of the calculation result and another calculated from the timing at which XU is generated can substitute. | Calculated from the timing at which YL is generated. |
| Downside | Peak of XU << peak of XL<br>Peak of YU << peak of YL | Calculated from the timing at which XL is generated. | Calculated from the timing at which YL is generated. |

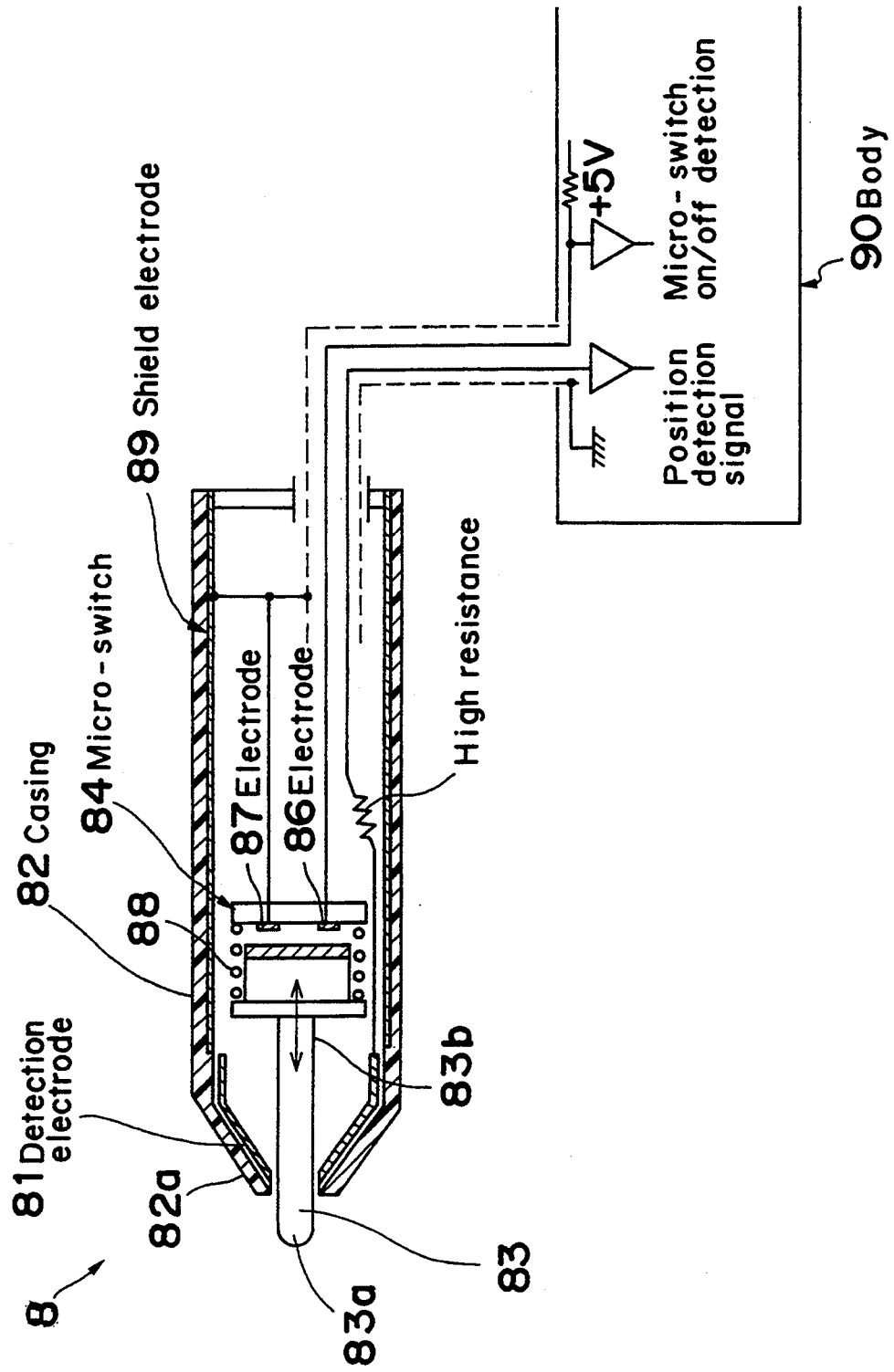

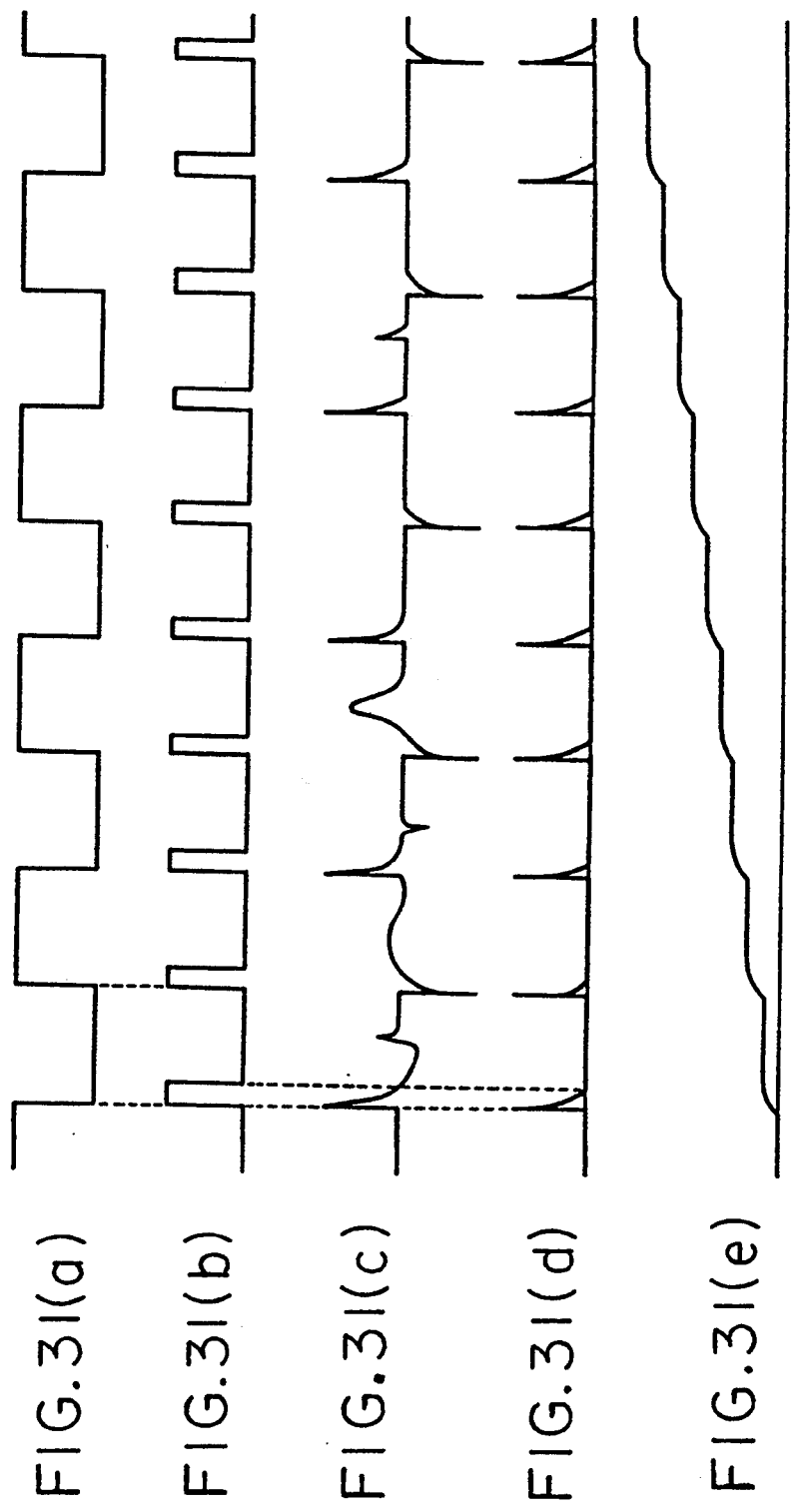

FIG.39(a) A.c. conversion signal

FIG.39(b) Electrostatically induced voltage (on panel surface)

FIG.39(c) Electrostatically induced voltage (off panel surface)

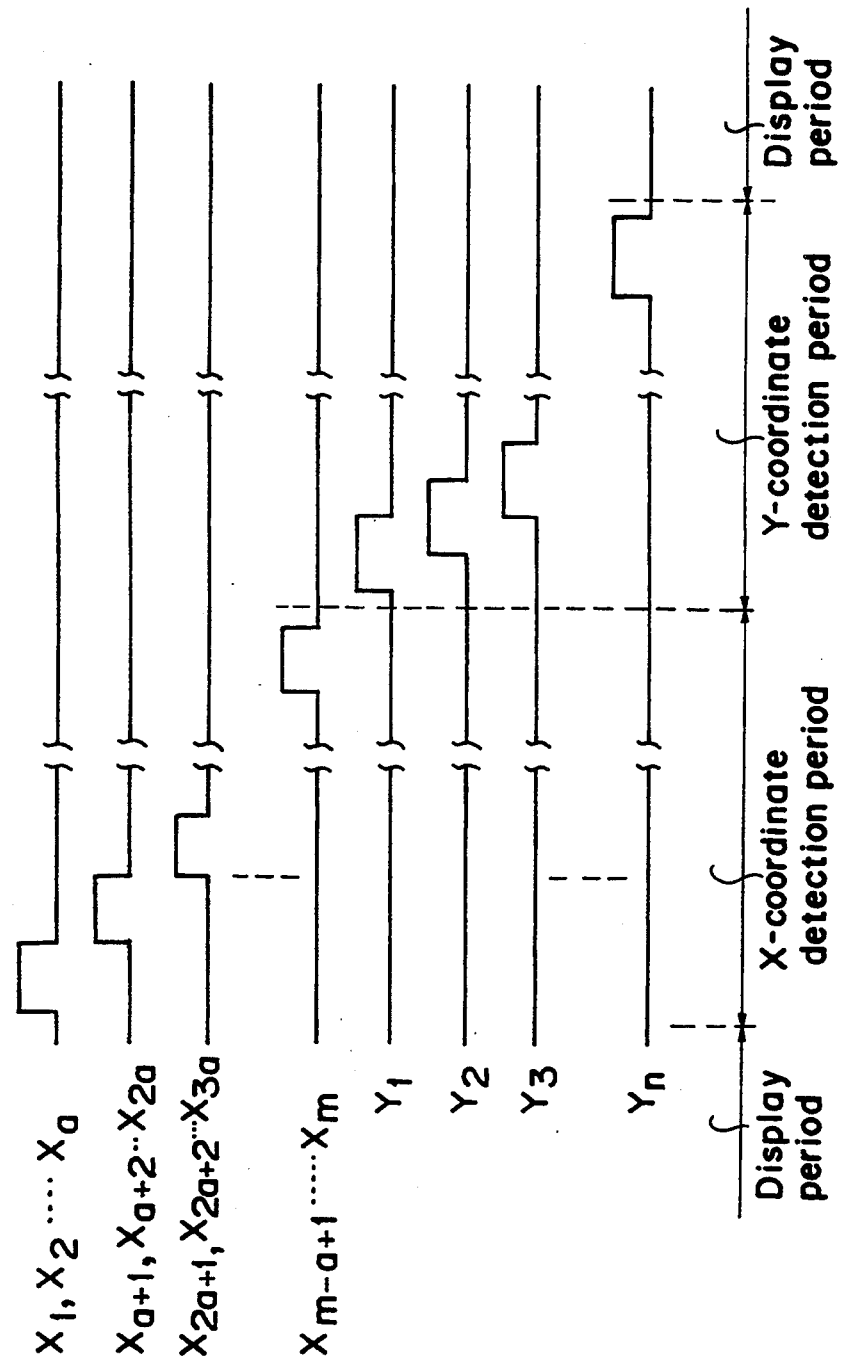

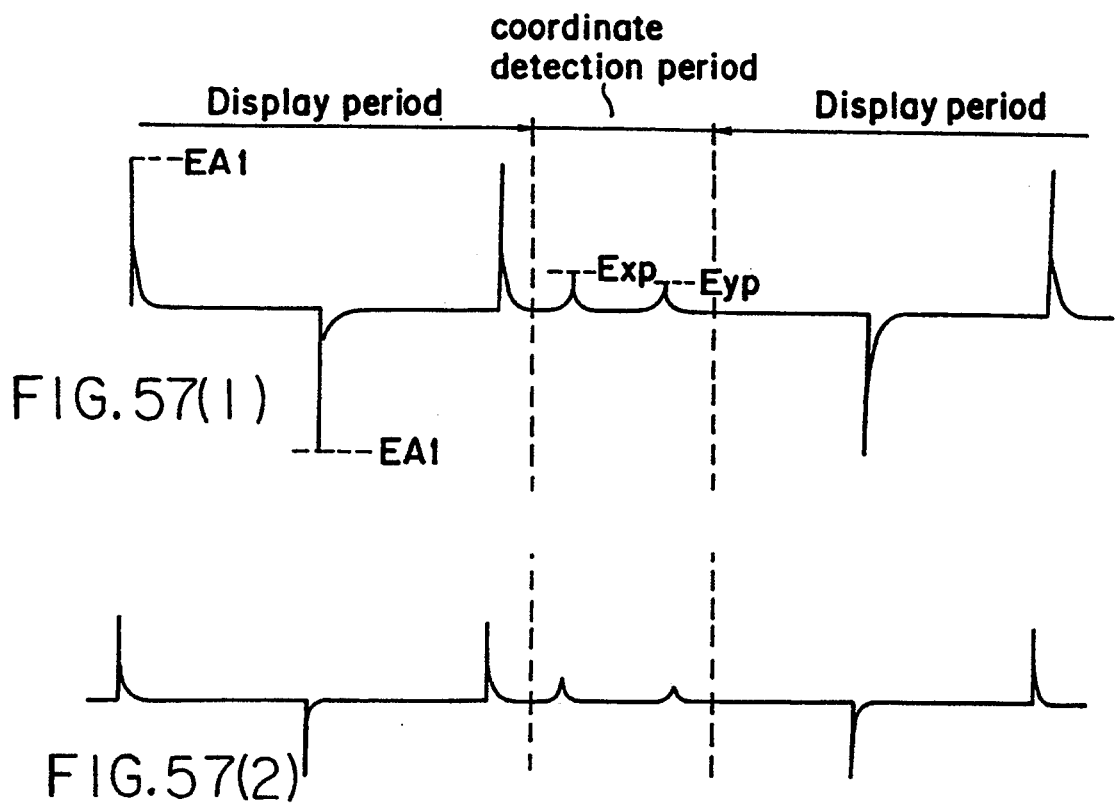
FIG. 57(1)
FIG. 57(2)
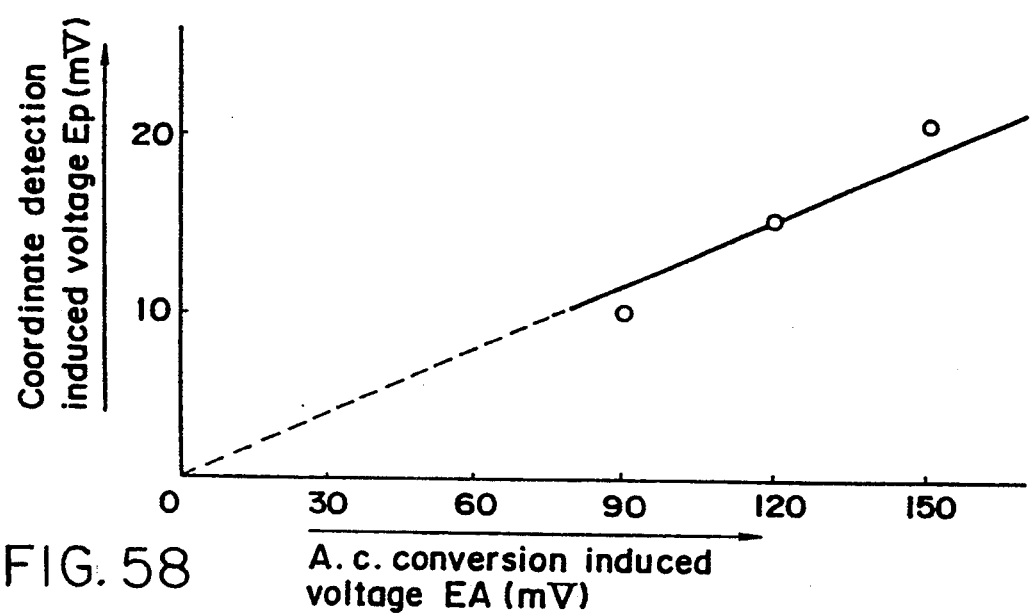
FIG. 58

Example

R2 = 12R1
V0 = 0
V1 = 1.7V
V2 = 3.4V
V3 = 23.5V
V4 = 25.2V
V5 = 26.9V

DISPLAY-INTEGRATED TYPE TABLET DEVICE

BACKGROUND OF THE INVENTION

The present invention relates to display-integrated type tablet devices for use in personal computers, word processors and the like.

As means for inputting handwritten characters and graphics into a computer, a word processor, or the like, there have been provided, in practical use, display-integrated type tablet devices in which, for example, an LCD (liquid crystal display) and an electrostatic induction tablet are stacked on each other so that characters and graphics can be inputted into the electrostatic induction tablet at a feeling that we write them on paper with some writing instrument. However, this type of display-integrated type tablet device has different coefficients of reflectance and transmittance between its portions where electrode exist and those where not, such that electrodes can be seen in a lattice form on the display screen, causing some deterioration in the display quality of the LCD.

In view of this problem, the present inventor has recently proposed a display-integrated type tablet device, as shown in FIG. 1, which has overcome such defects as described above, though it is not laid-opened and not known by the other.

This display-integrated type tablet device has one which serves as both the display electrode of an LCD and the position detection electrode of an electrostatic capacity type tablet device. In the tablet device, there are provided a coordinate detection period, during which specified coordinates on the tablet are detected, and a display period, during which an image is displayed, into a one-frame period, as shown in FIG. 2, whereby coordinate detection and image display are carried out by time sharing.

Referring to FIG. 1, a liquid crystal panel 1 is so constructed that liquid crystals are sandwiched between common electrodes $Y_1$-$Y_n$ (hereinafter, an arbitrary common electrode will be represented as Y) and segment electrodes $X_1$-$X_m$ (hereinafter, an arbitrary segment electrode will be represented as X), each electrode group being arranged so as to cross at right angles, wherein pixels are formed one for each region at which a common electrode Y and a segment electrode X cross each other. As a result, the liquid crystal panel 1 has n by m dot pixels arranged therein in a matrix form.

This display-integrated type tablet device has some advantages as compared with the above-described one, in which an electrostatic capacity type tablet is stacked on an LCD display, besides the advantage that the lattice-like electrode pattern has been eliminated so that the display becomes easy to view: that is, it can be easily reduced in cost as well as in size and weight, because electrodes and drive circuits are shared between the LCD and the electrostatic capacity type tablet.

The display-integrated type tablet device operates in the following manner. A common drive circuit 2 for driving the common electrode Y and a segment drive circuit 3 for driving the segment electrode X are connected to a display control circuit 5 and a detection control circuit 6 via a switching circuit 4. The switching circuit 4, being controlled by a control circuit 7, delivers an output signal from the display control circuit 5 to the common drive circuit 2 and the segment drive circuit 3 during a display period while it delivers an output from the detection control circuit 6 to the common drive circuit 2 and the segment drive circuit 3 during a coordinate detection period.

It is to be noted that although in FIG. 1 the switching circuit 4, the display control circuit 5, the detection control circuit 6, and the control circuit 7 are diagramed as divided into blocks, yet they are practically LSI-integrated such that they cannot so strictly be divided into such blocks from the viewpoint of form.

In the display period, shift data s is outputted from a shift data output terminal S of the display control circuit 5, an inversion signal fr is outputted from an inversion signal output terminal FR, a clock signal cp1 is outputted from a clock output terminal CP1, a clock signal cp2 is outputted from a clock output terminal CP2, and display data $D_0$-$D_3$ are outputted form data output terminals D0-D3.

The clock signal cp1, a clock signal that cycles at the period during which one-line pixels are displayed, is inputted as a clock signal cp1o into both a clock input terminal YCK of the common drive circuit 2 and a latch pulse input terminal XLP of the segment drive circuit 3 via an output terminal CP1O of the switching circuit 4. Also, the shift data s, a pulse signal for assigning each common electrode Y, is inputted as a shift data so into a shift data input terminal DIO1 of the common drive circuit 2 via an output terminal SO of the switching circuit 4 in synchronization with the clock signal cp1o.

When the shift data so is inputted into the common drive circuit 2, pulse position of the shift data so is shifted by a shift register, and a common electrode drive signal is outputted from output terminals 01-0n of the common drive circuit 2 corresponding to the shift positions to common electrodes $Y_1$-$Y_n$. This common electrode drive signal is generated depending on bias power supplies $V_0$-$V_5$ fed from a d.c. power supply circuit 12.

The clock signal cp2, a clock signal that cycles at a period resulting from dividing a few times the period during which one-line pixels are displayed, is inputted as a clock signal cp2o into a clock input terminal XCK of the segment drive circuit 3 via an output terminal CP2O of the switching circuit 4.

The display data $D_0$-$D_3$ are inputted into input terminals XD0-XD3 of the segment drive circuit 3 via output terminals D0O-D3O of the switching circuit 4 as display data $D_0o$-$D_3o$, and successively entrapped into a register within the segment drive circuit 3 in synchronization with the clock signal cp2o. When display data corresponding to one-line pixels are all entrapped, the entrapped display data are latched at the timing of the clock signal cp1o to be inputted into the latch pulse input terminal XLP, and segment electrode drive signals respectively corresponding to the display data are outputted from output terminals 01-0m of the segment drive circuit 3 to segment electrodes $X_1$-$X_m$. The segment drive signals are also generated depending on the bias power supplies $V_0$-$V_5$ fed from the d.c. power supply circuit 12.

The inversion signal fr is a signal for preventing any deterioration of the liquid crystals due to electrolysis by periodically inverting the direction in which the voltage is applied to the liquid crystals during the display period, and it is inputted as an inversion signal fro into an inversion signal input terminal YFR of the common drive circuit 2 and an inversion signal input terminal XFR of the segment drive circuit 3 via an inversion signal output terminal FRO of the switching circuit 4.

Thus, the pixel matrix of the liquid crystal panel 1 is driven according to its line order by operation of the common drive circuit 2 and the segment drive circuit 3, so that an image corresponding to the display data $D_0$–$D_3$ is displayed onto the liquid crystal panel 1.

During the coordinate detection period, on the other hand, shift data sd is outputted from a shift data output terminal Sd of the detection control circuit 6, an inversion signal frd is outputted from an inversion signal output terminal FRd, a clock signal cp1d is outputted from a clock output terminal CP1d, a clock signal cp2d is outputted from a clock output terminal CP2d, and drive data $D_0d$–$D_3d$ are outputted from data output terminals $D_0d$–$D_3d$.

The clock signal cp1d, a clock signal that cycles at the scanning period during which one-line common electrodes are scanned, is inputted as a clock signal cp1o into the clock input terminal YCK of the common drive circuit 2 and the latch pulse input terminal XLP of the segment drive circuit 3 via an output terminal CP1O of the switching circuit 4. The shift data sd, a pulse signal for assigning each common electrode Y, is inputted as shift data so into the shift data input terminal DIO1 of the common drive circuit 2 via the output terminal SO of the switching circuit 4 in synchronization with the clock signal cp1d.

Then, as in the case with the display period, pulse position of the shift data so is shifted by the shift register of the common drive circuit 2, and common electrode scan signals $Y_1$–$Y_n$ (hereinafter, an arbitrary common electrode scan signal will be represented as y) are successively outputted from the output terminals 01–0n corresponding to the shift positions to the common electrodes $Y_1$–$Y_n$. This common electrode scan signal y is generated depending on the bias power supplies $V_0$–$V_5$ fed from the d.c. power supply circuit 12.

The clock signal cp2d, a clock signal that cycles at a period resulting from dividing a few times the scan period during which one-line common electrodes Y are scanned, is inputted as a clock signal cp2o into the clock input terminal XCK of the segment drive circuit 3 via the output terminal CP2O of the switching circuit 4.

The drive data $D_0d$–$D_3d$ are inputted as drive data $D_00$–$D_30$ into the input terminals XD0–XD3 of the segment drive circuit 3 via output terminals D0O–D3O of the switching circuit 4, and entrapped into the register within the segment drive circuit 3 in synchronization with the clock signal 2o. When one-line drive data are entrapped, the entrapped drive data is latched at the timing of the clock signal cp1o to be inputted into the latch pulse input terminal XLP, while segment electrode scan signals $x_1$–$x_m$ (hereinafter, an arbitrary segment electrode scan signal will be represented as x) respectively corresponding to the drive data are outputted from the output terminals 01–0m of the segment drive circuit 3 to the segment electrodes $X_1$–$X_m$. This segment electrode scan signal x is also generated depending on the bias power supplies $V_0$–$V_5$ fed from the d.c. power supply circuit 12.

FIG. 3 is a timing chart of scan signals involved in the coordinate detection period of the above-mentioned display-integrated type tablet device. The coordinate detection period is divided into an x-coordinate detection period and a succeeding y-coordinate detection period, and a segment electrode scan signal x, which is a pulse voltage signal, is successively applied to a segment electrode X during the x-coordinate detection period while a common electrode scan signal y, which is a pulse voltage signal, is successively applied to a common electrode Y during the y-coordinate detection period.

By application of the pulse voltage signals, there is induced a voltage to a specified-coordinate detection pen 8 (hereinafter, simply referred to as detection pen) due to a floating capacity between the segment electrode X or common electrode Y and the tip electrode of the detection pen 8. The induced voltage developed to the detection pen 8 is amplified by an amplifier 9, and inputted into an x-coordinate detection circuit 10 and a y-coordinate detection circuit 11.

The x-coordinate detection circuit 10 and the y-coordinate detection circuit 11 detect the time elapse from when the pulse voltage signal is applied until when the induced voltage reaches its peak value, depending on the output signal from the amplifier 9 and the timing signal from the control circuit 7, thereby detecting the x-coordinate or the y-coordinate, respectively, of the position specified by the detection pen 8.

The above-described display-integrated type tablet device successively and repeatedly selects and displays among the common electrodes $Y_1$–$Y_n$ during the display period, thus the duty ratio of display (ratio of a one-line display period to a one-frame display period) being 1/n. Accordingly, when n is small, the duty ratio of display does not become so small and therefore the display contrast does not lower, whereas some high-resolution displays, which may involve a value of n, 480 or more, would cause the display contrast to lower to a disadvantage.

As LCD devices whose duty ratio of display is made larger, there have conventionally been known such LCD devices as shown in FIG. 4 or FIG. 5. In these figures the number of common electrodes Y is assigned 8 for simplicity of explanation.

The LCD device the main part of which is block-diagramed in FIG. 4 is so arranged that there are provided segment electrode of independent groups in equal number and at equal intervals to the upper half 1wU and the lower half 1wL of a display panel 1w, and each electrode group is to be driven by independent segment drive circuits. More specifically, upper segment electrodes $X_1U, \ldots, X_mU$ provided to the upper half 1wU of the display panel 1w (hereinafter, an arbitrary upper segment electrode will be represented as XU) are driven by an upper segment drive circuit 3U. On the other hand, lower segment electrodes $X_1L, \ldots, X_mL$ provided to the lower half 1wL of the display panel 1w (hereinafter, an arbitrary lower segment electrode will be represented as XL) are driven by a lower segment drive circuit 3L.

Meanwhile, upper common electrodes $Y_1$–$Y_4$ belonging to the upper half 1wU of the display panel 1w (hereinafter, an arbitrary upper common electrode will be represented as YU) are driven by an upper common drive circuit 2U. On the other hand, lower common electrodes $Y_5$–$Y_8$ belonging to the lower half 1wL of the display panel 1w (hereinafter, an arbitrary lower common electrode will be represented as YL) are driven by an lower common drive circuit 2L.

The upper half 1wU and the lower half 1wL in the screen of the display panel 1w are each driven by the same manner as with the example of FIG. 1.

More specifically, for the upper half 1wU, the upper common electrodes $Y_1$–$Y_4$ are successively driven from one end to another by the upper common drive circuit 2U while a group of the upper segment electrodes XU are driven by the upper segment drive circuit 3U.

Likewise, for the lower half 1wL, the lower common electrodes $Y_5$-$Y_8$ are successively driven from one end to another by the lower common drive circuit 2L while a group of the lower segment electrodes XL are driven by the lower segment drive circuit 3L.

In so doing, display of the upper half 1wU of the display panel 1w and that of its lower half 1wL are carried out simultaneously in parallel. That is, common electrode pairs, $Y_1$ and $Y_5$, $Y_2$ and $Y_6$, $Y_3$ and $Y_7$, and $Y_4$ and $Y_8$ are driven at the same timings, respectively. As a result, the duty ratio of display becomes $2/n$ ($n=8$), two times that of the prior art.

In the LCD device as shown in FIG. 4, since the upper common drive circuit 2U and the lower common drive circuit 2L operate simultaneously in the same manner, one drive circuit can serve as them. Or, the drive section of the display panel 1w may be given as shown in FIG. 5.

Referring to FIG. 5, construction of the common electrodes Y and segment electrodes X and that of the upper and lower segment drive circuits 3U, 3L are completely the same as in the case of FIG. 4; however, the upper common electrodes $Y_1$-$Y_4$ and the lower common electrodes $Y_5$-$Y_8$ are connected to one common drive circuit 2D in parallel and adapted to be driven simultaneously by the same common drive circuit 2D. In this case, also, the duty ratio of display two times that of the prior art can be obtained as in the case of FIG. 4.

The display panel drive method with an LCD device such as shown in FIG. 4 or FIG. 5 is called the electrode-division method or the two-screen method, where the resulting display duty ratio becomes two times that of the prior art, as described above. In more detail, with 400 common electrodes, such a display panel drive method as shown in FIG. 1 would involve a display duty ratio of 1/400 while such a display panel drive method as shown in FIG. 4 or FIG. 5 would be improved in the ratio to 1/200, the contrast being enhanced.

However, when the LCD device as shown in FIG. 4 or FIG. 5 is used for the display-integrated type tablet device, there will arise a problem: that is, to detect coordinates of the tip of the detection pen by the above-mentioned display panel drive method, if the upper half 1wU and the lower half 1wL of the display panel 1w are simultaneously scanned in the scan method as in FIG. 1, it will be impossible to detect the position.

As an example, since point $P_1$ represented by the symbol + in the upper half 1wU and point $P_2$ represented by the symbol + in the lower half 1wL in FIG. 5 will have the same voltage signal induced to the detection pen at the utterly same timing, it is impossible to determine which position the detection pen designates. The case is the same with the LCD device shown in FIG. 4, in which case a detection position will exist at two points, so that the device will no longer function as a tablet.

SUMMARY OF THE INVENTION

A first object of the present invention is therefore to provide a display-integrated type tablet device which allows its display duty ratio to be improved and which can accurately detect coordinates of the tip of the detection pen.

In order to achieve the aforementioned object, the present invention provides a display-integrated type tablet device having: a display panel, in which display-use material is sandwiched between segment electrodes and common electrodes, orthogonally crossing each other, and which is driven by a duty-type drive method; a detection pen having at its tip an electrode electrostatically coupled with the segment electrodes and the common electrodes of the display panel; a segment drive circuit for driving the segment electrodes; a common drive circuit for driving the common electrodes; a display control circuit for controlling the segment drive circuit and the common drive circuit during a display period to display an image onto the display panel; a detection control circuit for controlling the segment drive circuit during a coordinate detection period to successively scan the segment electrodes of the display panel while controlling the common drive circuit to successively scan the common electrodes; an x-coordinate detection circuit for detecting the x-coordinate on the display panel specified by the tip of the detection pen from both the timing at which an output signal from the detection pen is generated and the timing at which the segment electrodes are scanned; and a y-coordinate detection circuit for detecting the y-coordinate on the display panel specified by the tip of the detection pen from both the timing at which an output signal from the detection pen is generated and the timing at which the common electrodes are scanned, characterized in that the segment electrodes are divided into two, one side segment electrodes belonging to one half region on one side of the display panel and the other side segment electrodes belonging to the other half region on the other side opposite to the aforementioned one side; the common electrodes are divided into two, one side common electrodes belonging to one half region on one side of the display panel and the other side common electrodes belonging to the other half region on the other side opposite to the aforementioned one side; the segment drive circuit is composed of a one side segment drive circuit for driving the one side segment electrodes and the other side segment drive circuit for driving the other segment electrodes; the common drive circuit is composed of a one side common drive circuit for driving the one side common electrodes and the other side common drive circuit for driving the other side common electrodes, the one side segment drive circuit and the other side segment drive circuit or the one side common drive circuit and the other side common drive circuit having a shift register as well as a shift data feed path switching circuit for switching a shift data feed path so that shift data are inputted, in parallel mode, simultaneously into the two shift registers of the one side drive circuit and the other side drive circuit, both having the aforementioned shift registers while shift data are input, in serial mode, first only into the shift register of the one side drive circuit, thereafter shift data outputted from the shift register of the one side drive circuit is inputted into the shift register of the other side drive circuit, whereby the one side drive circuit and the other side drive circuit are driven in parallel in the parallel mode while the one side drive circuit and the other side drive circuit are driven in series in the serial mode by switching of the shift data feed path effected by the shift data feed path switching circuit.

With the above-described arrangement, in the display period, the display control circuit controls the one side segment drive circuit for driving the one side segment electrodes belonging to the one side half region of the display panel, the other side segment drive circuit for driving the other side segment electrodes belonging to the other side half region opposite to the one side of the display panel, the one side common drive circuit for driving the one side common electrodes belonging to the one side half region of the display panel, and the other side common drive circuit for driving the other side common electrodes belonging to the other side half region of the display panel, so that images are displayed on the one side half region and the other side half region of the display panel.

In the coordinate detection period, the one side electrodes and the other side segment electrodes are successively scanned by the detection control circuit. Through this scanning, the x-coordinate of a position on the display panel specified by the tip of the detection pen is detected by the x-coordinate detection circuit depending on both the timing at which the induced voltage signal developed to the electrode of the tip of the detection pen electrostatically coupled with the one side segment electrodes or the other side segment electrodes is generated and the timing at which the one side segment electrodes and the other side segment electrodes are scanned.

In similar manner, the one side common electrodes and the other side common electrodes are successively scanned by the detection control circuit. Through this scanning, the y-coordinate of a position on the display panel specified by the tip of the detection pen is detected by the y-coordinate detection circuit depending on both the timing at which the induced voltage signal from the detection pen is generated and the timing at which the one side common electrodes and the other side common electrodes are scanned.

To carry out the image display or coordinate detection in the manner described above, when the parallel mode is specified as the drive mode for the electrodes, the shift data feed path is switched over by the shift data feed path switching circuit, so that shift data is inputted simultaneously into the two shift registers of one side drive circuit and the other side drive circuit, the one side segment drive circuit and the other side segment drive circuit or the one side common drive circuit and the other side common drive circuit, whichever have a shift register. Then, the one side drive circuit and the other side drive circuit are driven in parallel.

Likewise, when the serial mode is specified, the shift data feed path is switched over by the shift data feed path switching circuit, so that shift data is inputted only into the shift register of the one side drive circuit. Then, the shift data outputted from the shift register of the one side drive circuit is inputted into the shift register of the other side drive circuit. Thus, the one side drive circuit and the other side drive circuit are driven in series.

In the manner described above, by specifying the parallel mode or the serial mode as the drive mode for the electrodes as required, the one side half and the other side half of the display panel is switchably driven in parallel or in series.

If the shift data feed path of the shift data feed path switching circuit is switched to the parallel mode side for the display period while it is to the serial mode side for the coordinate detection period, the one side drive circuit and the other side drive circuit having the shift register are driven in parallel during the display period, so that an image can be displayed on the one side half region and the other side half region of the display panel. As a result, the duty ratio of display can be improved.

Also, during the coordinate detection period, the one side drive circuit and the other side drive circuit can be driven in series, so that the one side half region and successively the other side half region of the display panel can be scanned. As a result, coordinates of a point existing in the one side half region of the display panel and coordinates of another point existing in the other side half region can be discriminated therebetween and detected correctly.

In consequence, according to the present invention, it is possible to provide a display-integrated type tablet device whose duty ratio of display can be improved and which can detect coordinates of the tip of the detection pen correctly.

Also, if the one side drive circuit having a shift register is composed of a one side common drive circuit while the other side drive circuit having a shift register is composed of the other side common drive circuit and if the shift data feed path switching circuit is composed of a multiplexer, it is easy to provide a display-integrated type tablet device whose duty ratio of display can be improved and which can detect coordinates of the tip of the detection pen correctly.

Still also, it is allowed that the drive circuit composed of the one side drive circuit and the other side drive circuit having shift registers consists of a common drive circuit, and that the shift data feed path switching circuit is constituted by a shift register that is located at the center out of the shift registers in odd number that the common drive circuit has, wherein the shift register located at the center is so arranged that it has a first input terminal for inputting shift data to the head of the shift register and a second input terminal for interruptively inputting shift data to the center thereof, thereby controlling allowance or disallowance of interrupt input from the second input terminal depending on an external control signal. Then it becomes possible to switchably control the common electrode drive mode that depends on the one side common drive circuit and the other side common drive circuit, between the parallel mode and the serial mode depending on the external control signal.

In consequence, according to the present invention, it is possible to provide in a simple structure a display-integrated type tablet device whose duty ratio of display can be improved and which can detect coordinates of the tip of the detection pen correctly.

Also, if the pulse width of the shift data for the coordinate detection period is set to one wider than the cycle at which clocks are transferred for the shift register, a scan signal wider in pulse width than the cycle of the transfer clocks is generated by the drive circuit.

As a result, to the detection pen there develops a higher induced voltage depending on scan signals of a plurality of electrodes in correspondence to the scan pulse width, which enables the tip coordinates of the detection pen to be detected further correctly.

Still also, it is desirable that electrode scanning during one-time coordinate detection period is effected in a plurality of times by at least one drive circuit of the segment drive circuit or the common drive circuit by making use of the period saved by displaying an image in parallel during the display period. This allows the tip coordinates of the detection pen to be detected a plurality of times during the one-frame period.

As a result, the tip coordinates of the detection pen can be detected with more correctness.

Further, if during the one-time coordinate detection period the electrodes of the segment electrodes or the common electrodes, whichever farther from the detection pen, are scanned in a plurality of times, the accuracy of coordinate detection, which would lower because of the greater distance from the detection pen, can be enhanced.

As a result, the x- and y-coordinates can be detected with equal accuracy while the tip coordinates of the detection pen can be detected with reliability.

In order to achieve the aforementioned object, the present invention provides a display-integrated type tablet device having: a display panel, in which display-use material is sandwiched between segment electrodes and common electrodes, orthogonally crossing each other, and which is driven by a duty-type drive method; a detection pen having at its tip an electrode electrostatically coupled with the segment electrodes and the common electrodes of the display panel; a segment drive circuit for driving the segment electrodes; a common drive circuit for driving the common electrodes; a display control circuit for controlling the segment drive circuit and the common drive circuit during a display period to display an image onto the display panel; a detection control circuit for controlling the segment drive circuit during a coordinate detection period to successively scan the segment electrodes of the display panel while controlling the common drive circuit to successively scan the common electrodes; an x-coordinate detection circuit for detecting the x-coordinate on the display panel specified by the tip of the detection pen from both the timing at which an output signal from the detection pen is generated and the timing at which the segment electrodes are scanned; and a y-coordinate detection circuit for detecting the y-coordinate on the display panel specified by the tip of the detection pen from both the timing at which an output signal from the detection pen is generated and the timing at which the common electrodes are scanned, characterized in that the segment electrodes are divided into two, one side segment electrodes belonging to one half region on one side of the display panel and the other side segment electrodes belonging to the other half region on the other side opposite to the aforementioned one side; the common electrodes are divided into two, one side common electrodes belonging to one half region on one side of the display panel and the other side common electrodes belonging to the other half region on the other side opposite to the aforementioned one side; at least one of the segment drive circuit and the common drive circuit is composed of a one side drive circuit for driving the one side electrodes and the other side drive circuit for driving the other side electrodes, the drive circuit other than composed of a one side drive circuit and the other side drive circuit having the one side electrodes and the other side electrodes connected thereto in parallel and in conjunction with each other; the one side drive circuit and the other side drive circuit are so arranged that they generate a scan signal having a scan pulse of a voltage that does not contribute to display of the display panel depending on an external control signal during a coordinate detection period and they deliver the signal to all the electrodes to be driven at the same timing; the x-coordinate detection circuit is so arranged that it detects the region on the display panel in which the tip of the detection pen exists, from both the timing at which a scan signal having a scan pulse of voltage that does not contribute to the display from the one side segment drive circuit and the other side segment drive circuit is inputted and the timing at which an output signal from the detection pen is generated and further from the peak value of the output signal while the y-coordinate detection circuit is so arranged that it detects the region on the display panel in which the tip of the detection pen exists, from both the timing at which a scan signal having a scan pulse of voltage that does not contribute to the display from the one side common drive circuit and the other side common drive circuit is inputted and the timing at which an output signal from the detection pen is generated and further from the peak value of the output signal, whereby it is detected whether the tip of the detection pen exists in the one side half region of the display panel or in the other side half region thereof.

With the above-described arrangement, when image display or coordinate detection is carried out as in the case of the tablet device described previously, a control signal is inputted into the one side drive circuit or the other side drive circuit from external during the coordinate detection period. Then by the drive circuit into which the control signal has been inputted, a scan signal having a scan pulse of voltage that does not contribute to display of the display panel is generated and inputted into all the electrodes to be driven at the same timing.

Subsequently, when the drive circuit into which the control signal has been inputted is the one side segment drive circuit and the other side segment drive circuit, the X-coordinate detection circuit detects the region on the display panel in which the tip of the detection pen exists, from both the timing at which a scan signal having a scan pulse of voltage that does not contribute to the display is outputted from the one side segment drive circuit and the other side segment drive circuit and the timing at which an output signal from the detection pen is generated and further from the peak value of the output signal.

Otherwise, when the drive circuit into which the control signal has been inputted is the one side common drive circuit and the other side common drive circuit, the y-coordinate detection circuit detects the region on the display panel in which the tip of the detection pen exists, from both the timing at which a scan signal having a scan pulse of voltage that does not contribute to the display is outputted from the one side common drive circuit and the other side common drive circuit and the timing at which an output signal from the detection pen is generated and further from the peak value of the output signal. Thus, it is detected whether the tip of the detection pen exists on one half region or on the other half region of the display panel.

It is desirable that the coordinate detection period is divided into a region detection period, an x-coordinate detection period, and a y-coordinate detection period, wherein, during the region detection period, from the one side drive circuit and the other side drive circuit, scan signals having scan pulses of voltage which does not contribute to the display and which differ in phase between the drive circuits are outputted to scan the one side half region and the other side half region of the display panel at different timings in series, and wherein, during the x- and y-coordinate detection period, the one side half region and the other side half region of the display panel are scanned in parallel, so that the x-coordinate detection circuit determines the x-coordinate on the display panel specified by the tip of the detection pen depending on detection result of the region of the display panel in which the tip of the detection pen exists, the detection result being dependent on the output signal from the detection pen in the region detection period, and that the y-coordinate detection circuit determines the y-coordinate on the display panel specified by the tip of the detection pen depending on detection result in the region detection period. By this arrangement, it is possible to provide a display-integrated type tablet device whose duty ratio of display can be improved and which can detect coordinates of the tip of the detection pen correctly at high speed.

It is also possible that, during the coordinate detection period, the one side segment drive circuit and the one side common drive circuit generate scan signals having scan pulses of the same voltage and input them into the electrodes to be driven at the same timing while the other side segment drive circuit and the other side common drive circuit generate scan signals different in phase from the scan signals derived from the two one side drive circuits and input them into the electrodes to be driven at the same timing, so that the x-coordinate detection circuit or the y-coordinate detection circuit detects the region on the display panel in which the tip of the detection pen exists, depending on the voltage signal induced to the detection pen due to the scan signals. By this arrangement, the voltage applied across electrodes opposed to each other can be made zero during the region detection period, in which period the region in which the detection pen exits is detected.

In consequence, according to the present invention, when liquid crystals are used as the material sandwiched between the segment electrodes and the common electrodes, it is possible to prevent the liquid crystals from deteriorating due to electrophoresis during the region detection period.

Further, in order to achieve the first objective, the present invention provides a display-integrated type tablet device comprising: a duty-type display panel in which a display member is disposed between segment electrodes and common electrodes, the electrodes of the segment electrodes being divided into upper segment electrodes and lower segment electrodes at the approximately center portion of a display screen; an upper segment drive circuit for driving the upper segment electrodes; a lower segment drive circuit for driving the lower segment electrodes; a common drive circuit for driving the common electrodes; a display control circuit for, during a display period, controlling the upper segment drive circuit, the lower segment drive circuit, and the common drive circuit to simultaneously effect display of the upper half and the lower half of the display panel; a position detection control circuit for, during a position detection period, controlling the upper segment drive circuit to successively scan the upper segment electrodes with an upper segment drive signal for x-coordinate detection, and for controlling the lower segment drive circuit to successively scan the lower segment electrodes with a lower segment drive signal for x-coordinate detection, and further for controlling the common drive circuit to successively scan the common electrodes with a common drive signal for y-coordinate detection; a position detection pen to be electrostatically coupled with the upper segment electrodes, the lower segment electrodes, and the common electrodes; and a coordinate detection circuit for detecting the coordinates of a position on the display panel specified by the position detection pen.

The display-integrated type tablet device of the present invention can be adapted so that the position detection control circuit scans both the upper segment electrodes and the lower segment electrodes simultaneously in parallel while it scans the upper half of the segment electrodes on the display panel during one period and scans the lower half of the common electrodes on the display panel during another period.

Also, the display-integrated type tablet device of the present invention can be adapted so that the position detection control circuit scans the upper segment electrodes during one period and does the lower segment electrodes during another period and it scans both the upper half of the common electrodes on the display panel and the lower half of the common electrodes on the display panel simultaneously in parallel, and that the coordinate detection circuit decides whether the detection pen exists in the upper half of the display panel or in the lower half thereof, both from the output signal and the scanning timing of the detection pen in the scanning of the upper segment electrodes and from the output signal and the scanning timing of the detection pen in the scanning of the lower segment electrodes while it detects the y-coordinate of the position of the position detection pen both from the decision result and from the output signal and the scanning timing of the position detection pen in the scanning of the common electrodes.

Further, the display-integrated type tablet device of the present invention can be adapted so that the position detection control circuit scans the upper segment electrodes and the lower segment electrodes simultaneously in parallel, with an upper segment drive signal and a lower segment drive signal differing in phase from each other while it scans the upper half of the common electrodes on the display panel and the lower half of the common electrodes on the display panel simultaneously in parallel, and that the coordinate detection circuit decides whether the position detection pen exists in the upper half or in the lower half of the display panel, from phase difference between the output signal of the position detection pen and the upper segment drive signal or the lower segment drive signal in the scanning of the upper segment electrodes and the lower segment electrodes, and it detects the y-coordinate of the position of the position detection pen both from the decision result and from the output signal of the position detection pen and the scanning timing in the scanning of the common electrodes.

The display-integrated type tablet device of the present invention can also be adapted so that the upper segment drive signal and the lower segment drive signal are high-frequency pulse signals of the same frequency having phase difference from each other.

The display-integrated type tablet device of the present invention can further be adapted so that the upper segment drive signal and the lower segment drive signal are high-frequency sine-wave signals of the same frequency having phase difference from each other.

The display-integrated type tablet device of the present invention can yet further be adapted so that the segment drive signal and the lower segment drive signal are single pulse signals having phase difference from each other.

With the above arrangement, during the display period, the display control circuit controls the upper segment drive circuit, the lower segment drive circuit, and the common drive circuit to effect the display of the upper half of the display panel and that of the lower half thereof simultaneously. Accordingly, the resulting duty ratio of display can be two times that in the case where the upper half and the lower half of the display panel are displayed in different periods, preventing the display contrast in high-resolution display from lowering. Further, during the position detection period, the position detection control circuit controls the upper segment drive circuit to successively scan the upper segment electrodes with an upper segment drive signal for x-coordinate detection, it also controls the lower segment drive circuit to successively scan the lower segment electrodes with a lower segment drive signal for x-coordinate detection, and it further controls the common drive circuit to successively scan the common electrodes with a common drive signal for y-coordinate detection. When a position on the display panel is specified by the position detection pen, there is induced on the position detection pen a voltage corresponding to each of the aforementioned drive signals, the voltage being outputted to the coordinate detection circuit. The coordinate detection circuit detects the coordinates of the position on the display panel specified by the position detection pen based on the output signal of the position detection pen. This arrangement has made it possible to perform position detection and to realize a display-integrated type tablet which has a great duty ratio of display.

When the position detection control circuit is so arranged as to scan the upper segment electrodes and the lower segment electrodes simultaneously in parallel and as to scan the upper half of the common electrodes in the display panel during one period and the lower half of the common electrodes in the display panel during another period, the display-integrated type tablet of the present invention is similar in scanning operation to the prior-art tablet, it being easy to perform the position detection.

Also, when the position detection control circuit is so arranged as to scan the upper segment electrodes and the lower segment electrodes during different periods and as to scan the upper half of the segment electrodes in the display panel and the lower half of the segment electrodes in the display panel simultaneously in parallel while the coordinate detection circuit is so arranged as to decides whether the position detection pen exists in the upper half or in the lower half of the display panel, both from the output signal of the position detection pen and the scanning timing in the scanning of the upper segment electrodes and from the output signal of the position detection pen and the scanning timing in the scanning of the lower segment electrodes, and then detect the y-coordinate of the position of the position detection pen, both from the decision result and from the output signal of the position detection pen and the scanning timing in the scanning of the common electrodes, the display-integrated type tablet device of the present invention makes it possible to connect the upper-half electrodes of the common electrodes with their corresponding lower-half electrodes so that they are driven by a single common drive circuit, thus allowing the number of drive circuits of the common drive circuit to be reduced to approximately $\frac{1}{2}$.

Further, when the position detection control circuit is so arranged as to scan the upper segment electrodes and the lower segment electrodes simultaneously in parallel, with an upper segment drive signal and a lower segment drive signal each having phase difference from each other and to scan the upper half of the common electrodes in the display panel and the lower half of the common electrodes in the display panel simultaneously in parallel while the coordinate detection circuit is so arranged as to decide whether the position detection pen exists in the upper half or in the lower half of the display panel from phase difference between the output signal of the position detection pen in the scanning of the upper segment electrodes and the lower segment electrodes and the upper segment drive signal or the lower segment drive signal and then detect the y-coordinate of the position of the position detection pen both from the decision result and from the output signal and the scanning timing of the position detection pen in the scanning of the common electrodes, it is possible for the display-integrated type tablet device of the present invention to reduce the time required for electrode scanning.

Still further, when it is arranged that the upper segment drive signal and the lower segment drive signal are high-frequency pulse signals of the same frequency having phase difference from each other, the display-integrated type tablet device of the present invention can minimize any effect of external noise by making an arrangement so that the output of the position detection pen is made to pass through a narrow-band band-pass filter whose pass band is the frequency component of the high-frequency pulse signals.

Yet further, when the upper segment drive signal and the lower segment drive signal are high-frequency sine-wave signals of the same frequency having phase difference from each other, the display-integrated type tablet device of the present invention can have the same effect as with the above-mentioned high-frequency pulse signals.

Furthermore, when the upper segment drive signal and the lower segment drive signal are single pulse signals having phase difference from each other, the display-integrated type tablet of the present invention can detect phase difference more easily then with the high-frequency pulse signals or with the high-frequency sine-wave signals.

A second object of the present invention is therefore to provide a display-integrated type tablet device which can prevent any malfunction due to noise of the detection pen and which also can suppress deterioration in image quality and increase in power consumption involved in coordinate detection scanning to such a level as will not matter.

In order to achieve the aforementioned object, the present invention provides a display-integrated type tablet device comprising: an LCD panel having segment electrodes and common electrodes which sandwich liquid crystals; a control drive circuit which can set a display period and a coordinate detection period by time sharing and which serves to successively apply voltages for image display to both the segment and common electrodes during the display period and to invert the polarity of the voltages for image display periodically at a timing at which the polarity of an a.c. conversion signal is inverted, and which successively applies voltages for coordinate detection to both the segment and common electrodes during the coordinate detection period; a detection pen to be electrostatically coupled with a specified electrode out of both the segment and common electrodes to enable an electrostatically induced voltage to be developed on the LCD panel surface; and a coordinate detection circuit for receiving the electrostatically induced voltage developed to the detection pen by the voltages for coordinate detection during the coordinate detection period and then detecting the coordinate specified by the detection pen based on the received electrostatically induced voltage, and further comprising: a mode detection circuit for receiving the electrostatically induced voltage developed to the detection pen by inverting polarity of the voltage for image display during the display period, and then comparing the received electrostatically induced voltage with a previously set reference voltage to decide the mode as detection mode, in which coordinate detection is to be performed, when the electrostatically induced voltage is greater than the reference voltage or to decide the mode as non-detection mode, in which coordinate detection is to be not performed, when the electrostatically induced voltage is smaller than the reference voltage, and further outputting a mode signal representing the decision result; and a coordinate output selection circuit for receiving both the coordinate outputted by the coordinate detection circuit and the mode signal outputted by the mode detection circuit, and then outputting the coordinate as it is when the mode signal represents the detection mode or halting the output of the coordinate when the mode signal represents the non-detection mode.

The present invention has been accomplished through considerations and analyses by the inventor as described below.

The inventor has investigated how the devices provided with the tablet function are used. According to the investigation, the devices are practically used, in many cases, in combination with input means such as a keyboard, where the time for which the tablet is used as input means is only a small portion of the total lamp-on time (total running time) of the device. Moreover, even within the time for which the tablet is used as input means, the total time for which the detection pen is off the input surface (i.e. LCD panel surface, in this case; hereinafter, referred to as "panel surface") is longer than the rest owing to such tasks as time for thinking and judgment of the operator, waiting for processing of the device, transmission and reception of data with terminals, waiting for operation of the operator, telephone calls to the operator, and interruption by some visitors, with the result that the time for which the detection pen is in proximity to the panel surface occupies only less than 10 percent of the total running time of the device. Accordingly, if the coordinate detection period is set only while the detection pen is in proximity to the panel surface, and if the display period only is set while the detection pen is off the panel surface, it is made possible to prevent deterioration in image quality and suppress increase in power consumption, in practical use of the device.

Also, if it is arranged that only coordinates detected while the detection pen is in proximity to the panel surface are regarded as effective and meanwhile coordinates detected while the detection pen is off the panel surface are regarded as ineffective, it is possible to prevent any malfunction due to noise of clothes and the like.

It is the point to be considered here how to decide whether or not the detection pen is in proximity to the panel surface, that is, whether or not it is the state to perform coordinate detection.

In general, such methods are known as one in which on one side of the detection pen there is provided a mode switch to be operated by the operator or another in which at the tip of the detection pen there is provided a micro-switch which reacts when it is lightly pressed. However, the method with the aid of the mode switch on one side of the detection pen is laborious in operation and disadvantageous from the operator's standpoint. Also, the method with the micro-switch at the tip of the detection pen results in slightly delayed start of detection, in which case when character input is effected at high speed, it is difficult to extract features of characters from those having many short strokes such as certain chinese characters, which may lead to misrecognition. Yet, it is impossible to display the cursor, for example of a "+" mark, to a point where input is to be targeted, by putting the detection pen into proximity to the input-target point without making it into contact therewith. The micro-switch will not serve unless thrown into contact with the panel surface.

Under such circumstances, the present inventor focused their attention on the fact that an a.c. conversion signal for inverting the interelectrode voltage of liquid crystals causes a spike-shaped, electrostatically induced voltage to be developed to the detection pen. This point is described below in detail with reference to the drawings.

FIG. 37 shows the drive timing of the display-integrated type tablet device as shown in FIG. 1, where the a.c. conversion signal (inversion signal) FR is inverted tens of times during the period for which one-frame display is effected, so that the average value among interelectrode voltages of the liquid crystals becomes zero. With the inversion signal FR at low level, selection voltages for the common electrode Y and the segment electrode X are $V_0$, $V_5$, respectively, denoted as "ON" in FIG. 37. With the inversion signal FR at high level, on the other hand, selection voltages for the common electrode Y and the segment electrode X are $V_5$, $V_0$, respectively, likewise denoted as "ON" in FIG. 37. Display is effected only at pixels where both the common electrode Y and the segment electrode X are "ON," while display is not effected at pixels where one of the common electrode Y and the segment electrode X is not "ON" or neither of them is "ON." That is, display is effected at pixels where the absolute value of voltage between both electrodes Y and X is $|V_5-V_0|$, in which case the polarity of voltage between both electrodes Y and X is determined by the inversion signal FR.

In this example, the inversion signal FR serves to invert the polarity at times $t_0$, $t_3$, and $t_6$, at which time points the voltages of all the common electrodes Y and segment electrodes X are changed simultaneously. At that time, if a detection pen 8 is positioned on the panel surface, there is developed a spike-shaped, electrostatically induced voltage, as shown in the lower part of FIG. 37, due to capacity coupling with the electrodes X and Y. The resulting electrostatically induced voltage is dependent not on the contents of display but largely on the distance between the detection pen 8 and the panel surface, as shown in FIG. 8. More specifically, the farther the detection pen 8 leaves the panel surface, the smaller the peak of the electrostatically induced voltage becomes (in addition, FIGS. 39(b) and (c) show a waveform resulting when the detection pen 8 is on the panel surface and another resulting when it is off the panel surface, respectively).

Accordingly, by comparing this spike-shaped voltage with a previously set reference voltage, which is greater or smaller, it can be known whether or not the detection pen 8 is in proximity to the panel surface.

When the mode detection circuit has a peak detector for generating a d.c. voltage proportional to the peak value of the received electrostatically induced voltage, it is easy to compare the electrostatically induced voltage with the reference voltage, which is greater or smaller.

Also, when there is provided an amplifier circuit for amplifying an electrostatically induced voltage developed to the detection pen and when both the coordinate detection circuit and the mode detection circuit are arranged to receive the electrostatically induced voltage amplified by the amplifier circuit, the electrostatically induced voltage can be prevented from being confused with noise, and therefore the detection accuracy can be improved.

Further, when the peak detector has a filter circuit for rejecting the d.c. component included in the received electrostatically induced voltage, it is possible to prevent any noise from entering the circuit when the electrode of the detection pen generates a d.c. voltage due to frictional charge with clothes or the like.

Still further, when the filter circuit is a bandpass filter whose pass band is basic frequencies of the a.c. conversion signal, it is possible to allow only the frequency component of the electrostatically induced voltage developed to the detection pen to pass the filter, thus enabling any external noise having high frequency component to be blocked.

Yet further, when the filter circuit includes a capacitor given by using a dielectric substance covering the electrode tip of the detection pen, there is no need of specially connecting a discrete capacitor thereto, contributing to a simplified construction. Moreover, misinput can substantially be improved which may occur when a finger of the operator makes contact with the electrode tip.

Furthermore, when the peak detector is arranged to synchronize with the timing at which polarity of the a.c. conversion signal is inverted, and integrate the electrostatically induced voltage within a period during which the electrostatically induced voltage is on, for generating the d.c. voltage, the period during which the received electrostatically induced voltage is integrated can be limited to a short one, whereby any effect of noise can be reduced.

Also, when the mode detection circuit is arranged so that, in making a decision whether the mode is to be moved from the detection mode to the non-detection mode, it outputs a mode signal representing the decision result that the mode should be moved to the non-detection mode only if the output voltage of the peak detector is once lower than the reference voltage and holds lower even after an elapse of a specified period, the mode signal can be prevented from becoming unstable (equivalent to chattering of switches), thus flickers being prevented from occurring on the display screen.

Also, when there are provided a plurality of values for the reference voltage and one for moving from the detection mode to the non-detection mode is set higher than another for moving from the non-detection mode to the detection mode, the mode signal can be prevented from becoming unstable (equivalent to chattering of switches), thus flickers being prevented from occurring on the display screen.

Also, when the control drive circuit has a means which, receiving a mode signal outputted by the mode detection circuit, sets both the display period and the coordinate detection period by time sharing when the mode signal represents the detection mode while it performs the setting of only the detection period when the mode signal represents the non-detection mode, it is possible for the display-integrated type tablet device to operate as a tablet for quite a short time during which the detection pen is in proximity to the panel surface and serve for display for the most period. Thus, it is possible to suppress deterioration in image quality and increase in power consumption involved in coordinate detection to such a level as will not matter at all.

Also, when the control drive circuit has a means which controls the image data transfer speed to the same one between a display period set for the detection mode and another set for the non-detection mode, construction of the entire device can be simplified.

Also, when the control drive circuit has a means which allows image data to be transferred at higher speed during a display period for the detection mode than during another display period for the non-detection mode so that the frame frequency will be approximately equal between the detection mode and the non-detection mode, the scan period can be prevented from being prolonged in a mode (display and coordinate detection mode) in which both the display period and the coordinate detection period are set by time sharing, thus preventing occurrence of any flickers regardless of the type of illuminating equipment or power supply frequency.

A third object of the present invention is therefore to provide a display-integrated type tablet device which can detect coordinates correctly even under such environment as is near a strong noise source or in abnormally dry air, and which is high in image quality and low in power consumption.

In order to achieve the aforementioned objective, the present invention provides a display-integrated type tablet device having: a liquid crystal panel in which liquid crystals are sandwiched between segment electrodes and common electrodes, orthogonally crossing each other, and which is driven by a duty type drive method; a detection pen having at its tip an electrode to be electrostatically coupled with the segment electrodes and the common electrodes of the liquid crystal panel; a segment drive circuit for driving the segment electrodes; a common drive circuit for driving the common electrodes; a display control circuit for controlling the segment drive circuit and the common drive circuit during the a display period to display an image onto the liquid crystal panel; a detection control circuit for, during a coordinate detection period, controlling the segment drive circuit to successively scan the segment electrodes of the liquid crystal panel while controlling the common drive circuit to successively scan the common electrodes; an x-coordinate detection circuit for detecting an x-coordinate on the liquid crystal panel specified by the tip of the detection pen from both the timing at which an output signal from the detection pen is generated and the timing at which the segment electrodes are scanned; and a y-coordinate detection circuit for detecting a y-coordinate on the liquid crystal panel specified by the tip of the detection pen from both the timing at which an output signal from the detection pen is generated and the timing at which the common electrodes are scanned, characterized in that the display-integrated type tablet device further comprises: an inversion signal generation means for generating an inversion signal for setting a time point at which the direction of voltage applied to the liquid crystals of the liquid crystal panel during the display period is inverted; a first sampling means for selectively sampling an induced voltage developed to the electrode of the detection pen during a first specified interval in the display period including the time point at which the direction of voltage is inverted, the time point having been set depending on the inversion signal; a second sampling means for selectively sampling an induced voltage developed to the electrode of the detection pen during a second specified interval other than the first specified interval in the display period; a first processing means for converting the induced voltage sampled by the first sampling means into d.c. voltage and then comparing the value of the converted voltage with a reference voltage; a second processing means for converting the induced voltage sampled by the second sampling means into d.c. voltage and then comparing the value of the converted voltage with a reference voltage; and a decision means for deciding whether or not the tip of the detection pen exists in proximity to the surface of the liquid crystal panel, depending on comparison result by the first processing means and comparison result by the second processing means, and outputting a signal representing the decision result.

With the above arrangement, during the display period, the segment drive circuit and the common drive circuit are controlled by the display control circuit to drive the segment electrodes and the common electrodes of the liquid crystal panel, so that an image is displayed onto the liquid crystal panel.

Thus, in the display period during which an image is displayed onto the liquid crystal panel, an induced voltage developed to the detection pen due to inversion of the direction of voltage applied to the liquid crystals is selectively sampled by the first sampling means during the first specified interval including the time point at which the direction of voltage applied to the liquid crystals of the liquid crystal panel is inverted, the time point having been set depending on an inversion signal. Also, during the second specified interval other than the first specified interval, the induced voltage developed to the detection pen is selectively sampled by the second sampling means.

Then the induced voltage sampled by the first sampling means or the second sampling means is converted into d.c. voltage by the first processing means or the second processing means, the resulting voltage value being compared with the reference voltage.

Subsequently, it is decided by the decision means whether or not the tip of the detection pen exists in proximity to the surface of the liquid crystal panel, depending on both comparison result by the first sampling means and comparison result of the second processing means, so that an signal representing the decision result is outputted.

In this process, since whether or not the tip of the detection pen exists in proximity to the surface of the liquid crystal panel is decided depending on both the induced voltages due to inversion of the direction of voltage applied to the liquid crystals, the voltages having been classified and sampled by the first sampling means and the second sampling means, and the induced voltage due to noise, the result is such that even if the tip of the detection pen picks up noise when it is off the surface of the liquid crystal panel, there will be no possibility that it is misdecided from effect of the noise picked up that the tip of the detection pen exists in proximity to the surface of the liquid crystal panel.

In consequence, only when it has been decided by the decision means that the tip of the detection pen exists in proximity to the surface of the liquid crystal panel, it is the detection mode, in which the segment electrodes and the common electrodes are successively scanned under control of the segment drive circuit and the common drive circuit by the detection control circuit, so that x- and y-coordinates of the tip of the detection pen are detected by the x- and y-coordinate detection circuit.

Meanwhile, when it has been decided by the decision means that the tip of the detection pen does not exist in proximity to the surface of the liquid crystal panel, the coordinates will not be detected. Therefore, even if the detection pen picks up any noise, there will be no misdetection of the coordinates of the tip of the detection pen due to the noise.

More specifically, according to the present invention, it can be correctly decided whether or not the tip of the detection pen exists in proximity to the surface of the liquid crystal panel without being affected by any external noise, thus allowing the setting of a correct detection mode depending on the decision result. Accordingly, it is possible to provide a display-integrated type tablet device which can detect coordinates correctly even under such environment as is in proximity to a strong noise source or abnormally dry air, and which is high in image quality and low in power consumption.

In one embodiment, the second processing means serves to sample-hold a peak value resulting from converting an induced voltage sampled by the second sampling means into d.c. voltage and compare the sample-held peak value with a reference peak value. This allows it to be decided correctly whether it is the detection mode or not even if any induced voltage due to external noise is of an extremely thin waveform.

Therefore, according to the present invention, it is possible to provide a display-integrated type tablet device which can detect coordinates correctly even under such environment as there exists a source of generating noise having an extremely thin waveform and which is high in image quality and low in power consumption.

The above-described display-integrated type tablet device of the present invention is preferably provided with a third processing means for sample-holding a peak value resulting from converting an induced voltage sampled by the second sampling means into d.c. voltage and then comparing the sample-held peak value with a reference peak value, wherein the second processing means compares an integrated voltage value with a reference voltage value, the integrated voltage value resulting from converting an induced voltage sampled by the second sampling means and then integrating the result, and wherein the decision means decides that the tip of the detection pen does not exist in proximity to the surface of the liquid crystal panel when at least one of comparison-target values of the second processing means and the third processing means is greater than a reference value. This allows it to be decided correctly whether it is the detection mode or not, whatever the waveform of an induced voltage due to external noise is.

Therefore, according to the present invention, it is possible to provide a display-integrated type tablet device which can detect coordinates correctly whatever the waveform of noise derived from a noise source is, and which is high in image quality and low in power consumption.

In order to achieve the aforementioned third objective, the present invention provides a display-integrated type tablet device having: a liquid crystal panel, in which liquid crystals are sandwiched between segment electrodes and common electrodes, orthogonally crossing each other, and which is driven by a duty-type drive method; a detection pen having at its tip an electrode to be electrostatically coupled with the segment electrodes and the common electrodes of the liquid crystal panel; a segment drive circuit for driving the segment electrodes; a common drive circuit for driving the common electrodes; a display control circuit for controlling the segment drive circuit and the common drive circuit during a display period to display an image onto the liquid crystal panel; a detection control circuit for, during a coordinate detection period, controlling the segment drive circuit to successively scan the segment electrodes of the liquid crystal panel while controlling the common drive circuit to successively scan the common electrodes; an x-coordinate detection circuit for detecting the x-coordinate on the liquid crystal panel specified by the tip of the detection pen from both the timing at which an output signal from the detection pen is generated and the timing at which the segment electrodes are scanned; and a y-coordinate detection circuit for detecting the y-coordinate on the liquid crystal panel specified by the tip of the detection pen from both the timing at which an output signal from the detection pen is generated and the timing at which the common electrodes are scanned, characterized in that the display-integrated type tablet device further comprises: inversion signal generation means for generating an inversion signal for setting in the display period a time point at which the direction of voltage applied to liquid crystals of the liquid crystal panel is inverted; a first sampling means for selectively sampling an induced voltage developed to the electrode of the detection pen during a first specified interval in the display period including the time point at which the direction of voltage applied is inverted, the time point having been set depending on the inversion signal; a second sampling means for selectively sampling an induced voltage developed to the electrode of the detection pen during a second specified interval other than the first specified interval in the display period; a first processing means for amplifying the induced voltage sampled by the first sampling means at a first amplification factor and then converting the result into d.c. voltage; a second processing means for amplifying the induced voltage sampled by the second sampling means at a second amplification factor greater than the first amplification factor and then converting the result into d.c. voltage; and decision means for comparing an output voltage from the first processing means and an output voltage from the second processing means together, deciding whether or not the tip of the detection pen exists in proximity to the surface of the liquid crystal panel, depending on the comparison result, and outputting a signal representing decision result.

With the above arrangement, during the display period, an induced voltage developed to the detection pen due to inversion of the direction of the voltage applied to the liquid crystals is selectively sampled by the first sampling means. The induced voltage developed to the detection pen is further selectively sampled by the second sampling means.

Then the induced voltage sampled by the first sampling means is amplified at a first amplification factor and thereafter converted into d.c. voltage. Likewise, the induced voltage sampled by the second sampling means is amplified by a second amplification factor greater than the first amplification factor and thereafter converted into d.c. voltage.

Subsequently, an output voltage from the first processing means and an output voltage from the second processing means are directly compared with each other by the decision means and, depending on the comparison result, it is decided by simple processing whether or not the tip of the detection pen exists in proximity to the surface of the liquid crystal panel, so that a signal representing the decision result is outputted.

Thus, since whether or not the tip of the detection pen exists in proximity to the surface of the liquid crystal panel is decided depending on an induced voltage due to inversion of the direction of the voltage applied to the liquid crystals and an induced voltage due to noise, the voltages having been sampled as discriminated from each other, it will never be misdecided that the tip of the detection pen exists in proximity to the surface of the liquid crystal panel regardless of the fact that it does not.

It is preferable that the first specified interval during which the first sampling means operates is an interval which includes a time point at which the level of the inversion signal generated by the inversion signal generation means is changed and which is shorter than one half of the cycle of the inversion signal, and that the second specified interval during which the second sampling means operates is an interval which starts after the first specified interval has terminated and which terminates before the next change of the level of the inversion signal.

This arrangement makes it possible to discriminate more correctly the induced voltage due to inversion of the direction of the voltage applied to the liquid crystals and the induced voltage due to noise from each other and sample the voltages as such.

Also, it is preferable that the inversion signal generation means, depending on a clock signal for successively driving the common electrodes by the common drive circuit, generates the inversion signal whose half cycle is a plurality of times the cycle of the clock signal; the first specified interval during which the first sampling means operates is one cycle of the clock signal; and that the second specified interval during which the second sampling means operates is an interval which starts at a time point when it has elapsed a period at least three times time constant of an induced voltage to be sampled by the first sampling means and also longer than the length of the first specified interval, from when the first specified interval starts.

This arrangement makes it possible to more simply set the first and second specified intervals in synchronization with the clock signal during which the induced voltage due to inversion of the direction of the voltage applied to the liquid crystals and the induced voltage due to noise can be discriminated from each other with more correctness and they can be exactly sampled.

Preferably, the induced voltage developed to the detection pen is sampled by the first sampling means and the second sampling means a plurality of times during a one-frame period. This arrangement makes it possible to decide whether nor not the tip of the detection pen exists in proximity to the surface of the liquid crystal panel, depending on a plurality of induced voltages developed to the detection pen during a one-frame period, with high accuracy and reliability.

Also, it may be arranged that the induced voltage developed to the detection pen is sampled by the first sampling means and the second sampling means a plurality of times during a one-frame period, and the induced voltages sampled during a one-frame period are converted into d.c. voltages and thereafter integrated. In this case, whether or not the tip of the detection pen exists in proximity to the surface of the liquid crystal panel is decided with high accuracy and reliability, depending on a plurality of induced voltages developed to the detection pen during a one-frame period.

A fourth object of the present invention is therefore to provide a display-integrated type tablet device which is short in its x-coordinate detection period, simple in circuitry, and high in accuracy of x-coordinate detection.

In order to achieve the aforementioned object, the present invention provides a display-integrated type tablet having: a display panel having segment electrodes and common electrodes; a segment drive circuit for applying voltage to the segment electrodes; a common drive circuit for applying voltage to the common electrodes; a detection pen to be electrostatically coupled with the segment electrodes and the common electrodes; and means for amplifying an electrostatically induced voltage of the detection pen, wherein carried out by time sharing are display of an image with the display panel and coordinate detection for determining the position of the detection pen from a voltage induced to the detection pen put into contact with the surface of the display panel, characterized in that the segment drive circuit is provided with a plurality of driving integrated circuits connected in cascade by serial input/output terminals, the driving integrated circuits comprising: scan mode setting means for setting scan mode of the driving integrated circuits to a first mode for a display period and to a second mode for a coordinate detection period; a data input terminal for receiving display data during the display period; a data latch for latching the data inputted from the data input terminal; a line latch; a shift register; drive signal output means; and control means, wherein the control means serves, in the first mode, to make the serial input/output terminal operate as a chip select terminal, to latch the display data inputted from the data input terminal by the data latch, to move the one-line data latched by the data latch to the line latch, and to output drive signals based on the data moved to the line latch simultaneously in parallel by the drive segment output means, while the control means serves, in the second mode, to make the serial input/output terminal operate as a shift data input/output terminal, to serially output shift data inputted through a serial input/output terminal to another serial input/output terminal while shifting it by the shift register, and to successively serially output drive signals depending on the shift data shifted by the shift register by the drive signal output means.

The display-integrated type tablet device of the invention is preferably arranged so that the pulse width of shift data is greater than the cycle of the clock signal for transferring the shift data.

The display-integrated type tablet device of the invention may be arranged so that it further comprises shift data control means for, when carrying out the scanning of the segment drive circuit and the scanning of the common drive circuit by time sharing during the coordinate detection period, making shift data outputted from the final stage of the drive circuit to be scanned firstly and then inputted into the first stage of the drive circuit to be scanned secondly.

Also, the shift data control means may be arranged so that it serves to delay the shift data outputted from the final stage of the drive circuit to be scanned firstly and thereafter to input the same into the first stage of the drive circuit to be scanned secondly.

Still also, the display-integrated type tablet device of the invention may be arranged so that the common drive circuit is an integrated circuit having the same construction as that of the driving integrated circuit forming the segment drive circuit, and the scan mode setting means is provided by a plurality of integrated circuits, which are connected in cascade and which function to set the scan mode normally to the second mode.

With the above arrangement, during the display period, the scan mode setting means sets the scan mode to the first mode, and the control means functions to make the serial input/output terminal operate as a chip select terminal, to make display data having been inputted from the display data input terminal latched by the data latch, to move one-line data latched by the data latch to the line latch, and to output drive signals based on the data moved to the line latch simultaneously in parallel by the drive signal output means. Meanwhile, during the coordinate detection period, the scan mode setting means sets the scan mode to the second mode, and the control means functions to make the serial input/output terminal operate as a shift data input/output terminal, to serially output the shift data inputted from a serial input/output terminal to another serial input/output terminal while shifting it by a shift register, and to make the drive signal output means serially and successively output drive signals depending on the shift data shifted by the shift register.

Therefore, operation of data transfer during the coordinate detection period is far simpler than that during the display period, thus making the x-coordinate detection period much shorter than with the prior art.

Also, since the shift data inputted from the serial input terminal is outputted from the serial output terminal to input it into the serial input terminal of the succeeding-stage driving integrated circuit, there is no need for multiplexers a chip select circuit for each LSI as are necessitated in the prior art, with the result of simplified circuitry.

When pulse width of the shift data is made greater than the cycle of the clock signal for transferring the shift data, that is, when the pulse width of shift data (SD) is greater than the cycle of the clock signal (DST) as exemplified in FIG. 47, drive signals applied to segment electrodes X1, X2, . . . on the tailing edge of DST overlap one another each by four electrodes, the resulting waveform of a voltage induced to the detection pen becomes smooth as illustrated in FIG. 5, with an increased accuracy of x-coordinate detection.

As illustrated in FIG. 6, for example, it may also arranged that shift data is outputted from the final stage $2_p$ of the common drive circuit and, directly or after being delayed by a specified time period via a delay circuit 200, inputted into the first stage $3_1$ of the segment drive circuit, otherwise that shift data is outputted from the final stage $3_n$ of the segment drive circuit and, directly or after being delayed by a specified time period, inputted into the first stage $2_1$ of the common drive circuit, in which case there is no need of applying shift data independently to both the common drive circuit and the segment drive circuit, thus allowing the whole circuitry required to be simpler.

Further, if an integrated circuit having the same construction as that of the driving integrated circuit of the segment drive circuit is used as the driving integrated circuit of the common drive circuit, it can be easier to control component parts.

A fifth object of the present invention is to provide a coordinate input device which can detect coordinates with high accuracy.

In order to achieve the aforementioned fifth objective, the present invention provides a coordinate input device including: a liquid crystal panel in which a plurality of segment electrodes and common electrodes in the form of strips are arranged so as to orthogonally cross each other; drive means for successively applying display voltage to the segment electrodes and the common electrodes to drive the liquid crystal panel for display and also effecting a.c. conversion driving so as to prevent electrolysis of liquid crystals; coordinate instruction means provided with an electrode having a relatively high input impedance to be electrostatically coupled with the segment electrodes and the common electrodes; coordinate detection means for, during a coordinate detection period which is set so as to succeed a liquid crystal panel display period and which does not contribute to display, successively applying to the common electrodes and the segment electrodes a coordinate detection voltage lower than a threshold voltage necessary for liquid crystal display, amplifying an voltage induced to the electrode of the coordinate instruction means, detecting both the timing at which the induced voltage is generated and its waveform, and calculating the input coordinate depending on both the timing at which the coordinate detection voltage is applied and the timing at which the induced voltage is generated, characterized in that the coordinate detection means comprises: d.c. voltage generation means for detecting a voltage induced to the electrode of the coordinate instruction means during a period other than the coordinate detection period, generating a d.c. voltage proportional to the detection value, and holding the d.c. voltage until the coordinate detection period; and processing means for performing normalization treatment of analog voltage induced to the electrode of the coordinate instruction means during the coordinate detection period, by using the d.c. voltage as an auxiliary voltage.

According to the present invention, the d.c. voltage generation means generates a d.c. voltage proportional to the peak value of a spike-shaped voltage induced to the electrode of the coordinate instruction means, and the processing means includes a comparator for digitizing the analog voltage into binary value and takes the d.c. voltage as a reference voltage for the comparator.

Also, according to the present invention, the d.c. voltage generation means generates a d.c. voltage proportional to the peak value of a spike-shaped voltage induced to the electrode of the coordinate instruction means, and the processing means digitizes the analog voltage into binary value with the peak value of the analog voltage held constant by feeding back the d.c. voltage to an amplifier which amplifies the induced voltage.

Still also, according to the present invention, the d.c. voltage generation means generates a d.c. voltage proportional to the peak value of a spike-shaped voltage induced to the electrode of the coordinate instruction means, and the processing means feeds back the d.c. voltage to a power supply which feeds a bias voltage to the drive means during a position detection period to thereby control the bias voltage so as to become higher as the d.c. voltage lowers.

According to the present invention, during a display period, the liquid crystal panel provided to the coordinate input device is under a.c. driving operation unique to the liquid crystal, such that when the coordinate instruction means is placed on the liquid crystal panel, there is detected an induced voltage like electrostatic spike noise with a floating capacity between electrodes forming the liquid crystal panel and those provided to the coordinate instruction means. Peak value and waveform of the induced voltage are not much related to the content of display of the liquid crystal panel, being approximately ten times the value of a voltage induced to the electrode of the coordinate instruction means during the coordinate detection period, roughly proportioned to each other with some difference in magnitude existing. Further, this proportional relationship holds even when the distance between the liquid crystal panel and the coordinate instruction means is changed or when display contrast in the liquid crystal panel is changed.

Therefore, it is made possible to perform stable coordinate detection at all times regardless both of the distance between the coordinate instruction means and the electrode of the liquid crystal panel and of contrast in the liquid crystal panel, by performing the following processing with the arrangement that an induced voltage developed to the electrode of the coordinate instruction means during the display period of the liquid crystal panel is converted into d.c. voltage by rectification-smoothing and peak-value holding and the value of the resulting d.c. voltage is held until the coordinate detection period.

1) The d.c. voltage is used as a reference voltage for the comparator to digitize analog voltage into binary value during the coordinate detection period.
2) The d.c. voltage is fed back to an amplifier which amplifies an induced voltage to hold the peak value of an analog voltage constant, thus digitizing the analog voltage into binary value.
3) The d.c. voltage is fed back to a power supply which feeds bias voltage to the drive means during the coordinate detection period, thereby controlling so that the bias voltage value becomes higher as the d.c. voltage lowers.

Further in order to achieve the fifth objective, the present invention provides a coordinate input device having: a display panel which has a plurality of segment electrodes arranged in parallel and a plurality of common electrodes arranged in parallel and which is driven by a duty-type drive method; a detection pen having at its tip an electrode to be coupled between the segment electrodes and the common electrodes of the display panel with a floating capacity; a display control circuit for outputting a display control signal for displaying an image onto a pixel matrix formed by regions at which the plurality of segment electrodes and the plurality of common electrodes of the display panel cross each other and also for outputting display data; a position detection control circuit for outputting a scan control signal for scanning the segment electrodes and the common electrodes of the display panel; a switching circuit for, during a display period, outputting a display control signal and display data from the display control circuit for the display panel while, during a position detection period succeeding the display period, outputting a scan control signal from the position detection control circuit; a common drive circuit for, during the display period, outputting a common electrode drive signal for successively selecting the common electrodes depending on a display control signal from the switching circuit while, during the position detection period, outputting a common electrode scan signal for successively scanning the common electrodes without displaying an image onto the pixel matrix depending on the scan control signal from the switching circuit; a segment drive circuit for, during the display period, outputting a segment electrode drive signal for displaying pixels pertaining to common electrodes selected by the common electrode drive signal depending on the display control signal and the display data from the switching circuit while, during the position detection period, outputting a segment electrode scan signal for successively scanning the segment electrodes without displaying an image onto the pixel matrix depending on the scan control signal from the switching circuit; and a coordinate detection circuit for, during the position detection period, detecting a coordinate specified on the display panel by the tip of the detection pen depending on both the timing at which the common electrode scan signal and the segment electrode scan signal are applied to the common electrodes and the segment electrodes and the induced voltage developed to the electrode of the detection pen, and outputting an x-coordinate signal and a y-coordinate signal, characterized in that a plurality of auxiliary electrodes parallel to the common electrodes and the segment electrodes are provided outside the display region of the display panel, and that during the position detection period an electrode scan signal is successively applied to the auxiliary electrodes, the common electrodes, and segment electrodes.

The coordinate input device of the present invention is characterized in that the potential of the scan signal for the auxiliary electrodes during the position detection period is the same as the potential of the scan signal applied to the common electrodes and the segment electrodes within the display region.

Also, the coordinate input device of the present invention is characterized in that the auxiliary electrodes are connected to the common drive circuit and the segment drive circuit, and that, during the position detection period, the electrodes are scanned in the order of the auxiliary electrodes, the common electrodes, and the auxiliary electrodes, and in the order of the auxiliary electrodes, the segment electrodes, and the auxiliary electrodes in a predetermined direction of arrangement.

Still also, the coordinate input device of the present invention is characterized in that electrode scan signals of the same potential are applied to the plurality of auxiliary electrodes arranged in parallel at the same timing with respect to a plurality of adjoining auxiliary electrodes.

Further, the coordinate input device is characterized in that the common drive circuit and the segment drive circuit each have a shift register, clock and data of the shift register being equal between the scanning of the auxiliary electrodes and the scanning of the common electrodes or the segment electrodes during the position detection period.

Still further, the coordinate input device is characterized in that the shift registers of the drive circuits have data interrupt function and operate during the display period for the display panel by interrupting data from a center portion of the shift register without scanning the auxiliary electrodes.

Yet also, the coordinate input device is characterized in that the coordinate detection circuit converts a coordinate value calculated including the auxiliary electrodes into a coordinate value in the effective coordinate input region formed by crossing regions at which the common electrodes and the segment electrodes cross each other.

Yet further, the coordinate input device of the present invention is characterized in that the auxiliary electrodes are formed so as to be on the same plane as that of the common electrodes or the segment electrodes, and that width of the auxiliary electrodes and their spacing are selected to be the width of the common electrodes or the segment electrodes and their spacing, respectively.

Also, the coordinate input device of the present invention is characterized in that the widthwise length of the auxiliary electrodes in the region of arrangement of the auxiliary electrodes is selected to be longer than distance between the detection pen and common electrodes or the segment electrodes when a coordinate input instruction is given for the display panel.

Yet also, the coordinate input device of the present invention is characterized in that the auxiliary electrodes are formed on a plane other than that of the segment electrodes or the common electrodes.

Yet further, the coordinate input device of the present invention is characterized in that the auxiliary electrodes are of the same material and formed by the same manufacturing processes as with the segment electrodes and the common electrodes.

According to the present invention, auxiliary electrodes are provided on the outward side in the direction of the display panel in which common electrodes and segment electrodes are arranged, in which, during a position detection period set so as to succeed the display period of the display panel, the auxiliary electrodes, the common electrodes, and the segment electrodes are scanned with a scan voltage applied thereto in order. By so doing, electrostatic coupling between the detection pen and the common electrodes or the segment electrodes when the detection pen is put into contact with proximity to the boundary of display region of the display panel can be thrown into approximately the same state as such electrostatic coupling when the detection pen is made contact with the proximity to the center of the display panel. As a result, it is possible to perform coordinate detection with high accuracy over the nearly entire display region, that is, entire surface of the coordinate detection.

Also, according to the present invention, since the auxiliary electrodes are driven by the common drive circuit and the segment drive circuit, coordinate detection can be carried out with high accuracy without the need of additionally providing any new circuit. In this case, increase in the number of electrodes to be driven causes the scan period to be prolonged in the display period for the display panel; when there occurs any effect to display of the display panel, the clock of the shift register included in the drive circuit is switched to scan the electrodes. In other words, the auxiliary electrodes are scanned at a clock of higher speed than the clock used for scanning the display electrodes. As a result, any deterioration in display quality of the display panel can be prevented.

Further according to the present invention, the shift register included in the drive circuit has a function of data interruption, so that during the position detection period drive data is inputted at the head of the shift register while during the display period the data is inputted at some point on the shift register, or a register corresponding to a display electrode. As a result, the scanning of the auxiliary electrodes is not carried out during the display period, whereby any deterioration in display quality of the display panel due to additionally providing auxiliary electrodes can be prevented.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 15 is an explanatory view of how to determine the y-coordinate of the tip of the detection pen depending on both UL detection result and y-coordinate detection result;

FIG. 18 is a timing chart of position detection method (2) in the third embodiment;

FIGS. 19(a)–19(e) are views showing the correlation of the position of the detection pen and its output waveform in the position detection method (2);

FIG. 20 is a view showing a table in which the position detection method (2) is summarized;

FIG. 30 is a view showing the state in which a microswitch is built in the detection pen;

FIGS. 31(a)–31(e) are views showing the waveform when an induced voltage is rectified and then integrated;

FIG. 51 is a timing chart of the prior-art coordinate detection;

FIGS. 57(1) and 57(2) are waveform diagrams showing a voltage induced to the detection pen;

FIG. 58 is a graph showing the correlation between an a.c. conversion induced voltage developed to the detection pen and a coordinate detection induced voltage;

DETAILED DESCRIPTION OF THE PREFERRED EMBODIMENTS

Throughout the following description of the preferred embodiments of the present invention, like components are designated by like numerals among the embodiments.

(Embodiment 1)

Figure 1:
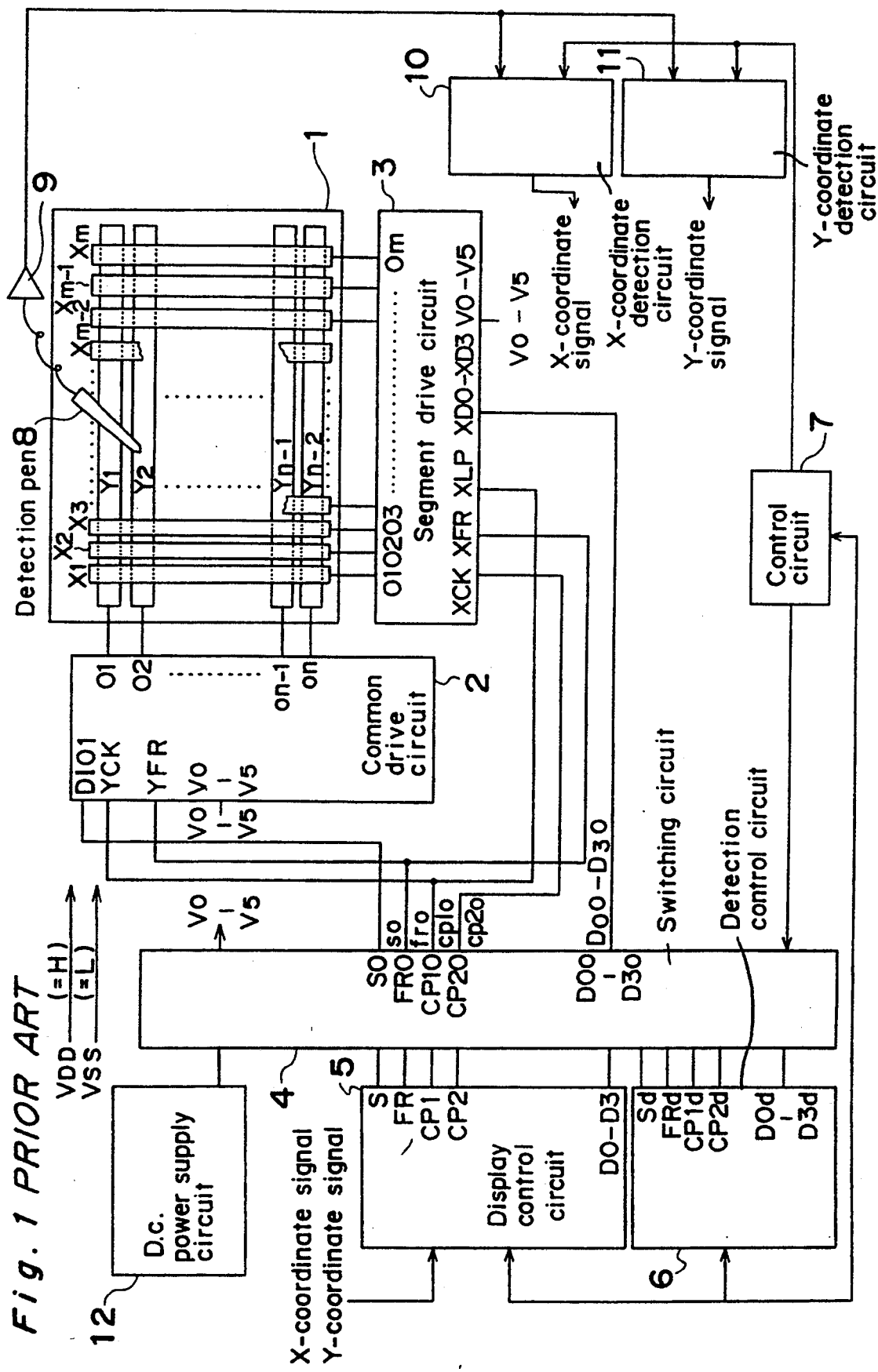
FIG. 1 is a block diagram of a prior-art display-integrated type tablet device.
Figure 4:
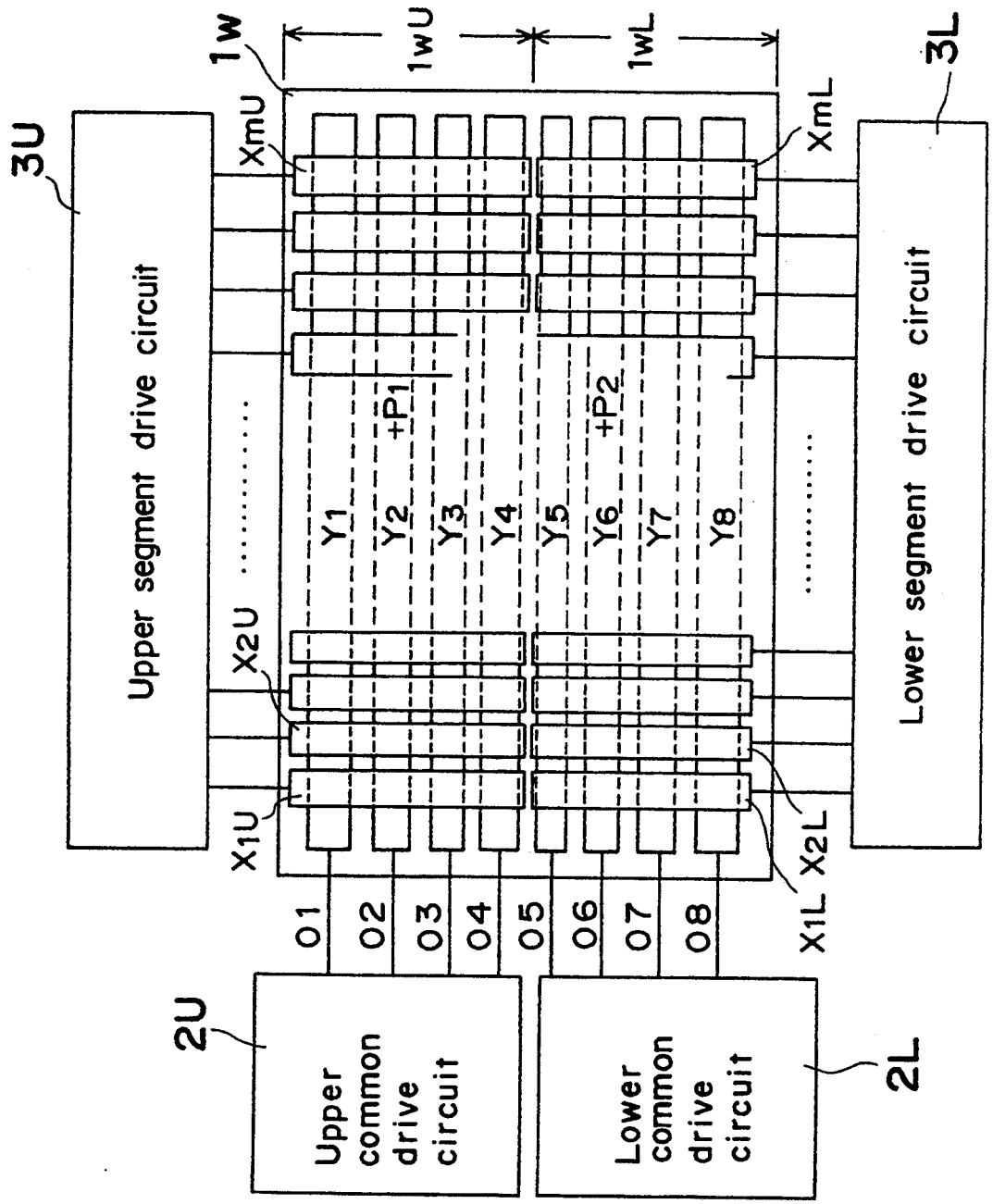
FIG. 4 is a main-part block diagram of a liquid crystal display device in which the display panel is divided into two.
Figure 6:
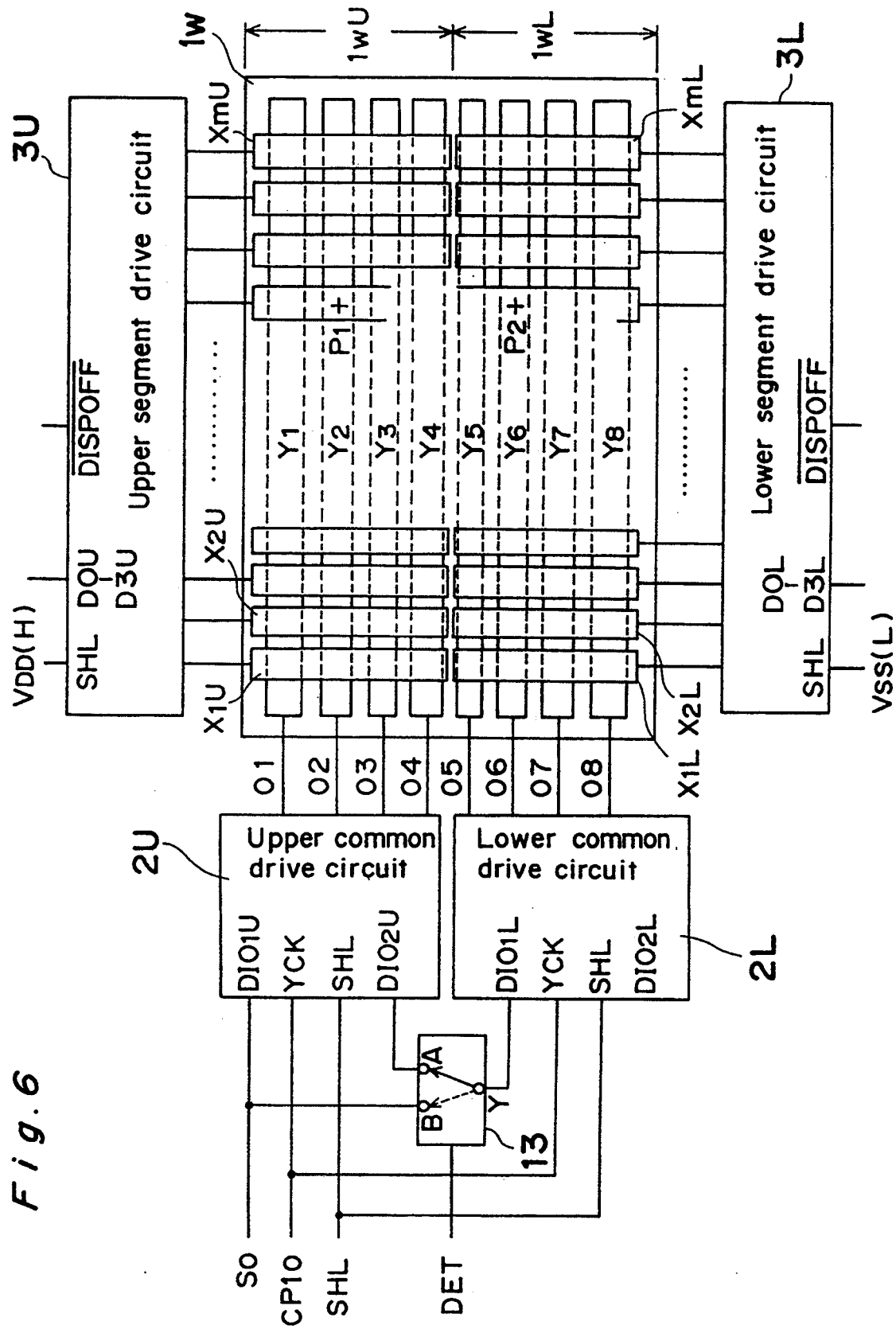
FIG. 6 is a main-part block diagram of a first embodiment of the display-integrated type tablet device according to the present invention.

The display-integrated type tablet device of the present embodiment is one in which the LCD device as shown in FIG. 4 is additionally provided with a tablet function, and which comprises a display section composed of a display panel 1w, upper/lower common drive circuits 2U, 2L, and upper/lower segment drive circuits 3U, 3L, as shown in FIG. 6. Although this display-integrated type tablet, as in the prior-art one as shown in FIG. 1, also has a switching circuit 4, a display control circuit 5, a detection control circuit 6, a control circuit 7, a detection pen 8, an amplifier 9, an x-coordinate detection circuit 10, a y-coordinate detection circuit 11, and a d.c. power supply circuit 12, yet they are omitted in FIG. 6.

In this display-integrated type tablet device, during the display period, display of the upper half 1wU of the display panel 1w and that of the lower half 1wL thereof are carried out simultaneously in parallel, in the same manner as in the LCD device shown in FIG. 4. As a result of this, duty ratio of display can be enhanced up to two times that in the prior art as shown in FIG. 1, with improved contrast.

During the coordinate detection period, on the other hand, the following method is applied to detect coordinates of the tip of the detection pen. It is to be noted that the number of the common electrodes Y is here assumed to be eight for simplicity of explanation.

Figure 7:
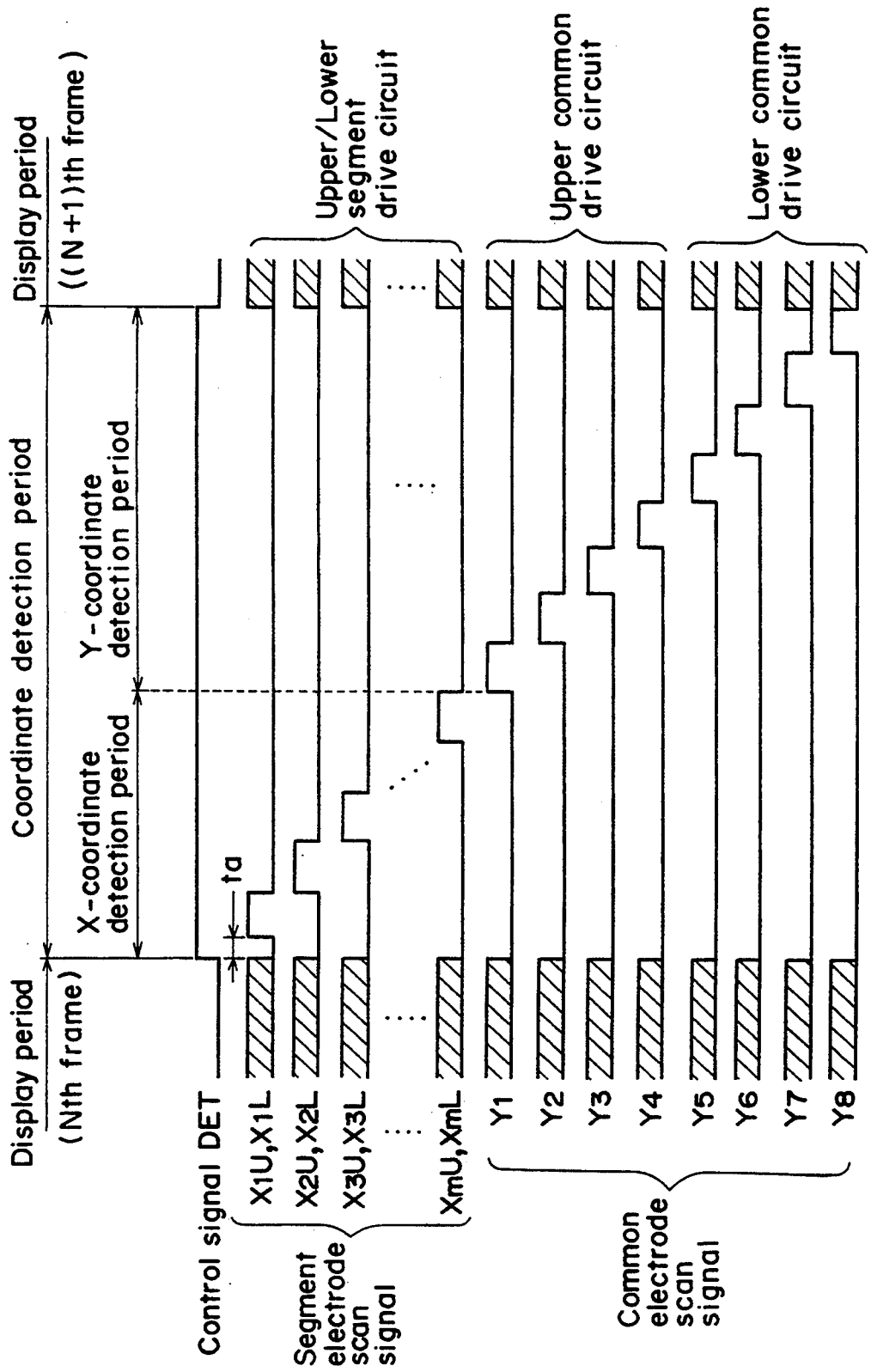
FIG. 7 is a view showing an example of the timing chart of the segment electrode drive signal and the common electrode drive signal in the display-integrated type tablet device as shown in FIG. 6.

FIG. 7 is a timing chart of a segment electrode scan signal x and a common electrode scan signal y in this coordinate detection method.

First, during an x-coordinate detection period, the upper segment drive circuit 3U and the lower segment drive circuit 3L scan a group of upper segment electrodes XU and a group of lower segment electrodes XL simultaneously in the same direction, respectively. In more detail, the drive circuits scan an upper segment electrode $X_1U$ and a lower segment electrode $X_1L$, an upper segment electrode $X_2U$ and a lower segment electrode $X_2L$, . . . , and an upper segment electrode $X_mU$ and a lower segment electrode $X_mL$ each at a timing, so that scanning is carried out as if upper and lower segment electrodes $X_mU$ and $X_mL$ the same distance away from one end were formed into one strip of segment electrode X. In this way, x-coordinate detection is carried out.

For this x-coordinate detection, instead of the way that upper segment electrodes XU and their corresponding lower segment electrodes XL (hereinafter, a pair of upper segment electrode XU and lower segment electrode XL to be scanned in x-coordinate detection as if they were a strip of segment electrodes X is referred to as a segment electrode pair) are scanned line by line, as shown in FIG. 7, it is also arranged that the segment electrode pairs are scanned a plurality of pairs at a time. Furthermore, a plurality of segment electrode pairs may be scanned as they overlap one another by such a method as described later.

By scanning the segment electrodes by a plurality of pairs, some advantages can be offered such that detection accuracy increases because of induced voltages developed to the detection pen, or that the detection period can be shortened.

Subsequently, moving to the y-coordinate detection period, upper common electrodes $Y_1$-$Y_4$ are successively scanned by the upper common drive circuit 2U and thereafter lower common electrodes $Y_5$-$Y_8$ are successively scanned by the lower common drive circuit 2L.

As a result of this, common electrodes Y are serially successively scanned from the common electrode $Y_1$ to the common electrode $Y_8$, so that the coordinate of point $P_1$ and that of $P_2$ (see FIG. 6) can be detected as separate coordinates.

Now the present embodiment is described in more detail below, referring to FIG. 6.

The upper common drive circuit 2U and the lower common drive circuit 2L each has a bidirectional shift register, each bidirectional shift register being provided with shift data input/output terminals $DIO_1U$, $DIO_2U$, and shift data input/output terminals $DIO_1L$, $DIO_2L$. In the case of FIG. 1, the shift data input/output terminals $DIO_1U$, $DIO_1L$ serve as input terminals to receive shift data So. Likewise, shift data input/output terminals $DIO_2U$, $DIO_2L$ serve as output terminals.

A multiplexer 13 switches and selects between a side of input terminal B, to which shift data So is inputted, and a side of input terminal A, to which an output signal from the shift data input/output terminal $DIO_2U$ is inputted, and outputs an input signal to the shift data input/output terminal $DIO_1L$ of the lower common drive circuit 2L.

The control signal DET is a signal for setting the display period and the coordinate detection period, which signal is arranged in the present embodiment so that it sets the coordinate detection period at an "H" level while it sets the display period at an "L" level. In addition, the coordinate detection period is a period equivalent to the vertical blanking period in CRT(cathode ray tube) display, during which period there will not be outputted display data $D_0U$-$D_3U$ corresponding to the upper segment drive circuit 3U and display data $D_0L$-$D_3L$ corresponding to the lower segment drive circuit 3L each from the display control circuit 5 (see FIG. 1).

The upper common drive circuit 2U and the lower common drive circuit 2L constructed as described above will operate in the following manner.

During the display period, the control signal DET goes to an "L" level depending on, for example, control of the control circuit 7 (see FIG. 1) while the multiplexer 13 selects the input terminal B side. As a result, the shift data So is inputted simultaneously into the shift data input/output terminal $DIO_1U$ of the bidirectional shift register of the upper common drive circuit 2U and the shift data input/output terminal $DIO_1L$ of the bidirectional shift register of the lower common drive circuit 2L.

Thus, the two bidirectional shift registers operate in parallel in synchronization with the same clock signal CP1o (hereinafter, such drive mode of the common electrodes Y is be referred to as parallel mode) to select the common electrodes $Y_1$, $Y_5 \rightarrow Y_2$, $Y_6 \rightarrow Y_3$, $Y_7 \rightarrow Y_4$, $Y_8$ in this order, so that the upper common electrodes YU and the lower common electrodes YL are simultaneously selected.

While this is carried out, the upper segment drive circuit 3U has display data $D_0U$-$D_3U$ inputted thereto and, on the other hand, the lower segment drive circuit 3L has display data $D_0L$-$D_3L$ inputted thereto. Accordingly, since the upper/lower segment electrodes XU, XL have already been driven in accordance with one-line display data, there is displayed an image onto both the upper half 1wU of the display panel 1w and the lower half 1wL thereof simultaneously.

As described above, during the display period, it is possible to carry out the display of the upper half 1wU and the lower half 1wL of the display panel by setting the common electrode drive mode to the parallel mode and controlling the upper common drive circuit 2U, the lower common drive circuit 2L, the upper segment drive circuit 3U, and the lower segment drive circuit 3L.

Meanwhile, during the coordinate detection period, the control signal DET goes to an "H" level so that the multiplexer 13 selects the input terminal A side. As a result, shift data So is inputted into the shift data input/output terminal $DIO_1U$ of the upper common drive circuit 2U. Then the shift data outputted from the shift data input/output terminal $DIO_2U$ after being shifted by the bidirectional shift register of the upper common drive circuit 2U is inputted into the shift data input/output terminal $DIO_1L$ of the lower common drive circuit 2L via the multiplexer 13.

Thus, the two bidirectional shift registers serially operate in synchronization with the clock signal CP1o (hereinafter, such common electrode drive mode is referred to as serial mode) to scan the common electrodes Y in the order of $Y_1 \rightarrow Y_2 \rightarrow \ldots \rightarrow Y_8$, so that the upper common electrodes YU and the lower common electrodes YL are scanned in series. Accordingly, the coordinates of a point $P_1$ existing in the upper half 1wU of the display panel 1w and those of a point $P_2$ existing in the lower half 1wL, both points being specified by the detection pen 8, can be detected as they are positively discriminated from each other.

As described above, between the bidirectional shift register for scanning the upper common electrodes YU and the shift register for scanning the lower common electrodes YL there is interposed the multiplexer 13. In this arrangement, by switchedly controlling the input of shift data into the bidirectional shift register for scanning the lower common electrodes YL by the multiplexer 13 and switching the common electrode drive mode to the parallel mode for the display period while switching it to the serial mode for the coordinate detection period, it is possible to approximately double the duty ratio of display by parallel display during the display period while it is possible to carry out serial scanning during the coordinate detection period.

Thus, contrast can be improved during the display period while coordinates of the detection pen can be detected positively during the coordinate detection period.

More specifically, in the present embodiment, the one side segment electrodes are formed by the upper segment electrodes XU while the other side segment electrodes are formed by the lower segment electrodes XL, and the one side common electrodes are formed by the upper common electrodes YU while the other side common electrodes are formed by the lower common electrodes YL. Also, the one side segment drive circuit is formed by the segment drive circuit 3U while the other side segment drive circuit is formed by the lower segment drive circuit 3L, and the one side common drive circuit is formed by the upper common drive circuit 2U while the other side common drive circuit is formed by the lower common drive circuit 2L. Further, the shift data feed path switching circuit is formed by the multiplexer 13.

Figure 8:
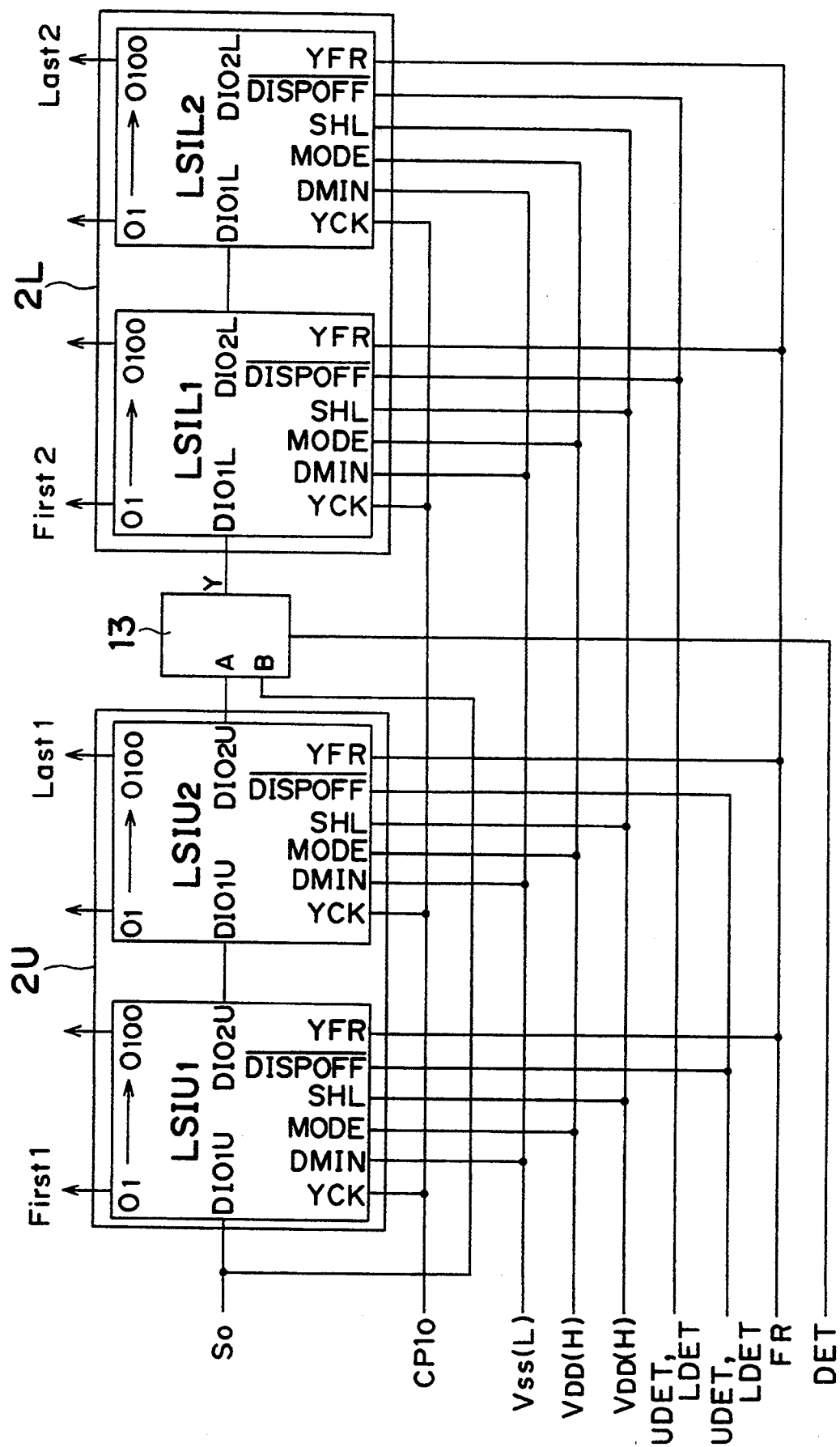
FIG. 8 is a view showing examples of the upper common drive circuit and the lower common drive circuit as shown in FIG. 6.

FIG. 8 is a view showing an example of circuit diagram of the upper common drive circuit 2U and the lower common drive circuit 2L as shown in FIG. 6.

In FIG. 8, the upper common drive circuit 2U is formed by two LSIs (hereinafter, abbreviated as $LSIU_1$ and $LSIU_2$, respectively) while the lower common drive circuit 2L is formed also by two LSIs (hereinafter, abbreviated as $LSIL_1$ and $LSIL_2$). The total number of common electrodes is 400, each 100 of which are connected to each of the four LSIs.

Figure 3:
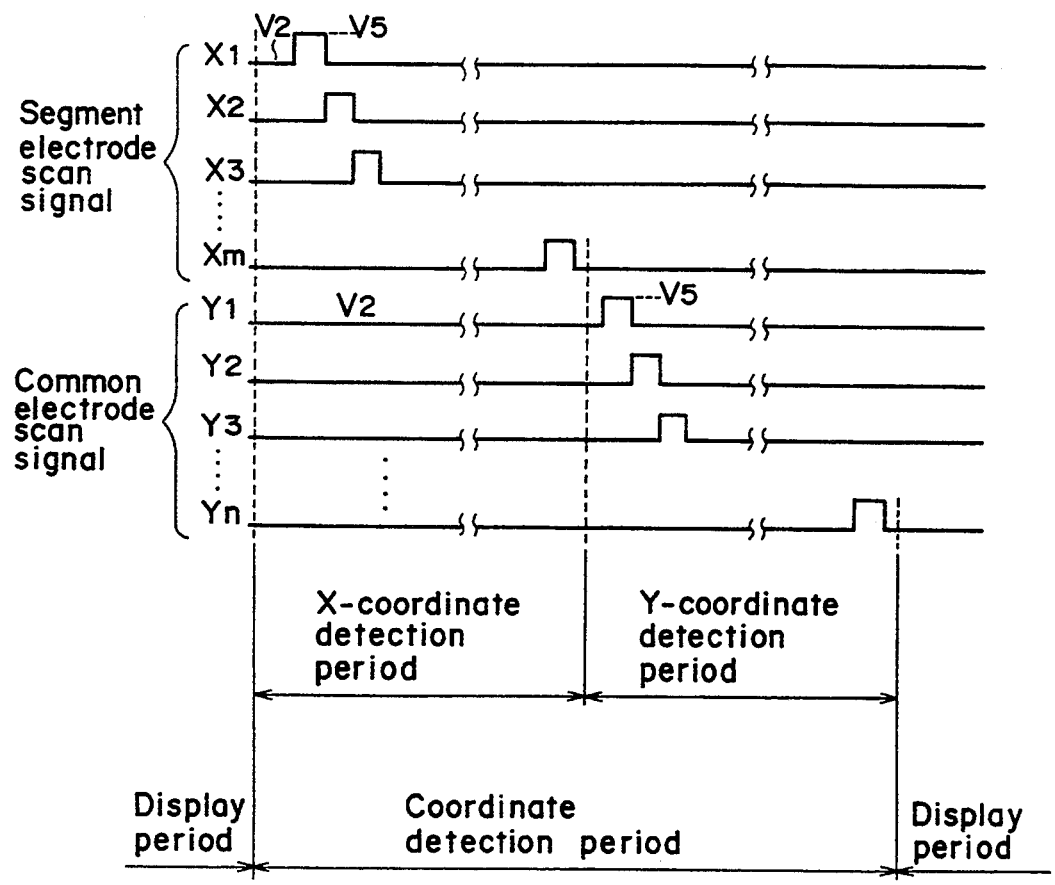
FIG. 3 is a timing chart of a segment electrode scan signal and a common electrode scan signal in the prior-art display-integrated type tablet device as shown in FIG. 1.

$DIO_1U$ and $DIO_1L$ are shift data input/output terminals of bidirectional shift registers formed by the LSIUs or the LSILs, as described above, and they serve as input terminals when power supply voltage "$V_{DD}$" is inputted (i.e. an "H" level signal is inputted) into a control terminal SHL of each LSIU or LSIL, as shown in FIG. 3, where the bidirectional shift registers shift from an output terminal $O_1$ toward an output terminal $O_{100}$ (toward the direction indicated by the arrow of the figure).

In contrast, the $DIO_1U$ and $DIO_1L$ serve as output terminals when power supply voltage "$V_{SS}$" is inputted (i.e. an "L" level signal is inputted) into the control terminal SHL, where the bidirectional shift registers shift from an output terminal $O_{100}$ toward an output terminal $O_1$ (toward the direction opposite to that indicated by the arrow of the figure).

$DIO_2U$ and $DIO_2L$ are shift data input/output terminals of the bidirectional shift registers formed by each LSIU or LSIL, and serve as output terminals when the bidirectional shift registers shift in the direction indicated by the arrow while they serve as input terminals when the bidirectional registers shift in the direction opposite to that indicated by the arrow.

The shift data input/output terminal $DIO_2U$ is connected to the shift data input/output terminal $DIO_1U$ of $LSIU_2$. Likewise, shift data input/output terminal $DIO_2L$ is connected to the shift data input/output terminal $DIO_1U$ of $LSIU_2$.

The multiplexer 13, as described previously, switchedly selects the input terminal A side connected to the shift data input/output terminal $DIO_2U$ of the $LSIU_2$ or the input terminal B side, to which shift data So is inputted, in compliance with DET. Then the multiplexer 13 outputs an input signal from an output terminal Y to the shift data input/output terminal $DIO_1L$ of the $LSIL_1$.

In the present embodiment, when the control signal DET is at an "L" level, the multiplexer 13 selects the input terminal B side. In this state, the shift data So is inputted simultaneously to the shift datainput/output terminal $DIO_1U$ of the $LSIU_1$ and the shift data input/output terminal $DIO_1L$ of the $LSIL_1$, where a row of the bidirectional shift registers within the upper common drive circuit 2U and a row of the bidirectional shift registers within the lower common drive circuit 2L operate in parallel depending on the same clock signal CP1o.

Thus, the 200 upper common electrodes YU connected to the upper common drive circuit 2U and the 200 lower common electrodes YL connected to the lower common drive circuit 2L are driven in parallel.

On the other hand, when the control signal DET is at an "H" level, the multiplexer 13 selects the input terminal A side. In this state, the shift data outputted from the shift data input/output terminal $DIO_2U$ of the $LSIU_2$ is inputted to the shift data input/output terminal $DIO_1L$ of the $LSIL_1$, where a row of the bidirectional shift registers within the upper common drive circuit 2U and a row of the bidirectional shift registers within the lower common drive circuit 2L operate in series.

Thus, the shift data So inputted to the shift data input/output terminal $DIO_1U$ Of the $LSIU_1$ is inputted to the shift data input/output terminal $DIO_1L$ of the $LSIL_1$ via the multiplexer 13 after being shifted by the bidirectional shift registers within the common drive circuit 2U, where the data is shifted by the bidirectional shift registers within the lower common drive circuit 2L. In this way, the 200 upper common electrodes YU connected to the upper common drive circuit 2U and the 200 lower common electrodes YL connected to the lower common drive circuit 2L are driven in series.

Figure 9:
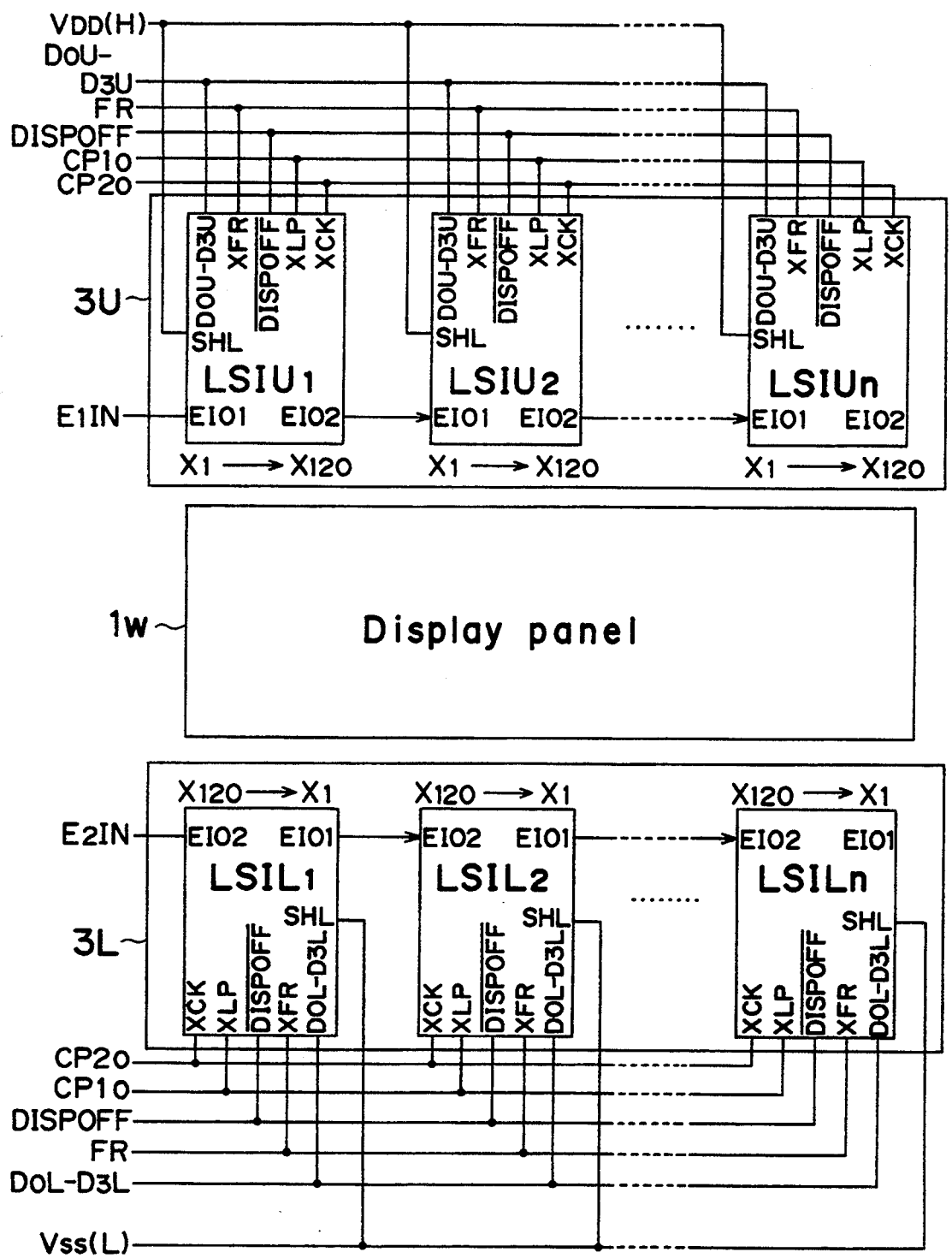
FIG. 9 is a view showing examples of the upper segment drive circuit and the lower segment drive circuit as shown in FIG. 6.

FIG. 9 is a view showing an example of practical circuits of the upper segment drive circuit 3U and the lower segment drive circuit 3L. These upper segment drive circuit 3U and lower segment drive circuit 3L are each formed in such a way that n bidirectional shift registers made up of n LSIs are connected in series.

The upper segment drive circuit 3U and the lower segment drive circuit 3L operate in the same manner as the serial operation in the upper common drive circuit 2U and the lower common drive circuit 2L, as shown in FIG. 3, where input shift data $E_1IN$ or shift data $E_2IN$ is serially shifted. Thus, display data $D_0U-D_3U$ or display data $D_0L-D_3L$ is entrapped to positions to which pulses of the shift data $E_1IN$ or $E_2IN$ have been shifted.

$LSIU_1-LSIU_n$, which form the upper segment drive circuit 3U, and $LSIL_1-LSIL_n$, which form the lower segment drive circuit 3L, are provided by LSIs having the same construction. However, since the $LSIU_1-LSIU_n$ and $LSIL_1-LSIL_n$ are arranged so as to oppose each other with the display panel 1w interposed therebetween, if a signal of the same level was inputted to the control terminal SHL of each LSI, shift direction in the $LSIU_1$ and that in the $LSIL_1-LSIL_n$ would result in opposite ones from each other.

This being the case, it is arranged that power supply voltage "$V_{DD}$ (level "H")" is inputted to each control terminal SHL of the $LSIU_1-LSIU_n$ of the upper segment drive circuit 3U, so that each LSIU shifts from output terminal $X_1$ toward output terminal $X_{120}$. It is also arranged that power supply voltage "$V_{SS}$ (level "L")" is inputted to each control terminal SHL of $LSIL_1-LSIL_n$ of the lower segment drive circuit 3L, so that each LSIL shifts from output terminal $X_{120}$ toward output terminal $X_1$.

By this arrangement, the upper segment electrode $X_mU$ and a lower segment electrode $X_mL$ located at a position opposed to the segment electrode $X_mU$ are simultaneously scanned, whereby the segment electrode $X_mU$ and the lower segment electrode $X_mL$ can be formed into a segment pair mentioned above.

Figure 10:
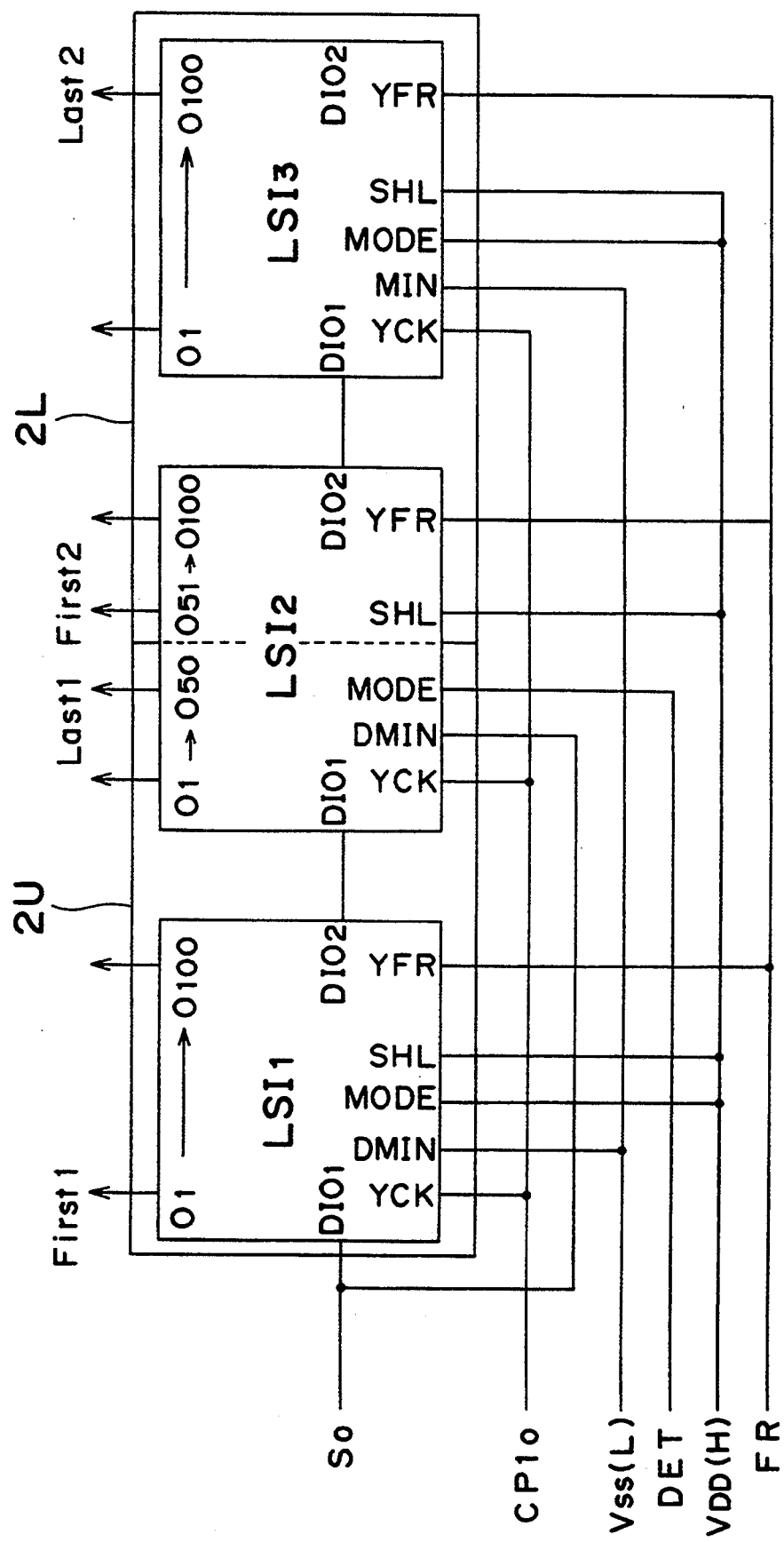
FIG. 10 is a view showing examples other than shown in FIG. 8 of the upper common drive circuit and the lower common drive circuit.

FIG. 10 is a circuit diagram showing a practical example other than FIGS. 6 and 8 of the upper common drive circuit 2U and the lower common drive circuit 2L. This embodiment is one so arranged that during the display period the upper common electrodes YU and lower common electrodes YL are selected in parallel while during the coordinate detection period the upper common electrodes YU and the lower common electrodes YL are scanned in series.

In FIG. 10, the upper common drive circuit 2U and the lower common drive circuit 2L are formed by three LSIs (hereinafter, abbreviated as $LSI_1$, $LSI_2$, and $LSI_3$, respectively). Further, a shift data input/output terminal $DIO_2$ of $LSI_1$ and a shift data input/output terminal $DIO_1$ of $LSI_2$ are connected together while a shift data input/output terminal $DIO_2$ of $LSI_3$ and a shift data input/output terminal $DIO_1$ of $LSI_3$ are connected together.

In this case, the total number of common electrodes is 300, 100 common electrodes Y of which are connected to each of the three LSIs.

Each of the LSIs has a control terminal MODE, and when an "L" level control signal is inputted to the control terminal MODE, a relevant LSI is set to single mode.

Then each of the LSIs, when set to dual mode, effects shifting in two ways in parallel, that is, shifting shift data inputted from the input/output terminal $DIO_1$ of the bidirectional shift register formed by the relevant LSI in the direction from output terminal $O_1$ toward output terminal $O_{50}$ and shifting shift data inputted from input terminal DMIN in the direction from output terminal $O_{51}$ toward output terminal $O_{100}$. Meanwhile, when set to the single mode, each LSI effects shifting of shift data inputted from input/output terminal $DIO_1$ in the direction from output terminal $O_1$ toward output terminal $O_{100}$ while neglecting shift data inputted from input terminal DMIN.

In either case, shift direction of each bidirectional shift register is determined by the level of the power supply voltage inputted to the control terminal SHL.

As shown in FIG. 10, to each control terminal MODE of the $LSI_1$ and $LSI_3$ are normally applied an "H" level power supply voltage "$V_{DD}$," thereby setting the $LSI_1$ and $LSI_3$ to the single mode. Meanwhile, to the control terminal MODE of $LSI_2$ located at the center between the $LSI_1$ and $LSI_3$ is applied the control signal DET, thereby setting the $LSI_2$ to be switchable between the single and the dual mode depending on the level of the control signal DET.

By this arrangement, when the control signal DET is at an "L" level, $LSI_2$ is set to the dual mode, where the upper common drive circuit 2U and the lower common drive circuit 2L shift the shift data So simultaneously inputted both to the shift data input/output terminal $DIO_1$ of the $LSI_1$ and to the input terminal DMIN of the $LSI_2$ in parallel depending on the same clock signal CP1o.

As a result, the shift data So inputted to the shift data input terminal $DIO_1$ of the $LSI_1$ is shifted from the output terminal $O_1$ of the $LSI_1$ toward the output terminal $O_{50}$ of the $LSI_2$ via the output terminal $O_{100}$ of the $LSI_1$ and the output terminal $O_1$ of the $LSI_2$. The shift data So inputted to the input terminal DMIN of the $LSI_2$ in parallel to the above data is shifted from the output terminal $O_{51}$ of the $LSI_2$ toward the output terminal $O_{100}$ of the $LSI_3$ via the output terminal $O_{100}$ of the $LSI_2$ and the output terminal $O_1$ of the $LSI_3$. Thus, the 150 upper common electrodes YU connected to the upper common drive circuit 2U and the 150 lower common electrodes YL connected to the lower common drive circuit 2L are driven in parallel.

On the other hand, when the control signal DET is at an "H" level, the $LSI_2$ is set to the single mode, where the upper common drive circuit 2U and the lower common drive circuit 2L serially shifts the shift data So inputted to the shift data input/output terminal $DIO_1$ of the $LSI_1$ depending on the clock signal CP1o.

As a result, the input shift data So is serially shifted from the output terminal $O_1$ of the $LSI_1$, via the output terminals of the $LSI_2$, up to the output terminal $O_{100}$ of the $LSI_3$. In this way, the 150 upper common electrodes YU connected to the upper common drive circuit 2U and the 150 lower common electrodes YL connected to the lower common drive circuit 2L are successively driven in series.

In consequence, in the present embodiment, the shift register located at the center is provided by the bidirectional shift register of the $LSI_2$.

As described above, in either case of the upper/lower common drive circuits 2U, 2L as shown in FIG. 8 or the upper/lower common drive circuits 2U, 2L as shown in FIG. 10, during the display period, by setting the control signal DET to an "L" level, it is made possible to drive the upper common electrodes YU connected to the upper common drive circuit 2U and the lower common electrodes YL connected to the lower common drive circuit 2L in parallel, and therefore to improve the duty ratio of display.

During the coordinate detection period, on the other hand, by setting the control signal DET to an "H" level, it is possible to successively scan the upper common electrodes YU connected to the upper common drive circuit 2U and the lower common electrodes YL connected to the lower common drive circuit 2L in series.

In this arrangement, the shift data So inputted into the bidirectional shift registers of the upper/lower common drive circuits 2U, 2L is transferred on the tailing edge of the clock signal CP1o for transfer. Accordingly, when the common electrodes Y are selected and scanned one by one, the maximum value of the pulse width of the shift data So comes equal to the cycle of the clock signal CP1o.

During the display period, since the upper common electrodes YU and the lower common electrodes YL are selected by a set of each one electrode of them, the maximum value of the pulse width of the shift data So during the display period is the cycle of the clock signal CP1o.

In contrast to this, during the coordinate detection period, normally a plurality of common electrodes Y are collectively scanned to enhance the induced voltage from the detection pen, enhance the detection accuracy of coordinates of the detection pen, and shorten the coordinate detection period. Accordingly, the pulse width of the shift data So during the coordinate detection period is set to a few clocks of the clock signal CP1o.

Figure 11:
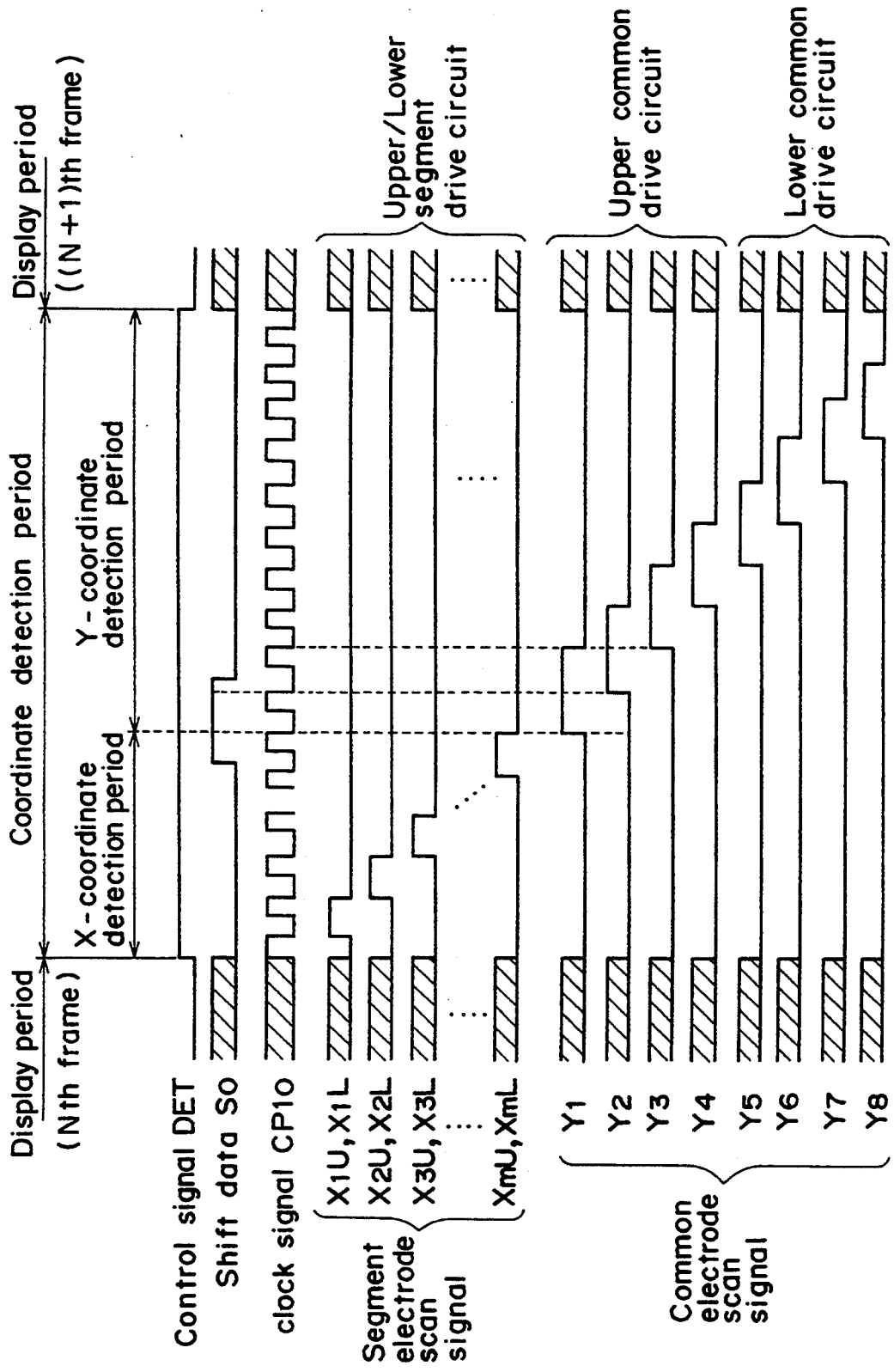
FIG. 11 is a timing chart of the segment electrode scan signal and the common electrode scan signal when the pulse width of shift data So is set to a length of 2 clocks of a clock signal CP1o.

FIG. 11 is a timing chart when the pulse width of the shift data So is set to two clocks of the clock signal CP1o. In this case, the common electrodes Y can be scanned with every two common electrodes overlapped, as in the order of $Y_1 \rightarrow Y_1$, $Y_2 \rightarrow Y_2$, $Y_3 \rightarrow Y_3$, $Y_4 \rightarrow Y_4$, $Y_5 \rightarrow \ldots$. In this order, the number of common electrodes to be overlapped is not limited to two; practically, it is effecitive to choose the number of 16 common electrodes or so.

The manner of scanning a plurality of electrodes for the coordinate detection period can be applied also to the segment electrodes X without being limited to the common electrodes Y, as stated above.

In the above-described aspects of the present embodiment, since the upper common electrodes YU and the lower common electrodes YL are driven in parallel during the display period, some time margin results within the display period. This allows some extension of the coordinate detection period within a one-frame period.

For example, assume that the ratio of the coordinate detection period with respect to a one-frame period in the prior art as shown in FIG. 1 is 0.04 and that of the display period is 0.96. If, in this case, the ratio of the coordinate detection period is doubled to 0.08 and that of the display period is changed to 0.92 and further the above-described embodiment is applied, then the display period will seemingly be reduced to a substantial extent; however, since the upper half 1wU and the lower half 1wL of the display panel 1w are displayed in parallel, the display period is substantially reduced as compared with the prior art, allowing the effect of the reduction in the display period to be neglected as follows.

When the number of common electrodes Y is 400, the resulting display duty ratio in the prior art (i.e. ratio of a one-line display period with respect to a one-frame period) is 0.096/400=0.0024. Meanwhile, the display duty ratio when the above embodiment is applied is 0.092/200=0.0046. Hence, a display duty ratio of 0.0046/0.0024 (=1.9 times) can be attained by applying the above embodiment.

This means that applying the embodiment allows the two opponents of coordinate detection period and display duty ratio to be approximately doubled.

As shown above, it is possible to extend the coordinate detection period by shortening the display period with application of the above embodiment, and to effect the scanning of the common electrodes Y and the segment electrodes X a plurality of times during the coordinate detection period.

In this arrangement, it may be only one group of the common electrodes Y and the segment electrodes X which are scanned a plurality of times, without causing any problem.

For example, in FIG. 6, the common electrodes Y are located below the segment electrodes X. Therefore, the segment electrodes X are closer to the detection pen 8, and the voltage induced to the detection pen due to a segment electrode scan signal x is higher than a voltage induced due to a common electrode scan signal y. As a result, the accuracy of detecting coordinates of the tip of the detection pen 8 is such that the accuracy of y-coordinate detection is lower than that of x-coordinate detection.

Thus, in the above-described embodiment it is arranged that the number of scanning times for the common electrodes Y during the y-coordinate detection period is made greater than that for the segment electrodes X during the x-coordinate detection so that the y-coordinate is determined with reference to a plurality of detection results.

Although the common electrodes Y are located below the segment electrodes X in FIG. 6, yet which electrodes should be located below depends on which characteristic of the drive circuits is considered more important, without limiting them especially to the common electrodes Y.

For example, judged from the accuracy of detecting coordinates of the tip of the detection pen with the lower electrodes, it can be said that higher detection accuracy in the vicinity of the boundary between the upper half 1wU and the lower half 1wL of the liquid crystal panel 1 will result when the segment electrodes X, which form segment electrode pairs by an upper segment electrode XU and a lower segment electrode XL, are located below, as is converse to the case of FIG. 1.

However, from the fact that it is possible to enhance the detection accuracy by effecting the scanning of electrodes a plurality of times, as described above, it follows that the accuracy of detecting coordinates of the tip of the detection pen does not show any difference, whichever group of electrodes is located below. Accordingly, which group of electrodes is located below may be determined by other factors.

For instance, as viewed from the point of the coordinate detection period, prolongation of the total scan period due to a plurality of times scanning of the lower electrodes can be minimized by arranging a group of electrodes, whichever group requires a shorter one-time scanning time, to be located below.

Accordingly, when x-coordinate scan and y-coordinate scan are carried out at the same scanning speed, a group of electrodes out of segment electrodes X and common electrodes Y, whichever the number of electrodes is smaller, (i.e. the group of electrodes whose one-time scanning time is shorter) should be located below. When the number of common electrodes Y is 400 and that of segment electrodes X is 640 as in the above embodiment, it is effective to increase the number of scanning times with the common electrodes Y located below as shown in FIG. 1.

Further, as described above, if it is arranged that, to scan a group of electrodes a plurality of times during a one-time coordinate scan period, the speed and direction at and in which the detection pen will move in the current scanning are predicted from the coordinates of the tip of the detection pen calculated in the previous- and one more previous-time scanning, and that only the coordinate values approximate to the predicted ones are assigned ones for the current scanning out of a plurality of coordinate values obtained from the current scanning, then it is possible to further enhance the accuracy of detecting the coordinates of the tip of the detection pen.

As another advantage by extension of the coordinate scan period, it is possible to lower the clock frequency for detection during the coordinate scan period so that any effect of external noise can be minimized in detecting the coordinates of the tip of the detection pen. Furthermore, power consumption also can be lowered by lowering the clock frequency.

(Embodiment 2)

Figure 12:
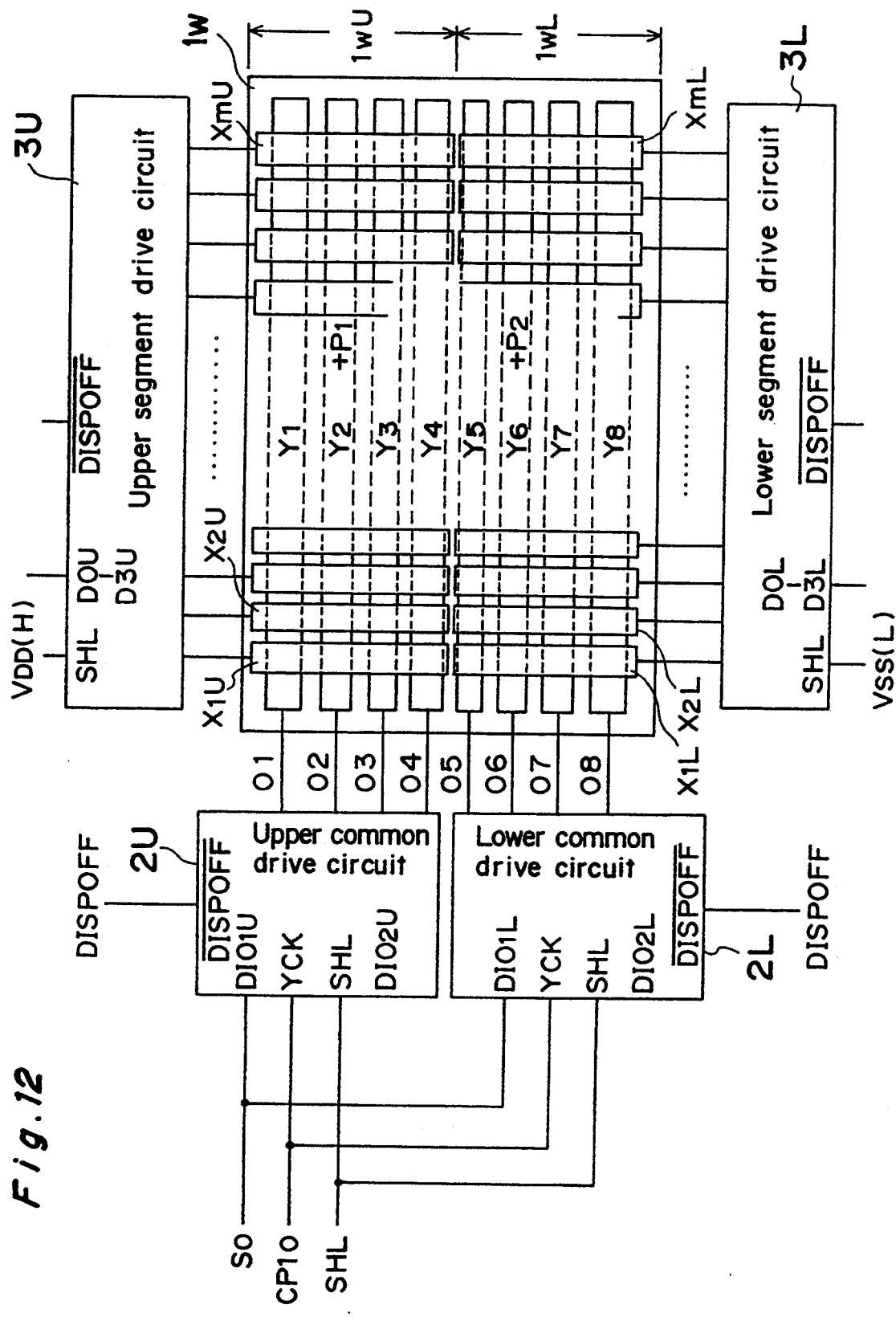
FIG. 12 is a main-part block diagram of a display-integrated type tablet device according to a second embodiment of the present invention, in which the scanning of the upper common electrodes and the scanning of the lower common electrodes can be carried out in parallel during the coordinate detection period.

Embodiment 2 is an embodiment in which the coordinate detection period is shortened by scanning the upper half 1wU and the lower half 1wL of the display panel 1w in parallel also during the coordinate detection period, as during the display period. In the present embodiment, a display panel and its drive circuits as shown in FIG. 12 are employed. An upper common drive circuit 2U and a lower common drive circuit 2L, as shown in FIG. 12, have an essential construction in which the multiplexer 13 has been removed from the construction as shown in FIG. 8. Also, the upper segment drive circuit 3U and the lower segment drive circuit 3L have the same construction as shown in FIG. 9.

Hereinbelow, operations of the upper common drive circuit 2U, the lower common drive circuit 2L, the upper segment drive circuit 3U, and the lower segment drive circuit 3L of the display-integrated type tablet device in the present embodiment are described with reference to FIG. 12, FIG. 8, and FIG. 9.

The upper common drive circuit 2U, the lower common drive circuit 2L, the upper segment drive circuit 3U, and the lower segment drive circuit 3L are each provided with a control terminal DISPOFF. This control terminal DISPOFF is to normally receive an "H" level signal, and by applying drive signals or scan signals of voltages set by level shifters (not shown) to electrodes where pulses of shift data So are shifted by the bidirectional shift registers that the drive circuits 2U, 2L, 3U, and 3L have, the operation of image display or coordinate detection as described above is performed.

The level shifters appropriately combine bias power supplies $V_0$–$V_5$ fed from the d.c. power supply circuit 12 (see FIG. 1) depending on the level of inversion signals FR inputted into the drive circuits 2U, 2L, 3U, and 3L, so as to set a drive voltage or scan voltage and a reference voltage for the segment electrode drive signal, the common electrode drive signal, the segment electrode scan signal x, and the common electrode scan signal y.

In FIG. 3, the scan voltage of the common electrode scan signal y and that of the segment electrode scan signal x for the coordinate detection period are set to "$V_5$" while the non-scan voltage (i.e. reference voltage) is set to "$V_2$."

In this arrangement, when level of signals inputted to control terminals DISPOFF goes "L," the value of voltage outputted to electrodes connected to output terminals $O_1$–$O_{100}$, $X_1$–$X_{120}$ of the bidirectional shift registers of the corresponding drive circuits 2U, 2L, 3U, and 3L is set to "$V_0$" irrespectively of the contents of the level shifters. The resulting voltage "$V_0$" is the lowest voltage of the aforementioned bias power supplies, not contributing to display of the display panel 1w at all.

In this case, since the control terminals DISPOFF are provided to the drive circuits 2U, 2L, 3U, and 3L independently of each other, the voltage "$V_0$" can be applied each independently to the upper common electrodes YU, the lower common electrodes YL, the upper segment electrodes XU, and the lower segment electrodes XL.

Figure 13:
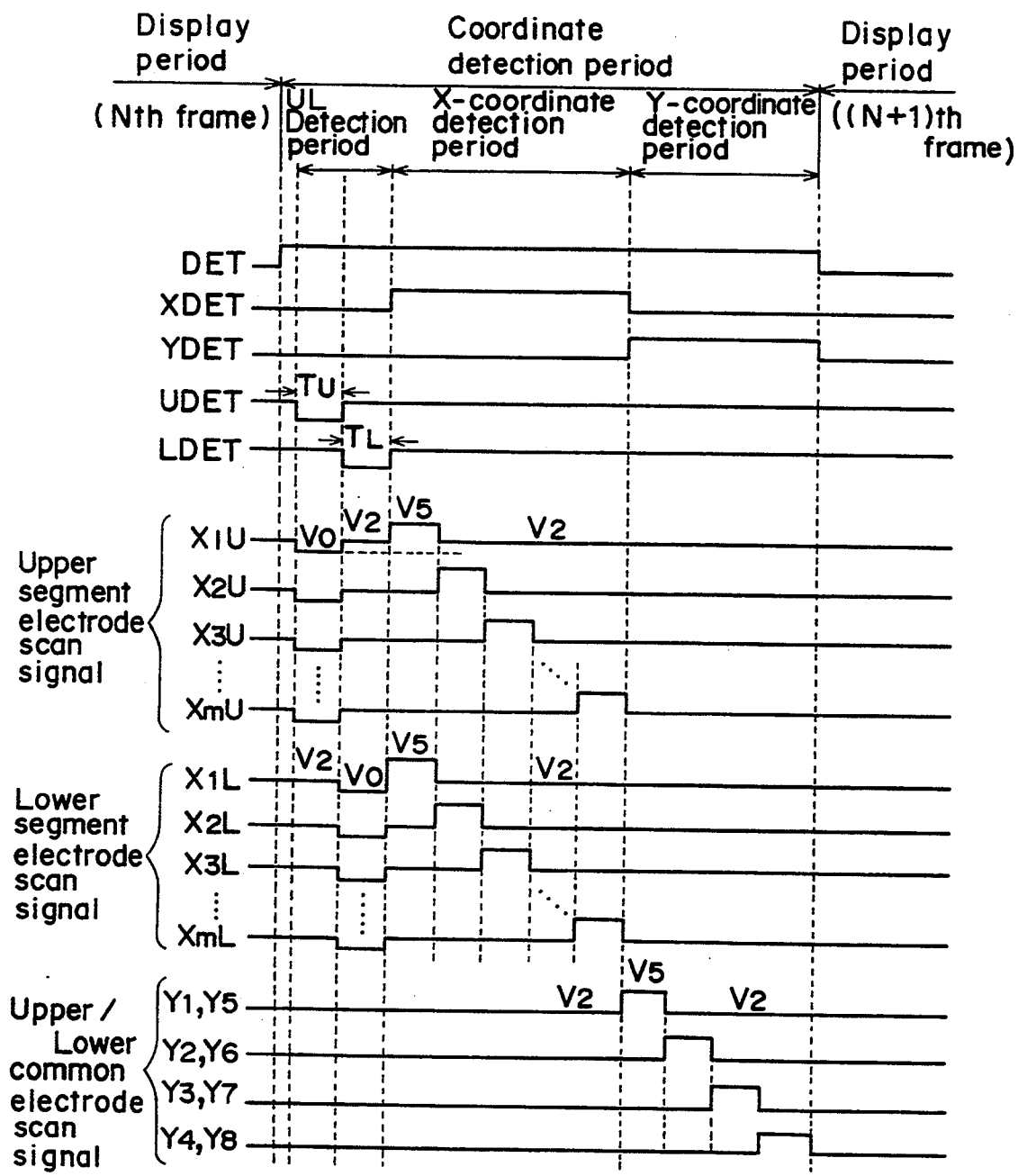
FIG. 13 is a view showing an example of the timing chart of the segment electrode scan signal and the common electrode scan signal in the display-integrated type tablet device as shown in FIG. 12.

FIG. 13 is a timing chart of segment electrode scan signals x and common electrode scan signals y during the coordinate detection period in the present embodiment.

In this embodiment, as shown in FIG. 13, there is provided a period for detecting whether the detection-target region is the upper half 1wU or the lower half 1wL of the display panel 1w (hereinafter, referred to as UL detection period). Further this UL detection period is divided into U detection period $T_U$, during which the upper half 1wU of the display panel 1w is to be detected, and L detection period $T_L$, during which the lower half 1wL thereof is to be detected.

The U detection period $T_U$ and L detection period $T_L$ are set by setting a U detection period setting signal UDET or an L detection period setting signal LDET to an "L" level.

Accordingly, as shown in FIG. 13, for the U detection period $T_U$ in the coordinate detection period (a period during which the control signal DET is at an "H" level, as described above), the level of the U detection period setting signal UDET inputted to the control terminal DISPOFF of the upper segment drive circuit 3U is set to an "L" level, so that the scan voltage of the segment electrode scan signals xU inputted to the upper segment electrodes $X_1U$–$X_mU$ connected to the upper segment drive circuit 3U is set to "$V_0$."

On the other hand, the U detection period setting signal UDET inputted to the control terminals DISPOFF of the drive circuits 2U, 2L, and 3L other than the upper segment drive circuit 3U is set to an "H" level, thereby setting the voltage of the segment electrode scan signals xL or the common electrode scan signals yU, yL inputted into the lower segment electrodes XL, the upper common electrodes YU, and the lower common electrodes YL to the non-scan voltage "$V_2$."

In contrast to this, during the L detection period $T_L$, the L detection period setting signal LDET inputted to the control terminal DISPOFF of the lower segment drive circuit 3L is set to an "L" level while the L detection period setting signal LDET inputted to the control terminals DISPOFF of the other drive circuits 2U, 2L, and 3U is set to an "H" level. Further, the scan voltage of the segment electrode scan signals xL inputted to the lower segment electrodes XL is set to "$V_0$" while the voltage of the segment electrode scan signals xU or the common electrode scan signals yU, yL inputted to the upper segment electrodes XU, upper common electrodes YU, and the lower common electrodes YL is set to the non-scan voltage "$V_2$."

When such segment electrode scan signals xU, xL and common electrode scan signals yU, uL are inputted to the segment electrodes XU, XL and the common electrodes YU, YL, there develops an induced voltage due to scan pulses of the voltage "$V_0$" of the segment electrode scan signals xU, xL to the detection pen located on the display panel 1w.

Accordingly, depending on whether the timing at which the induced voltage has occurred to the detection pen is the U detection period or the L detection period, it can be detected whether the detection pen 8 is in the upper half 1wU or in the lower half 1wL of the display panel 1w.

Figure 14:
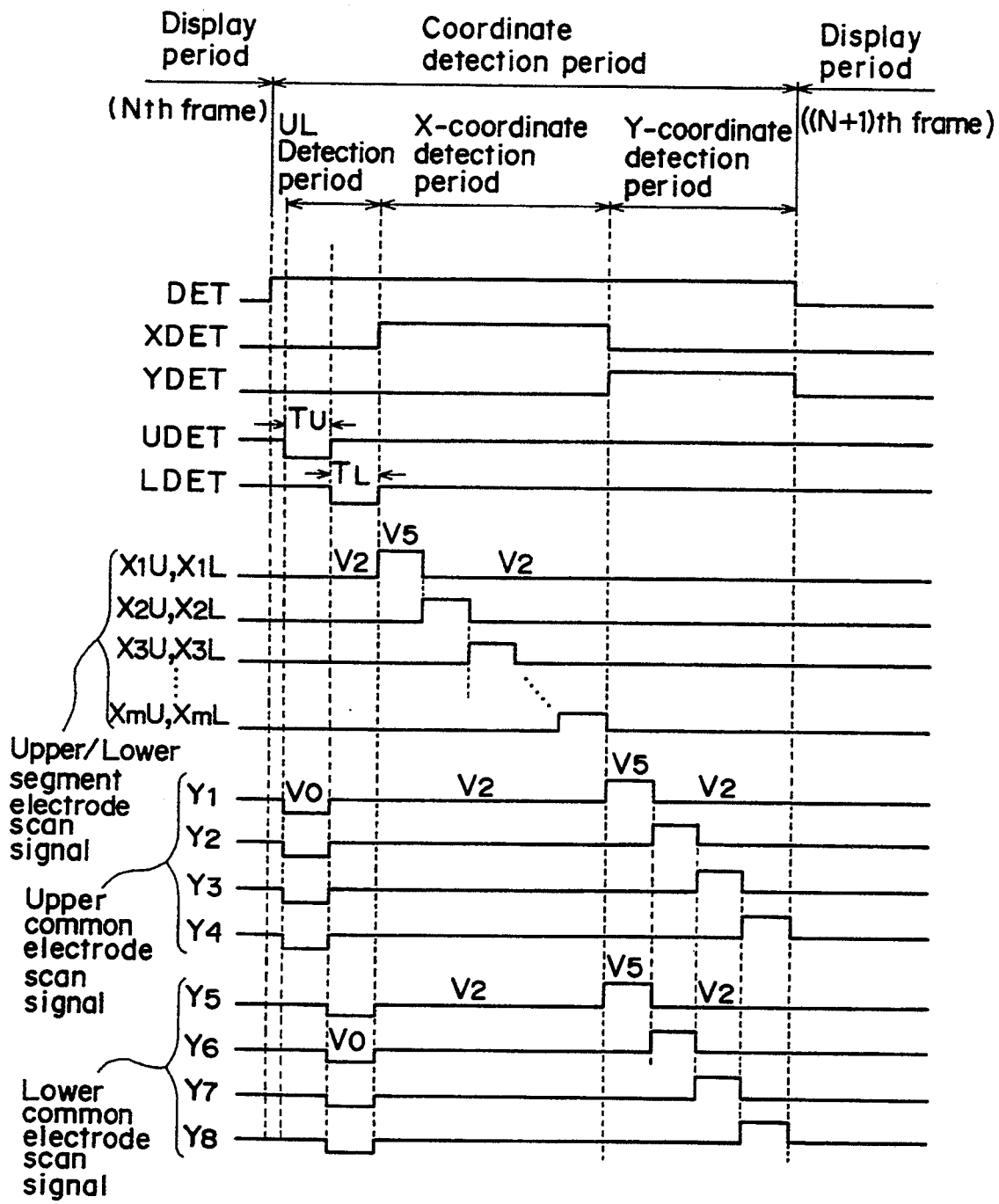
FIG. 14 is a timing chart of the segment electrode scan signal and the common electrode scan signal other than shown in FIG. 13 of the display-integrated type tablet device as shown in FIG. 12.

In the above-described embodiment, the scan voltage of the segment electrode scan signals xU, xL for both the U detection period $T_U$ and the L detection period $T_L$ is set to "$V_0$." However, it may be the scan voltage of the common electrode scan signals yU, yL which is set to "$V_0$," as shown in FIG. 14.

More specifically, during the U detection period $T_U$, the U detection period setting signal UDET inputted to the control terminal DISPOFF of the upper common drive circuit 2U is set to an "L" level while the U detection period setting signal UDET inputted to the control terminals DISPOFF of the other drive circuits 2L, 3U, and 3L is set to an "H" level. On the other hand, during the L detection period $T_L$, the L detection period setting signal LDET inputted to the control terminal DISPOFF of the lower common drive circuit 2L is set to an "L" level while the L detection period setting signal LDET inputted to the control terminals DISP-OFF of the other drive circuits 2U, 3U, and 3L is set to an "H" level.

As stated above, in the above-described aspects of the present embodiment, the U detection period $T_U$ or the L detection period $T_L$ is set, and it is previously detected whether the tip of the detection pen 8 exists in the upper half 1wU or in the lower half 1wL of the display panel 1w, depending on the scan signals from the upper common drive circuit 2U and the lower common drive circuit 2L or those from the upper segment drive circuit 3U and the lower segment drive circuit 3L. Accordingly, as shown by + mark in FIG. 12, the coordinates of a point $P_1$ existing in the upper half 1wU of the display panel 1w and those of a point $P_2$ existing in the lower half 1wL thereof can be discriminated from each other correctly by the x-coordinate detection circuit 10 or the y-coordinate detection circuit 11 (see FIG. 1 for both), mentioned before, even if the upper half 1wU and the lower half 1wL of the display panel 1w are scanned in parallel, as described below.

FIG. 15 is a view which shows, for each region in which the tip of the detection pen 8 exists, an example of the induced voltage developed to the detection pen 8, and the way both the region in which the tip of the detection pen 8 exists and the y-coordinate of the tip of the detection pen 8 are determined.

Now referring to FIG. 15, the way how the y-coordinate is determined is described in detail, for each case of the region in which the tip of the detection pen 8 exists.

FIG. 15(a) shows a case in which, in the UL detection period, only during the U detection period $T_U$ there appears the peak "DU" of induced voltage. In this case, the y-coordinate detection circuit decides that it is the upper half 1wU of the display panel 1w in which the tip of the detection pen 8 exists. It is noted that the scan voltage "$V_0$" of the common electrode scan signals y inputted to the common electrodes Y during the U detection period $T_U$ is a lower voltage with respect to the non-scan voltage "$V_2$," and therefore the voltage induced to the detection pen 8 results in negative polarity.

Further, the peak of the induced voltage that appears to the detection pen 8 during the y-coordinate detection period in the case of FIG. 15(a) is "$V_{P1}$," the only one, allowing the y-coordinate of the detection pen 8 to be calculated as a position distant from an uppermost position of the display panel by a distance corresponding to a time "$t_y$" from the start of scanning the y-coordinate to the occurrence of the peak "$V_{P1}$."

FIG. 15(b) shows a case where peaks "DU" and "DL" appear during the U detection period $T_U$ and the L detection period $T_L$, respectively, in the UL detection period. In this case, it is decided that the tip of the detection pen exists in the vicinity of the boundary between the upper half 1wU and the lower half 1wL of the display panel 1w and further that, based on the relation between the peak value "$V_{DU}$" of the peak "DU" and the peak value "$V_{DL}$," "$V_{DU}$">"$V_{DL}$," the tip of the detection pen 8 exists in the upper half 1wU of the display panel 1w.

Also in this case, since there occurs two peaks of induced voltage, "$V_{P1}$" and "$V_{P2}$" to the detection pen 8 during the y-coordinate detection period, the y-coordinate of the tip of the detection pen 8 is calculated as a position distant from an uppermost position of the display panel 1w by the distance corresponding to a time "$t_y$" from the start of scanning the y-coordinate to the occurrence of the peak "$V_{P1}$."

FIG. 15(C) shows a case where peaks "DU" and "DL" of induced voltage appear during the U detection period $T_U$ and the L detection period $T_L$, respectively, in the UL detection period, and where the relation between the peak value "$V_{DU}$" of the peak "DU" and the peak value "$V_{DL}$" of the peak "DL" results in "$V_{DU}$"≈"$V_{DL}$." In this case, it is decided that the tip of the detection pen exists on the boundary between the upper half 1wU and the lower half 1wL of the display panel 1w.

Yet further, in this case, there occurs each half of two peaks "$V_{P1}$" and "$V_{P2}$" of induced voltage, equal to each other, to the detection pen 8 during the y-coordinate detection period at both the beginning of the y-coordinate detection period and the end thereof, and therefore the y-coordinate of the tip of the detection pen 8 is calculated as the midpoint of the display panel 1w.

FIG. 15(d) shows a case symmetrical to the case of FIG. 15(b). That is, during the UL detection period, peaks "DU" and "DL" of induced voltage appear during the U detection period $T_U$ and the L detection period $T_L$, respectively, in the UL detection period, and the relation between the peak value "$V_{DU}$" of the peak "DU" and the peak value "$V_{DL}$" of the peak "DL" is "$V_{DU}$"<"$V_{DL}$." Thus it is decided that the tip of the detection pen 8 exists in the lower half 1wL of the display panel 1w.

Further in this case, the y-coordinate of the tip of the detection pen 8 is calculated as a position distant from the midpoint of the display panel 1w by the distance corresponding to a time "$t_y$" from the start of scanning the y-coordinate to the occurrence of the peak "$V_{P2}$."

FIG. 15(e) shows a case symmetrical to the case of FIG. 15(a). That is, peak "DL" of induced voltage appears only during the L detection period $T_L$ in the UL detection period, and it is decided that the tip of the detection pen 8 exists in the lower half 1wL of the display panel 1w.

Further, the y-coordinate of the tip of the detection pen 8 is calculated as a position distant from a position on the center line of the display panel 1w by the distance corresponding to a time "$t_y$" from the start of scanning the y-coordinate to the occurrence of the peak "$V_{P2}$."

Thus, by previously detecting the region in which the tip of the detection pen 8 exists, it is made possible to scan the upper half 1wU and the lower half 1wL of the display panel 1w in parallel during the coordinate detection period, allowing the coordinates of the tip of the detection pen 8 to be detected in a scanning time substantially shorter than the prior-art coordinate detection period.

When each electrode is scanned with such a segment electrode scan signal x and a common electrode scan signal y as shown in FIG. 13, the common electrodes YU and the lower common electrodes YL are scanned in parallel both during the UL detection period and during the x/y-coordinate detection period.

Figure 16:
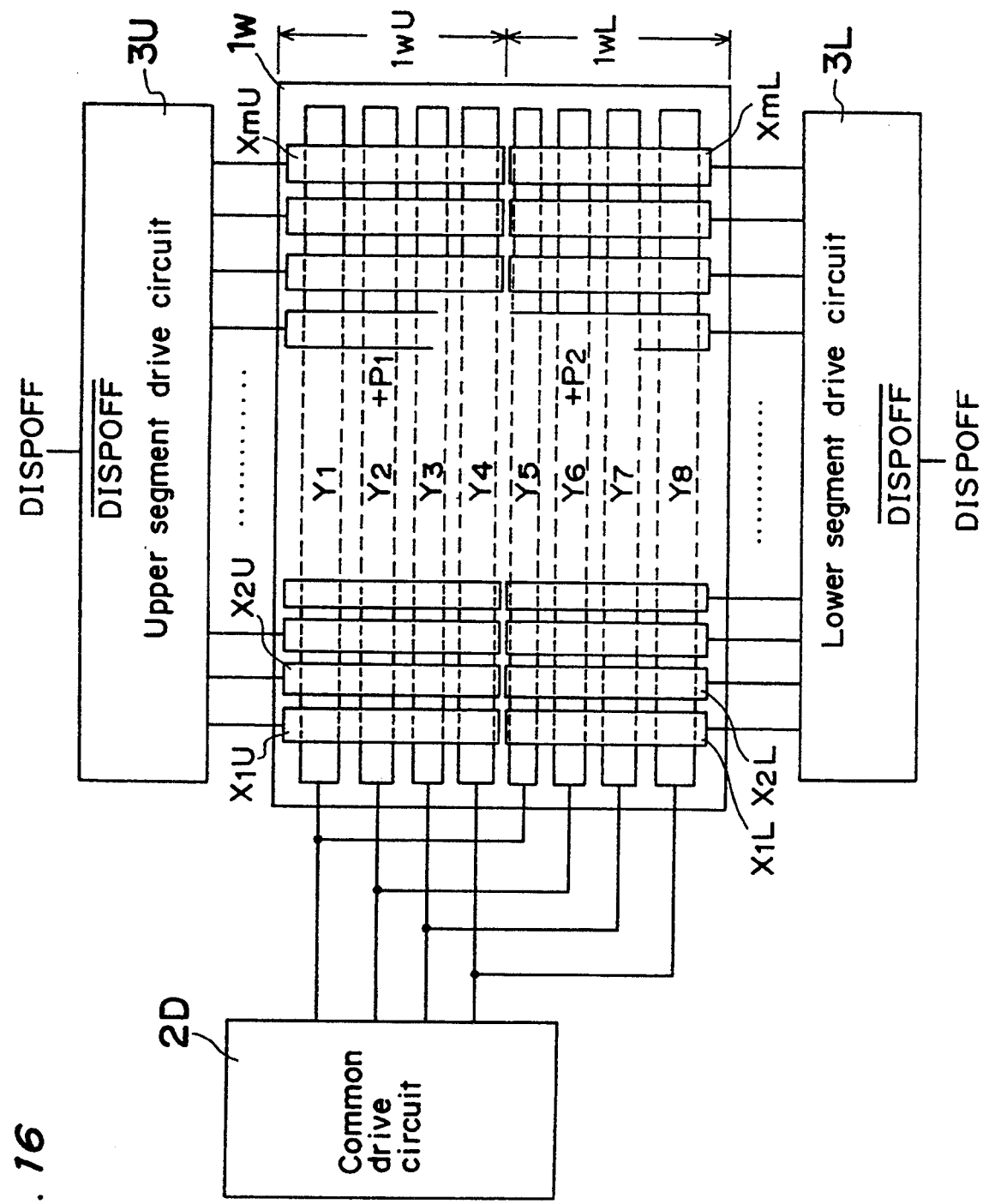
FIG. 16 is a main-part block diagram of the display-integrated type tablet device other than that shown in FIG. 12, in which the scanning of the upper common electrodes and the scanning of the lower common electrodes can be carried out in parallel during the coordinate detection period.

Accordingly, two common drive circuits of the upper common drive circuit 2U and the lower common drive circuit 2L as shown in FIG. 12 are not necessarily required, but it will also do only if the upper common electrodes $Y_1$-$Y_4$ and the lower common electrodes $Y_5$-$Y_8$ are connected to one common drive circuit 2D in parallel as shown in FIG. 16. As a result, the common drive circuit can be reduced one half that in the prior-art display-integrated type tablet device as shown in FIG. 1 or in the display-integrated type tablet devices as shown in FIG. 6 and FIG. 12.

In this arrangement, if d.c. voltage continues to be applied to the liquid crystals that form the pixels of the display panel 1w, the liquid crystals may undergo deterioration due to electrolysis, which leads to reduction in its service life.

Thus, during the normal display period, the direction in which voltage is applied to the liquid crystals is inverted by controlling the level shifters within the LSIs, depending on the level of inversion signals FR which are inputted to inversion signal input terminals YFR of $LSIU_1$, $LSIU_2$, $LSIL_1$, and $LSIL_2$ in FIG. 8, or inversion signal input terminals YFR of $LSI_1$, $LSI_2$, and $LSI_3$ in FIG. 10, or inversion signal input terminals XFR of each LSI in FIG. 9, so that the average value of voltage applied to each pixel during a few-frame display periods is made "0."

Further, during the x-coordinate detection period and the y-coordinate detection period in the coordinate detection period, the level shifters are controlled depending on the level of the inversion signals FR inputted into the LSIs, so that, for example as shown in FIG. 14, the scan voltage and non-scan voltage of the segment electrode scan signal x and the common electrode scan signal y are made equal to each other. By so doing, the average value of voltage of the other group of electrodes with respect to one group of electrodes, out of the groups of the segment electrodes X and the common electrodes Y, is made "0" for the x-/y-coordinate detection period.

However, even if the average value of voltage applied to the liquid crystals during the display period and the x-/y-coordinate detection period is made "0" as described above, the liquid crystals may undergo electrolysis due to many times repeated UL detection, for a shortened time of the UL detection period during a one-frame period, without arrangement for making the average value of voltage "0" during the UL detection period.

Thus, in the present embodiment, using the display-integrated type tablet device as shown in FIG. 12, a segment electrode scan signal xU or a common electrode scan signal yU of a reference voltage "$V_2$" in which a scan pulse of a voltage "$V_0$" has been inserted is inputted into an upper segment electrode XU and an upper common electrode YU, opposed to each other, during the U detection period $T_U$ In contrast to this, during the L detection period $T_L$, a segment electrode scan signal xL or a common electrode scan signal yL of a reference voltage "$V_2$" in which a scan pulse of a voltage "$V_0$" has been inserted is inputted into an lower segment electrode XL and a lower common electrode YL, opposed to each other.

In this way, to scan the upper half 1wU and the lower half 1wL of the display panel 1w in series during the U detection period $T_U$ or the L detection period $T_L$, electrode scan signals of the same reference voltage "$V_2$" in which a scan pulse of the same voltage "$V_0$" are inputted into a segment electrode X and a common electrode Y, which are opposed to each other.

In similar manner, also during the UL detection period, electrode scan signals of the same reference voltage, in which a scan pulse of the same voltage has been inserted, are inputted to two opposed electrodes, so that the average value of voltage of the other group of electrodes with respect to one group of electrodes during UL detection period is made "0," thereby preventing deterioration of liquid crystals during the UL detection period.

In addition, as the time point at which the UL detection period is provided in the coordinate detection period the following is most desirable.

As stated previously, during the display period, the level of voltage applied to the electrodes is collectively changed over by the level shifters depending on the level of the inversion signals FR, thereby inverting the direction of voltage applied to the liquid crystals. As a result, there is induced high-level, spike-shaped noise to the detection pen 8 when the level of the voltage applied to the electrodes is inverted.

To prevent the spike noise, which occurs to the detection pen 8 during the display period, from producing any effect even to the coordinate detection period such as to cause the coordinate detection accuracy of the detection pen 8 to lower, for example, segment electrode scan signals $x_1U$, $x_1L$ are inputted to segment electrodes $X_1U$, $X_1L$ after a specified time "$t_a$" has elapsed from when the display period had been succeeded by the coordinate detection period, as shown in FIG. 7.

On the other hand, during the UL detection period, scan signals are simultaneously inputted to 4 upper common electrodes YU or m upper segment electrodes XU for the U detection period, and 4 lower common electrodes YL or m lower segment electrodes XL for the L detection period. In brief, scan signals are inputted simultaneously to a large number of electrodes. Because of this, effect of noise can be minimized during the UL detection period.

Also, during the UL detection period, it is sufficient only to detect whether the tip of the detection pen exists in the upper half 1wU or in the lower half 1wL of the display panel 1w. Accordingly, so high a detection accuracy is not required.

From the above-described points, if the UL detection period is provided immediately after the display period, it becomes feasible to effectively utilize the time for moving from the display period to the x-/y-coordinate detection period and to shorten the total time for coordinate detection by virtue of the effective use of the moving time, to a great advantage.

In the present embodiment as described above, although the display panel 1w is horizontally divided into two, the upper half 1wU and the lower half 1wL, in FIG. 6, yet it may also be divided longitudinally into two, the right half and the left half. In such a case, two common electrodes arranged in the same row form a common electrode pair.

Furthermore, the upper common drive circuit 2U, the lower common drive circuit 2L, the upper segment drive circuit 3U, and the lower segment drive circuit 3L are not limited in their practical contruction to those shown in FIG. 8, FIG. 9, and FIG. 10.

As shown above, the above-described present embodiment has been decribed, taking the case where a liquid crystal display panel is used as the display panel 1w. However, the display panel 1w to be used in the present invention is not limited to the liquid crystal display panel, but, for example an EL (electroluminescence) display panel may be applied thereto.

(Embodiment 3)

Figure 5:
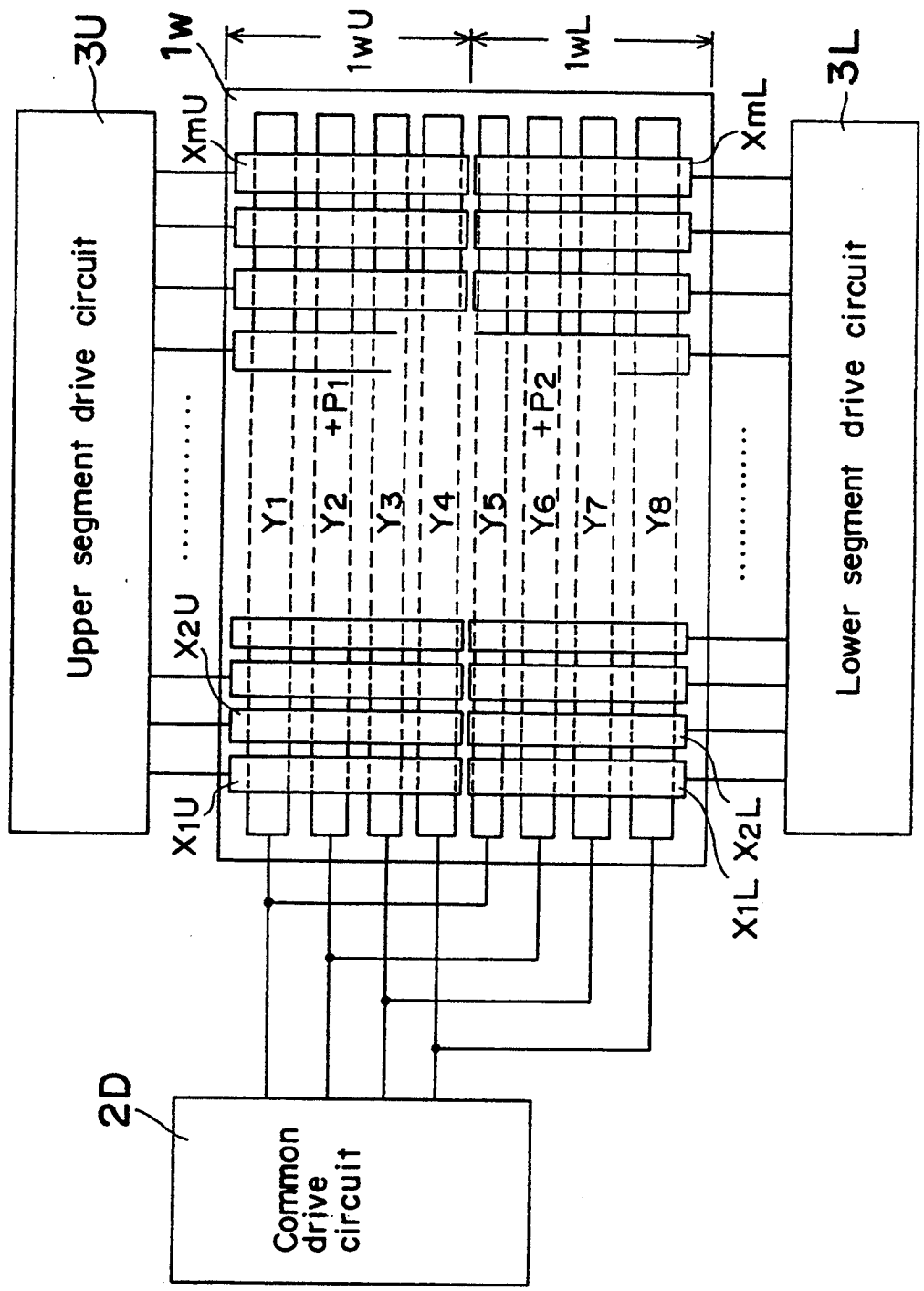
FIG. 5 is a main-part block diagram of a liquid crystal display device other than that shown in FIG. 4, in which the display panel is divided into two.

The display-integrated type tablet device of the present embodiment is one which has such construction as shown in FIG. 4 or FIG. 5 and which is provided, although omitted in these figures, with a switching circuit 4, a display control circuit 5, a detection control circuit 6, a control circuit 7, a detection pen 8, an amplifier 9, an x-coordinate detection circuit 10, a y-coordinate detection circuit 11, and a d.c. power supply circuit 12, as in the prior art in FIG. 1. With this arrangement, during the display period, as described for the prior art, in either case of the two tablet devices, display of the upper half 1wU and that of the lower half 1wL of the display panel 1W is carried out in parallel, whereby duty ratio of display can be two times that of the prior art and contrast improved. During the position detection period, position detection is carried out in the following methods, where the number of common electrodes is assumed to be 8 for simplicity of explanation.

(1) Position detection method—1

Figure 17:
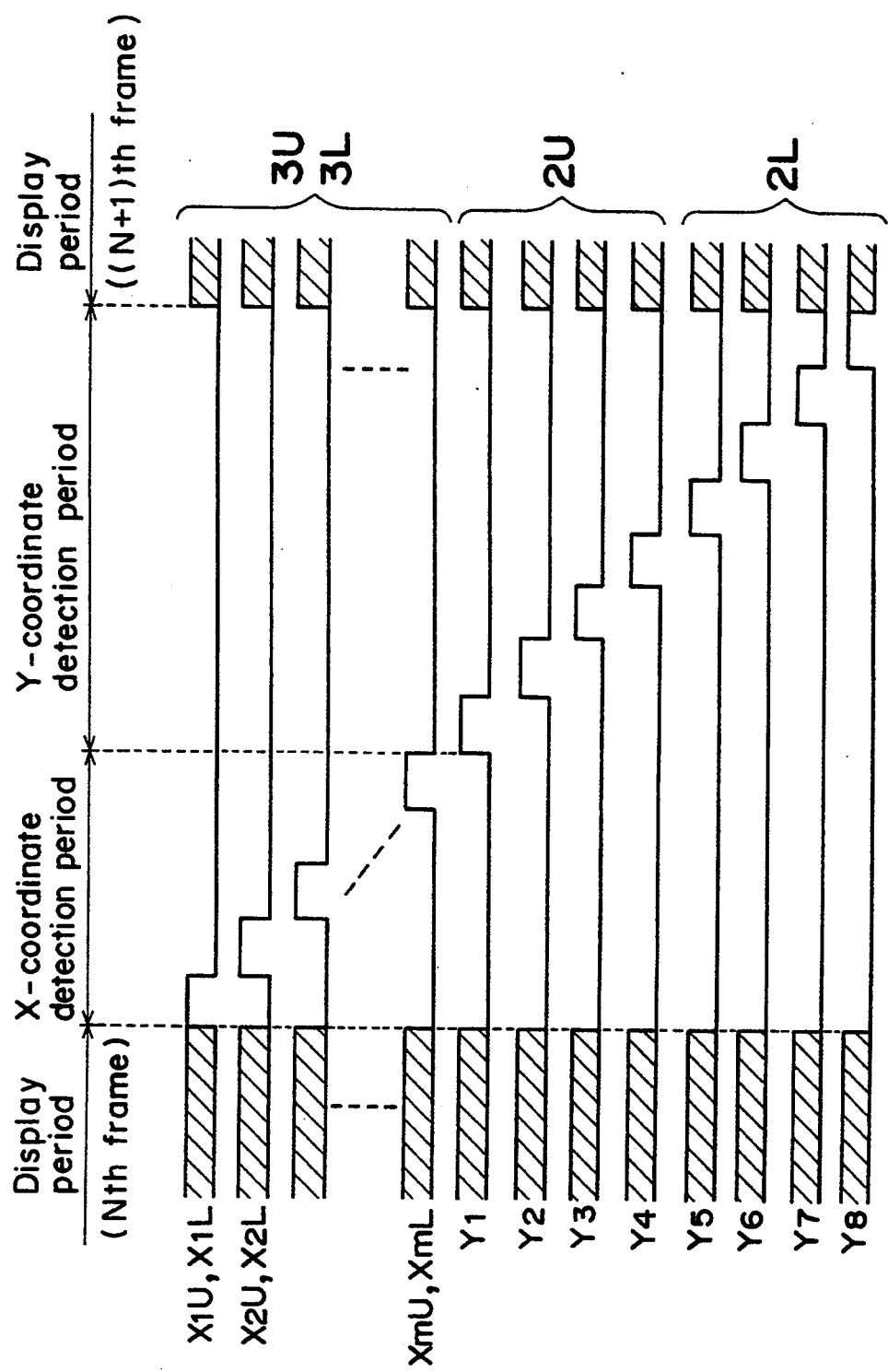
FIG. 17 is a timing chart of position detection method (1) in a third embodiment of the present invention.

This method is to perform the position detection at such timing as shown in FIG. 17, and can be applied to the tablet device in FIG. 4.

First, during an x-direction detection period, an upper segment drive circuit 3U (hereinafter, simply referred to as 3U) and a lower segment drive circuit 3L (hereinafter, simply referred to as 3L) simultaneously scan a group of upper segment electrodes XU (hereinafter, referred to as XU) and a group of lower segment electrodes XL (hereinafter, referred to as XL), respectively. In other words, $X_1U$ and $X_1L$, $X_2U$ and $X_2L$, .. ., $X_mU$ and $X_mL$ are scanned at the same timing to detect an x-direction position by peforming the same scanning as if upper and lower segment electrodes were connected. For this x-direction detection, it may be replaced by scanning electrodes XU and XL one by one, as shown in FIG. 18, or by scanning the electrodes XU and XL a plurality of ones at each one time. Scanning a plurality of electrodes at each one time will give some advantages that the voltage induced to the detection pen becomes greater to result in an improved detection accuracy and that the detection period becomes shorter.

Referring next to a y-direction detection period, an upper common drive circuit 2U (hereinafter, simply referred to as 2U) scans a group of upper common electrodes YU (hereinafter, referred to as electrodes YU) in the order of Y1→Y2→Y3→Y4 and thereafter a lower common drive circuit 2L (hereinafter, simply referred to as 2L) scans a group of lower common electrodes YL (hereinafter, referred to as electrodes YL) in the order of Y5→Y6→Y7→Y8. The electrodes YU and YL are driven, as shown above, in the order of Y1→Y2→ . . . →Y7→Y8, thus allowing points P1 and P2 to be detected as different positions.

This method cannot be applied to the tablet device of FIG. 5 because in the tablet device of FIG. 5 the electrodes Y1, Y2, Y3, and Y4 and the electrodes Y5, Y6, Y7, and Y8 are electrically connected each other and driven simultaneously by one common drive circuit 2D (hereinafter, simply referred to as 2D), such that the points P1 and P2 are detected as the same position.

(2) Position detection method—2

This method is to perform the position detection at such timing as shown in FIG. 18 and can be applied to both the tablet device of FIG. 4 and that of FIG. 5.

Figure 2:
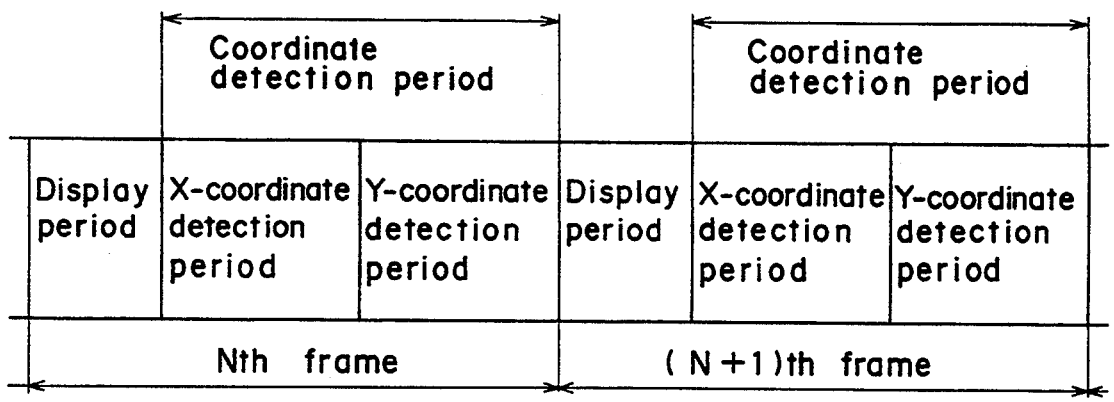
FIG. 2 is a view showing an example of the display period and the coordinate detection period of a display-integrated type tablet device.

In this method, the x-direction detection period is divided into an x-direction upper portion detection period and an x-direction lower portion detection period which succeeds it, wherein, during the x-direction upper portion detection period, 3U successively scans the electrodes XU while 3L successively scans the electrodes XL. Thereafter, during the y-direction detection period, 2D successively scans the electrodes YU and the electrodes YL (in the case of FIG. 4, 2U and 2L performs the scanning in parallel simultaneously). Thus, depending on the results, the x-coordinate and y-coordinate are detected. It is to be noted that the detection is carried out in this case by three steps of x-direction upper portion, x-direction lower portion, and y-direction, but no particular restrictions are imposed on the order and polarity of applied voltage.

FIGS. 19(a)–19(e) are views showing the correlation between the position of the detection pen and the output thereof, in this method. In the Figures, XU, XL, YU, and YL are outputs of the detection pen when the electrodes XU, XL, YU, and YL are scanned.

FIG. 19(a) shows a case where the detection pen exists at a point P1 in the upper half U of the display panel. In this case, when 3U operates during the x-direction upper portion detection period to apply a voltage successively to the electrodes XU, there is induced a voltage XU to the detection pen, allowing the x-coordinate to be decided from the timing and also making it clear that the detection pen exists in the upper half U. Subsequently, when 3L operates during the x-direction lower portion detection period to successively apply a voltage to the electrodes XL, there will be induced no voltage to the detection pen with no detection signal obtained. Next, when 2D (2U and 2L in the case of FIG. 4) operates to successively apply a voltage to the electrodes YU and the electrodes YL, there is induced a voltage YU to the detection pen. However, even if the detection pen exists at a point in the lower half L, there is induced the same voltage to the detection pen at the same timing, and therefore the y-coordinate cannot be decided only from the output of the detection pen; yet however, since it has been proved from the scanning of the electrodes XU that the detection pen exists in the upper half U, the y-coordinate can be decided to be the point P1.

FIG. 19(e) shows a case where the detection pen exists at a point P2 in the lower half L. In this case, there is no output from the detection pen during the x-direction upper portion detection period, but there is an output from the detection pen during the x-direction lower portion detection period, from which output the x-coordinate can be detected. During the y-direction detection period, as in the case of (a), although the y-coordinate cannot be detected only from the output YL from the detection pen, yet it is known from the scanning of the electrodes XL that the detection pen exists in the lower half L, the y-coordinate can be decided to be the point P2.

FIG. 19(c) shows a case where the detection pen exists approximately in the center of the display panel, i.e. approximately at the center between the electrode $Y_4$ and the electrode $Y_5$. In this case, XU, XL, YU, and YL are outputted to the detection pen. The x-coordinate calculated from the XU and the x-coordinate calculated from the XL approximately coincide with each other, and therefore the x-coordinate can be authenticated as it is. However, as for the y-coordinate, YU only allows a coordinate in the vicinity of $Y_1$ or $Y_5$ to be calculated for the y-coordinate while YL only allows a coordinate in the vicinity of $Y_4$ or $Y_8$ to be calculated therefor, so that the y-coordinate cannot be decided. In this case, however, since the peak values of YU and YL are approximately equal to each other, the peak values are detected and, if they approximately coincide, it is decided to be approximately the center of the y-coordinate display panel.

FIG. 19(b) shows a case where the detection pen is located somewhat upward apart from the center of the display panel. In this case, peak values of outputs of the detection pen have the following relation:

peak value of XU > peak value of XL;

and peak value of YU > peak value of YL.

When the peak values are as shown above, the x-coordinate calculated from XU and the y-coordinate from YU are adopted.

FIG. 19(d) shows a case where the detection pen is located somewhat downward apart from the center of the display panel. In this case, converse to the case of (b), peak values of outputs of the detection pen have the followng relation:

peak value of XU < peak value of XL;

and peak value of YU < peak value of YL.

In this case the x-coordinate calculated from XL and the y-coordinate from YL are adopted.

It is noted that in the cases of (b) and (d) as described above, a coordinate calculated from XU and a coordinate calculated from XL are expected to coincide with each other and therefore the average value of the two coordinates may be adopted instead.

As shown above, by such an arrangement that the x-direction scanning is divided into that for its upper portion and that for its lower portion, and then the resulting outputs are compared with each other, the x-coordinate and y-coordinate can be detected.

Results of the above arrangement can be summarized as shown in the table of FIG. 20.

In addition, in this table, the y-coordinate calculated from YL is the result from adding the value for the upper half of the y-coordinate to a value calculated from the timing for pulse generation.

(3) Position detection method—3

Figure 21:
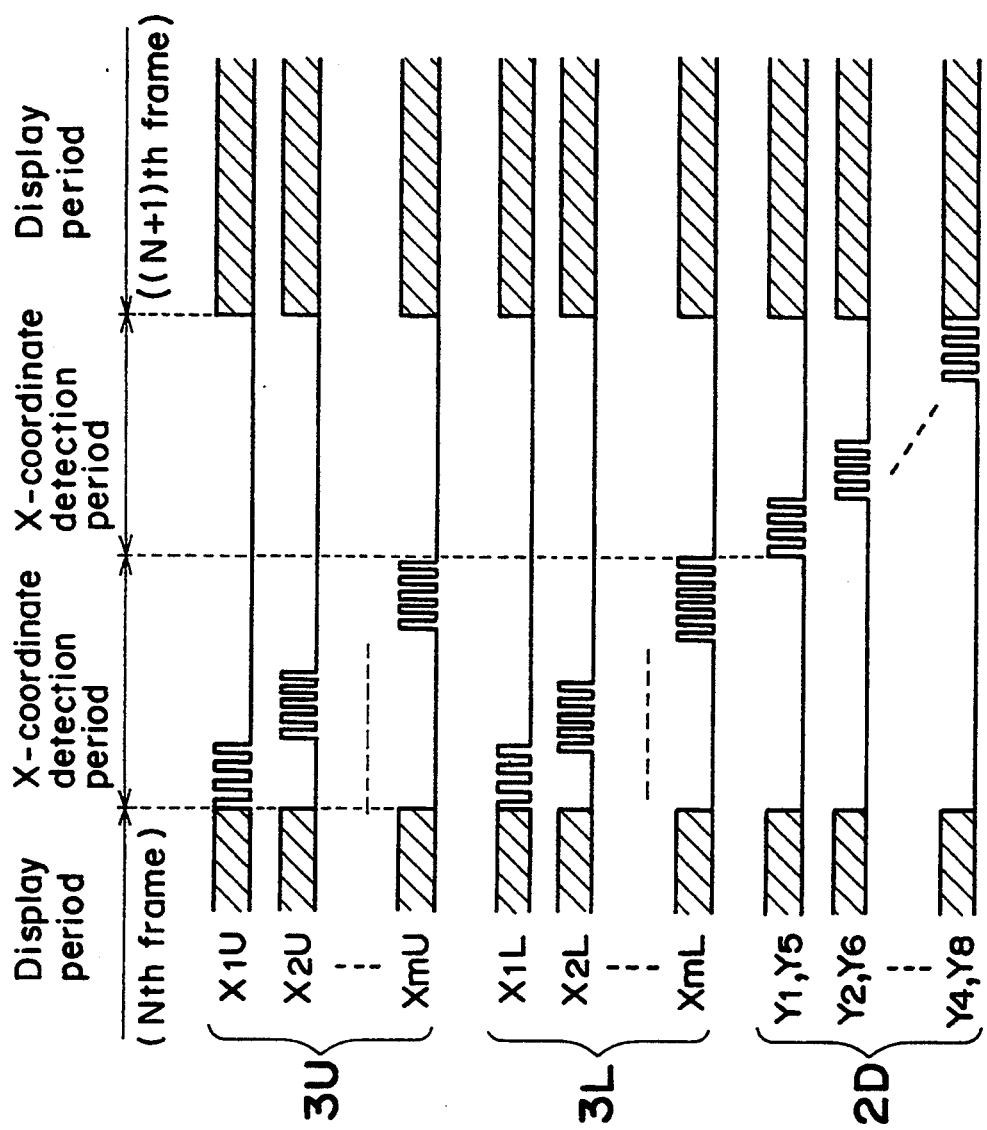
FIG. 21 is a timing chart of position detection method (3) in the third embodiment.

This method is one in which the scan pulse is composed not of a single pulse but of pulse groups of high-frequency f, as shown in FIG. 21, and can be applied to both the tablet device of FIG. 4 and that of FIG. 5.

Figure 22:
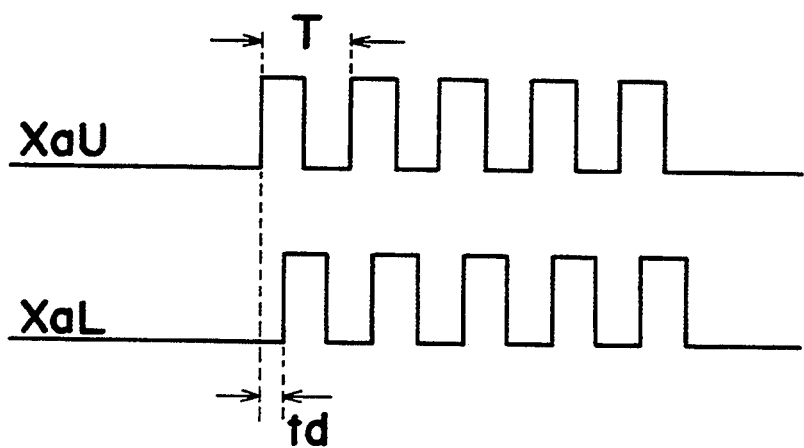
FIG. 22 is a view showing two high-frequency pulses having phase difference from each other.

The x-direction detection and the y-direction detection are carried out by pulse groups of the same frequency. Also, although 3U and 3L scan at the same timing, yet a pulse group XaL applied to electrodes XaL (a=1−m) delays by td with respect to a pulse group XaU applied to electrodes XaU (a=1−m), as shown in FIG. 22. For this td, T/4 (T=1/f) or so is selected without being limited thereto. Also, XaU may delay with respect to XaL. A set of pulses having periods T delayed by td from each other can be easily generated by a known technique, its description being omitted.

In this method, an output of the detection pen is made to pass through an amplifier having a band-pass filter characteristic by which the frequency f is selectively amplified, a ceramic filter having frequency f being suitable for the amplifier. Therefore, the waveform after passing through the amplifier is not a pulse waveform as in FIG. 22 but a sine wave from which higher harmonic wave has been removed.

Figure 23A:
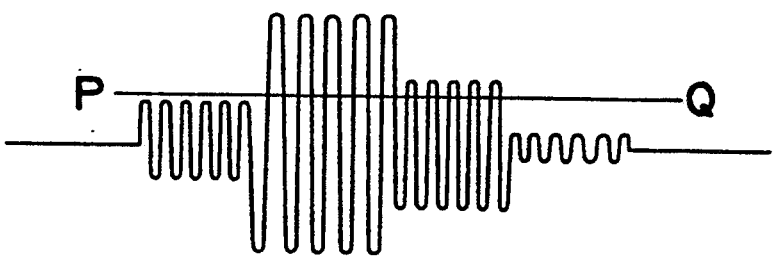
FIGS. 23(a)–23(e) are views for explaining the position detection method (3) in the third embodiment.
Figure 23B:
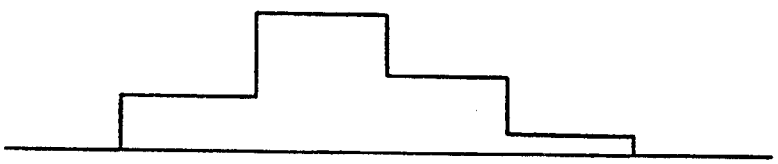

FIG. 23(a) is a waveform resulting from amplifying an induced voltage of the detection pen with an amplifier having the above-mentioned filter characteristic in the case where 3U and 3L operate to effect the x-direction scanning. The output of (b) is obtained by rectifying and detecting the output of the amplifier, and the coordinate in the x-direction can be detected by both the generation timing and waveform of the output.

Further, the y-direction detection is carried out for the upper half U and lower half L of the display panel simultaneously in parallel, as shown in FIG. 21, thus requiring it to be detected whether the detection pen exists in the upper half U or in the lower half L when the x-direction scanning is effected. The way of the detection is described below.

Figure 23C:
Figure 23D:
Figure 23E:
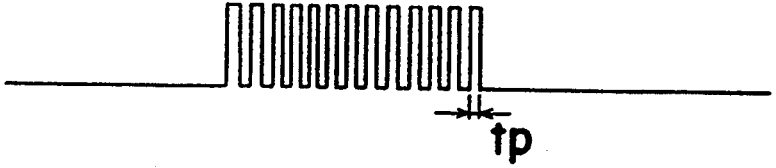

FIG. 23(c) is a view in which the waveform of (a) is cut out at P-Q level by a comparator. FIG. 23(d) shows the pulses of frequency f which form the basis of the waveform of XaU in FIG. 22. FIG. 23(e) shows an output wave obtained by ANDing (c) and (d) together, where the pulse width tp in (e) shows the phases of (c) and (d); when the phases of (d) and (e) coincide, the result will be T/2 while when they are shifted by td as in XaL in FIG. 22, the result will be tp=(T/2−td). Accordingly, it can be easily decided from the value of tp whether the pen exists in the upper half U or in the lower half L. Also, the phase shift in the vicinity of the center between the upper and lower electrode groups falls at an approximately center between the phase shift in the upper half and that in the lower half, such that if detection pen is moved upward above this, the phase shift gradually decreases; when 10 mm or so apart from the center, it perfectly coincides with the value for the upper half. The case is the same when the pen exists below the center. Thus, by carrying out the x-direction scanning by 3U and 3L, the x-coordinate is detected while whether the pen is located in the upper half or in the lower half is detected from phase difference of the high-frequency component of a detection voltage.

Therefore, whereas 2D is operated by the scanning as shown in FIG. 21 to carry out the y-direction detection and, as a result, the y-coordinate thereby obtained is detected by two points, upper and lower, yet a correct position can be determined based on that it is previously determined from the x-direction detection in which region the pen exists.

For the y-direction detection, a single pulse such as shown in FIG. 17 or FIG. 18 may also be used; however, a high-frequency pulse as shown in FIG. 21 is desirable because of the following reasons.

A first reason is that whereas a signal is read by capacity coupling between scan electrodes and the detection pen, if the voltage of scan electrodes are high-frequency modulated as in FIG. 21 the resulting impedance between the scan electrodes and the detection pen becomes lower, causing in turn the detection voltage to be heightened, with the result that S/N ratio is improved while the subsequent processing is facilitated.

A second reason exists in that malfunction due to external noise is minimized. Since the tip of the detection pen is designed to have a high impedance, there may occur some malfunction due to a charge potential resulting when it makes contact with not only a scan electrode but clothes or the like. However, the amplifier having the above-mentioned filter characteristic serves to eliminate the noise components.

(4) Position detection method—4

Figure 24:
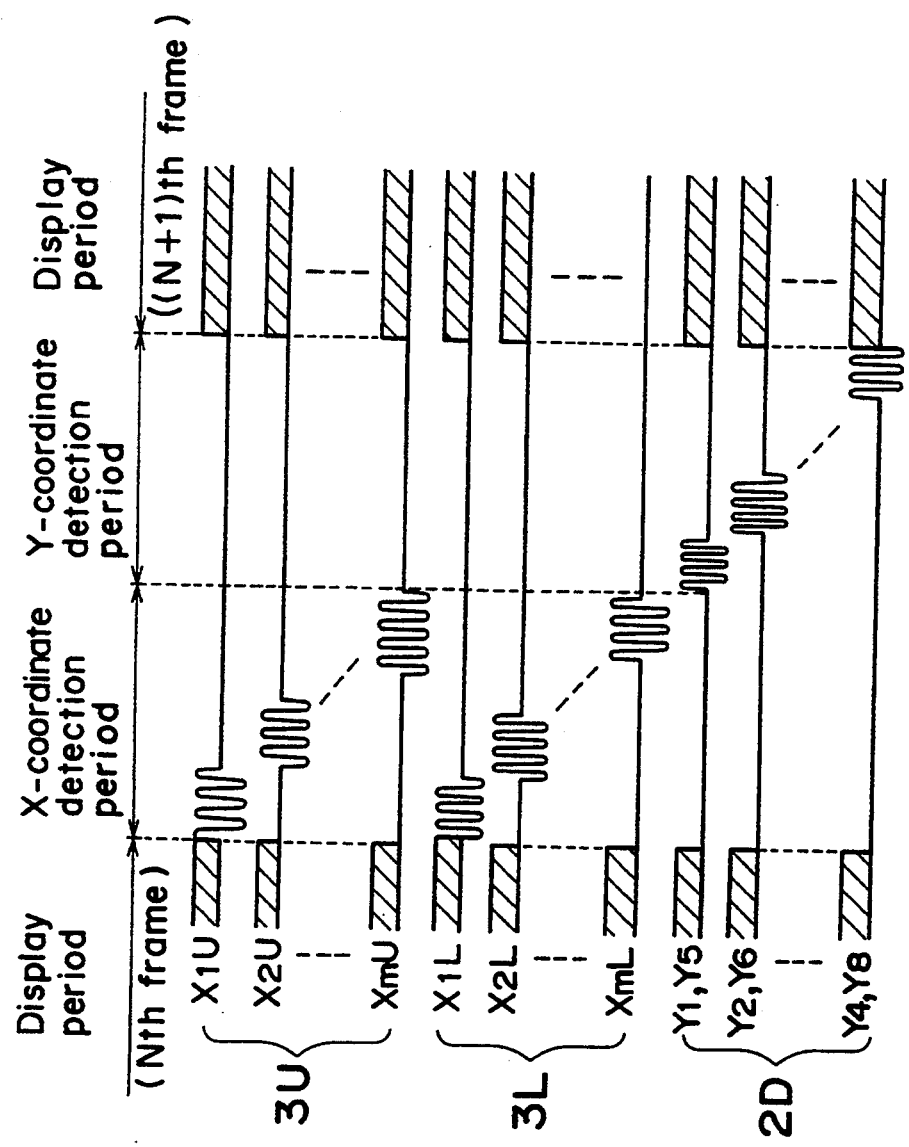
FIG. 24 is a timing chart of position detection method (4) in the third embodiment.

This method is one in which a high-frequency sine wave is used, as shown in FIG. 24, instead of the high-frequency pulses shown in FIG. 21. The way the position detection is carried out is almost the same as described in "Position detection method—3."

However, in this method, further more advantages can be obtained. A first one is that no d.c. electric field will be applied to the liquid crystals by virtue of the position detection scanning of this method's own.

The liquid crystal, if a d.c. electric field is applied, will undergo electrolysis, leading to some deterioration. Accordingly display is done while the polarity of voltage is turned over during the display period, which is difficult for the tablet device to do this in scanning for coordinate detection. If the scanning is carried out by AC as in this method, there will never occur such type of problem.

A second advantage is that the scanning voltage can be made higher. Whereas in the case of position detection the voltage applied to the electrodes is required to be lower than the threshold voltage at which the liquid crystals operate, the threshold voltage has a characteristic that the higher the frequency of the voltage applied the greater the threshold voltage. Accordingly, it is possible to heighten the voltage by inceasing the frequency of the scan voltage.

(5) Position detection method—5

Figure 25:
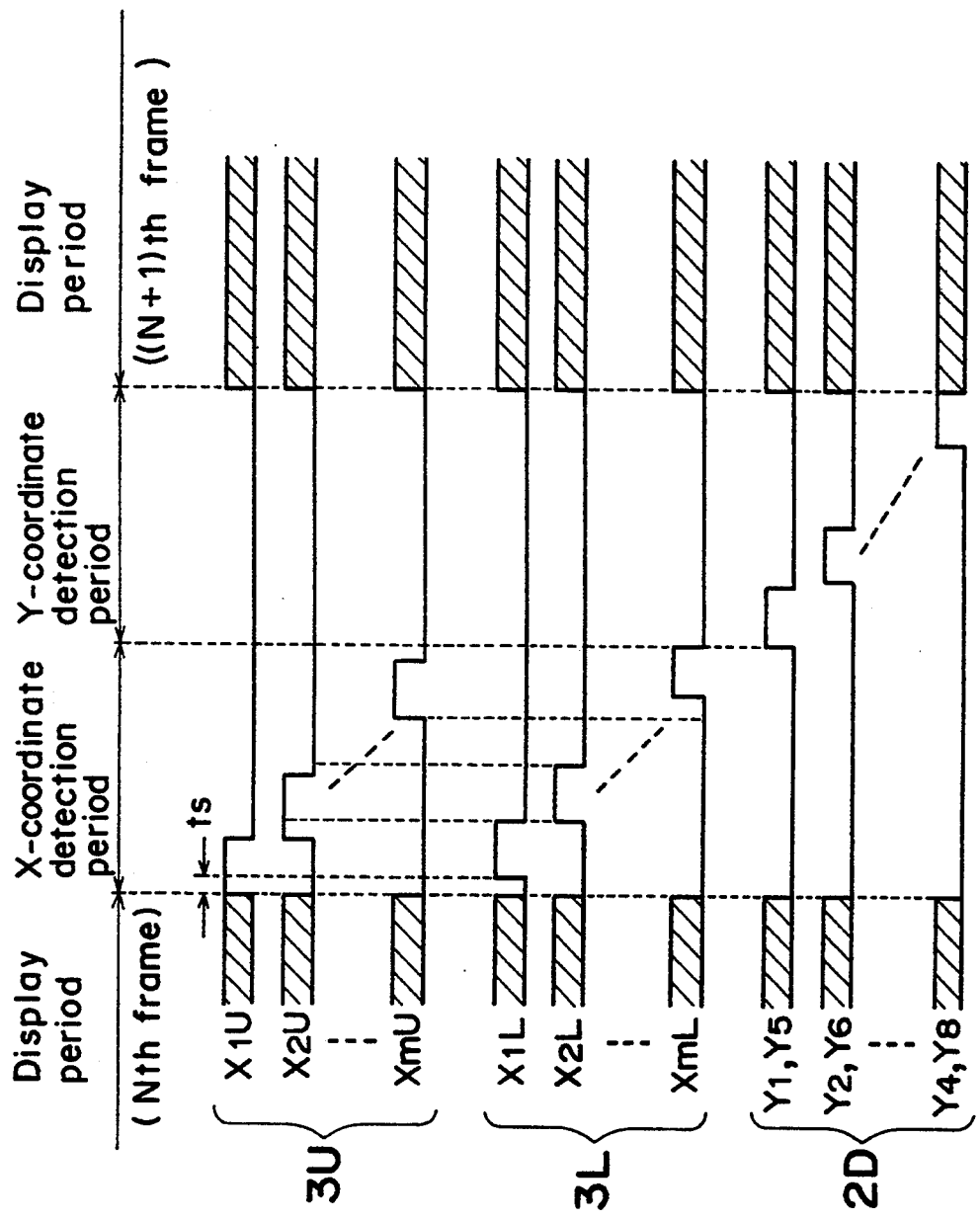
FIG. 25 is a timing chart of position detection method (5) in the third embodiment.

FIG. 25 is a timing chart for explaining this detection method.

In this method, the scanning of the upper half by 3U and that of the lower half by 3L are carried out during the same period, in which the start time for scanning by the corresponding two circuits is shifted by ts. According to such a way of scanning, the timing at which a voltage is induced to the detection pen or the width of a pulse induced differs between the two cases of scanning, it is quite easy to carry out the position detection. When the detection pen exists in the upper half or in the lower half and 5 mm or more apart from the center dividing portion between the upper half U and the lower half L, it is possible to detect it from the delay of timing of x-direction detection as shown in FIG. 25 whether the detection pen exists in the upper half or in the lower half at the time of x-direction scanning, and moreover to determine $P_1$, $P_2$ by y-direction scanning. Next, when the detection pen is located at approximately the center portion, induction arises from both the upper half and the lower half, i.e. from both the scanning by 3U and that by 3L, with the result that the width of an induced pulse is wider than a voltage only from either the upper half or the lower half. Thus it is quite easily detected that the detection pen exists in the center portion, allowing an easy detection of whether the y-direction coordinate in the y-direction scanning by 2D is either $P_1$ or $P_2$.

In addition, although the scanning for the lower half is delayed by ts in the case of FIG. 25, it is not limited to this and the scanning for the upper half may be delayed instead.

As described above, by performing the position detection by any method of (1) to (5), it is made possible to realize a display-integrated type tablet device whose duty ratio of display is improved to about two times that of the prior art, without lowering the contrast of display in high-resolution display.

It is to be noted that although the present embodiment has been described taking the case of a liquid crystal display panel, yet it is not limited to liquid crystal display panels but may also be applied to EL display panels.

(Embodiment 4)

Figure 26:
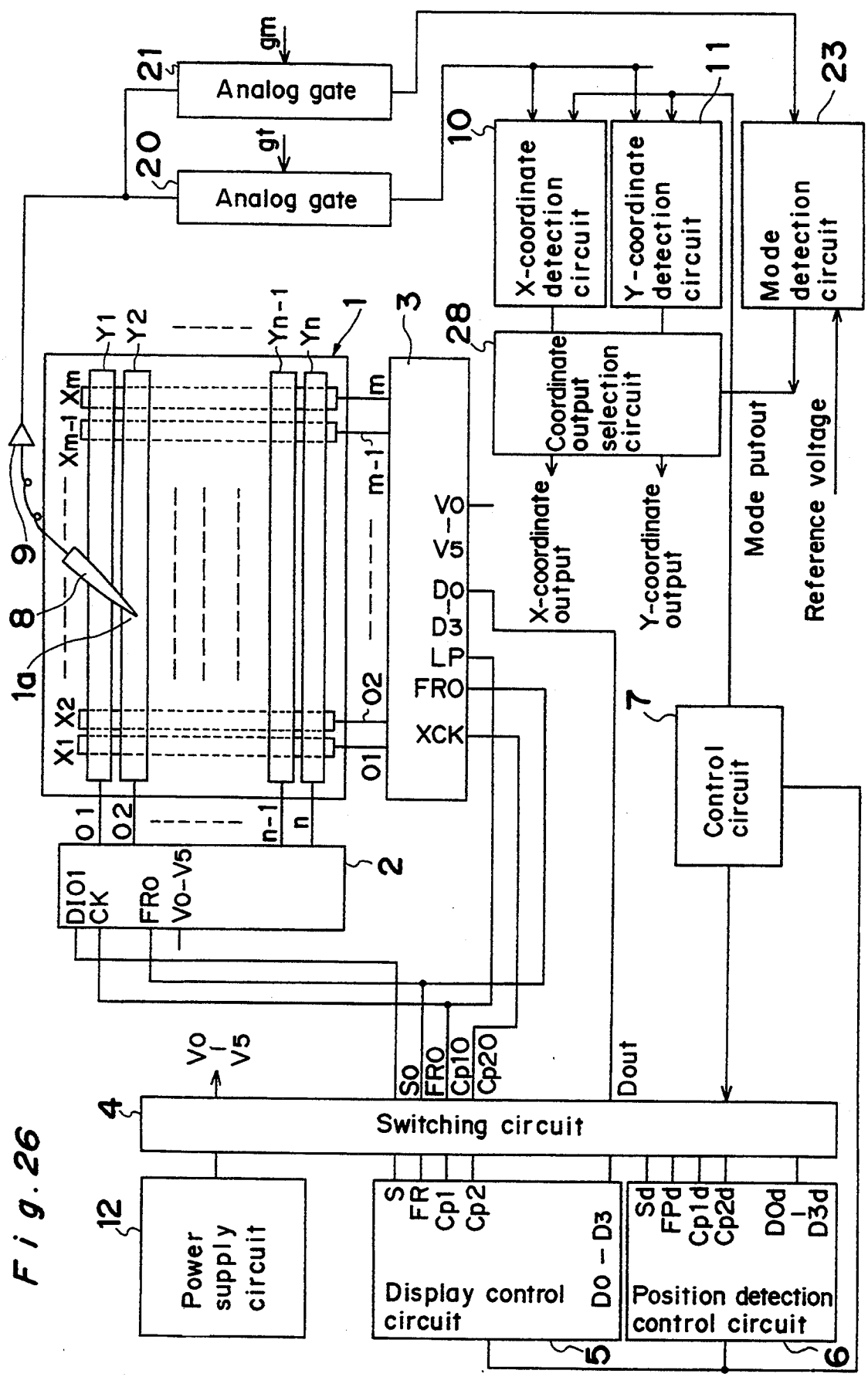
FIG. 26 is a view showing the general construction of a display-integrated type tablet device according to a fourth embodiment of the present invention.
Figure 27:
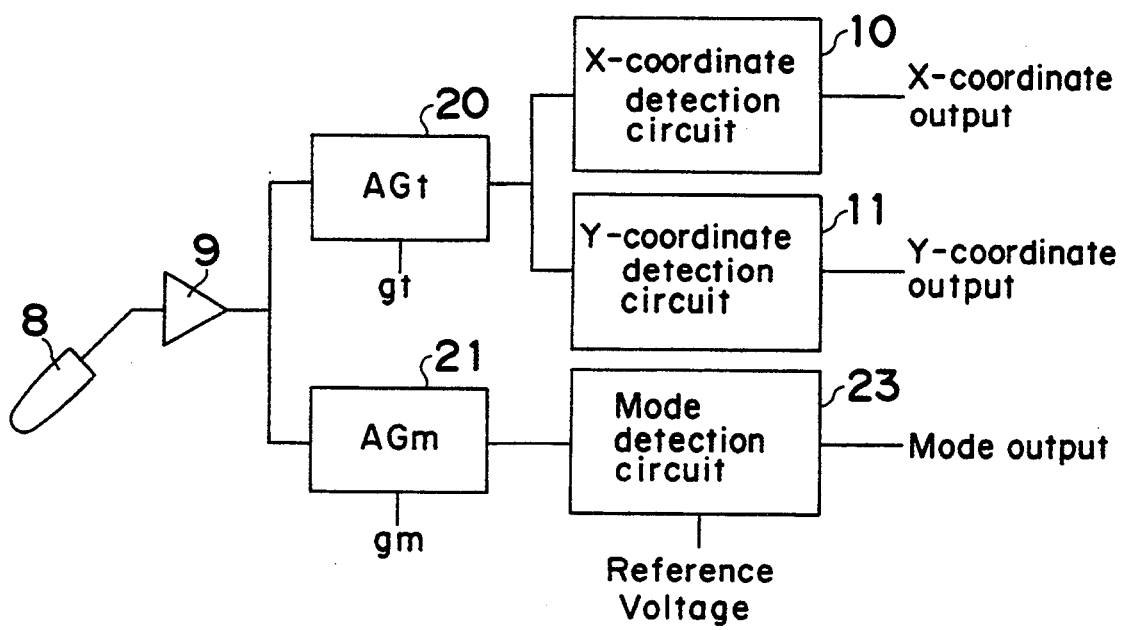
FIG. 27 is a view showing the construction of the main part of the aforementioned display-integrated type tablet device.

FIG. 26 shows the general construction of the display-integrated type tablet device of the present invention as shown in FIG. 4 while FIG. 27 shows the main-part construction of the same display-integrated type tablet device. Its control drive circuit is composed of a common drive circuit 2, a segment drive circuit 3, a switching circuit 4, a display control circuit 5, and a position control circuit 6. In addition, like component parts as in the prior-art display-integrated type tablet device shown in FIG. 1 are designated by like reference numerals.

Figure 37:
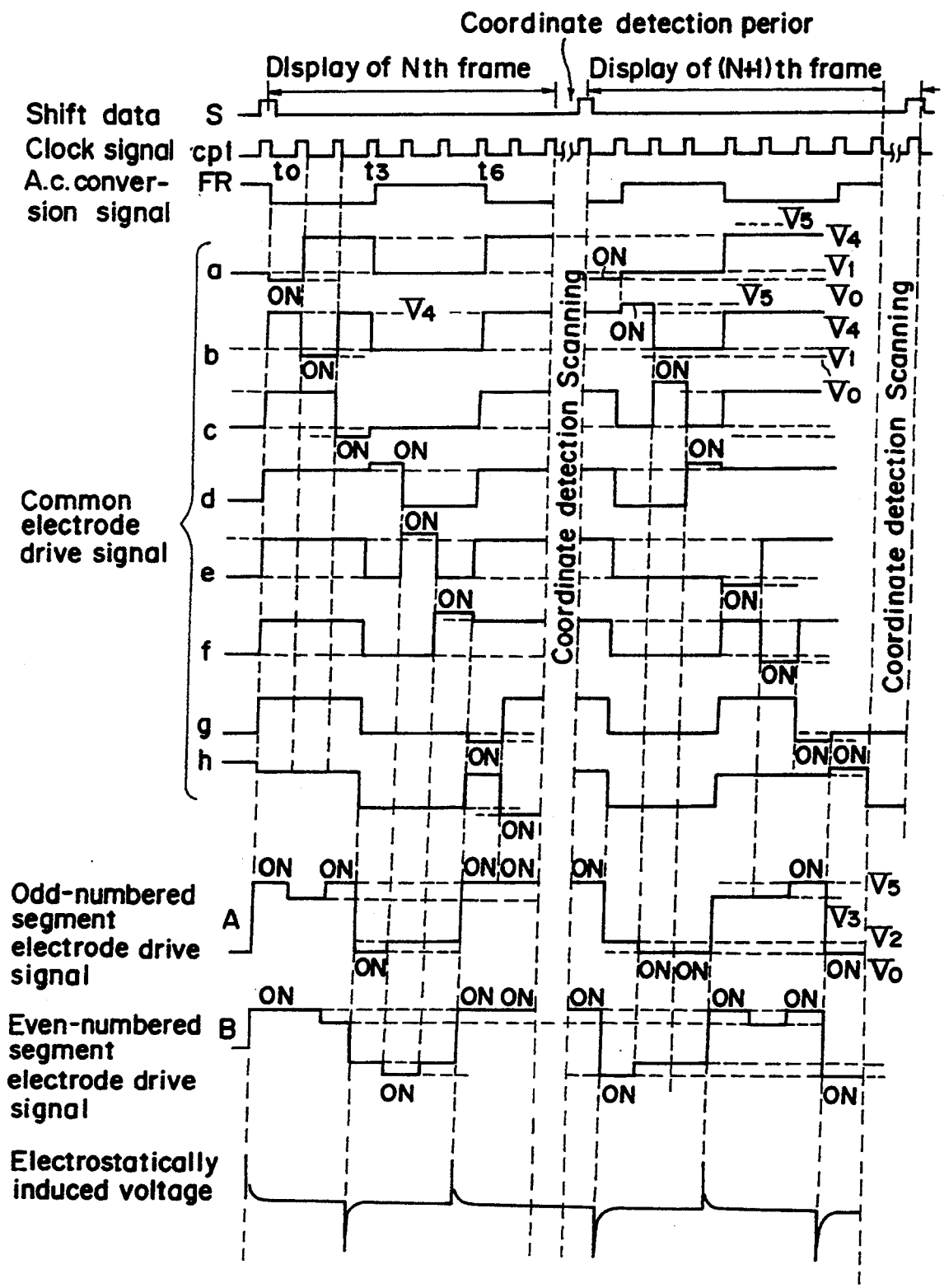
FIG. 37 is a view showing the drive timing of the display-integrated type tablet device that the present applicant has previously proposed.
Figure 38:
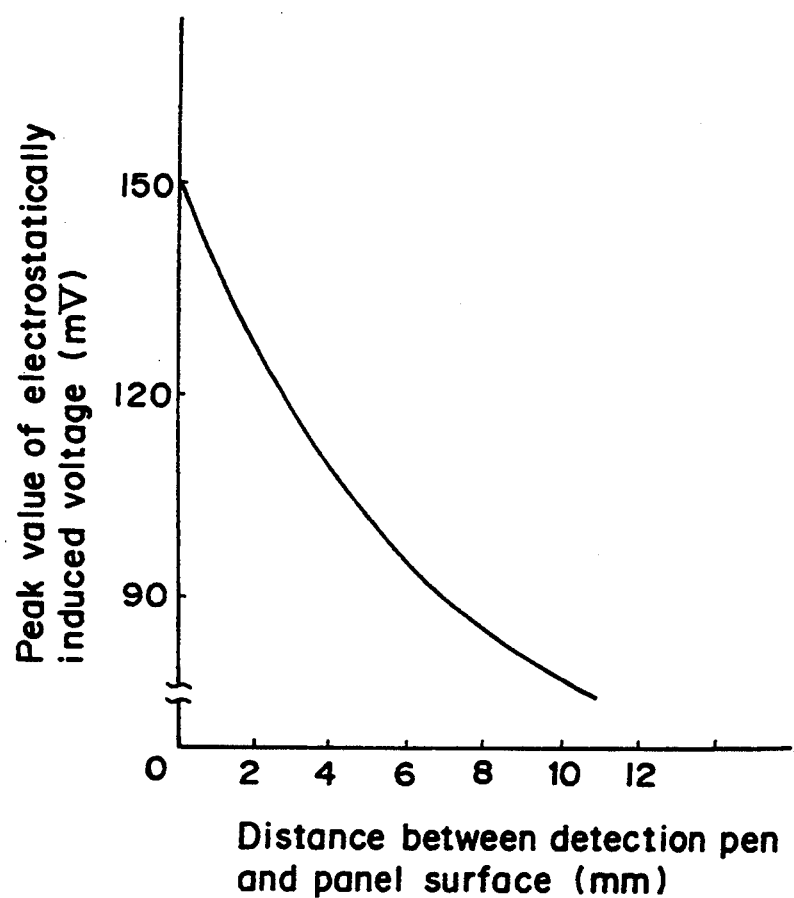
FIG. 38 is a view showing distance dependency of the peak value of an electrostatically induced voltage.
Figure 39:
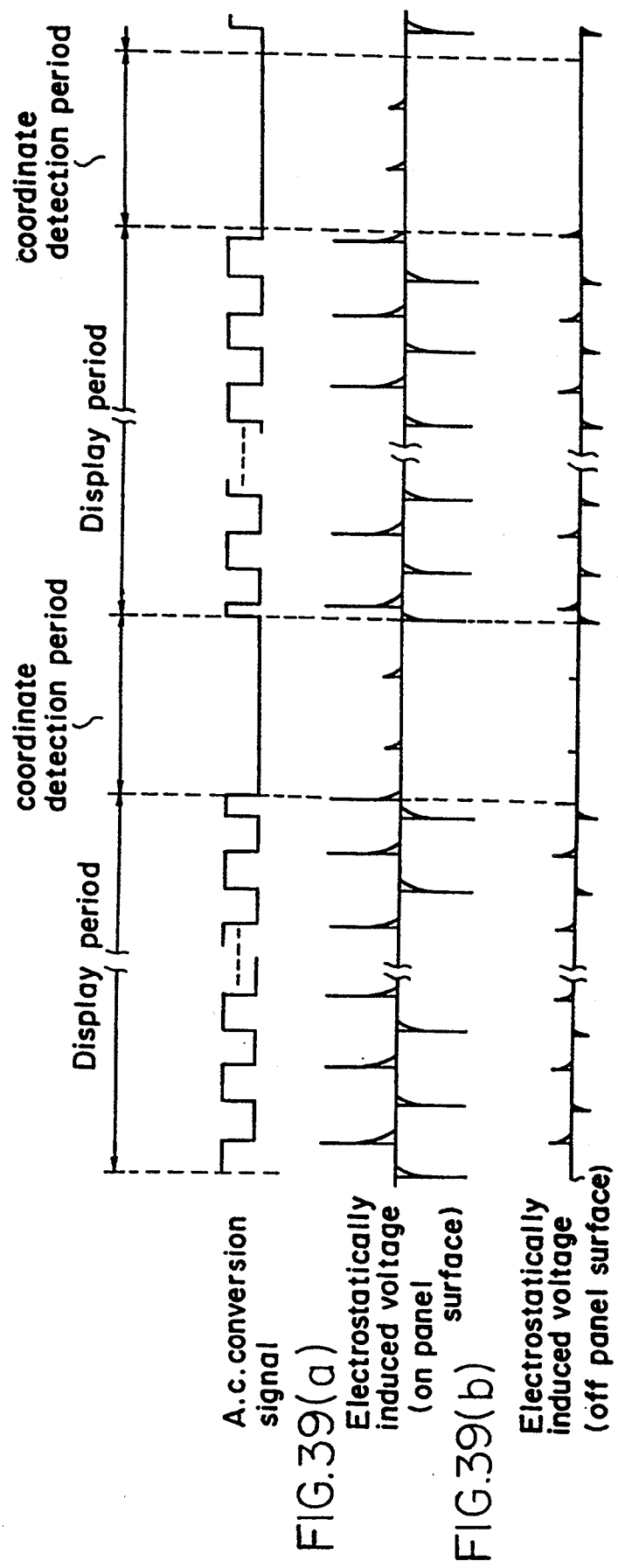
FIGS. 39(a)–39(c) are views showing distance dependency of the waveform of an electrostatically induced voltage.

As shown in FIG. 26, when a detection pen 8 is located on a panel surface 1a, there is induced a spike-shaped electrostatically induced voltage at a timing at which polarity of an a.c. conversion signal FR shown in FIG. 37 is inverted (simultaneously, polarity inversion occurs to both a voltage for image display, or a common electrode drive signal and a segment electrode drive signal). This electrostatically induced voltage is linearly amplified by an operational amplifier 9 connected to the detection pen 8.

As shown in FIG. 27, analog gates 20, 21 are connected to the output side of the operational amplifier 9. Further, an x-coordinate detection circuit 10 and a y-coordinate detection circuit 11 are connected to the analog gate 20 while a mode detection circuit 23 is connected to the analog gate 21. The analog gate 21 is adapted to open by receiving a control voltage gm during the display period and close during the coordinate detection period. On the other hand, the analog gate 20 is adapted to close during the display period and open by receiving a control voltage gt during the coordinate detection period. Accordingly, the electrostatically induced voltage developed to the detection pen 8 is branched at the output side of the operational amplifier 9 so as to be fed to the mode detection circuit 23 through the analog gate 21 during the display period and fed to the x-coordinate detection circuit 10 and the y-coordinate detection circuit 11 through the analog gate 20 during the coordinate detection period. The reason why the electrostatically induced voltage is branched after being amplified by the operational amplifier 9 is that the magnitude of the electrostatically induced voltage developed to the detection pen 8 is in the order of several tens mV, where if the voltage is branched as it is, the detection accuracy would reduce due to noise.

The mode detection circuit 23 receives an electrostatically induced voltage developed to the detection pen 8 during the display period through the operational amplifier 9 and the analog gate 21. The mode detection circuit 23 compares the received electrostatically induced voltage with a previously set reference voltage, so that when the the electrostatically induced voltage is greater than the reference voltage, it decides as detection mode in which coordinate detection is to be effected. Conversely, when the electrostatically induced voltage is smaller than the reference voltage, it decides as non-detection mode in which coordinate detection is not to be effected. Then the mode detection circuit 23 outputs a mode signal representing the decision result (binary data of high or low level). The mode signal may be in the form of analog value or several-step level value; however binary data is sufficient in this case.

As shown in FIG. 26, the mode signal outputted by the mode detection circuit 23 is fed to a coordinate output selection circuit 28 along with coordinates outputted by the x-coordinate detection circuit 10 and the y-coordinate detection circuit 11 during the coordinate detection period. The coordinate output selection circuit 28, when the mode signal represents the detection mode, outputs the received coordinates as they are, while when the mode signal represents the non-detection mode, it halts the output of the coordinates and instead, for example, either neglects all the coordinate output or outputs a signal representing the origin of the x/y-coordinates.

As described above, it can be decided depending on the mode signal outputted by the mode detection circuit 23 whether coordinates outputted by the coordinate detection circuits 10, 11 are authentic ones or those due to noise. As a result, any malfunction due to noise of the detection pen 8 can be prevented.

Figure 28:
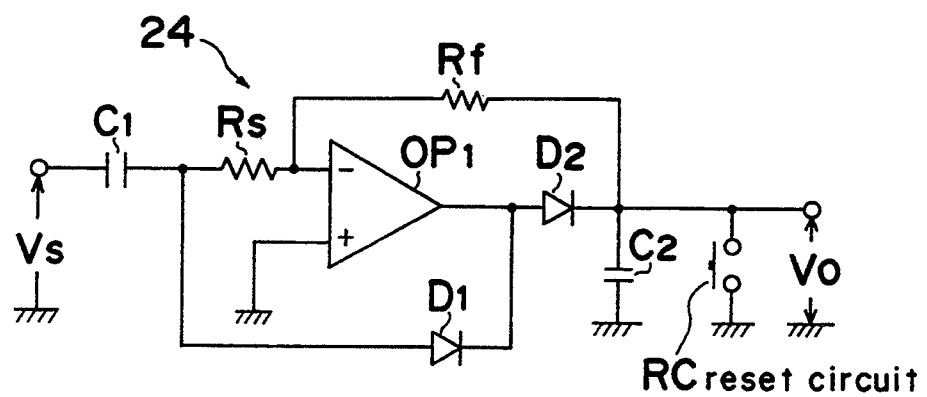
FIG. 28 is a view showing a peak detector which the mode detection circuit of the display-integrated type tablet device has.

The electrostatically induced voltage, as shown in FIG. 37, is of a spike-shaped, differential waveform. It is difficult to compare the peak value of this waveform, as it is, with the reference voltage. Thus, as shown in FIG. 28, within the mode detection circuit 23 there is provided a peak detector 24 for converting the spike-shaped differential waveform into d.c. voltage. This peak detector 24 is composed of a differential amplifier $OP_1$, diodes $D_1$, $D_2$, resistors Rs, Rf, capacitors $C_1$, $C_2$, and a reset circuit RC, and, when receiving an electrostatically induced voltage (which takes a positive or negative peak value) Vs, generates a d.c. voltage Vo proportional to the peak value. The generated d.c. voltage Vo is accumulated in the capacitor $C_2$ on the output side. The reset circuit RC is composed of, for example, a field effect transistor (FET) and others, and can reset the voltage Vo generated for the preceding frame before the start of display for each display period. Meanwhile, the capacitor $C_1$ on the input side forms a filter circuit (high-pass filter) to remove the d.c. component included in the electrostatically induced voltage Vs. Therefore, when the electrode of the detection pen 8 generates a d.c. voltage due to frictional charge with clothes or the like, any noise can be prevented from entering the circuit. It is to be noted that the capacitor $C_1$ is not necessarily located within the mode detection circuit 23, but alternatively may be provided either to the operational amplifier 9, the analog gate 21, or within the container of the detection pen 8.

Figure 29A:
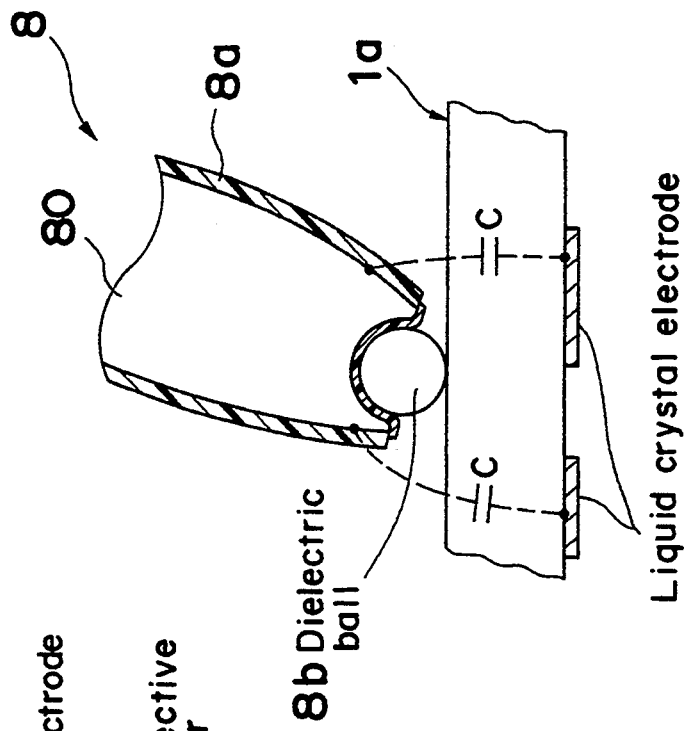
FIGS. 29(a), (b) are views showing the construction of the tip of the detection pen.
Figure 29B:
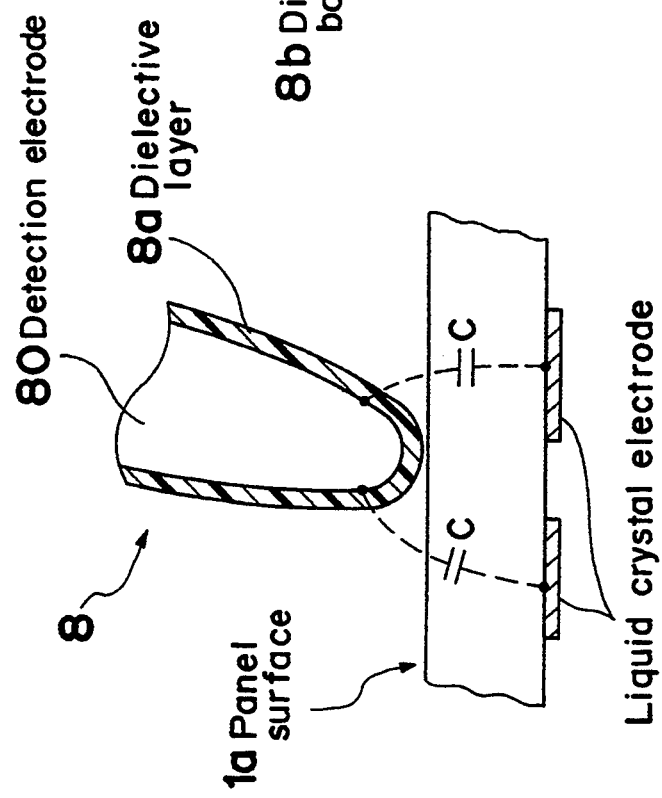

Furthermore, the capacitor $C_1$ may be provided by covering the detection electrode (electrode tip) 80 with a dielectric layer 8a, as shown in FIG. 29. The dielectric layer 8a is one formed of a resin or glass and 0.2 mm or so in thickness. This arrangement can eliminate the need of additionally connecting a discrete capacitor, allowing the construction to be simplified. Yet, for example, when a finger of the operator makes contact with the electrode tip 80, the possibility of misinput can substantially be improved. In addition, in the construction as shown in FIG. 29, there is a possibility that when characters are written on the panel surface 1a many times, the dielectric layer 8a may be worn away, causing the electrode tip 80 exposed such that it will no longer serve for its purpose. To avoid such a disadvantage, the one shown in FIG. 29 is provided with a rounded dielectric ball 8b.

The detection pen 8 may also be arranged to have a built-in micro-switch 84, as shown in FIG. 30. This detection pen 8 is provided with an approximately cylindrical, plastic (dielectric) casing 82 having a tapered end portion 82a; a detection electrode 81 to be fitted to the inside of the end portion 82a of the casing 82; and a pen lead 83 to be slidably fitted to the tip opening of the detection electrode 81. The pen lead 83 is rod shaped (may be made of an insulating material or, if it can be insulated from the detection electrode 81, a metal); its front end 83a is exposed to the outside of the casing 82 while its rear end 83b is connected to the micro-switch 84 within the casing 82. The micro-switch 84 has an electrode 85 which moves in the axial direction along with the pen lead 83, and electrodes 86, 87. The electrode 86 is given a potential +5 V from the side of a tablet body 90 while the electrode 87 is grounded along with a shield electrode 89. The shield electrode (formed by electroless plating or the like) 89 is provided on the inside (or outside) of the casing 82, thus serving to shield noise to the detection electrode 81. To use the detection pen 8, the tip of the pen lead 83 is press contacted with the panel surface 1a (against a spring 88) at a writing pressure of ten odd grams, whereby the electrode 85 and the electrodes 86, 87 are put into contact with each other, allowing it to be detected that the input is being exercised. When the pen lead 83 is made separate from the panel surface 1a, the electrode 85 and the electrodes 86, 87 are separated from each other by the force of the spring 88, restoring the original state. In addition, the pen lead 83, when worn, may be replaced discretely by itself.

Further, as the filter circuit above mentioned, a bandpass filter is desirably provided which takes fundamental frequencies of the a.c. conversion signal FR as its pass band. Owing to the fact that the electrostatically induced voltage developed to the detection pen 8 is equal in frequency to the a.c. conversion signal FR, if this frequency only is allowed to pass through, an necessary electrostatically induced voltage can be obtained and moreover any external noise (high in frequency component) can be blocked.

Also, the mode detection circuit 23 may be arranged to rectify the electrostatically induced voltage and integrate its one-frame portion, as shown in FIGS. 31(a) 31(e), so that a d.c. voltage proportional to the peak value of the received electrostatically induced voltage. In the figure, FIG. 31(a) shows an a.c. conversion signal FR while FIG. 31(c) shows the waveform (including noise) of the received electrostatically induced voltage. Normally, the a.c. conversion signal FR is inverted each time 13 common electrodes Y have been scanned. Accordingly, for example, when the number of common electrodes Y is 400, the resulting number of inversion times during the period for displaying one screen is $400/13 \approx 30$; hence, with double-rectification effected, the integrated value of 30 pulses allows the d.c. voltage to be obtained. Thus by integrating a large number of pulses, effect of noise included in the electrostatically induced voltage can be reduced while detection accuracy can be improved.

Furthermore, with a sampling signal as shown in FIG. 31(b), noise effect can be further reduced. This sampling signal rises in synchronization with the timing at which the polarity of the a.c. conversion signal FR is inverted. The pulse width of the sampling signal is depicted in the figure as wider than it is for simplicity's sake; yet in practical case, it is made to be approximately equal to the pulse width of the electrostatically induced voltage as shown in FIG. 31(c), that is, 1/10 or so of the pulse width of the a.c. conversion signal FR. After the aforementioned electrostatically induced voltage is passed through the analog gate circuit using the sampling signal as a gate, and thereafter rectified so that the waveform shown in FIG. 31(d) is obtained. The result of ingtegrating the waveform is the waveform shown in FIG. 31(e). In this way noise effect can be reduced by limiting the period during which the received electrostatically induced voltage is integrated to within a short period during which the sampling signal is up. Also, by differentiating the waveform of the received electrostatically induced voltage so as to narrow its pulse width while further narrowing the pulse width of the sampling signal, more advantages can be expected.

When the operator is moved into input preparation or thinking state in a position with the detection pen 8 held in the vicinity of the panel surface 1a, the mode to be decided by the mode detection circuit 23 may be fluctuated, resulting in instability (equivalent to chattering in switches). As a result of this, there may occur flickering on the display screen. To avoid this phenomenon, the following two means are effective.

Figure 32A:
FIGS. 32(a)–32(c) are views showing a mode signal outputted by the mode detection circuit.
Figure 32B:
Figure 32C:
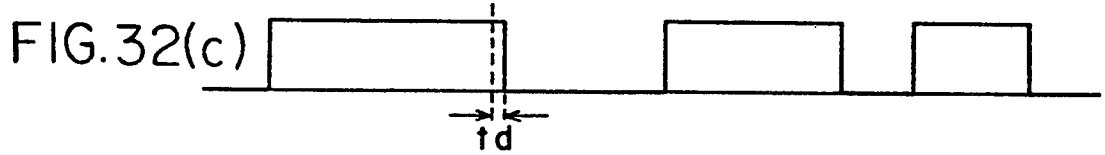

A first means is a means for, in making a decision to move from the detection mode into the non-detection mode, so deciding only when the output voltage of the peak detector 24 is once lower than the reference voltage and, after a specified period has elapsed, still lower than the same. FIGS. 32(a)–32(c) illustrate this process in detail. FIG. 32(a) pictures an output voltage of the peak detector 24, which shows the fact that the detection pen 8 turns into and out of contact with the panel surface 1a at a high frequency. When this output voltage is directly compared with the reference voltage as it is, to digitize it into binary value, the resulting waveform is such that high and low levels replace each other at a very high frequency, as shown in FIG. 32(b). However, with the arrangement that the mode is moved to the non-detection mode (low level) only when the output voltage is once lower than the reference voltage and, after the elapse of a period td, still lower than the same, a stable waveform can be obtained as shown in FIG. 32(c).

Figure 33A:
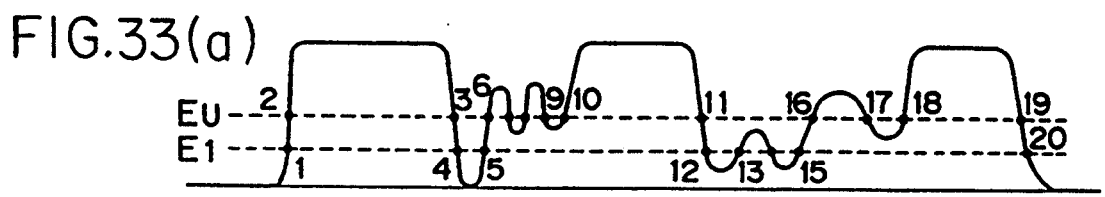
FIGS. 33(a)–33(d) are views showing a mode signal outputted by the mode detection circuit.
Figure 33B:
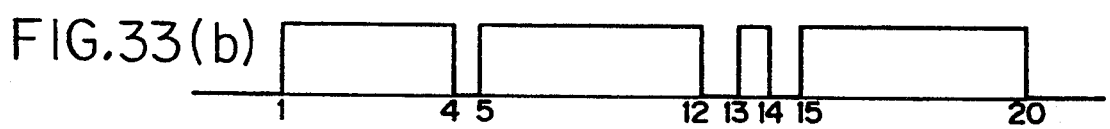
Figure 33C:
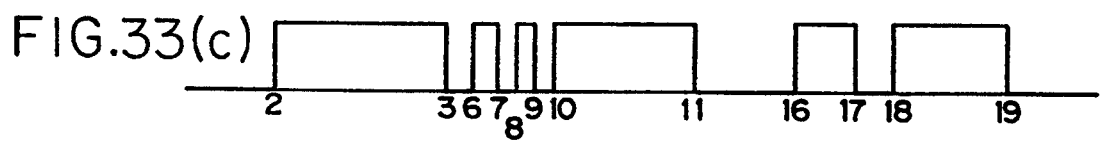
Figure 33D:
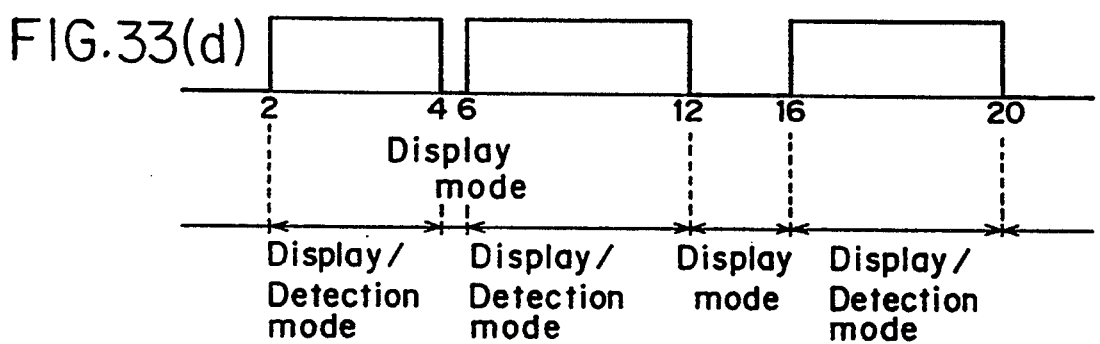
Figure 34:
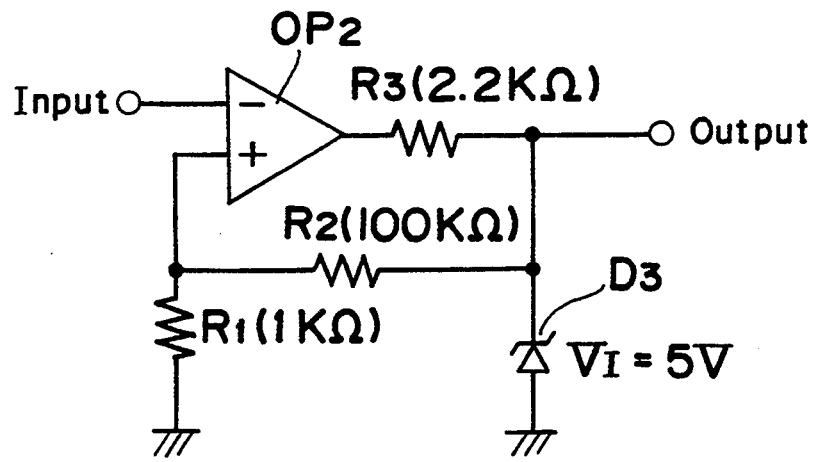
FIG. 34 is a view showing a comparator which the mode detection circuit has.

A second means is a means for, with a plurality of reference voltages set, setting one for moving from the detection mode to the non-detection mode higher than another for moving from the non-detection mode to the detection mode. Practically, within the mode detection circuit 23, a comparator having a hysteresis characteristic is formed by an operational amplifier $OP_2$ and a Zener diode $D_3$ in combination, as shown in FIG. 34. FIGS. 33(a)–33(d) illustrate the detail of this arrangement. FIG. 33(a) shows an output voltage of the peak detector 24, where Eu, El are reference voltages of different values (Eu>El). In addition, the numerals in FIG. 33(a) denote the timing at which the output voltage coincides with reference voltages Eu, El (applicable also to FIGS. 33(b), (c)). When the output voltage is binary-digitized as it is by referencing the reference voltages Eu, El, the resulting waveform is such that high and low levels replace each other at a high frequency, as shown in FIGS. 33(b) and (c). However, with the arrangement that Eu is selected as the reference voltage when the output voltage changes from up to down, and El is selected as the reference voltage when the output voltage changes from down to up, such a stable waveform can be obtained as shown in FIG. 33(d). Referring to this from the viewpoint of the position of the detection pen 8, one position where the detection pen 8 is made closer toward the panel surface 1a from a distance is equivalent to Eu, and another when the detection pen 8 is made farther from the panel surface 1a is equivalent to El. In other words, when the detection pen 8 is made closer to the panel surface 1a from a distance, the detection mode will not be entered until the detection pen comes quite close thereto; on the other hand, when the detection mode has once been entered, the detection mode will continue up to a position farther than where the detection mode had been entered. Accordingly, such malfunction can be avoided as there occurs flickering on the display screen.

Figure 36:
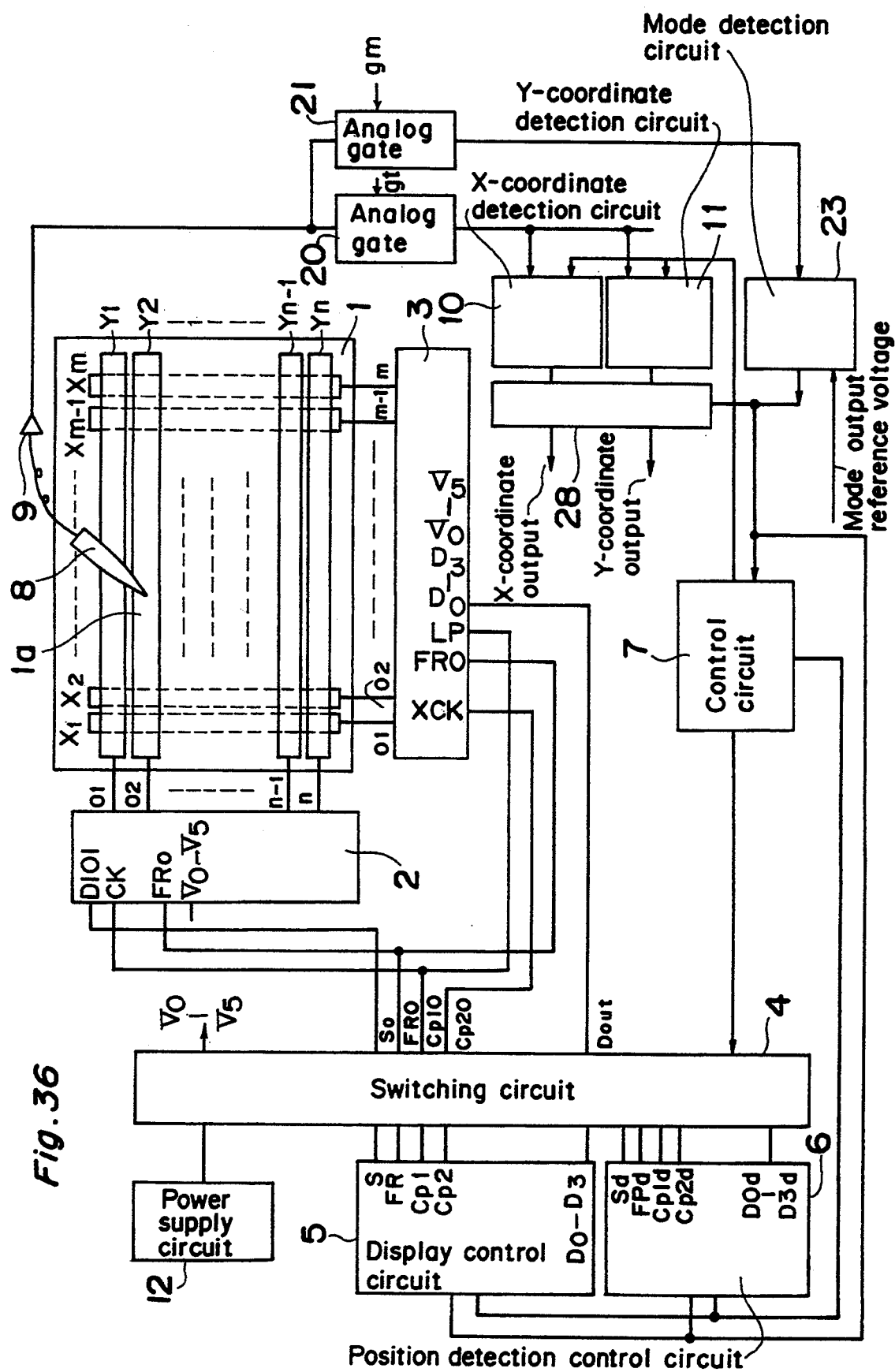
FIG. 36 is a view showing the general construction of the display-integrated type tablet device of the aforementioned variation.

FIG. 36 shows the general construction of a variation of the display-integrated type tablet device of the above-described Embodiment 4. This display-integrated type tablet device comprises a control circuit 7' and a display control circuit 5' in place of the control circuit 7 and the display control circuit 5 as shown in FIG. 26 and FIG. 1, respectively; otherwise, the tablet device is same in construction as that of Embodiment 4 shown in FIG. 26. The control circuit 7', receiving a mode signal outputted by the mode detection circuit 23, sets both the display period and the coordinate detection period by time sharing when the mode signal represents the detection mode (display/coordinate detection mode). When the mode signal represents the non-detection mode, on the other hand, it sets only the display period (display mode). The display control circuit 5' is of the programmable type and, when receiving a mode signal outputted by the mode detection circuit 23, it can change the transfer mode (e.g. image data transfer speed, clock signal, and synchronizing signal) according to the contents of the mode signal.

Figure 35:
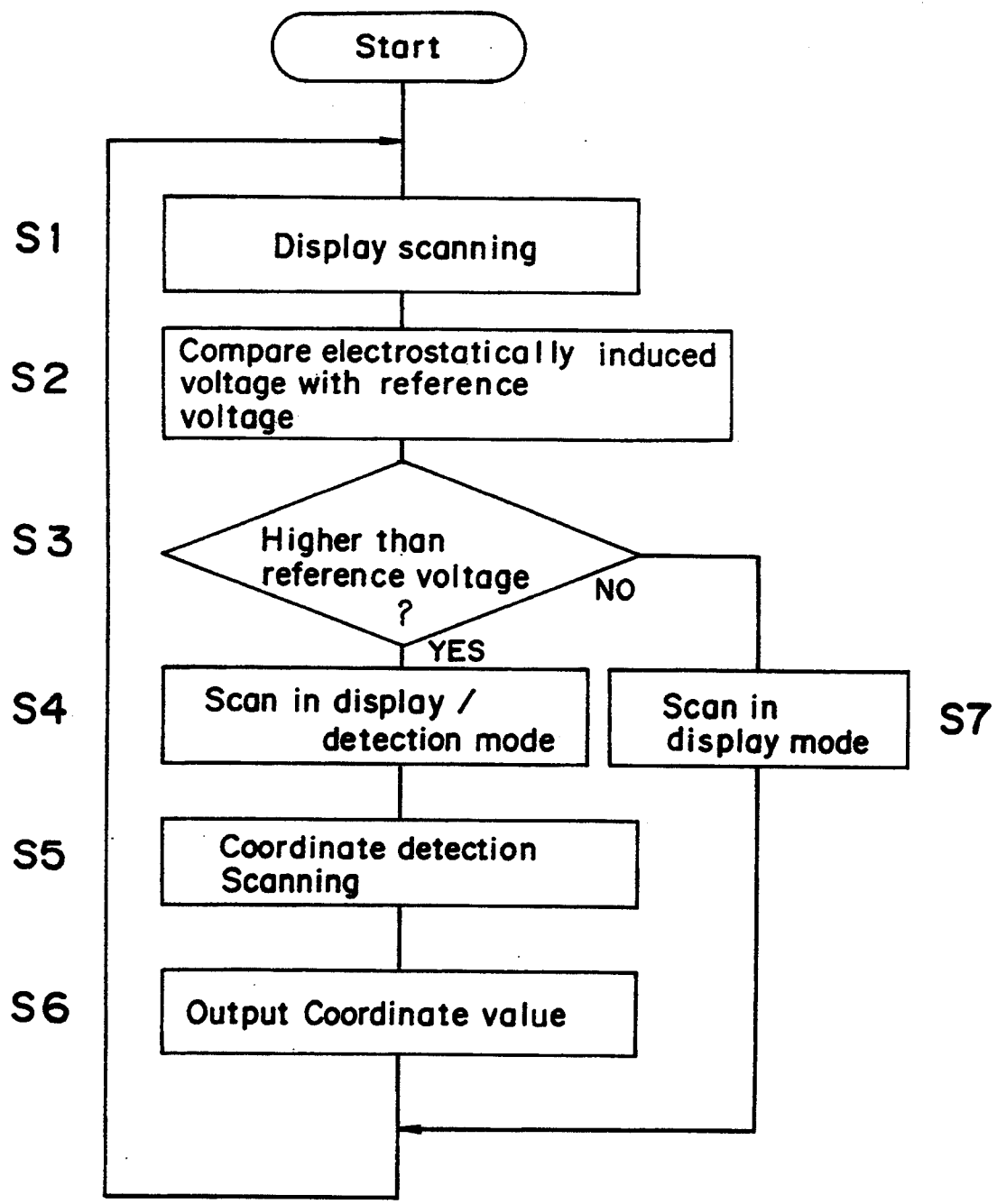
FIG. 35 is a view showing a flow chart for explaining the operation of a variation of the display-integrated type tablet device as shown in FIG. 26.

With this display-integrated type tablet device, as shown in FIG. 35, first the control circuit 7' sets the display period to perform display scanning (step S1). During this display period, the mode detection circuit 23 compares an electrostatically induced voltage developed to the detection pen 8 with the reference voltage, thereby performing mode decision (step S2). When the electrostatically induced voltage is higher than reference voltage, scanning is carried out in the display/coordinate detection mode (step S4); when the electrostatically induced voltage is lower than the reference voltage, scanning is carried out in the display mode (step S7). For scanning in the display/coordinate detection mode, not only the display period but also the coordinate detection period are set to perform the coordinate detection scanning (step S5), so that a coordinate value is outputted through the coordinate output selection circuit 13. In this way the tablet device operates as a tablet only for an extremely short period during which the detection pen 8 is in proximity to the panel surface 1a, serving only for display for most period. Therefore, it is possible to suppress reduction in image quality and increase in power consumption involved in coordinate detection to such level as will not matter in practical use.

Below presented are two ways for setting both the image data transfer speed from the display control circuit 5' to the liquid crystal panel 1 and the number of frames per second, in the case where both display period and coordinate detection period are set. One is that the image data transfer speed is set equal between display mode and display/coordinate detection mode (same with clock signal and synchronizing signal), and the coordinate detection period is only interrupted into the display period in the display/coordinate detection mode. In this setting, the construction of the device can be simplified. The other is that the image data transfer speed is made faster in the display/coordinate detection mode than in the display mode (same with clock signal and synchronizing signal) while the number of frames per second is made equal between the display mode and the display/coordinate detection mode. In this setting, it is possible to prevent the scan period from being lengthened in the display/coordinate detection mode, so that occurrence of flickering can be prevented regardless of what types the lighting equipment and power supply frequency are.

(Embodiment 5)

There are two types of voltage which is picked up by the detection pen of the display-integrated type tablet device from external due to electrostatic induction: one is induced voltage caused by inversion of the direction in which voltage is applied to liquid crystals as described before and the other is induced voltage caused when the detection pen separates from the liquid crystal panel into proximity to or contact with some external equipment, object, person, or the like.

The present invention is to further reliably prevent misdetection of coordinates of the tip of the detection pen due to noise, by virtue of its focused point that the induced voltage due to inversion of the direction in which voltage is applied to liquid crystals is generated at regular timings because of its conjunction with the logic of the display circuit such that it will be generated only for limited periods.

Figure 40:
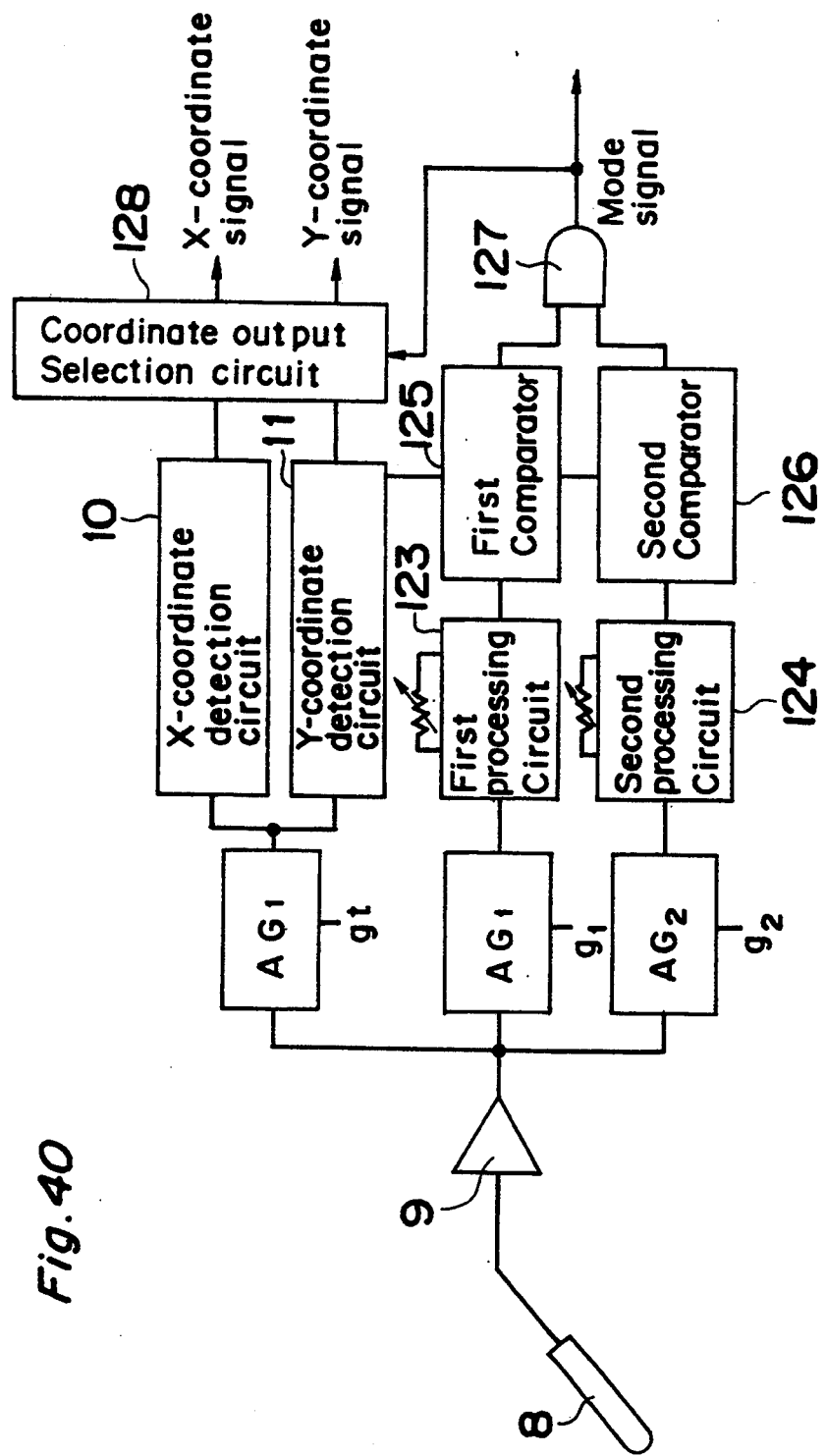
FIG. 40 is a block diagram showing the coordinate detection section in a display-integrated type tablet device according to a fifth embodiment of the present invention.

FIG. 40 is a block diagram of the coordinate detection section of a display-integrated type tablet device according to the present embodiment. This display-integrated type tablet device having the coordinate detection section, as in the prior-art display-integrated type tablet device shown in FIG. 1, comprises a liquid crystal panel 1, a common drive circuit 2, a segment drive circuit 3, a switching circuit 4, a display control circuit 5, a position control circuit 6, a control circuit 7, and a d.c. power supply circuit 12.

In addition, in FIG. 40, like component parts as with in the prior-art display-integrated type tablet device shown in FIG. 1 are designated by like numerals, description thereof being omitted.

The output terminal of the operational amplifier 9 connected to the tip electrode of the detection pen 8 there is connected with input terminals of an analog gate $AG_t$ for coordinate detection, a first analog gate $AG_1$ and a second analog gate $AG_2$ for induced voltage detection. Further the output terminal of the analog gate $AG_t$ for coordinate detection is connected with both an x-coordinate detection circuit 10 and a y-coordinate detection circuit 11.

The output terminal of the first analog gate $AG_1$ is connected with a first processing circuit 123, which is in turn connected with a first comparator 125. On the other hand, the output terminal of the second analog gate $AG_2$ is connected with a second processing circuit 124, which is in turn connected with a second comparator 126. Further the output terminals of the first/second comparators 125, 126 are each connected with an input terminal of the same AND gate 127.

The analog gates described above go "ON" when receiving an "H" level gate signal at their gate terminals while they go "OFF" when receiving an "L" level gate signal.

More specifically, the analog gate $AG_t$ for coordinate detection is "ON/OFF" controlled by a gate signal $g_t$ which is held at "H" level during the coordinate detection period, so that it transmits an induced voltage derived from the operational amplifier 9 only during the coordinate detection period. Also, the first analog gate $AG_1$ is "ON/OFF" controlled by a gate signal $g_1$ so that it transmits an induced voltage derived from the operational amplifier 9 to the first processing circuit 123 only during a period in which the gate signal $g_1$ is held at "H" level. Likewise, the second analog gate $AG_2$ transmits an induced voltage derived from the operational amplifier 9 to the second processing circuit 124 only during a period in which the gate signal $g_2$ is held at "H" level.

The first processing circuit 123 rectifies and amplifies voltages of periods sampled by the first analog gate $AG_1$, transmitting them to the first comparator 125. Likewise, the second processing circuit 124 rectifies and amplifies voltages of periods sampled by the second analog gate $AG_2$, transmitting them to the second comparator 126.

In consequence, the first analog gate $AG_1$ forms the foregoing first sampling means; the second analog gate $AG_2$ forms the foregoing second sampling means; the first processing circuit 123 and the first comparator 125 in combination forms the foregoing first processing means; the second processing circuit 124 and the second comparator 126 in combination forms the foregoing second processing means; and the AND gate 127 forms the foregoing decision means.

Figure 41:
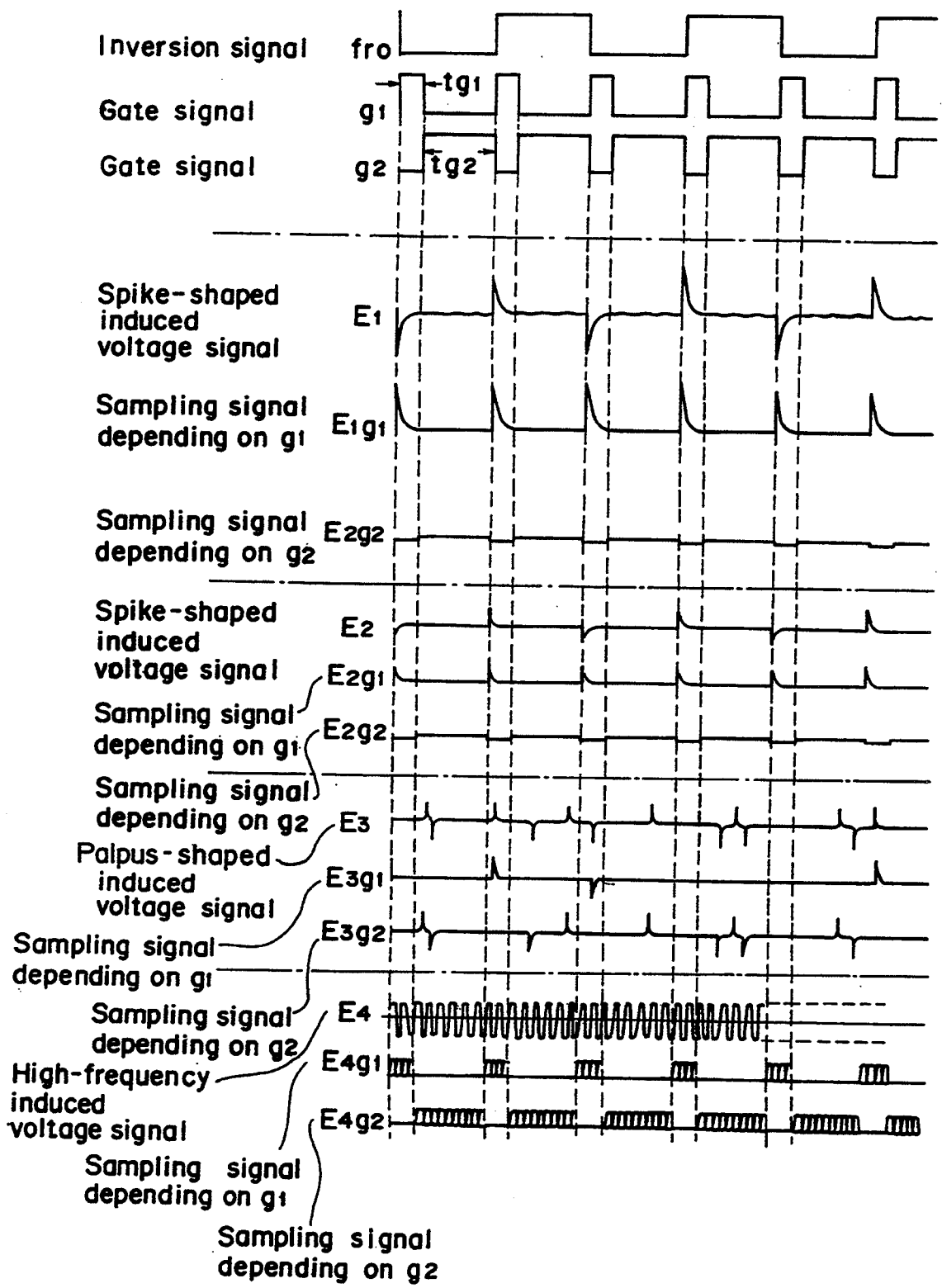
FIG. 41 is a timing chart of various types of signals pertaining to the coordinate detection section as shown in FIG. 40.

Now the display-integrated type tablet device with the above-described construction is described in detail with respect to operation of its coordinate detection section. FIG. 41 shows a timing chart of various types of signals pertaining to the coordinate detection section.

Referring to FIG. 41, a signal $E_1$ is a spike-shaped induced voltage (hereinafter, referred to as spike-shaped induced voltage signal) developed to the detection pen 8 when the detection pen 8 is approximately put into contact with the surface of the liquid crystal panel 1, the signal being an induced voltage signal that occurs while the pen input is under progress or preparation.

A signal $E_2$ is a spike-shaped induced voltage signal developed to the detection pen 8 when the detection pen 8 is a little separated from the liquid crystal panel 1, the signal having a peak value lower than that of the spike-shaped induced voltage signal $E_1$.

These spike-shaped induced voltage signals $E_1$, $E_2$ are induced to the detection pen 8 due to inversion of the direction in which voltage is applied to the liquid crystals, the inversion synchronous with change in level of an inversion signal fro, so that they are generated in synchronization with the change in level of the inversion signal fro.

A signal $E_3$ is a palpus-shaped induced voltage signal developed when the detection pen 8 is separated from the liquid crystal panel 1 and located in the vicinity of a palpus-shaped noise source.

A signal $E_4$ is a high-frequency induced voltage signal developed when the detection pen 8 is separated from the liquid crystal panel 1 and located in the vicinity of a high-frequency noise source.

The induced voltages developed to the detection pen 8 due to these types of noise will occur independently of change in level of the inversion signal fro.

The gate signal $g_1$ is a gate signal for sampling only the spike-shaped induced voltage signal developed to the detection pen 8 due to inversion of the direction in which voltage is applied to the liquid crystals of the liquid crystal panel 1, the signal $g_1$ being a pulse signal which has a pulse width of "$tg_1$" and which rises on an edge of the level change of the inversion signal fro (on rising edge or tailing edge) or immediately before the edge.

Also, the gate signal $g_2$ is a gate signal for sampling only an induced voltage signal developed immediately after the spike-shaped induced voltage signal, due to the aforementioned palpus-shaped noise or high-frequency noise or the like, the gate signal $g_2$ being a pulse signal which has a pulse width of "$tg_2$" and which rises after the foregoing pulse width of "$tg_1$" or so has elapsed from the time of level change of the inversion signal fro. In this case, the gate signal $g_2$ may be an inversion signal of the gate signal $g_1$.

In addition, signals $E_{1g1}$, $E_{2g1}$, $E_{3g1}$, and $E_{4g1}$ are ones resulting from sampling and rectifying the signals $E_1$, $E_2$, $E_3$, and $E_4$ depending on the gate signal $g_1$. Also, signals $E_{1g2}$, $E_{2g2}$, $E_{3g2}$, and $E_{4g2}$ are ones resulting from sampling and rectifying the signals $E_1$, $E_2$, $E_3$, and $E_4$ depending on the gate signal $g_2$.

The pulse width $tg_1$ of the gate signal $g_1$ is appropriately selected so as to be within the range of three times time constant $\tau$ of the spike-shaped induced voltage, for the purpose of sampling only the spike-shaped induced voltage signal developed to the detection pen 8. This time constant $\tau$ depending on the construction of the detection pen 8, that of the display-integrated type tablet device of the present embodiment is 16 $\mu$.sec. Accordingly, the pulse width $tg_1$ of the gate signal $g_1$ is set to 35 $\mu$.sec.

Figure 42:
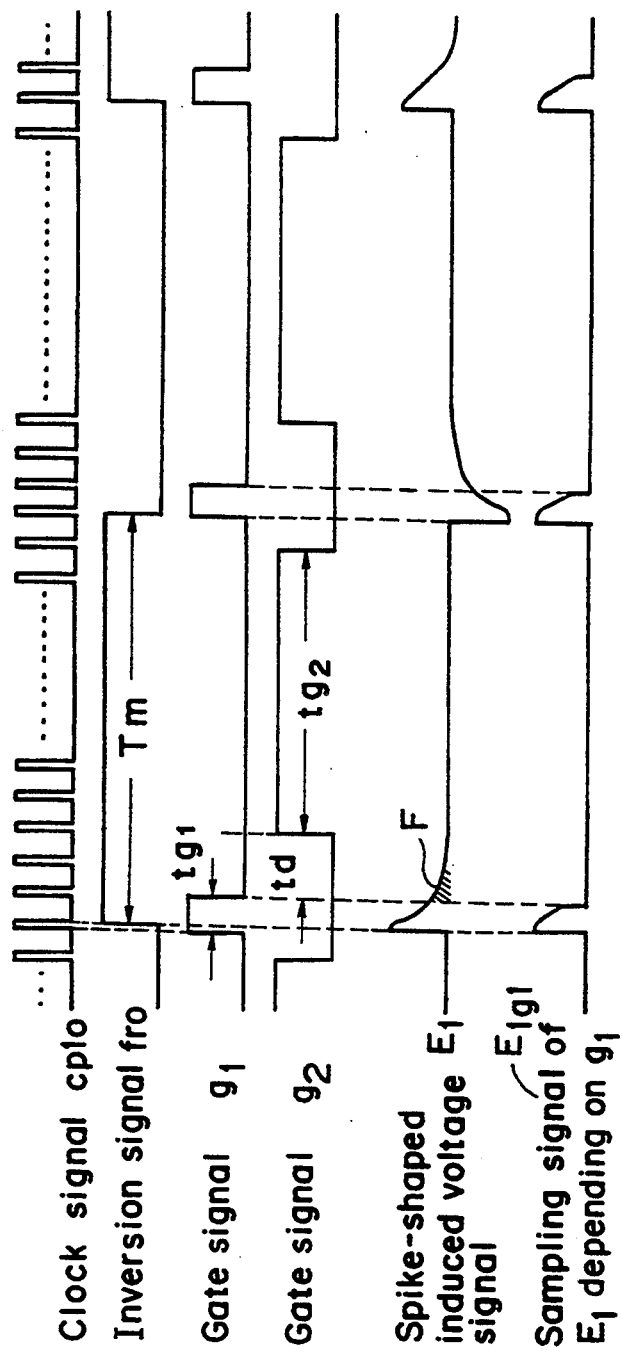
FIG. 42 is an enlarged view of a portion of signals in FIG. 41.

The resulting time is the cycle time of the clock signal CP1o of the common drive circuit 2 during the display period. Normally, as shown in FIG. 42, the inversion signal fro is generated depending on the clock signal CP1o. Therefore, by selecting the pulse width $tg_1$ of the gate signal $g_1$ to some positive integer times the cycle of the clock signal CP1o, the gate signal $g_1$ can be generated with high accuracy by simple circuitry.

Further, as shown in FIG. 42, the inversion signal fro will change in level on the tailing edge of the clock signal CP1o. Accordingly, if the rise time of a pulse of the gate signal $g_1$ is set to the rise time of the clock signal CP1o, the first analog gate $AG_1$ has already been "ON" when the spike-shaped induced voltage rises due to change in level of the inversion signal fro, thus allowing the rise of the spike-shaped induced voltage to be sampled reliably.

It is to be noted that the inversion signal fro in the present embodiment is adapted to change in level every 13 cycles of the clock signal CP1o, its half cycle time being set to Tm=455 $\mu$sec. Accordingly, assuming that the pulse width $tg_1$ of the gate signal $g_1$ is the cycle of the clock signal CP1o while the gate signal $g_2$ is the inversion signal of the gate signal $g_1$, as shown in FIG. 41, the resulting pulse width $tg_1$ of the gate signal $g_1$ is 35 $\mu$sec while the resulting pulse width $tg_2$ of the gate signal $g_2$ is approximately 420 $\mu$sec.

The gate signal $g_2$ as shown in FIG. 41 is generated as an inversion signal of the gate signal $g_1$, whereas it is effective to provide an idle time td between gate signal $g_1$ and gate signal $g_2$, as shown in FIG. 42. This is attributed to the following reason:

As described before, in the system of the first processing circuit 123—the first comparator 125, it is decided whether the detection pen 8 is in proximity to the liquid crystal panel 1, depending on peak values of the spike-shaped induced voltage developed due to inversion of the direction in which voltage is applied to the liquid crystals of the liquid crystal panel 1. In this case, the spike-shaped induced voltage is a thin-spike shaped voltage induced only when the detection pen 8 is put into 10 mm or less proximity to the surface of the liquid crystal panel 1. In such a state that the detection pen 8 is in 10 mm or less proximity to the surface of the liquid crystal panel 1, the tip electrode of the detection pen 8, which is made high in input impedance and is nearly floating, is more densely electrostatically coupled with the segment electrodes X and the common electrodes Y such that it will pick up almost no noise.

Due to this, the spike-shaped induced voltage results in a waveform having a large average voltage ratio between an extremely short transition period, including the time point at which the level of the inversion signal fro changes, and the steady periods, which ratio ranges 5 to 10 times. Accordingly, by sampling vicinities of the peak of the spike-shaped induced voltage as much as possible, the height of the detection pen 8 can be decided at high accuracy. Thus, the pulse width $tg_1$ of the gate signal $g_1$ is set so that the foot of the spike-shaped induced voltage (region F hatched in the spike-shaped induced voltage signal $E_1$ in FIG. 42) is cut off.

In contrast to this, in the system of the second processing circuit 124—the second comparator 126, it is decided whether or not the detection pen 8 has picked up any noise, depending on a palpus-shaped induced voltage and a high-frequency induced voltage due to noise. Therefore, by preventing the foot of the spike-shaped induced voltage from entering the induced voltage signals to be sampled for the above decision, it is made possible to detect only noise at high accuracy.

As a result, decisions can be made correctly upon whether or not the detection pen 8 is in proximity to the liquid crystal panel 1 and whether or not an induced voltage signal is noise, based on the arrangement that there is provided an idle time td to a portion corresponding to the foot of the spike-shaped induced voltage signal and that the foot of the spike-shaped induced voltage signal is cut off.

As described above, the period of the spike-shaped induced voltage is almost within the range of time $3\tau$ and therefore, with the pulse width $tg_1$ of the gate signal $g_1$ set to e.g. $\tau$, the idle time td should appropriately be set to $\tau$.

In addition, it is also appropriate to set both the idle time td and the pulse width $tg_2$ of the gate signal $g_2$ to some positive integer times the cycle of the clock signal CP1o, as with the pulse width $tg_1$ of the gate signal $g_1$.

The first processing circuit 123 and the second processing circuit 124 determine the average voltage by half-wave rectifying or full-wave rectifying induced voltages sampled by the first analog gate $AG_1$ or the second analog gate $AG_2$, transmitting the results to the first comparator 125 and the second comparator 126. Then the first comparator 125 and the second comparator 126 make a comparison between the input average voltage and the reference voltage.

In so doing, the average voltage is not determined each time the first analog gate $AG_1$ or the second analog gate $AG_2$ turns "ON," but should be done by integrating induced voltage signals sampled during a one-frame period.

In the case of the timing chart as shown in FIG. 42, the inversion signal fro will change in level 30 times or so during a one-frame period. Accordingly, there occur nearly an equal number of spike-shaped induced voltages to the tip electrode of the detection pen 8. Thus these spike-shaped induced voltages are rectified by the first processing circuit 123, thereafter integrated by a smoothing circuit, and compared with the reference voltage by the second comparator 126 a little before entering the coordinate detection period.

Then after the comparison results by the first comparator 125 and the second comparator 126 are outputted to the AND gate 127, the voltage-integrated values retained in the first processing circuit 123 and the second processing circuit 124 are cleared, entering the subsequent processing of the induced voltage signals in the next frame.

The first comparator 125 compares the integrated voltage of the sampled induced voltages inputted from the first processing circuit 123 with the reference voltage, as described above. Then when the integrated voltage is higher than the reference voltage, it outputs an "H" level signal. When the integrated voltage is lower than the reference voltage, it outputs an "L" level signal.

Therefore, when an "H" level signal is outputted from the first comparator 125, the resulting peak value of the spike-shaped induced voltage developed to the tip electrode of the detection pen 8 is high, showing that the tip of the detection pen 8 is in close proximity to the surface of the liquid crystal panel 1.

On the other hand, the second comparator 126 compares the integrated voltage of the sampled induced voltages inputted from the second processing circuit 124 with the reference voltage, as described above. Then when the integrated voltage is higher than the reference voltage, it outputs an "L" level signal; when the integrated voltage is lower than the reference voltage, it outputs an "H" level signal.

Accordingly, when an "H" level signal is outputted from the second comparator 126, the resulting peak value of the induced voltage due to noise developed to the tip electrode of the detection pen 8 is low or small in amount, showing that the tip of the detection pen 8 is fairly apart from the noise source (i.e. in close proximity to the surface of the liquid crystal panel 1).

In consequence, it is possible to decide the state of the detection pen 8 by ANDing a signal derived from the first comparator 125 and a signal derived from the second comparator 126. In other words, depending on the output signal from the AND gate 127, it can be decided whether it is the "detection mode," in which a coordinate detection period is set succeeding to a display period, or the "non-detection mode," in which the coordinate detection period is not set (hereinafter, an output signal from the AND gate 127 is referred to as a mode signal).

In this arrangement, when the mode signal is at an "H" level, the tip of the detection pen 8 is in proximity to the surface of the liquid crystal panel 1, deciding as the detection mode. On the other hand, when the mode signal is at an "L" level, the tip of the detection pen 8 is apart from the surface of the liquid crystal panel 1, deciding as the non-detection mode.

In addition, the setting of the detection mode or that of the non-detection mode is carried out in the following way.

A coordinate output selection circuit 128, which selects whether or not an x-coordinate signal from the x-coordinate detection circuit 10 and a y-coordinate signal from the y-coordinate detection circuit 11 should be outputted to external, is controlled so that both coordinate signals are outputted when the mode signal is at an "H" level (in the detection mode) while not when the mode signal is at an "L" level (in the non-detection mode).

Further, the mode signal is transmitted to the control circuit 7 (see FIG. 1). Then the control circuit 7 controls so that the detection control circuit 6 (see FIG. 1) will not operate when the mode signal is at an "H" level.

As described above, in the present embodiment, there are provided the first analog gate $AG_1$ that holds "ON" for a specified time $tg_1$ from the time point when the level of the inversion signal fro changes or immediately before the level change and the second analog gate $AG_2$ that holds "ON" for a specified time $tg_2$ from the time point when a specified time td has elapsed. Moreover, in sampling the induced voltage signal developed to the tip electrode of the detection pen 8, the sampling is carried out by separating the voltage signal into a spike-shaped induced voltage signal due to inversion of the direction in which voltage is applied to the liquid crystals of the liquid crystal panel 1 and an induced voltage signal due to noise by the first and second analog gates $AG_1$, $AG_2$.

With this arrangement, the spike-shaped induced voltage signal for a one-frame period sampled by the first analog gate $AG_1$ is rectified and integrated by the first processing circuit 123, where the first comparator 125 outputs an "H" level signal when the integrated voltage is higher than the reference voltage. On the other hand, the induced voltage signal due to noise for a one-frame period sampled by the second analog gate $AG_2$ is rectified and integrated by the second processing circuit 124, where the second comparator 126 outputs an "H" level signal when the integrated voltage is lower than the reference voltage.

As a result, the AND gate 127 outputs an "H" level mode signal only when the tip of the detection pen 8 is in proximity to the surface of the liquid crystal panel 1 such that a substantially small amount of noise is involved, thus allowing the detection mode and the non-detection mode to be set correctly depending on the mode signal.

In consequence, according to the present embodiment, it is possible to decide whether the mode is the "detection mode" or the "non-detection mode," depending on the induced voltage developed to the tip electrode of the detection pen 8 due to inversion of the direction in which voltage is applied to the liquid crystals of the liquid crystal panel 1, even under such environment as around any special equipment causing strong noise or very dry air. Thus, coordinate detection can be performed correctly without being affected by noise.

Also, since the coordinate detection is performed only when the detection pen 8 is in proximity to the surface of the liquid crystal panel 1, the frame frequency can be lowered so that deterioration in image quality can be prevented, without requiring any increase in power consumption.

As described above, in determining the average voltage, which makes a target for comparison by the first comparator 125 and second comparator 126, by integrating the sampling induced voltage signal during a one-frame period, there occurs no problem when the induced voltage signal due to noise is one having some extent of time width such as the palpus-shaped induced voltage signal $E_3$ or the high-frequency induced voltage signal $E_4$. However, in the case of an induced voltage due to extremely thin noise, the integrated value by the second processing circuit 124 results in an extremely small one, being neglected in some cases.

Figure 43:
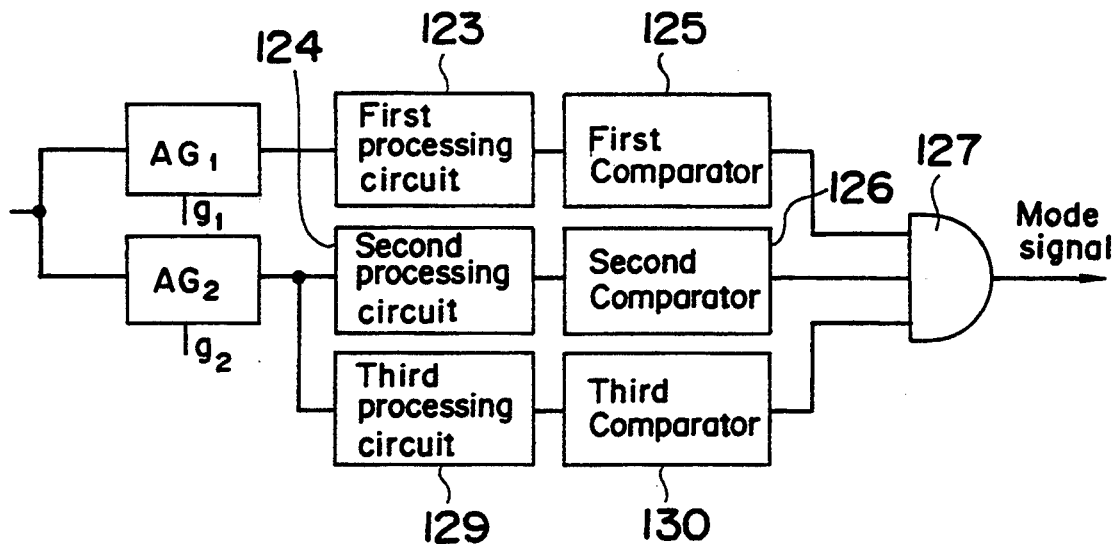
FIG. 43 is a partly block diagram of a coordinate detection section other than that shown in FIG. 40.

FIG. 43 is a partly block diagram of a modification of the present embodiment in which the foregoing problem is taken into consideration.

In the present modification, there is provided a system of a third processing circuit 129—a third comparator 130 as the foregoing third processing means in parallel to the system of the second processing circuit 124—the second comparator 126.

The third processing circuit 129 samples and holds the peak value of an induced voltage due to the above-described noise during a one-frame period sampled by the second analog gate $AG_2$. Then the third comparator 130 compares the sample-held peak value with the reference peak value. Further after the comparison by the third comparator 130, the voltage representing the peak value held to the third processing circuit 129 is cleared before entering the next frame or early in the next frame.

In addition, suitable for the clear signal used for the above purpose is shift data s for the common drive circuit 2 outputted from the display control circuit 5.

The third comparator 130, as in the second comparator 126, outputs an "H" level signal when the peak value held by the third processing circuit 129 is lower than the reference peak value; when higher, on the other hand, it outputs an "L" level signal. This means that when an "H" level signal is outputted from the third comparator 130, the induced voltage due to noise developed to the tip electrode of the detection pen 8 is low such that the tip of the detection pen 8 is substantially apart from the noise source (i.e. substantially close to the surface of the liquid crystal panel 1).

Therefore, according to the present modification, even if an induced voltage signal due to extremely thin noise as described above is developed to the detection pen 8, it is possible to decide as the detection mode correctly when the mode signal outputted from the AND gate 127 goes to an "H" level.

Figure 44:
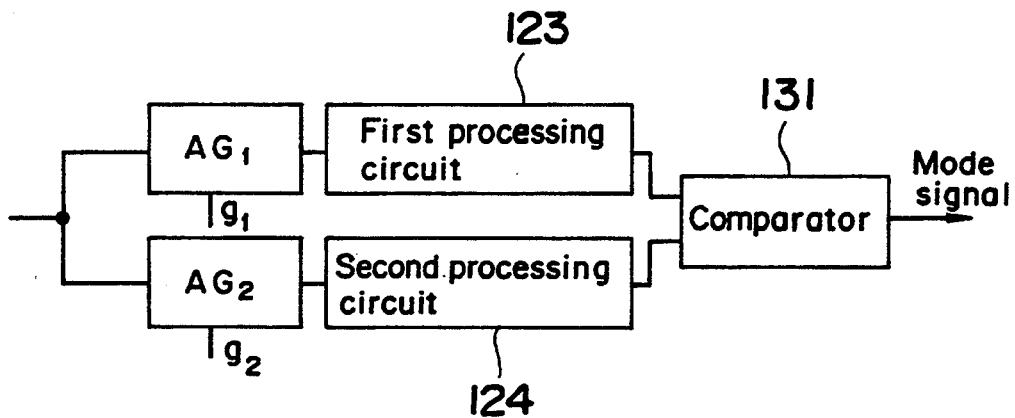
FIG. 44 is a partly block diagram of a coordinate detection section other than those shown in FIGS. 40 and 43.

FIG. 44 shows an embodiment of the present invention other than the foregoing embodiments. Referring to FIG. 44, a comparator 131 directly compares an integrated voltage for a one-frame period of spike-shaped induced voltages due to inversion of the direction in which voltage is applied to the liquid crystals of the liquid crystal panel 1, outputted from the first processing circuit 123, and an integrated voltage for a one-frame period of induced voltages due to noise outputted from the second processing circuit 124.

In doing this, amplification factors for the first processing circuit 123 and the second processing circuit 124 are set as to be different from each other. Differing depending on the time of the gate signal $g_1$ and the gate signal $g_2$ and the contents of the integration circuits of the first processing circuit 123 and the second processing circuit 124, the above amplification factors are set so that the output voltage of the second processing circuit 124 will be higher than the output voltage of the first processing circuit 123.

Then the comparator 131 decides, when the output voltage of the first processing circuit 123 is higher by referencing the output voltage from the second processing circuit 124, that the tip of the detection pen 8 is in proximity to the surface of the liquid crystal panel 1 since the spike-shaped induced voltage is higher than the noise. Thus it outputs an "H" level mode signal.

On the other hand, when the output voltage from the first processing circuit 123 is equal to or lower than the reference voltage, the comparator 131 decides that the tip of the detection pen 8 is apart from the surface of the liquid crystal panel 1 since the spike-shaped induced voltage is not so high in comparison with noise. Thus it outputs an "L" level mode signal.

It can be said accordingly that the comparator 131 serves as the foregoing decision means.

As a consequence, in the case of the spike-shaped induced voltage signal $E_1$ or spike-shaped induced voltage signal $E_2$, an "H" level mode signal is outputted so that the "detection mode" is set. Meanwhile, in the case of the palpus-shaped induced voltage signal $E_3$ or high-frequency induced voltage signal $E_4$, an "L" level mode signal is outputted so that the "non-detection mode" is set.

Below described are two ways for setting the detection mode, in so doing with the above-described embodiments.

A first method of setting the detection mode is: display data transfer speed, cycles of clock signals, and synchronizing speed of synchronizing signals during the display period for all the frames are previously set equal among them and, when the mode signal is at an "H" level, the coordinate detection period is simply interrupted after the display period of the relevant frame, thereby setting the detection mode. According to this method, there is an advantage that the whole construction including the display control circuit 5 can be simplified.

On the contrary, since the length of the display period is equal between detection mode and non-detection mode, the length of the frame period in the detection mode becomes longer than that in the non-detection mode and the frame frequency in the detection mode becomes smaller. Accordingly, there may occur flickering depending on the types of the lighting equipment and the power supply frequency.

By contrast, a second method of setting the detection mode is that the frame frequency is made equal between detection mode and non-detection mode. In the detection mode in this case, the number of display pixels must be equal despite the fact that the length of the display period becomes shorter by the length of the coordinate detection period. Accordingly, during the display period in the detection mode, the display data transfer speed, frequencies of clocks, synchronizing speed of synchronizing signals, and the like are made faster than those during the display period in the non-detection mode.

In this case, the display control circuit 5 is desirably display control circuit of the programmable type capable of changing its output control signal when receiving the mode signal.

As described above, according to the above-described embodiments, it is possible to decide correctly without being affected by peripheral noise, whether the detection pen 8 is in close proximity to the surface of the liquid crystal panel 1. Hereinbelow, although not directly related to the present invention, a brief description is made on techniques for implementing the above-described embodiments more effectively.

When the operator has moved into an input-preparation or thinking state in a position with the detection pen 8 located as the integrated value of the spike-shaped induced voltage outputted from the first processing circuit 123 is equal to the reference voltage of the first comparator 125, then a mode signal outputted from the AND gate 127 is put into a chattering state in which the mode signal switches over and over between "H" level and "L" level in a short time. Accordingly, the detection mode and the non-detection mode are switched over and over in a short time in response to the mode signal, causing flickering on the screen.

To avoid this, the following countermeasure can be taken effectively.

That is, in the state that the detection mode has been set with the integrated value outputted from the first processing circuit 123 higher than the reference value of the first comparator 125, when the integrated value becomes lower than the reference value, the non-detection mode is not immediately set but, if the mode signal remains at an "L" level as a result of a plurality of times comparison or one more comparison after a specified time elapse by the first comparator 125, the non-detection mode is set.

In the above embodiments, the setting of the detection mode is effected by controlling the coordinate output selection circuit 128 and the detection control circuit 6 by a mode signal. However, the present invention is not limited to this arrangement. For example, it is allowed to use in combination "ON/OFF" control of the analog gate $AG_t$ for coordinate detection by the control of the gate signal $g_t$ and operation halt of the detection control circuit 6. Also, operation halt of the x-coordinate detection circuit 10 and the y-coordinate detection circuit 11 and the operation halt of the detection control circuit 6 may be used in combination.

Further, in the above embodiments, both image display and coordinate detection are carried out during a one-frame period in the detection mode while only the image display is carried out during a one-frame period in the non-detection mode. However, the present invention is not limited to this.

For example, it may be arranged that both image display and coordinate detection are carried out during all the frame periods, wherein when mode signal from the AND gate 127 is at an "L" level, detection result is removed taking the coordinate detection result as a misdetection, or the display position of the detected value of the tip electrode coordinate of the detection pen 8 to the liquid crystal panel 1 is taken as the coordinate origin.

(Embodiment 6)

Figure 45:
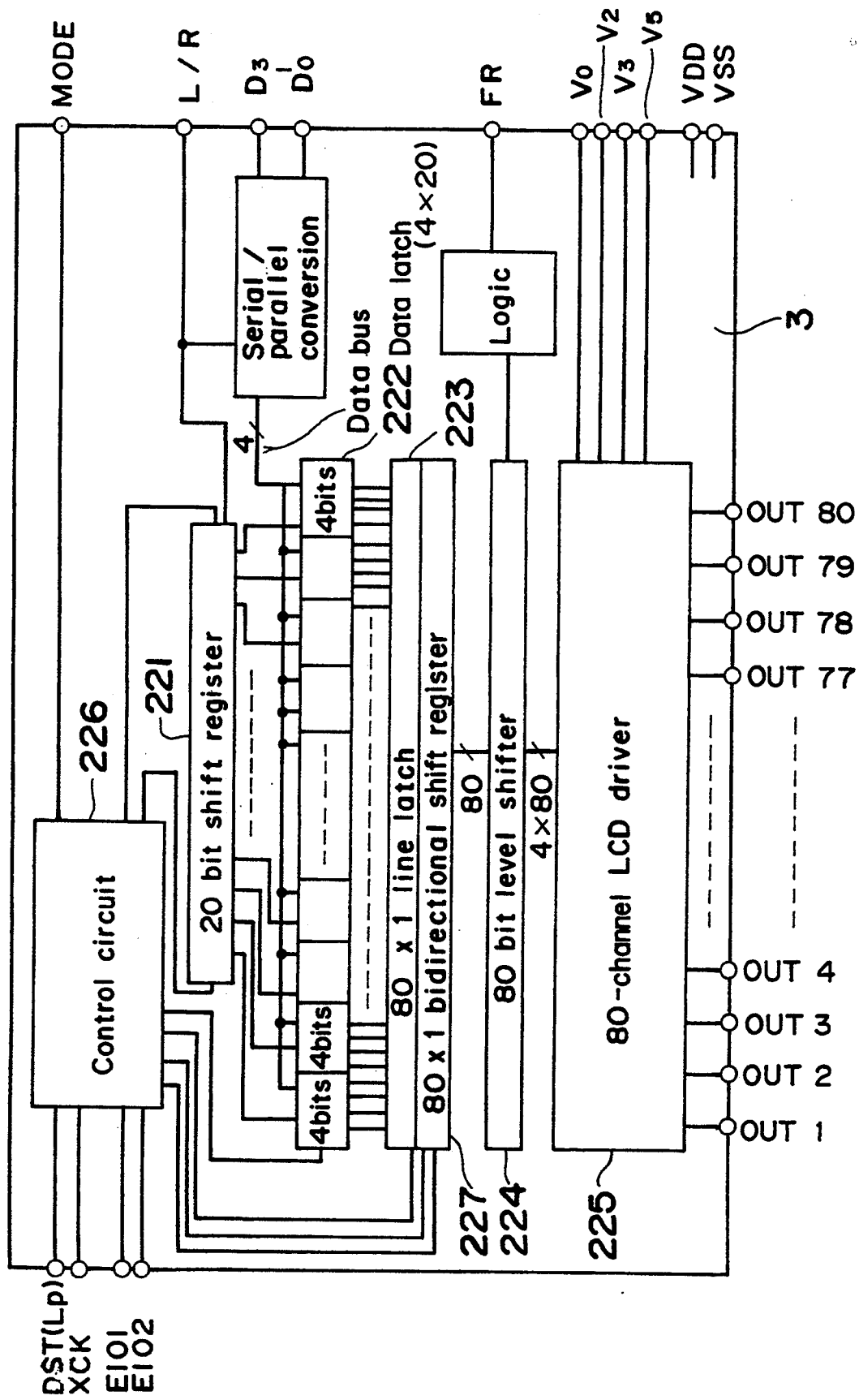
FIG. 45 is a block diagram of an LSI to be used in a sixth embodiment of the present invention.
Figure 46:
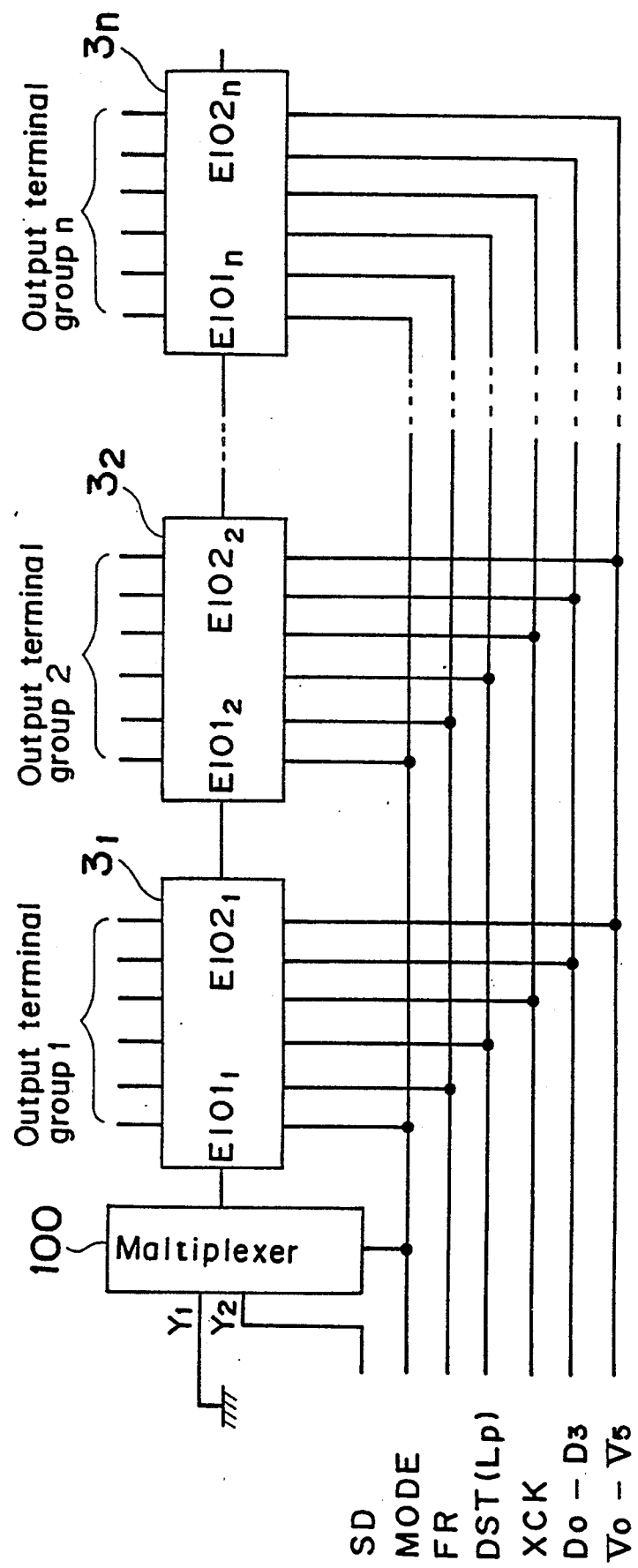
FIG. 46 is a circuit diagram of a segment drive circuit in which the aforementioned LSIs are connected in cascade.
Figure 47:
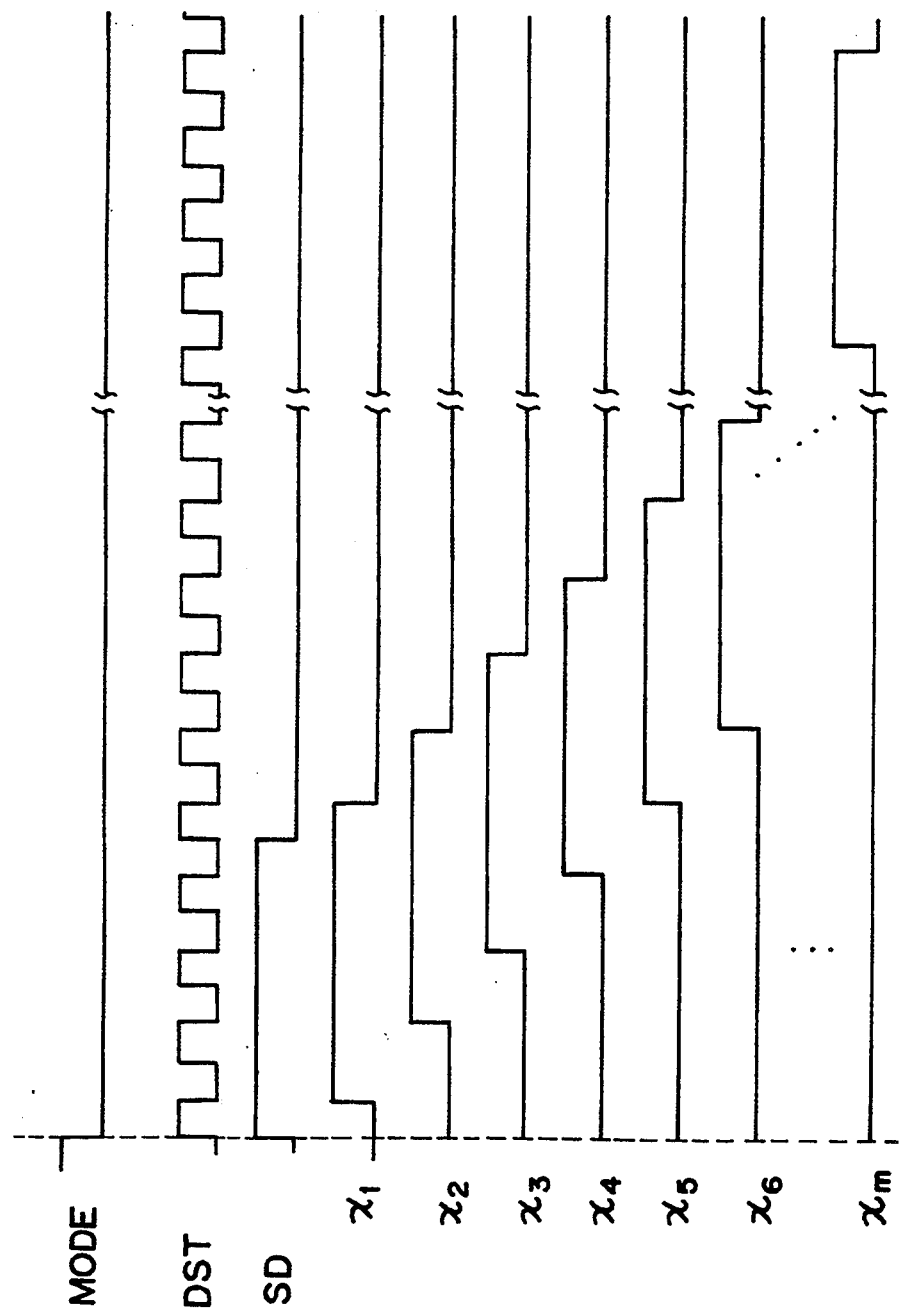
FIG. 47 is a timing chart of x-coordinate detection in the above embodiment.

FIG. 45 is a block diagram of an LSI forming the segment drive circuit used in Embodiment 6 of the present invention; FIG. 46 is a circuit diagram of the segment drive circuit in which this LSI is connected in a plural number in cascade; and FIG. 47 is a timing chart of x-coordinate detection in the present embodiment.

Figure 50:
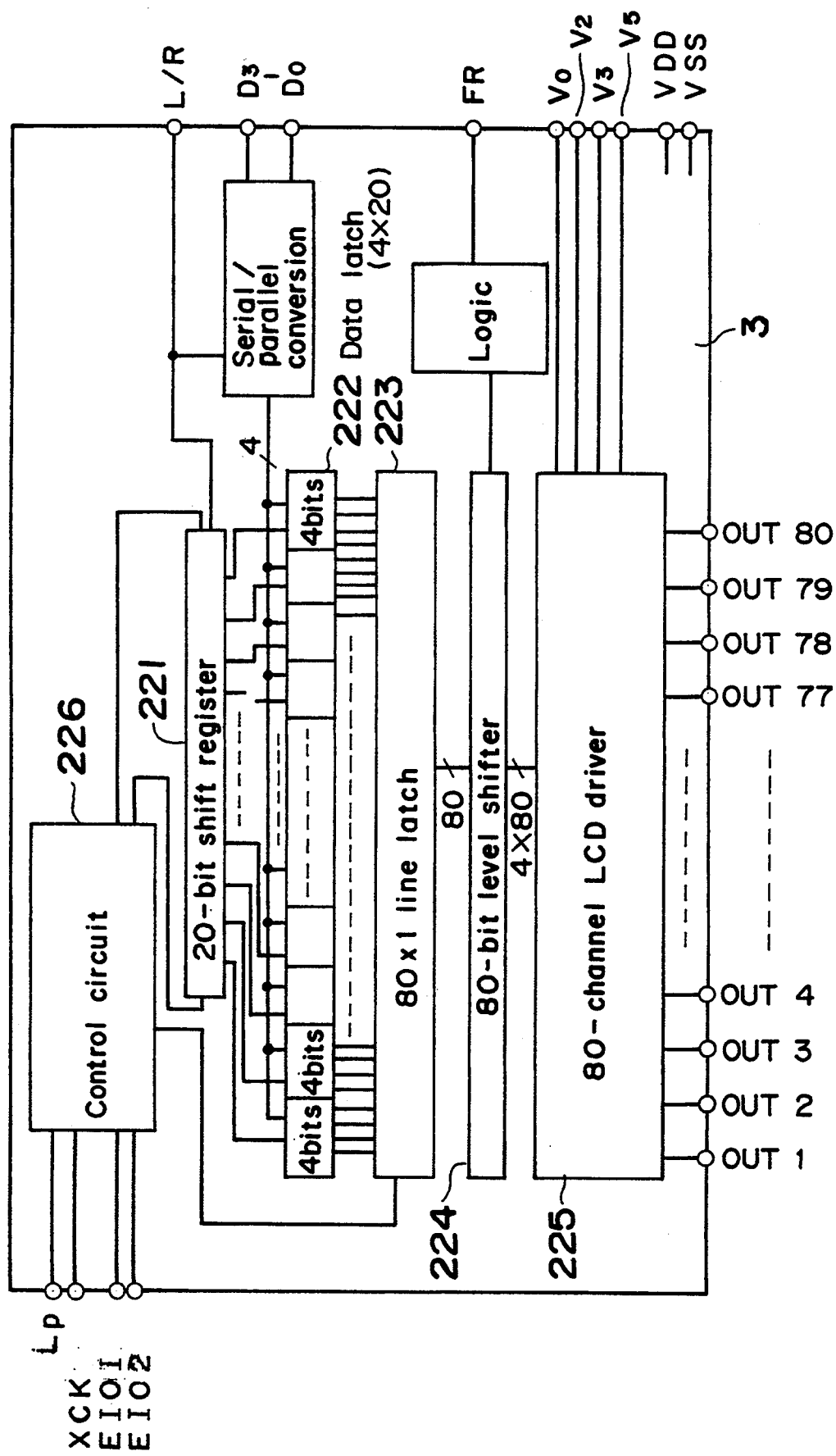
FIG. 50 is a block diagram of an LSI to be used for the prior-art segment drive circuit.

$LSI_3$ shown in FIG. 45 is constructed so that the LSI as shown in FIG. 50 is additionally provided with an MODE terminal and a bidirectional shift register 27. The MODE terminal is set to HIGH during the display period and to LOW during the coordinate detection period by the control circuit 7 as shown in FIG. 1.

Referring first to the LSI of FIG. 50 in more detail, serial input/output terminals EIO1 and EIO2 switch the shift direction depending on the input level of L/R, being set to either input or output. For example, when L/R=L, EIO1 serves as input while when L/R=H, it serves as cascade output. EIO2 is converse to EIO1. Each bit of a shift register 221 has parallel output function, the outputs being connected to corresponding gates of a 4×20 bit data latch 222 having one gate for every 4 bits. Accordingly, display data to be transferred at clocks XCK are successively accommodated into the data latch 222, where 80 bit full data are accommodated into the data latch 222 at 20 times of clocks while this LSI is put into non-select state. In this state, shift data from EIO1 is outputted to a chip select EIO2 simultaneously, selecting the succeeding LSI by the chip select EIO1 of the succeeding LSI connected in cascade. A line latch 223 is connected to a level shifter 224 with a bit bus. LP, denoting the input terminal of latch pulses, latches data of the data latch 222 to the line latch 223 on the tailing edge, where an output voltage is determined by the level shifter 224 depending on both the content of the line latch 223 and an FR signal, outputting it simultaneously from both an LCD driver 225 and output terminals OUT1 . . . OUT80. At the same time, the chip select is cleared by the control circuit 226 on the tailing edge of LP.

Referring again to FIG. 45, a control circuit 226, serving as both a control means and a scan mode setting means, sets the scan mode to a first mode, "display mode," when the MODE terminal goes HIGH while it sets the scan mode to a second mode, "detection mode," when the MODE terminal goes LOW. Then, E101, E102 are made to function completely like EIO1, EIO2 as shown in FIG. 50 in the display mode and to function as shift data input/output terminals, their new function, in the detection mode. Further, in the detection mode, EIO1 serves for serial input when L/R=H, and for serial output when L/R=L. The case with EIO2 is converse to that with EIO1.

XCK is used for transfer of data $D_0$–$D_3$ in the display mode, serving as transfer clocks for the shift register 221, but not used in the detection mode. DST operates as input of LP in the display mode while it operates as clocks for shift data in the detection mode. Terminals of $D_0$–$D_3$ serve as input terminals of display data in the display mode, but are not used in the detection mode.

Next the operation of this LSI is explained.

When the scan mode is the display mode, EIO1 and EIO2 serve as chip select input/output terminals completely like EIO1 and EIO2 as shown in FIG. 50; both the EIO1 and EIO2 are set to serial input/output of the shift register 221, where display data $D_1$–$D_3$ are transferred at transfer clocks XCK. Each bit of the shift register 221 has parallel output function, the outputs being connected to corresponding gates of the 4×20 bit data latch 222 having one gate for every 4 bits (FIG. 45 shows the case of 4 bits, whereas 8 or 16 bits also available). Accordingly, display data to be transferred at clocks XCK are successively accommodated into the data latch 222, where full data are accommodated into the data latch 222 at 20 times of clocks while this LSI is put into non-select state. In this state, since the input and output of the shift register 221 are connected to EIO1 and EIO2, respectively, the shift data from EIO1 is outputted to the chip select EIO2 simultaneously, selecting the succeeding LSI by the chip select EIO1 of the succeeding LSI connected in cascade. In this display mode, the line latch 223 is connected to the level shifter 224 with a bit bus. DST, denoting the input terminal of data strobes (latch pulses), latches data of the data latch 222 to the line latch 223 on the tailing edge, where a voltage necessary for scanning is selected out of $V_0$–$V_5$ by the level shifter 224 depending on the content of the line latch and an FR signal, outputting it simultaneously from both the LCD driver 225 and the output terminals OUT1 . . . OUT80. At the same time, the chip select is cleared by the control circuit 226 (on the tailing edge of DST).

When the scan mode is the detection mode, EIO1 and EIO2 serve as shift data input/output terminals, making input/output of a bidirectional shift register 227 made of 80 registers, $R_1$, $R_2$, ..., $R_{80}$. Also, the level shifter 224 is connected to the parallel output of the bidirectional shift register 227, and separated from the line latch 223. Accordingly, shift data fed to the EIO1 (EIO2 depending on L/R) are successively outputted to electrodes via OUT1 . . . OUT80 from the LCD driver 225 through the level shifter 224 as parallel output of the bidirectional shift register 227.

In this detection mode, EIO1 serves as shift data input terminal, and shift data inputted to the EIO1 is transferred to the bidirectional shift register 227 by clock pulses applied to the DST, thereafter outputted from the EIO2. In other words, data inputted into the LSI3$_1$ is transferred in the order of EIO1$_1$→$R_1$→$RR_2$→3 . . . →$R_{80}$→EIO2$_1$, inputted into the EIO1$_2$ of the succeeding stage LSI3$_2$, and transferred up to the LSI3$_n$ of the final stage through like processing.

As shown in FIG. 46, the EIO1$_1$ of the first stage is connected to the output of a multiplexer 100, whose input is selected for either Y1 or Y2 depending on the MODE signal.

In the case of the display mode, the MODE signal is H, and input of the multiplexer 100 is selected for Y$_1$ set to L (Vss), with EIO1$_1$ at L. MODE, XCK, FR, DST, $D_0$–$D_3$, $V_0$–$V_5$, and others are connected to all the LSIs, each LSI being successively chip-selected by chip select terminals EIO1$_1$, EIO1$_2$, . . . In this display mode, EIO1$_1$ is fixed to L through the multiplexer 100, whereas in its initial state after a latch pulse is applied to the DST terminal, all other chip select output terminals EIO2$_1$, EIO2$_2$ . . . are at H while EIO1$_2$, EIO1$_3$, . . . connected thereto are also at H, 3$_1$ only being selected.

Data $D_0$–$D_3$ corresponding to a group 1 of output terminals are transferred to 3$_1$ by XCK, and successively accommodated into 20 sets of data latches (20 bit shift registers) in which the number of outputs of one chip (80 channels in FIG. 1) is formed by 4 bits. When full data (4×20 bits) are entered, EIO2$_1$ goes L and EIO1$_2$ connected thereto also goes L, causing the first-stage LSI to be put into non-select state while the second-stage LSI3$_2$ being selected. Thereafter, the data is transferred to the second-stage LSI3$_2$, accommodated into the internal data latch. Selection of the data latch into which data $D_0$–$D_3$ is accommodated is performed by a 20-bit shift register 221. Such operation is succeedingly repeated so that the data is accommodated into the data latch of the final-stage LSI3$_n$. Then, LP is applied from DST, causing the data of the data latches of all the LSIs to be moved to the line latches, where a voltage corresponding to the FR signal is outputted simultaneously from the group of output terminals OUT1–OUT80 by an LCD driver, so that it is applied to the electrodes connected thereto. In this way in the display mode, the operation is completely the same as when prior-art LSIs as shown in FIG. 50 are used.

In the detection mode, the MODE signal status is L, while Y$_2$ is selected as an input to the multiplexer 100. To EIO1$_1$ is applied a shift data SD. The input data SD to EIO1$_1$ is transferred to the bidirectional register 227 in conformity with the clock pulse CP2d applied to DST of LSI3$_1$ and then transferred through the shift register in the order of $R_1$, $R_2$, $R_3$, . . . $R_{80}$ to be thereafter outputted to EIO2$_1$. The data SD output to EIO2$_1$ is inputted to EIO1$_2$ of LSI3$_2$ in the next stage to be successively transferred to LSI3$_n$. The data in the bidirectional shift register 227 are outputted via the level shifter 224 without passing through the latch successively as voltage outputs OUT1, . . . OUT80, set up according to the FR signal.

FIG. 47 is a timing chart of scanning for detection with the above-mentioned LSI. The output data are shifted one electrode by one electrode with data overlap by 4 electrodes. The above-mentioned arrangement is same as the Y coordinate detection in FIG. 51, where the shifting of voltages applied to electrodes is carried out smoothly, which kind of scanning achieves a smoother voltage waveform of the voltage induced in the detection pen without any stepped portions as compared with the conventional step-shaped scanning (X coordinate detection in FIG. 51).

Figure 48A:
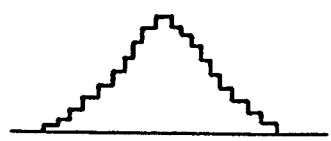
FIGS. 48(a)–48(c) are waveform diagrams of a detected voltage in the above embodiment.
Figure 48B:
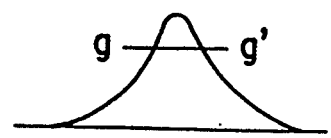
Figure 48C:
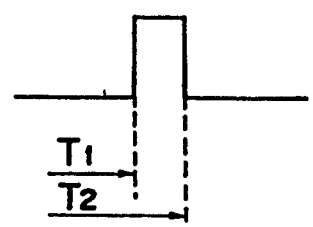

FIG. 48(a) is a view of an induced voltage obtained by the scanning operation in FIG. 47 of the present embodiment, where the voltage is exaggerated for explanation and practically a high-frequency component is removed from the voltage waveform due to floating capacitance, etc. as shown in FIGS. 48(a)–48(c). Since the voltage is applied to each electrode independently, sometimes the voltage is not symmetrical, however it is assumable that the voltage is virtually symmetrical because the steps are small enough. The induced voltage is converted to a binary data by means of the slice voltage g to have an waveform as shown in FIG. 48(c). The coordinate value of the pen position is measured by counting times T$_1$ and T$_2$ from the reference point to obtain the center value from the average value of the times.

Figure 52A:
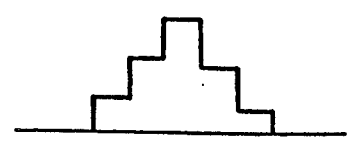
FIGS. 52(a)–52(c) are waveform diagrams of the prior-art detected voltage.
Figure 52B:
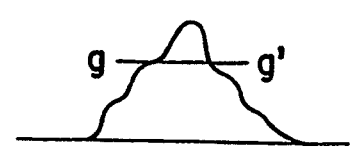
Figure 52C:
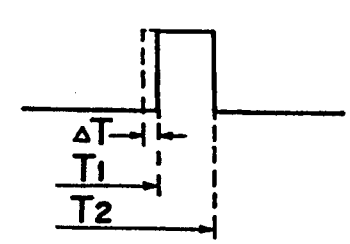

In the embodiment in FIGS. 48(a)–48(c), the waveform is symmetrical having no shoulder portion as compared with the conventional case in FIGS. 52(a)–52(c), and therefore even when the slice level or the detection voltage level varies, the waveform fluctuates symmetrically to result in achieving a constant average value with high accuracy. Although the shift data pulse width corresponds to 4 clock pulses in the description, the greater the pulse width the higher the induced voltage of the detection pen. However, a saturation takes place when the pulse width is greater than 20 pulses, and increase of pulse width more than 20 pulses produces a reducing effect, or conversely flatten the maximum level (crest portion) of the voltage waveform of the detection pen in FIGS. 48(a)–48(c) to unfavorably result in not only reducing the detection accuracy but also expanding the peripheral non-detection region. The optimum clock pulse amount, which depends on the distance between the display electrode and the detection pen, is practically not greater than 32 pulses when a protection panel is placed on the normal display panel and corresponding to preferably 8 to 16 clock pulses with data overlap by 8 to 16 electrodes in scanning.

As described above, the display-integrated type tablet device of the present embodiment employs an LSI device as shown in FIG. 45 as an LSI for driving the segment drive circuit instead of the conventional LSI in FIG. 50. In the coordinate detection period, the drive signal is applied in conformity with the shift data inputted from the serial input/output terminals E1O1 and E102, and therefore the scanning is extremely simplified to permit use of a simple circuit for remarkable reduction of x-coordinate scanning period. For example, the conventional x-coordinate detection period of 500 microseconds can be reduced to 100 microseconds.

Further by making the shift data SD have a quadruple pulse width of that of the clock signal DST as shown in FIG. 47, the x-coordinate detection can be carried out by shifting data one electrode by one electrode with data overlap by 4 electrodes to achieve a smooth induced voltage waveform of the detection pen with increase of detection accuracy.

The reduction of coordinate detection time enables increase of the duty ratio of display, which permits multiple scanning in the detection period on condition that the coordinate detection period is same to further increase the detection accuracy.

Figure 49:
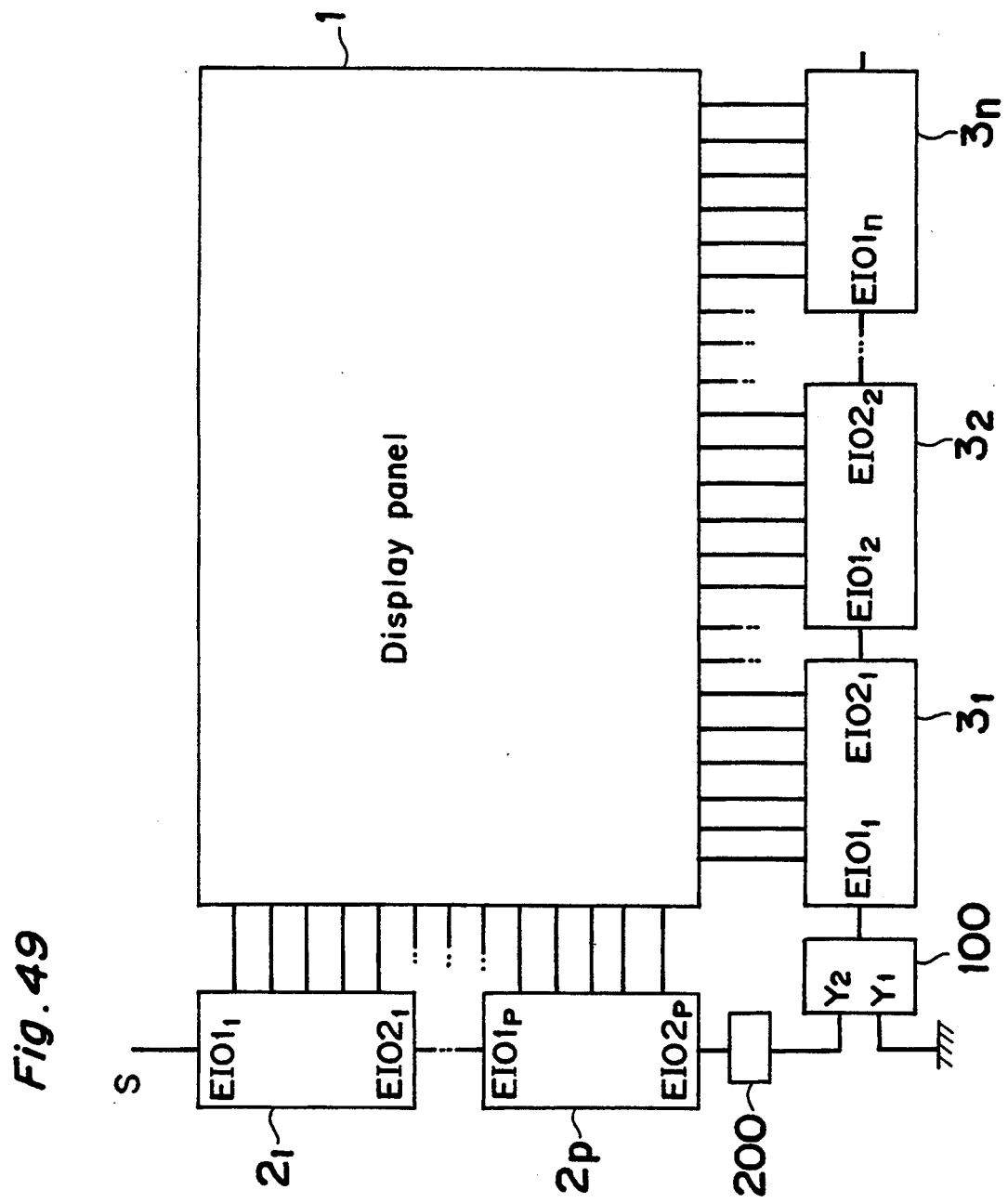
FIG. 49 is an explanatory view when data from the common drive circuit is used as input data for the segment drive circuit in the above embodiment.

The common and segment drive circuits transfer shift data in conformity with clock pulses in the coordinate detection period and finally output the data from the output terminals, and therefore, an output at a shift data output terminal EIO2p of LSI2p of in the final stage can be used as a shift data of the segment drive circuit 3 after scanning the common drive circuit 2 as shown in FIG. 49. The output of the common drive circuit 2 may be delayed by means of a delay circuit 200 such as a shift register instead of directly connecting the output to the input of the segment drive circuit 3. It is of course that the segment drive circuit 3 may carry out scanning before the common drive circuit 2 carries out scanning, which arrangement leads to simplifying the circuit construction.

As obvious from the above description, the operation of the segment drive circuit in the detection mode is same as the operation of the common drive circuit in the display or coordinate detection. Therefore, the LSI in FIG. 45 can be used for the common drive circuit. The fact that the same LSI can be used for the common drive circuit and the segment drive circuit is preferable in controlling parts in stock.

Although the display data $D_0$–$D_3$ are described in the form of 4-bit data in the above-mentioned embodiment, the display data can be processed in 8 or 16 bits. In such a case, the bit amount, data latch, etc. of the shift register 21 differ from those in FIG. 45. Although the LSI output channel amount is described based on an 80-channel model, the present invention is not limited to it. Although the display panel is described based on an LCD panel, an EL panel may be also adoptable.

(Embodiment 7)

Figure 53:
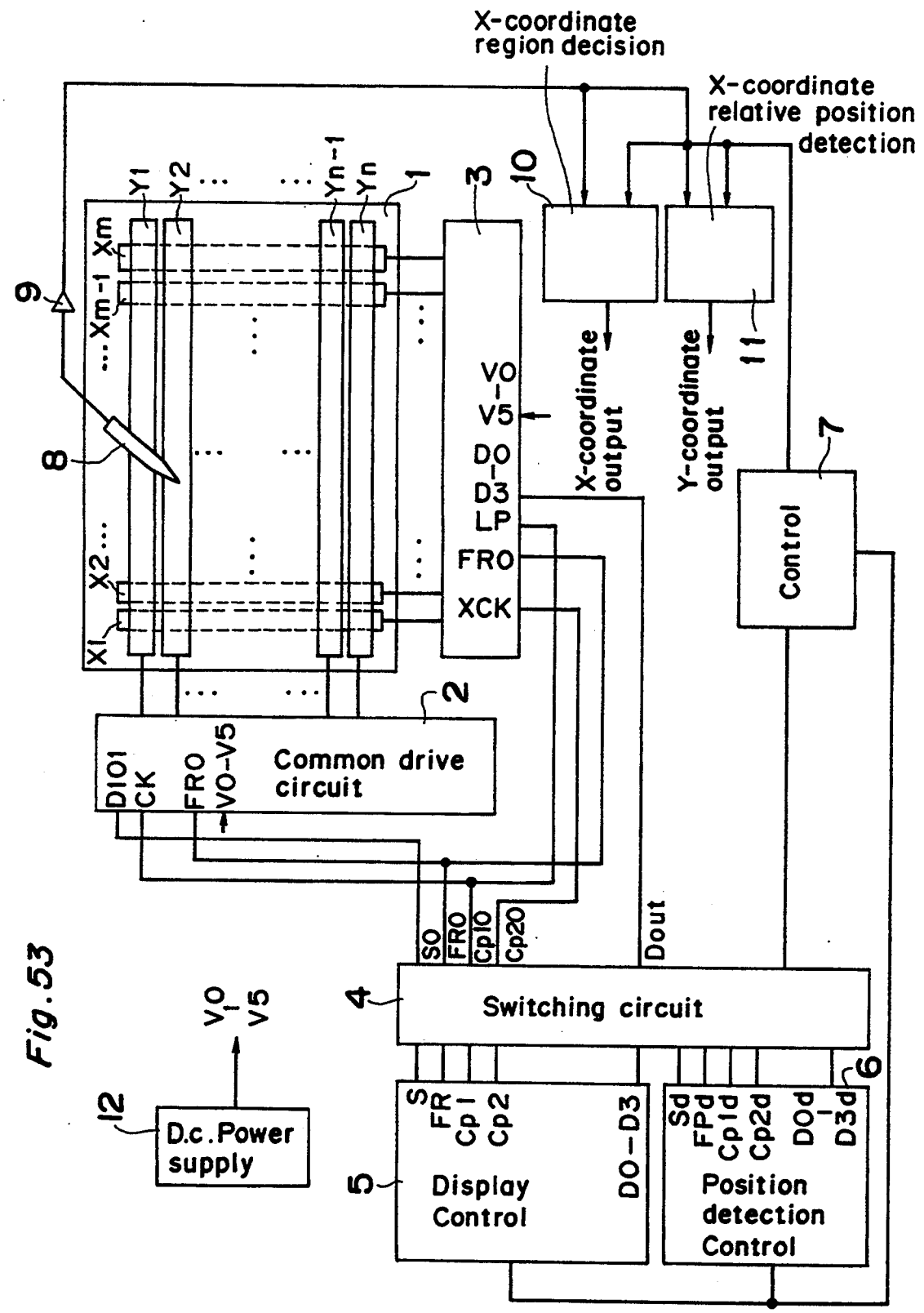
FIG. 53 is a block diagram showing the basic construction of a coordinate input device according to a seventh embodiment of the present invention.

FIG. 53 is a block diagram, similar to FIG. 1, showing a rough configuration of the coordinate input device according to Embodiment 7 of the present invention, wherein components identical to those in FIG. 1 are designated by like reference numerals. This coordinate input device is a so-called display-integrated type tablet device, in which LCD display electrodes work as a position detection electrode, and position detection and display are performed by time sharing.

In FIG. 53, a liquid crystal panel 1 is formed of a liquid crystal layer sandwiched between common electrodes Y (Y1–Yn) and segment electrodes (X1–Xn), both of which cross each other. Liquid crystal layer portion at each crossing where one common electrode Y meets one segment electrode X is a pixel. That is, the pixels of n×m dots are arranged in a matrix format.

In addition to the advantage that legibility is enhanced by making grid patterned electrodes invisible from outside, the display-integrated type tablet device offers further a cost reduced, light-weighted and compact design, because of dual purpose design as both electrodes and drivers at the same time, compared to a type in which a tablet is placed on top of an LCD.

A common drive circuit 2 for driving the common electrodes Y and a segment drive circuit 3 for driving the segment electrodes X are connected to both a display control circuit 5 and a position detection control circuit 6, via switching circuit 4. The switching circuit 4, controlled for switching action by a control circuit 7, transfers the output of the display control circuit 5 to the drive circuits 2 and 3 during the display period, and transfers the output of the position detection control circuit 6 to the drive circuits 2 and 3 during the position detection period.

During the display period, the display control circuit 5 outputs shift data S, inversion signal FR, clocks. CP1, CP2, display data D0–D3 on respective terminals.

The clock CP1 is a clock signal of which period agrees with the scanning time required to complete scanning across one row of pixels. The clock CP1 is transferred from the output terminal CP1O of the switching circuit 4 to both the clock input terminal of the common drive circuit 2 and the latch pulse input terminal LP of the segment drive circuit 3. The shift data S, which is the pulse signal for addressing each common electrode Y, is transferred from the output terminal SO of the switching circuit 4 to the shift data input terminal D101 of the common drive circuit 2 in synchronization with the clock CP1.

In response to each shifting of the shift data S, a drive signal is transferred from the corresponding output terminal of the common drive circuit 2 to the common electrodes Y. The drive signal is derived from the bias voltage V0–V5 which are supplied by a d.c. power supply circuit 12.

The clock CP2 is a clock signal of which period agrees with one of time bands as a result of division of the scanning time by a number, wherein the scanning time is the duration required to complete scanning for one column of pixels. The clock CP2 is transferred from the output terminal CP20 of the switching circuit 4 to the clock input terminal XCK of the segment drive circuit 3.

The display data D0–D3 are outputted from the output terminals Dout of the switching circuit 4, fed to the input terminals D0–D3 of the segment drive circuit 3, and, then, sequentially received by registers in the segment drive circuit 3. When the display data corresponding to one full row of pixels are received, the display data are latched at the timing of the clock CP1 applied to the latch pulse input terminal LP. The drive signal corresponding to each individual display data is transferred from the output terminal of the segment drive circuit 3 to the segment electrodes X. This drive signal is also derived from the bias voltage V0–V5 which are supplied by the d.c. power supply circuit 12.

The inversion signal FR is the signal which periodically inverts the polarity of the voltage applied to the liquid crystals to protect liquid crystals against deterioration as a result of electrolysis.

The common drive circuit 2 and the segment drive circuit 3 operates as mentioned above, the liquid crystal panel 1 is sequentially driven in the order of row, and an image corresponding to the display data is presented on the liquid crystal panel 1.

During the position detection period, on the other hand, the position detection control circuit 6 outputs shift data S, inversion signal FRd, clocks CP1d, CP2d, and drive data D0d–D3d on each corresponding output terminals.

The clock CP1d is a clock signal of which period agrees with the scanning time required to complete scanning across one row of the common electrodes Y. The clock CP1d is transferred from the output terminal CP1O of the switching circuit 4 to both the clock input terminal CK of the common drive circuit 2 and the latch pulse input terminal LP of the segment drive circuit 3.

The shift data Sd, which is the pulse signal for addressing each common electrode Y, is transferred from the output terminal SO of the switching circuit 4 to the shift data input terminal DI01 of the common drive circuit 2 in synchronization with the clock CP1d. In response to each shifting of the shift data Sd, a drive signal is transferred from the corresponding output terminal of the common drive circuit 2 to the common electrodes Y. The drive signal is derived from the bias voltage V0–V5 which are supplied by the d.c. power supply circuit 12.

The clock CP2d is a clock signal of which period agrees with the scanning time required to complete scanning for one column of segment electrodes X. The clock CP2d is transferred from the output terminal CP2Od of the switching circuit 4 to the clock input terminal XCK of the segment drive circuit 3.

The drive data D0–D3 are outputted from the output terminals Dout of the switching circuit 4, fed to the input terminals D0–D3 of the segment drive circuit 3, and, then, sequentially received by a register 20 in the segment drive circuit 3. When the drive data corresponding to one full row of the segment electrodes X are received, the drive data are latched at the timing of the clock CP1d applied to the latch pulse input terminal LP. The drive signal corresponding to each individual drive data is transferred from the output terminal of the segment drive circuit 3 to the segment electrodes X. This drive signal is also derived from the bias voltages V0–V5 which are supplied by the d.c. power supply circuit 12.

The inversion signal FRd is a signal which periodically inverts the polarity of the voltage applied to the liquid crystals to protect liquid crystals against deterioration as a result of electrolysis.

Figure 54:
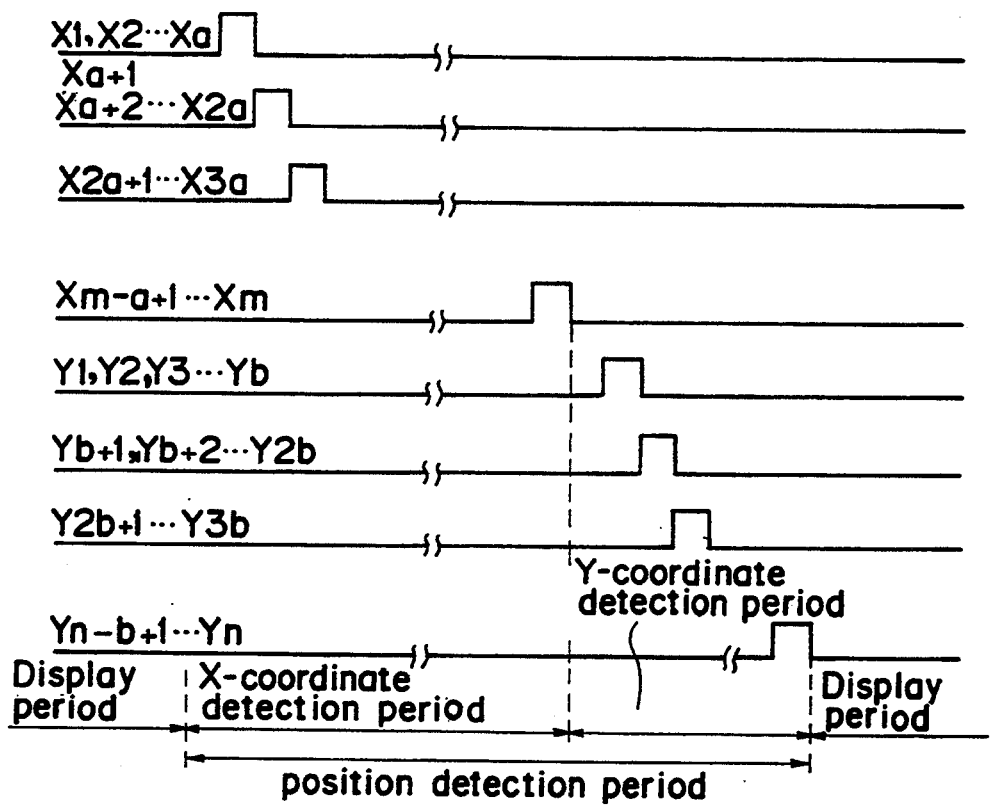
FIG. 54 is a timing chart showing the operation of the coordinate input device during a position detection period.

FIG. 54 is a time chart showing drive timing during the position detection period in the display-integrated type tablet device. As shown in FIG. 54, the position detection period is divided into an x-coordinate detection period and a y-coordinate detection period in succession to it; during the x-coordinate detection period, the segment electrodes X are driven in steps of a electrodes, and during the y-coordinate detection period, th common electrodes Y are driven in steps of b electrodes. A plurality of electrodes are driven together at a time by a pulse, because detection accuracy is enhanced by increasing induced voltage at a detection pen 8 and detection period is shortened.

Figure 55:
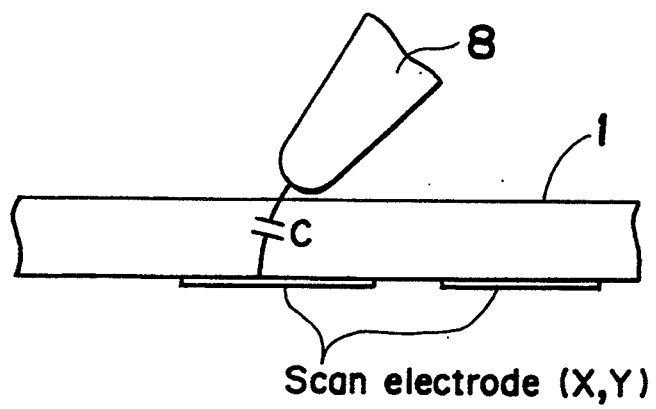
FIG. 55 is a view showing electrical connection between a liquid crystal panel and a detection pen.

As shown in FIG. 55, voltage is induced at the detection pen 8 as a result of electrostatic coupling between the detection pen 8 and scan electrodes X, Y. The induced voltage at the detection pen 8 is amplified by an amplifier 9. Based on both the output signal from the amplifier 9 and the timing signal from the control circuit 7, an x-coordinate region decision circuit 10 detects an x-coordinate, and a y-coordinate region decision circuit 11 detects a y-coordinate.

During the display period of the LCD panel, the LCD performance can be deteriorated as a result of electrolysis of liquid crystals if DC electric field is continuously applied to the liquid crystals. To avoid this, a display driving method unique to the LCD panel, called a.c. conversion driving scheme, is performed. In this display driving method, the polarity of the voltage applied to liquid crystals is inverted between the common electrodes and the segment electrodes several tens of times during the display period of one frame in the scanning process, so that the average voltage between electrodes is zero, while keeping the absolute value of the voltage applied to liquid crystals to a constant.

Figure 56:
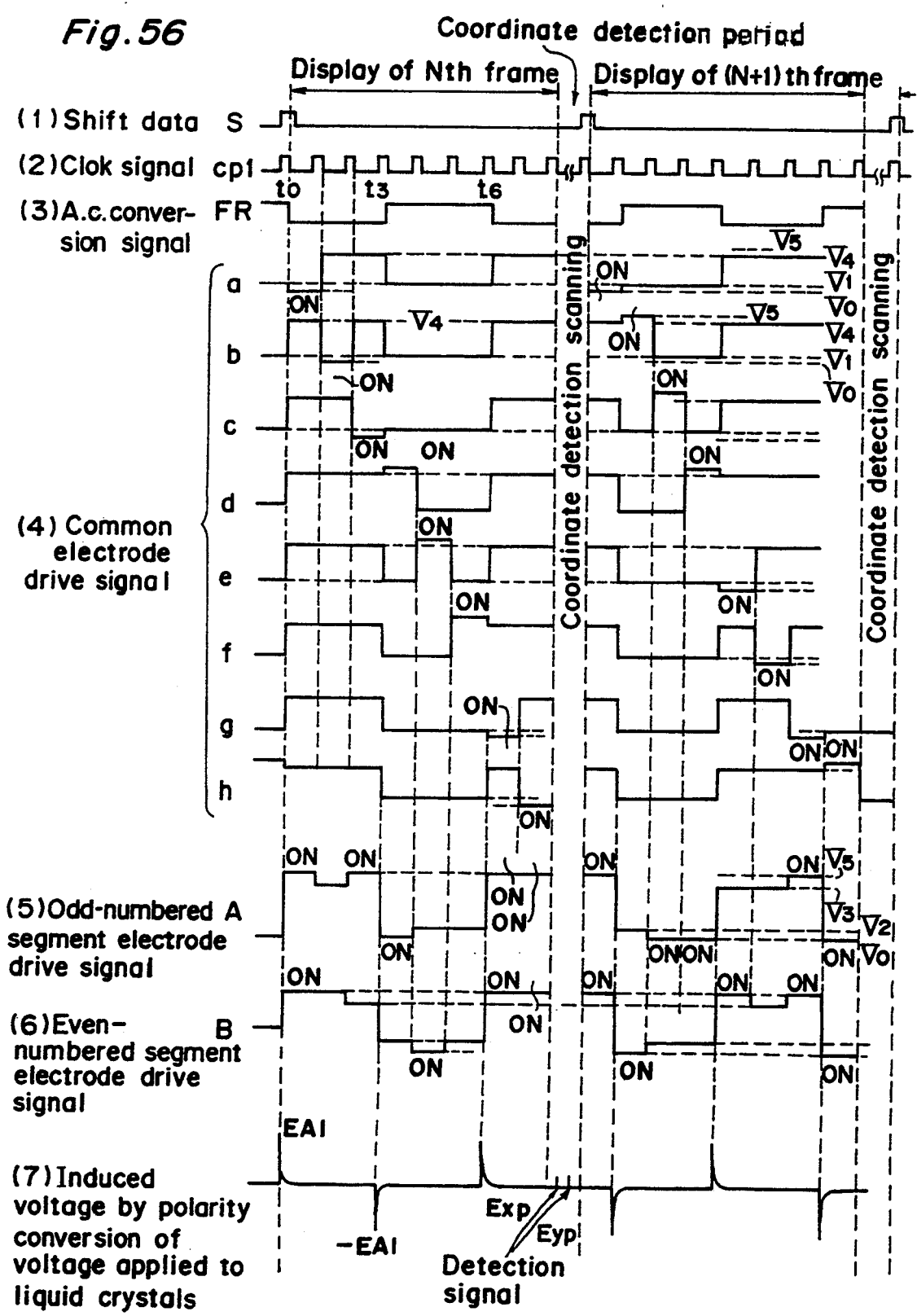
FIG. 56 is a timing chart for explaining the operation of the coordinate input device as shown in FIG. 53 during the display period.
Figure 59:
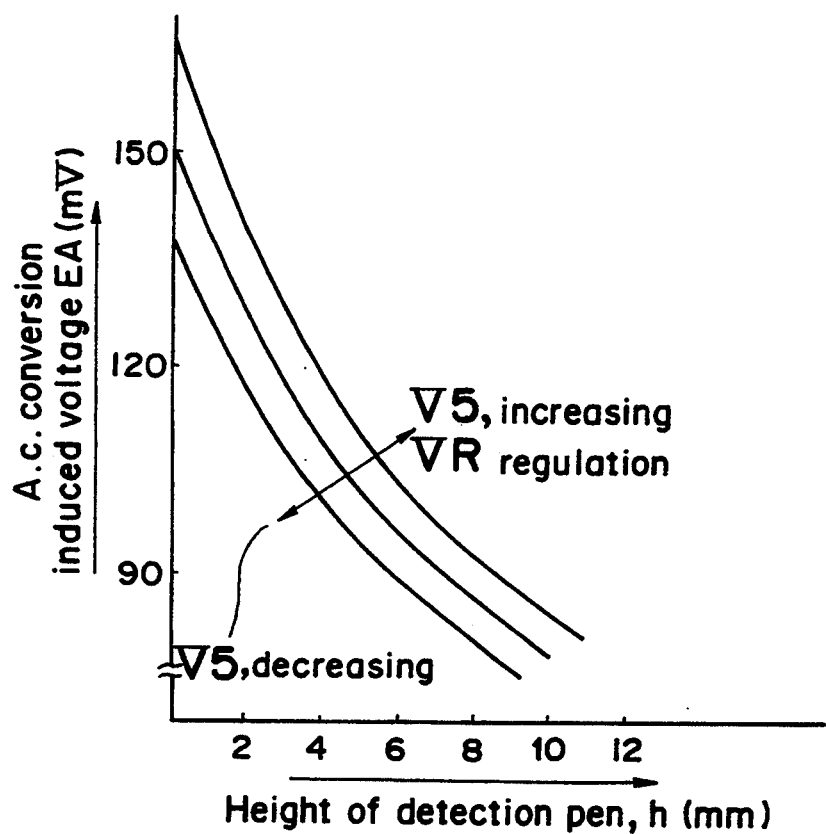
FIG. 59 is a graph showing the correlation between distance between the detection pen and the liquid crystal panel and the a.c. conversion induced voltage.

FIG. 56 is a time chart showing the display operation by the liquid crystal panel 1. In the LCD display operation, a voltage needed for displaying of one row is applied to all segment electrodes X, a selection voltage is applied to common electrodes Y corresponding to that row. FIG. 56(7) details the display operation, and shows how the polarity of applied voltage to the common X electrodes and the segment electrodes Y changes, in response to the transition of the inversion signal FR to a high level or to a low level during one frame.

When the inversion signal FR remains at a low level, the selection voltage at the common electrodes Y is V0. This is denoted by "ON" in FIG. 56. When the inversion signal FR is at a high level, the selection voltage is V5. Similarly, this is denoted by "ON" in FIG. 56. When the conversion signal FR is at a low level, the selection voltage at the segment electrodes X is V5. This is also denoted by "ON." When the inversion signal FR is at a high level, the selection voltage is V0. This is again denoted by "ON."

When one common electrode and one segment electrode, both mutually crossing, are ON, that pixel corresponding to the crossing is driven for display. When one common electrode or/and one segment electrode are not ON, the corresponding pixel is not driven for display. That is, any pixels having the absolute value of voltage between both electrodes is V5–V0 are displayed, and their polarities are determined by the inversion signal FR.

In FIG. 56, the inversion signal FR transitions at time t0, time t3, and time t6, and, at each of these timings, all common electrodes and all segment electrodes change their polarities. At each timing, when the detection pen 8 is placed on the liquid crystal panel 1, spike-noise shaped voltages are induced at a detection electrode of the detection pen 8 as shown in FIG. 56(7). FIGS. 57(1) and 57(2) are enlarged views of the spike-shaped voltages.

The values EA of spike-shaped voltages are proportional to voltages Exp, Eyp (denoted by Ep in FIG. 58)

induced on the detection pen 8 during the detection period, as shown in FIG. 58. Such a proportional relationship remains working, even when the detection pen 8 is detached off the surface of the LCD panel 1 or even when contrast adjustments are performed. This proportional relationship also remains working on the entire surface of the liquid crystal panel 1. This is a logical electrical phenomenon, because the same electrode is employed to induce voltage, derived from voltage the same power supply applies to the same electrodes by means of the same drive circuit.

By rectifying and then holding to its peak value the induced voltage (electrostatic spike-noise shaped voltage) on the detection pen 8 as a result of a.c. conversion drive during the display period, d.c. voltage may be produced. The d.c. voltage is held until the coordinate detection periods. Based on the d.c. voltage, the output (induced voltage) from the detection pen 8 is subjected to a dual number processing. Coordinate detection is thus performed in a reliable and accurate manner, regardless of separation between the detection pen 8 and the liquid crystal panel 1, and regardless of contrast adjustments.

Figure 60:
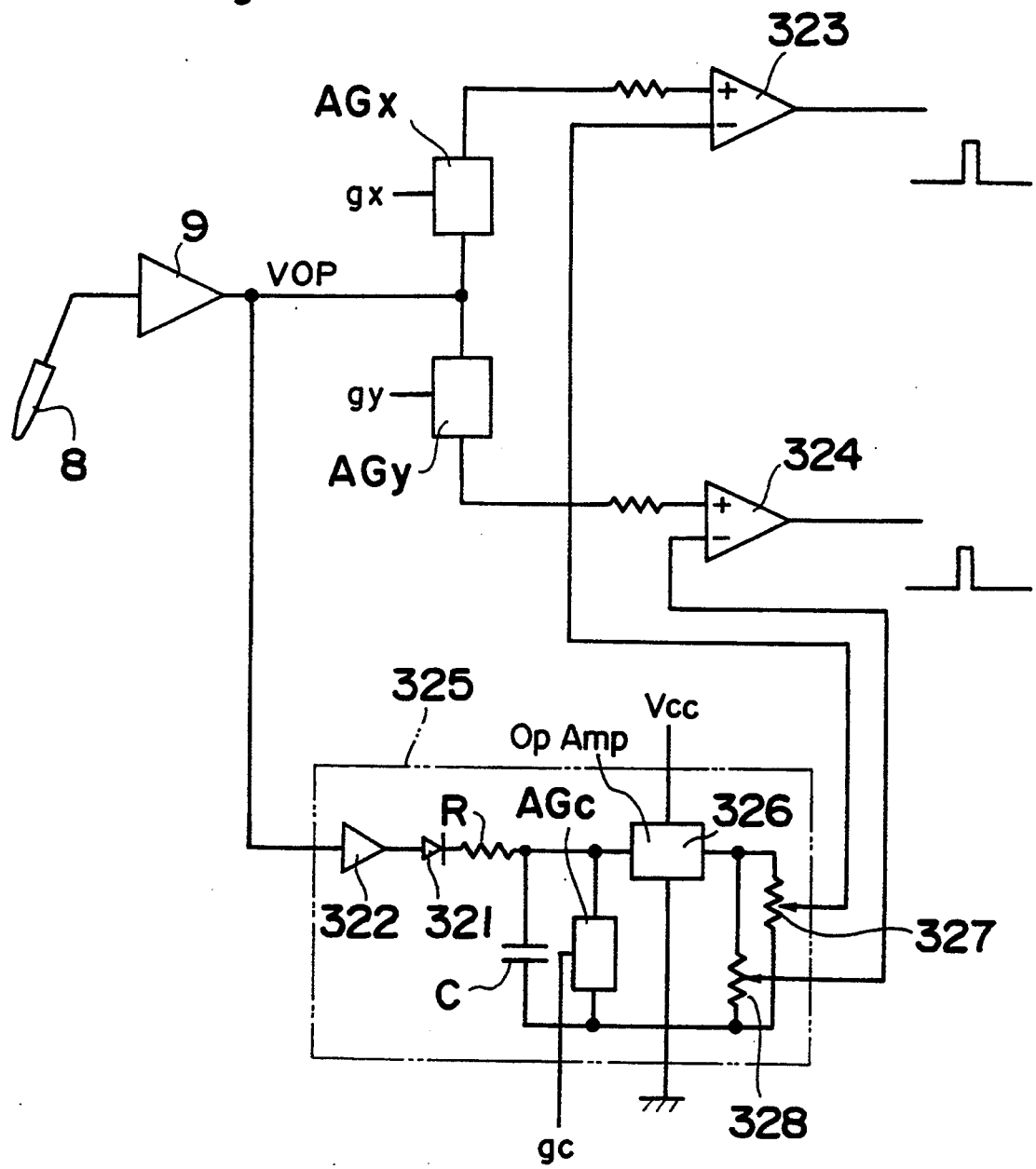
FIG. 60 is a circuit diagram showing the construction related to the detection pen and detection circuits in the coordinate input device as shown in FIG. 53.

FIG. 60 is a schematic diagram showing the circuit related to the detection pen 8 and coordinate detection circuits 10, 11. In FIG. 60, the control circuit 325 is a circuit for producing d.c. voltage, based on the induced voltage on the detection pen 8. Specifically, the control circuit 325 receives the output VOP which an operational amplifier 9 provides after amplifying the detection pen 8 induced voltage, and, with a diode 321 and a resistor R, rectifies spike-shaped voltages (Ea in FIG. 57) detected in a.c. conversion drive during the display period of the liquid crystal panel 1, and produces the d.c. voltage proportional to the peak values of spike-shaped voltages to be used to charge up a capacitor C.

The d.c. voltage is voltage divided by potentiometers 327 and 328, with divided voltages being used as reference voltages for comparators 323 and 324, respectively. An operational amplifier 326 converts the voltage value charged in the capacitor C, proportional to the induced voltage as a result of the a.c. conversion drive, into the voltage level required as a reference voltage level for the comparators 323, 324.

An analog gate circuit AGc discharges or clears the capacitor C stored voltage at the timing of control signal gc, after the coordinate detection scanning in the coordinate detection period completes but before the next cycle of coordinate detection scanning starts, in order to present up-to-date information about induced voltage on the detection pen 8 immediately before the next coordinate detection scanning. The analog gate circuit AGc remains in a high impedance state during the detection period and, preceding to it, for a duration during which spike-shaped voltages are received as a result of a.c. conversion drive at least for some time.

A resistor Rg may be substituted for the analog gate circuit AGc. In this case, it makes a sense if the time constant C×Rg approximates the coordinate detection period. The voltage in the capacitor C nearly follows the detection pen 8. To decrease component quantity and to enhance cost reduction, the use of the resistor Rg is more practical than the use of the analog gate circuit AGc.

Analog gate circuits AGx, AGy respectively provide the comparators 323, 324 with respective voltages only within time of periods required for coordinate detection in accordance with control signals gx, gy in the x-coordinate detection period and the y-coordinate detection period. Alternatively, the analog gate circuits AGx, AGy may be arranged after the comparators 323, 324. In this case, all detected voltages are dual-number processed to be separated.

(Embodiment 8)

Figure 61:
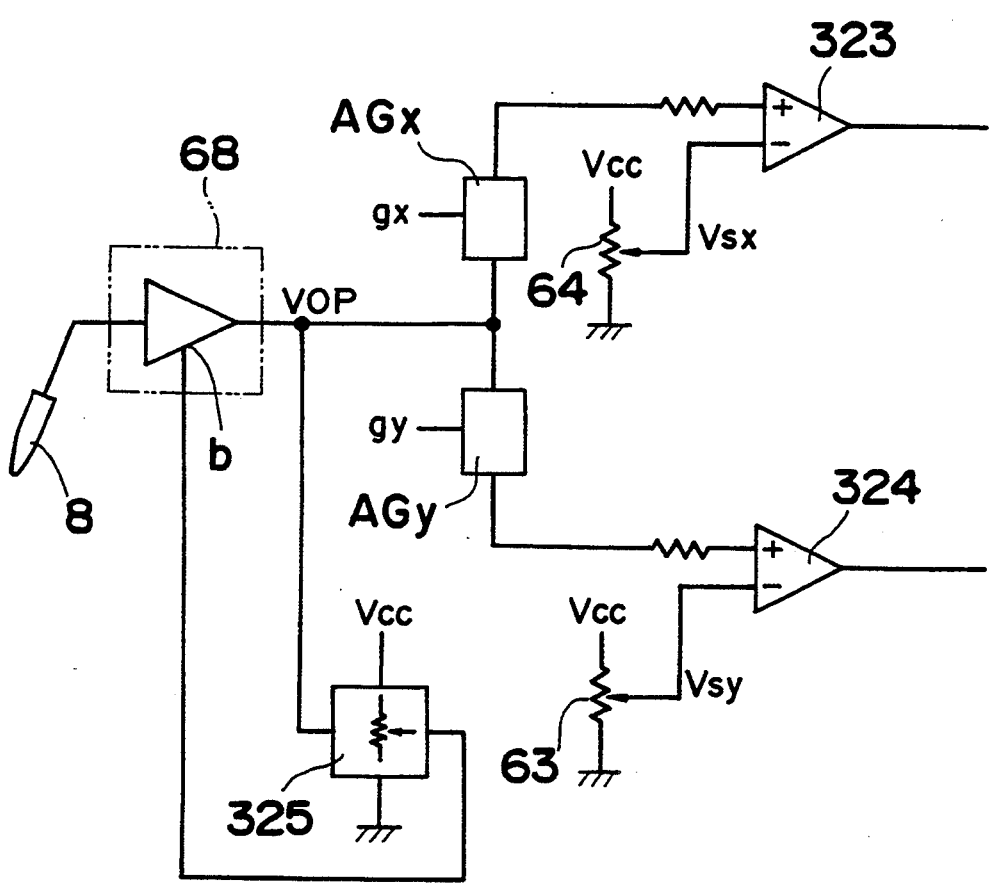
FIG. 61 is a circuit diagram for explaining an eighth embodiment of the present invention.

FIG. 61 is a schematic diagram showing the Embodiment 8. In FIG. 61, an amplifier 68 is a gain-controlled type amplifier having an operational amplifier, wherein gain is controlled by externally applying voltage to a terminal b. The output VOP of the amplifier 68, converted by the control circuit 325 to d.c. voltage which is then fed back to the amplifier 68. Based on the voltage applied to the terminal b, the amplifier 68 controls its gain so that the output voltage VOP is kept to a fixed value. The fixed value is adjusted by a potentiometer inside the control circuit 325.

The output voltage VOP from the amplifier 68 is kept constant as mentioned above. The peak value of the induced voltage on the detection pen 8 is thus kept fixed, if the distance between the detection pen 8 and the liquid crystal panel 1 varies and if the display contrast of the liquid crystal panel 1 is adjusted. Reliable and accurate detection is thus achieved if the reference voltages for the comparators 323, 324 are set fixed by potentiometers 64, 63.

(Embodiment 9)

Furthermore, another embodiment is described below. In this embodiment, the d.c. voltage produced by the control circuit 325 in FIG. 60 is used to control the value of scanning voltages applied to the common electrodes and the segment electrodes during the position detection period.

Figure 62:
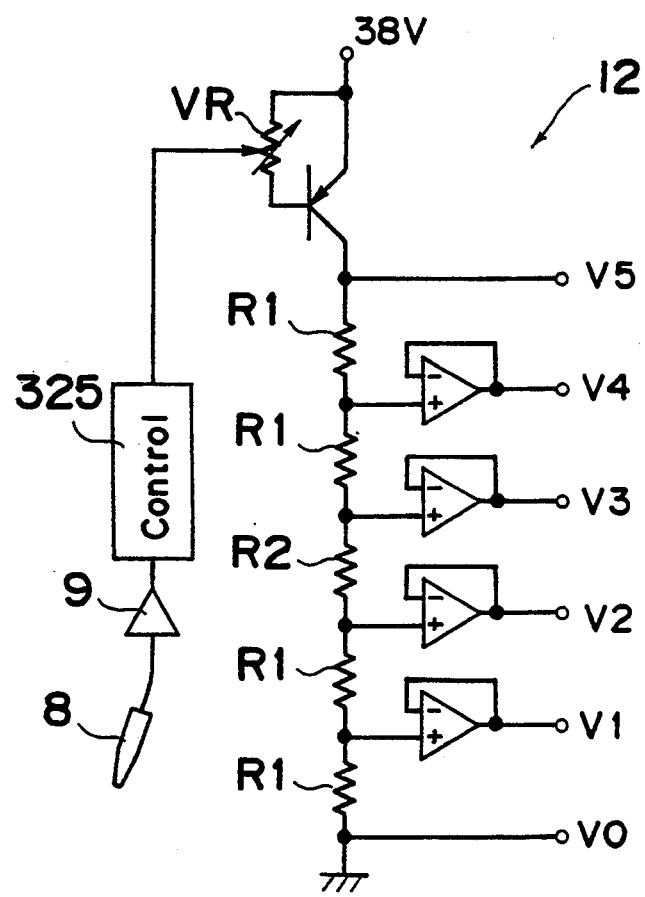
FIG. 62 is a circuit diagram showing the basic construction of a d.c. power supply circuit used for the coordinate input device as shown in FIG. 53.

That is, low spike-shaped voltages induced to the detection pen 8 during the display period suggests low detected voltage on the detection pen 8 during the position detection period as shown in FIG. 58. Bias voltages V0–V5 from the d.c. power supply circuit 12 are controlled so that, in case of low d.c. voltage, the scanning voltages applied to the common electrodes and the segment electrodes are set high during the position detection period. Specifically, when the d.c. voltage stored in the control circuit 25 is lowered in the d.c. power supply circuit 12 shown in FIG. 62, bias voltages V0–V5 may be set to higher voltage levels if a contrast control potentiometer VR is adjusted to its lower value. The bias voltages set high are fed to the common electrode drive circuit 2 and the segment electrode drive circuit 3, causing the scanning voltages to go high, and thereby maintaining the voltage induced on the detection pen 8 during the coordinate detection period, to normal voltage level without dropping.

The normal coordinate detection operation is performed even when the detection pen 8 is detached off the detection surface of the liquid crystal panel 1. The control of bias voltages V0–V5 is carried out during the position detection period rather than during the display period.

In each of the above embodiments, the work area needs to be defined. When, in use, the detection pen 8 is separated by 5 mm or more from the detection surface of the liquid crystal panel 1, spike-shaped voltages due to the a.c. conversion drive during the display period become smaller; if the dual-number processing is performed based on such spike-shaped voltages, the detection pen 8 may erroneously receive low level noise as coordinates.

As an alternative to using, as a reference, spike-shaped voltages which take place during the display period of the liquid crystal panel 1, reference voltage may simultaneously be applied to all common electrodes and/or all segment electrodes during an interval between the display period and the position detection period; the detected value by the detection pen 8 may be used as a reference value.

According to the embodiments described above, accurate coordinate detection is achieved even when the distance between the detection pen 8 and the liquid crystal panel 1 varies, and even when the contrast of the liquid crystal panel 1 is adjusted.

According to the present invention, even if the induced voltage on coordinate display means suffers variations when the coordinate display means is detached off an liquid crystal panel as a detection surface or when the contrast of the liquid crystal panel is adjusted, accurate coordinate detection operation is achieved, while the induced voltage is subjected to the dual number processing, by automatically updating the reference voltages for comparators which perform dual-number processing, or by automatically controlling the gain of an amplifier.

When the d.c. voltage is lower than a predetermined reference voltage, the voltage induced on the coordinate display means during the coordinate detection period is also low. Therefore, when the d.c. voltage is low, the bias voltages applied to drive means are set higher. This causes the scanning voltages applied to the electrodes of the liquid crystal panel to go high, thereby maintaining the voltage induced on the coordinate display means during the coordinate detection period to normal voltage level, without dropping the voltage. In this case, also, high coordinate detection accuracy is maintained.

(Embodiment 9)

Figure 63:
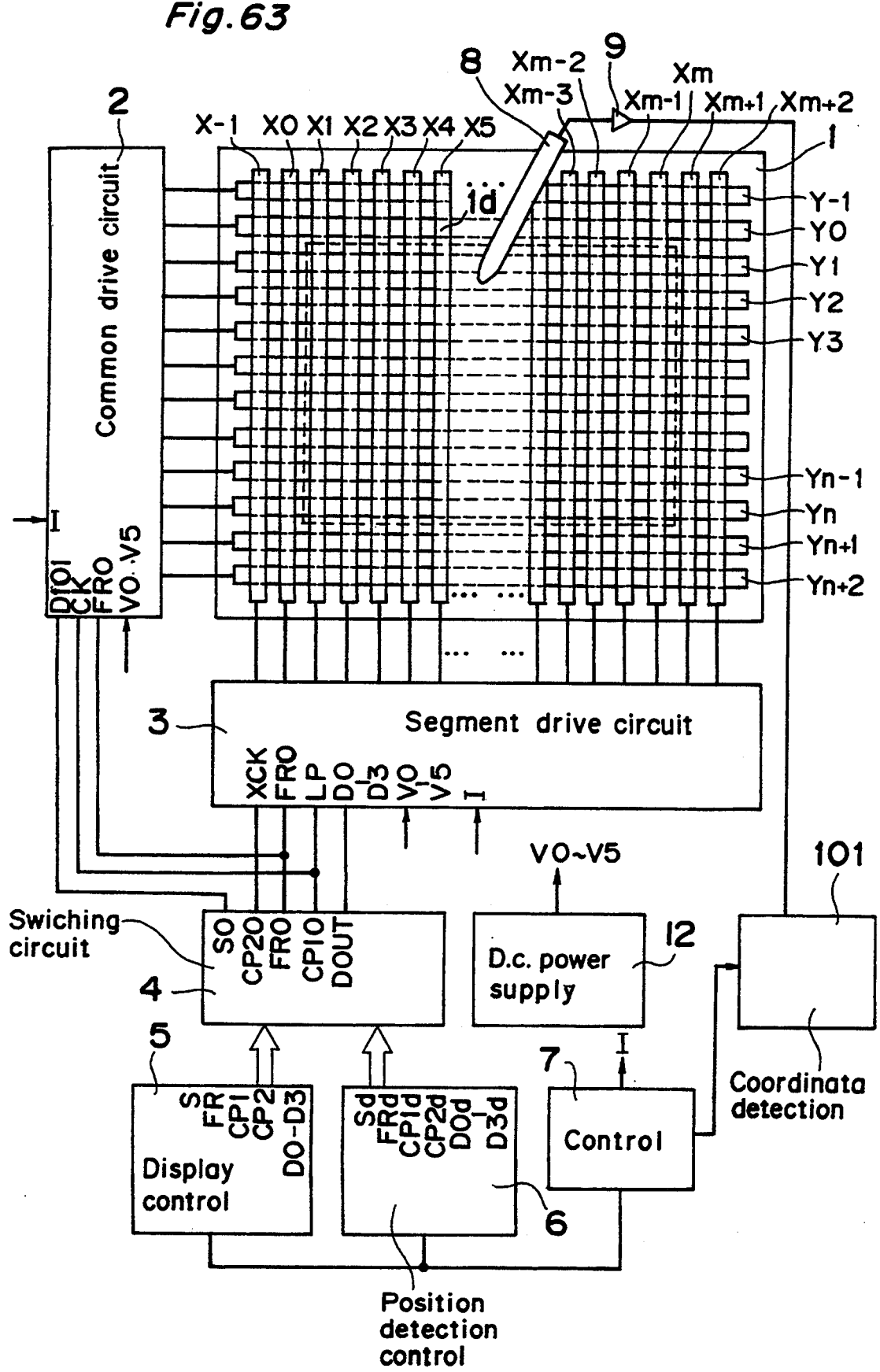
FIG. 63 is a block diagram showing the basic construction of a display-integrated type coordinate input device according to a ninth embodiment of the present invention.

FIG. 63 is a block diagram of a coordinate input device in accordance with the present invention. The above-mentioned input device is so-called a display-integrated type tablet device, where each electrode of the LCD display concurrently serves as a position detection electrode to enable a time sharing between position detection and display.

Figure 64:
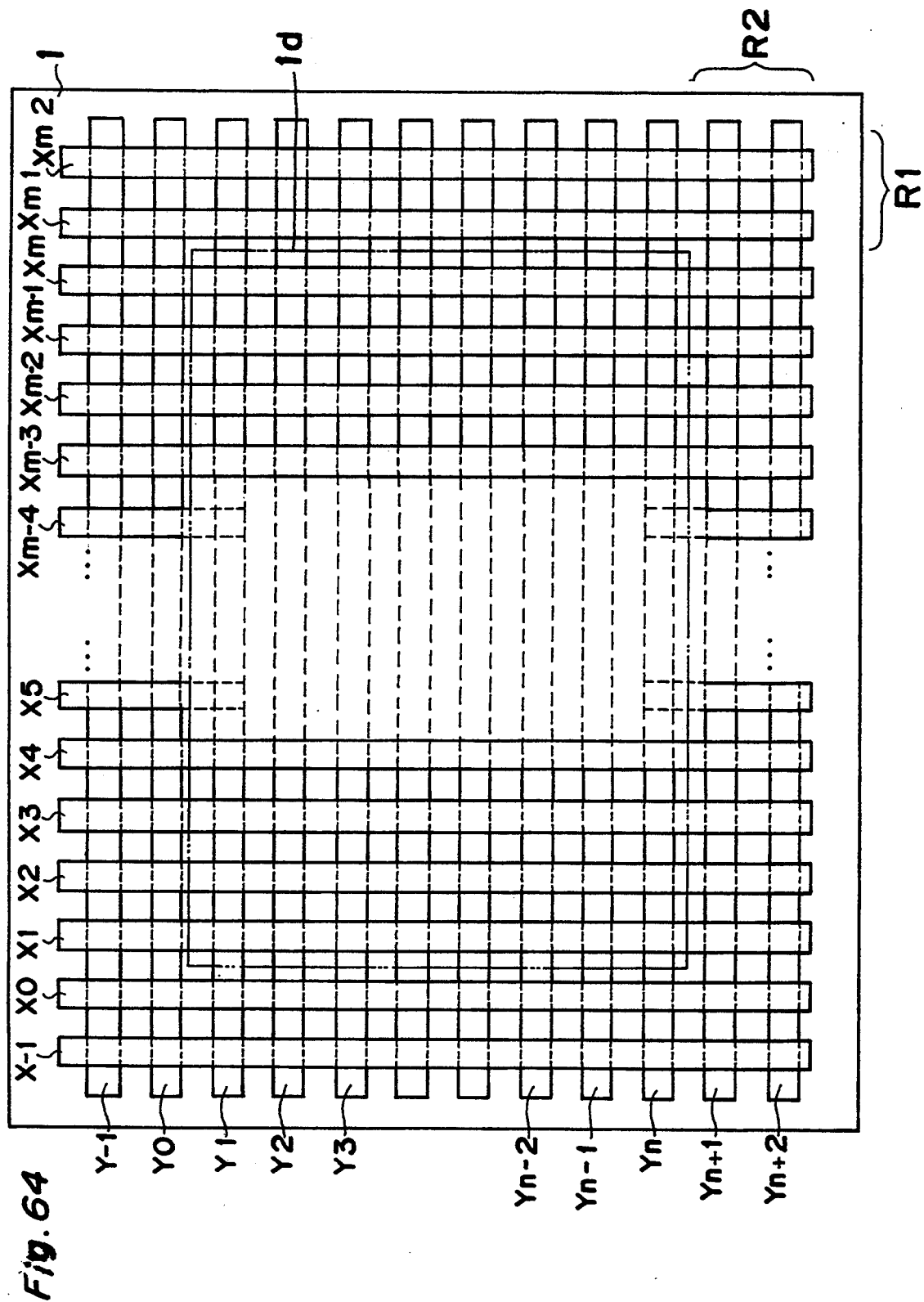
FIG. 64 is an enlarged plan view of the liquid crystal panel used for the coordinate input device as shown in FIG. 63.

In FIG. 64, the liquid crystal panel 1 has such a construction that an LCD layer is interposed between common electrodes Y1 through Yn arranged mutually intersecting (referred to as "Y" in general) and segment electrodes X1 through Xm (referred to as "X" in general), where each LCD layer position at which each common electrode Y and each segment electrode X, crossing each other, constitutes each pixel. In other words, n×m pixels are arranged in a matrix form.

The above-mentioned display-integrated type tablet device has such an advantage that the electrodes in a grating form is invisible as compared with a device in which tablets are superposed on the above kind of LCD display to achieve a clear vision, and the fact that the tablets concurrently serve as electrodes and drive circuit leads to cost reduction as well as compact and light-weight designing of the device.

A common drive circuit 2 for driving the aforesaid electrodes Y and a segment drive circuit 3 for driving the aforesaid electrodes X are connected via a switching circuit 4 to a display control circuit 5 as well as to a position detection control circuit 6. The switching circuit 4 is controlled for switching by a control circuit 7 to produce an output from a display control circuit 5 to the drive circuits 2 and 3 during the display period or produce an output of the position detection control circuit 6 to the drive circuits 2 and 3 during the position detection period.

In the display period, the display control circuit 5 outputs from its output terminal a shift data S, an inversion signal FR, clock signals CP1 and CP2, and display data D0–D3.

The clock CP1 having a cycle corresponding to scanning pixels in one line is inputted from an output terminal CP1O of the switching circuit 4 to a clock input terminal CK of the common drive circuit 2 and to a latch pulse input terminal LP of the segment drive circuit 3. Meanwhile, the shift data S, which is a pulse signal for designating each common electrode Y, is outputted from an output terminal SO of the switching circuit 4 and then inputted from the shift data input terminal D101 of the common drive circuit 2 in synchronization with the clock signal CP1.

Conforming to shifting of the aforesaid shift data S, a drive signal is outputted from the output terminal of the common drive circuit 2 corresponding to the shift position to the common electrodes Y. The drive signal is generated based on bias voltages V0–V5 supplied from the d.c. power supply circuit 12. The clock CP2 having a cycle corresponding to a segment obtained by dividing the time for scanning pixels in one line is outputted through an output terminal CP20 of the switching circuit 4 and then inputted to a clock input terminal XCK of the segment drive circuit 3.

The display data D0–D3 are outputted through an output terminal Dout of the switching circuit 4 to the input terminals D0–D3 of the segment drive circuit 3 to be successively taken in the register. When display data corresponding to the pixels of one scanning line are taken in, the display data are latched according to a timing of the clock CP1 inputted to the aforesaid latch pulse input terminal LP, and a drive signal corresponding to each display data are output from the output terminal of the segment drive circuit 3 to the segment electrode X. The drive signal is also formed based on the bias voltages V0–V5 supplied from the d.c. power supply circuit 12. It is noted that the inversion signal FR is a signal for preventing the possible deterioration of the LCDs due to electrolysis by cyclically inverting the polarity of voltage applied to the LCDs.

By virtue of the operations of the common drive circuit 2 and the segment drive circuit 3, the pixels of a liquid crystal panel 1 are driven line-sequentially to display an image corresponding to the display data is displayed on the liquid crystal panel 1.

During the position detecting time, the position detection control circuit 6 outputs from its output terminal a shift data Sd, an inversion signal FRd, clock signals CP1d and CP2d, drive data D0d–D3d.

The clock signal CP2d having a cycle corresponding to a time for scanning segment electrodes X in one line is outputted from an output terminal CP20d of the switching circuit 4 and then input to a clock input terminal XCK of the segment drive circuit 3.

The drive data D0d–D3d are outputted from an output terminal Dout of the switching circuit 4 and then inputted to input terminals D0–D3 of the segment drive circuit 3 to be then successively taken into a register provided in the segment drive circuit 3. When drive data corresponding to segment electrodes X of one line are taken in, the data are latched according to the timing of the clock CP1d input to the latch pulse input terminal LP, and drive signals corresponding to each drive data are inputted from the output terminal of the segment drive circuit 3 to the segment electrodes X. The drive signal is also formed based on the bias voltages V0–V5 supplied from the d.c. power supply circuit 12. It is noted that the inversion signal FRd is a signal for preventing the possible deterioration of the LCDs due to electrolysis by cyclically inverting the polarity of voltage applied to the LCDs.

When a position detection pen 8 (referred to merely as "the detection pen" hereinafter) is put close to the surface of the liquid crystal panel 1, a voltage is induced at the electrode provided at the tip of the detection pen 8 due to the floating capacitance between the electrode at the detection pen 8 and the electrodes X and Y. The voltage induced at the detection pen 8 is amplified by an amplifier 9 and then applied to a coordinate detection circuit 101.

FIG. 64 is an enlarged plan view of the liquid crystal panel 1. As shown in FIG. 64, electrodes X−1, X0, Xm+1, and Xm+2 as well as electrodes Y−1, Y0, Yn+1, and Yn+2 are auxiliary electrodes which are formed on an identical surface with the common electrodes Y or the segment electrode X, i.e., on an identical printed circuit board outside of the display region 1d of the liquid crystal panel 1. It seems that the above construction means expansion of the common electrode region and the segment electrode region, however, the electrodes are not required to serve as an information display. In the present embodiment, auxiliary electrodes are provided outside the display region 1d two for one side and two for the other side, while the electrode width and intervals between electrodes are almost as same as the display electrodes in the display region 1d.

Although the auxiliary electrodes are provided outside the display region 1d two for one side and two for the other side in FIG. 64, practically the auxiliary electrode formation regions R1 and R2 in the liquid crystal panel 1 is determined depending on the tip configuration of the detection pen 8, and the distance between the LCD layer including the glass board, polarizing plate, and protection plate (not shown) on the liquid crystal panel 1 and the detection pen 8. At least a certain space is necessary between the detection pen 8 and the scanning electrodes (common electrodes or segment electrodes), the distance therebetween practically selected to be approximately 3 millimeters.

The auxiliary electrode formation regions R1 and R2 have a region not for display, and therefore it is not necessary to fill the auxiliary electrodes with LCDs and an insulating film or an adhesive for adhering two glass plates may be interposed. When a scanning voltage is applied to the auxiliary electrodes for display in the display time of the liquid crystal panel 1, the scan period, or the display time is of course prolonged, and therefore no scanning (driving) of the auxiliary electrodes is necessary.

Figure 65:
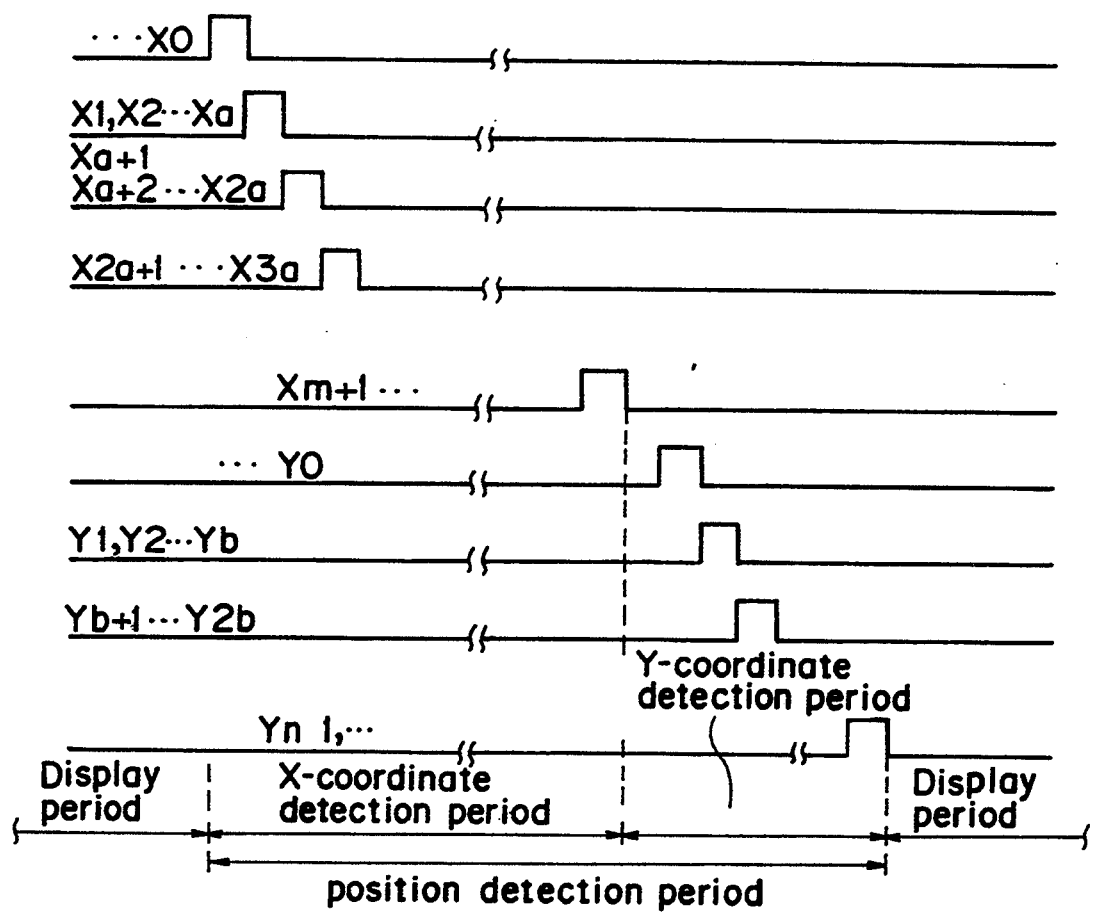
FIG. 65 is a timing chart showing the operation of the coordinate input device of the present invention during the coordinate detection period.

FIG. 65 is a timing chart showing the drive timing of each electrode in the position detection time. As shown in FIG. 65, the position detection time is shared by an x-coordinate detection period and the subsequent y-coordinate detection period, where the segment electrodes X are successively driven in units of a in the x-coordinate detection period while the common electrodes Y are driven in units of b in the y-coordinate detection period. Since the auxiliary electrodes are provided in the liquid crystal panel 1 in accordance with the present embodiment, the electrodes preceding the auxiliary electrode X0 are driven prior to driving the segment electrodes X1 through Xa, and subsequent to driving the segment electrodes Xm-a through Xm, the electrodes succeeding the auxiliary electrode Xm+1 are driven. In the same manner, the electrodes preceding the auxiliary electrodes Y0 are driven prior to driving the common electrodes Y1 through Yb, and subsequent to driving the common electrodes Yn-b through Yn, the auxiliary electrodes succeeding the auxiliary electrode Yn+1 are driven (scanned).

As described above, the auxiliary electrodes are necessary only at the time of position detection, while at the time of electrode scanning for position detection the electrodes are scanned in units of a or b as shown in FIG. 65, and therefore it is not necessary to connect any independent drive circuit to each electrode. In more detail, by connecting a plurality of electrodes in a comb-like shape at an electrode end and further to the drive circuit, even the drive method of the present embodiment can be greatly improved in function by merely adding a drive circuit. The drive circuit may be connected outside the liquid crystal panel 1.

The display electrodes and the auxiliary electrodes are transparent electrodes made of an indium oxide or tin oxide. The electrodes are formed by firstly forming an electrode layer on the -entire surface of the glass print board by spattering or the like means, and thereafter only the necessary portions are made to remain by means of a photographing technique and etching method. Therefore, the auxiliary electrodes are formed simultaneously in the same processing manner as the display electrodes.

Since a coordinate value is calculated on the basis of scanning all the electrodes including the auxiliary electrodes in the aforesaid position detection period, the origin of the coordinate value to be calculated is set outside the display region 1d (coordinate detection region), however in practical use, any coordinate value outside the display region 1d is not necessary and inconvenient in carrying out display processing and other processing.

Therefore the coordinate detection circuit 101 outputs the detected coordinate value through coordinate shifting so that an origin is positioned at the lower left of the display region 1d. There is sometimes the case that the coordinate value is out of the display region 1d due to a problem in reading precision at the boundary of the display region 1d, and in such a case it is appropriate to correct the coordinate value to a coordinate value in the display region 1d.

The common drive circuit 2 and the segment drive circuit 3 have increased amount of output terminals by the amount of the auxiliary electrodes as compared with the conventional drive circuit, however each of the drive circuits has substantially the same internal constructions as that of the conventional one.

It is noted that, when a conventional drive circuit is used as it is, despite that no scanning is necessary in the display time, display period is prolonged by the time for scanning auxiliary electrodes because each of the drive circuits 2 and 3 has a shift register including therein auxiliary electrodes. However, the time for scanning the auxiliary electrodes is very short in comparison with the scanning time of the display region 1d, which is therefore practically ignorable.

For the above reasons, the conventional electrode drive circuit can be used as it is without newly designing nor producing any integration circuit exclusively for the coordinate input device of the present embodiment, which also leads to such advantageous effects as cost reduction.

However, when the scanning time of the auxiliary electrodes is comparatively long, the contrast of the liquid crystal panel 1 is degraded. Therefore, when a higher contrast is required, some countermeasure must be provided therefor. The following describes several countermeasures for the requirement.

One measure is to provide a display clock and a high-speed scanning clock having a frequency higher than the display clock in the display control circuit 5, and the auxiliary electrode section is scanned by means of the high-speed scanning clock. With the above-mentioned measure, the scanning time of the auxiliary electrodes can be shortened to thereby prevent the possible degradation of the display contrast of the liquid crystal panel 1. By modifying the display control circuit 5, the conventional electrode drive circuit can be used as it is.

Figure 66:
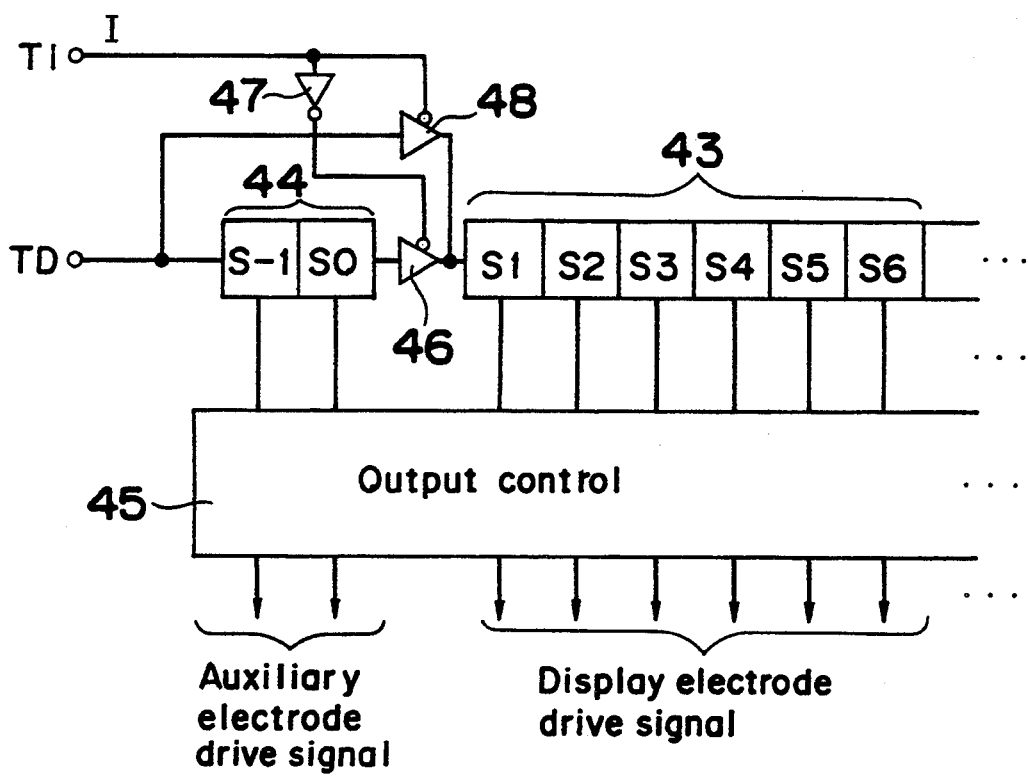
FIG. 66 is a circuit diagram showing the construction of a shift register provided to the common drive circuit or the segment drive circuit as shown in FIG. 63.

The following describes another measure with reference to FIG. 66. The measure is to provide the shift register of each of the drive circuits 2 and 3 with an interruption function for permitting interruption of a data in the midway. In the coordinate detection period, data D101 and drive data D0-D3 are inputted to the shift register in each drive circuit from the top of the shift register, therefore the drive circuit carries out a successive scanning of electrodes including the auxiliary electrodes. In the display period, the display data is inputted from a center portion of the shift register to drive only the display electrodes.

In FIG. 66 the shift register comprises an auxiliary electrode register 44 and a display electrode register 43. An output control section 45 outputs drive signals for driving each electrode according to the data stored in the shift register. A 3-status gate 46 is provided between memory units S0 and S1 constituting the shift register, while a 3-status gate 48 is provided between the input terminal TD and the memory S1. To the gate 46 is inputted a control signal I from the input terminal TI via an inverter circuit 47, while the control signal I from the input terminal TI is directly inputted to the gate 48. Therefore, by changing the signal status of the control signal I from the input terminal TI into low level, a high-level signal formed by inverting the control signal I is inputted to the gate 46 to turn off the gate. The gate 48 is turned on by receiving a low-level control signal I to successively shift the drive data inputted from the input terminal TD to the right memory unit in FIG. 66 in the order of S1, S2, . . .

On-the contrary, by changing the signal status of the control signal I from the input terminal TI to high level, a low-level signal formed by inverting the control signal I is inputted to the gate 46 to turn on the gate. The gate 48 is turned off by receiving a high-level control signal I to thereby successively shift the drive data inputted from the input terminal TD to the right memory unit in FIG. 66 in the order of S−1, S0, S1, . . .

Therefore data are inputted from the memory S1 in the display time. Data are inputted from the memory S−1 in the coordinate detection period. With the above arrangement, the auxiliary electrodes are not driven in the display period preventing the possible degradation of display contrast of the liquid crystal panel 1.

Elements in several steps are connected in a cascade form in practical drive circuits 2 and 3. When the connection portion is placed between the memory units S0 and S1 in FIG. 4, an external connection can be achieved.

Figure 67:
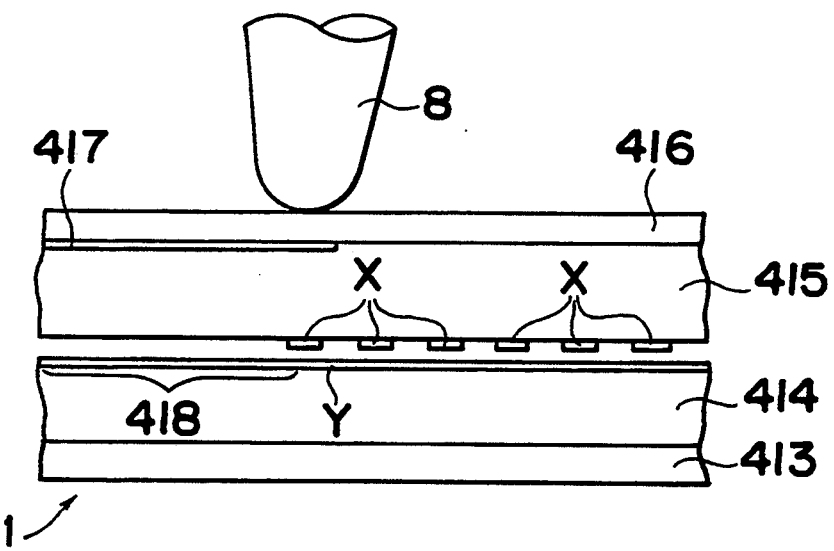
FIG. 67 is a sectional view showing another embodiment of the present invention.

FIG. 67 is a sectional view for explaining another embodiment of the present invention. A feature of the present embodiment is to provide a shield member 417 outside the liquid crystal panel 1, i.e., between a glass print board 415 and a polarizing plate 416. In the above case, the shield member 417 is effective for shielding the electric field from the lead wire 418. Although the present embodiment is inferior to the present embodiment, no special liquid crystal panel is necessary and the conventional liquid crystal panel can be used as it is, which factors being advantageous for use as a popular type tablet device.

It is noted that a shield member 417 may be provided on the polarizing plate 416. The portion is generally covered with, for example, a plastic casing, and therefore, the shield member may be attached with a conductive adhesive tape, or it may be formed with a conductive material or by means of an electroless plating inside the plastic casing.

Although the above describes the case that the display electrodes of the liquid crystal panel are used as coordinate detection electrodes, the same thing can be said for the case that an EL (electro-luminescence) display panel concurrently serving as electrode leads and display electrodes is adopted as a tablet.

According to the present invention as described above, even when the detection pen is put into contact with the boundary of the display region, i.e., the coordinate detection region of the display panel, a voltage waveform outputted from the detection pen by virtue of an electrostatic coupling between the auxiliary electrodes and the detection pen is made approximately equal to the voltage waveform output from the detection pen when the detection pen is put into contact with, for example, a center portion of the display region. Therefore, even at the boundary of the coordinate detection region, coordinate detection can be achieved with high accuracy. Furthermore, even when the above kind of auxiliary electrodes are provided, no influence is exerted on the display operations of the display panel to therefore achieve a coordinate detection with high accuracy assuring a high display quality.

What is claimed is:

1. A display-integrated type tablet device having: a display panel, in which display-use material is sandwiched between segment electrodes and common electrodes, orthogonally crossing each other, and which is driven by a duty-type drive method; a detection pen having at its tip an electrode to be electrostatically coupled with the segment electrodes and the common electrodes of the display panel; a segment drive circuit for driving the segment electrodes; a common drive circuit for driving the common electrodes; a display control circuit for controlling the segment drive circuit and the common drive circuit during a display period to display an image onto the display panel; a detection control circuit for controlling the segment drive circuit during a coordinate detection period to successively scan the segment electrodes of the display panel while controlling the common drive circuit to successively scan the common electrodes; an x-coordinate detection circuit for detecting the x-coordinate on the display panel specified by the tip of the detection pen from both the timing at which an output signal from the detection pen is generated and the timing at which the segment electrodes are scanned; and a y-coordinate detection circuit for detecting the y-coordinate on the display panel specified by the tip of the detection pen from both the timing at which an output signal from the detection pen is generated and the timing at which the common electrodes are scanned, wherein the segment electrodes are divided into two, one side segment electrodes belonging to one half region on one side of the display panel and the other side segment electrodes belonging to the other half region on the other side opposite to the aforementioned one side;

the common electrodes are divided into two, one side common electrodes belonging to one half region on the one side of the display panel and the other side common electrodes belonging to the other half region on the aforementioned other side;

the segment drive circuit is composed of a one side segment drive circuit for driving the one side segment electrodes and the other side segment drive circuit for driving the other side segment electrodes;

the common drive circuit is composed of a one side common drive circuit for driving the one side common electrodes and the other side common drive circuit for driving the other side common electrodes;

the one side segment drive circuit and the other side segment drive circuit, or the one side common drive circuit and the other side common drive circuit have a shift register and a shift data feed path switching circuit for switching a shift data feed path so that shift data are inputted, in parallel mode, simultaneously into the two shift registers of the one side drive circuit and the other side drive circuit, both having the aforementioned shift registers, while shift data are inputted in serial mode, first only into the shift register of the one side drive circuit, thereafter the shift data outputted from the shift register of the one side drive circuit is inputted into the shift register of the other side drive circuit; whereby the one side drive circuit and the other side drive circuit are driven in parallel in the parallel mode while the one side drive circuit and the other side drive circuit are driven in series in the serial mode, by switching of the shift data feed path effected by the shift data feed path switching circuit.

2. A display-integrated type tablet device as claimed in claim 1, wherein the shift data feed path switching circuit is so arranged that it switches the shift data feed path to the parallel mode side for the display period while it switches the path to the serial mode side for the coordinate detection period, whereby the one side drive circuit and the other side drive circuit are driven in parallel during the display period to display an image simultaneously onto the one side half region and the other side half region of the display panel while the one side drive circuit and the other side drive circuit are driven in series during the coordinate detection period to scan the one side half region of the display panel and successively scan the other half region of the display panel.

3. A display-integrated type tablet device as claimed in claim 1, wherein the one side drive circuit having a shift register is the one side common drive circuit while the other side drive circuit having a shift register is the other side common drive circuit;

the shift data feed path switching circuit is a multiplexer;

a shift data output terminal of the shift register of the one side common drive circuit is connected to one input terminal of the multiplexer and a shift data input terminal of the shift register of the one side common drive circuit is connected to the other input terminal of the multiplexer while a shift data input terminal of the shift register of the other side common drive circuit is connected to an output terminal of the multiplexer.

4. A display-integrated type tablet device as claimed in claim 1, wherein the drive circuit composed of the one side drive circuit and the other side drive circuit respectively having shift registers is the common drive circuit, the common drive circuit having an odd number of shift registers connected in series;

the shift data feed path switching circuit is a shift register located at the center of the odd number of shift registers that the common drive circuit has;

the shift register located at the center having a first input terminal, through which shift data is inputted to the head of the shift register, and a second input terminal, through which shift data is interruptively inputted to the center of the shift register, and so arranged as to control allowance or disallowance of interruptive input from the second input terminal depending on an external control signal, whereby during the parallel mode, interruptive input from the second input terminal of the shift register located at the center is allowed by the control signal to input shift data simultaneously into the head of the shift register at one end of the shift register row that the common drive circuit has and into the second input terminal of the shift register located at the center, so that the one side common drive circuit having the one side half of the shift register row and the other side common drive circuit having the other side half of the shift register row are driven in parallel, while during the serial mode, interruptive input from the second input terminal of the shift register is inhibited by the control signal to input shift data only into the head of the shift register at the one end of the shift register row, so that the one side common drive circuit and the other side common drive circuit are driven in series.

5. A display-integrated type tablet device as claimed in claim 1, wherein the pulse width of the shift data in the coordinate detection period is made wider than the cycle of transfer clocks for the shift register.

6. A display-integrated type tablet device as claimed in claim 1, wherein at least one drive circuit of the segment drive circuit and the common drive circuit is arranged so as to effect electrode scanning a plurality of times during the one-time coordinate detection period.

7. A display-integrated type tablet device as claimed in claim 6, wherein either of the segment electrodes or the common electrodes, whichever farther from the detection pen, are scanned a plurality of times.

8. A display-integrated type tablet device having: a display panel, in which display-use material is sandwiched between segment electrodes and common electrodes, orthogonally crossing each other, and which is driven by a duty-type drive method; a detection pen having at its tip an electrode to be electrostatically coupled with the segment electrodes and the common electrodes of the display panel; a segment drive circuit for driving the segment electrodes; a common drive circuit for driving the common electrodes; a display control circuit for controlling the segment drive circuit and the common drive circuit during a display period to display an image onto the display panel; a detection control circuit for controlling the segment drive circuit during a coordinate detection period to successively scan the segment electrodes of the display panel while controlling the common drive circuit to successively scan the common electrodes; an x-coordinate detection circuit for detecting the x-coordinate on the display panel specified by the tip of the detection pen from both the timing at which an output signal from the detection pen is generated and the timing at which the segment electrodes are scanned; and a y-coordinate detection circuit for detecting the y-coordinate on the display panel specified by the tip of the detection pen from both the time at which an output signal from the detection pen is generated and the timing at which the common electrodes are scanned, wherein the segment electrodes are divided into two, one side segment electrodes belonging to one half region on one side of the display panel and the other side segment electrodes belonging to the other half region on the other side opposite to the aforementioned one side;

the common electrodes are divided into two, one side common electrodes belonging to one half region on one side of the display panel and the other side common electrodes belonging to the other side half region opposite to the aforementioned one side;

one of the segment drive circuit and the common drive circuit is composed of a one side drive circuit for driving the one side electrodes and the other side drive circuit for driving the other side electrodes;

the drive circuit, other than the one composed of a one side drive circuit and the other side drive circuit, having the one side electrodes and the other side electrodes connected thereto in parallel and in conjunction with each other;

the one side drive circuit and the other side drive circuit are so arranged that they generate a scan signal having a scan pulse of a voltage that does not contribute to display of the display panel depending on an external control signal during a coordinate detection period and they deliver the scan signal to all the electrodes to be driven at the same timing;

the x-coordinate detection circuit is so arranged that it detects the region on the display panel in which the tip of the detection pen exists, from both the timing at which a scan signal having a scan pulse of a voltage that does not contribute to the display from the one side drive circuit and the other side drive circuit from the detection pen is generated and further from the peak value of the output signal while the y-coordinate detection circuit is so arranged that it detects the region on the display panel in which the tip of the detection pen exists, from both the timing at which a scan signal having a scan pulse of a voltage that does not contribute to the display from the one side drive circuit and the other side drive circuit is inputted and the timing at which an output signal from the detection pen is generated and further from the peak value of the output signal, whereby it is detected whether the tip of the detection pen exists in the one side half region of the display panel or in the other side half region thereof.

9. A display-integrated type tablet device as claimed in claim 8, wherein the coordinate detection period is divided into a region detection period for detecting a region on the display panel in which the tip of the detection pen exists, an x-coordinate detection period for detecting the x-coordinate on the display panel specified by the detection pen, and a y-coordinate detection period for detecting the y-coordinate specified by the detection pen, and wherein during the region detection period, from the one side drive circuit and the other side drive circuit, scan signals having scan pulses of voltage which does not contribute to the display and which differ in phase between the drive circuits are outputted to scan the one side half region and the other side half region of the display panel at different timings in series, and during the x-coordinate detection period, the segment drive circuits are simultaneously controlled by the detection control circuit to scan the one side half region and the other side half region of the display panel in parallel, while during the y-coordinate detection period, the common drive circuits are simultaneously controlled by the detection control circuit to scan the one side half region and the other side half region of the display panel in parallel, the x-coordinate detection circuit being arranged so that, during the region detection period, it detects the region on the display panel in which the tip of the detection pen exits depending on an output signal from the detection pen and, during the x-coordinate detection period, it determines the x-coordinate on the display panel specified by the tip of the detection pen depending on detection result in the region detection period, the y-coordinate detection circuit being arranged so that, during the region detection period, it detects the region on the display panel in which the tip of the detection pen exists and, during the y-coordinate detection period, it determines the y-coordinate on the display panel specified by the tip of the detection pen depending on detection result in the region detection period.

10. A display-integrated type tablet device as claimed in claim 8, wherein both of the segment drive circuit and the common drive circuit are composed of the one side drive circuit and the other side drive circuit and also the external control signal is inputted into all the drive circuits, and during the coordinate detection period, for each of the drive circuits to generate a scan signal having a scan pulse of a voltage that does not contribute to the display and input it all the electrodes to be driven depending on an external control signal, the one side segment drive circuit and the one side common drive circuit generate scan signals having a scan pulse of the same voltage and input them at the same timing into the electrodes to be driven while the other side segment drive circuit and the other side common drive circuit generate scan signals differing in phase from the scan signals from the two one side drive circuits having the scan pulse of the same voltage to input them at the same timing into all the electrodes to be driven, and the x-coordinate detection circuit or the y-coordinate detection circuit detects the region on the display panel in which the tip of the detection pen exists from both the timing at which the scan signal having the scan pulses of voltages that do not contribute to the display from the two one side drive circuits and the two other side drive circuits are inputted and the timing at which an output signal from the detection pen is generated and further from the peak value of the output signal.

11. A display-integrated type tablet, comprising: a duty-type display panel, in which a display material is disposed between segment electrodes and common electrodes, the segment electrodes being divided into first segment electrodes and second segment electrodes at approximately center of a display screen; a first segment drive circuit for driving the first segment electrodes, one side terminals of said first segment electrodes being electrically connected to the first segment drive circuit, while the other side terminals of said first segment electrodes being opened; a second segment drive circuit for driving the second segment electrodes, one side terminals of said second segment electrodes being electrically connected to the second segment drive circuit, while the other side terminals of said second segment electrodes being opened; a common drive circuit for driving the common electrodes, one side terminals of said common electrodes being electrically connected to the common drive circuit, while the other side terminals of said common electrodes being opened; a display control circuit for, during a display period, controlling the first segment drive circuit, the second segment drive circuit and the common drive circuit to cause the display panel to simultaneously effect the display of the upper half and the display of the lower half of the display panel; a position detection control circuit for, during a position detection period, controlling the first segment drive circuit to successively apply first segment scan signals to the one side terminals of the first segment electrodes for x-coordinate detection, for controlling the second segment drive circuit to successively apply second segment scan signals to the one side terminals of the second segment electrodes for x-coordinate detection, and for controlling the common drive circuit to successively apply common scan signals to the one side terminals of the common electrodes for y-coordinate detection; a position detection pen to be electrostatically coupled with the first segment electrodes, the second segment electrodes, and the common electrodes; and a coordinate detection circuit for detecting coordinates of a position on the display panel specified by the position detection pen depending on an output signal of the position detection pen.

12. A display-integrated type tablet as claimed in claim 11, wherein the position detection control circuit is so arranged as to control the first segment drive circuit and the second segment drive circuit to scan the first segment electrodes and the second segment electrodes simultaneously in parallel.

13. A display-integrated type tablet as claimed in claim 11, wherein the position detection control circuit is so arranged as to scan the upper segment electrodes during one period and scan the lower segment electrodes during another period, and to scan the upper half of the common electrodes in the display panel and the lower half of the common electrodes of the display panel simultaneously in parallel, and the coordinate detection circuit is so arranged as to decide whether the position detection pen exists in the upper half or in the lower half of the display panel, from both an output signal and scan timing of the position detection pen in the scanning of the upper segment electrodes and both an output signal and scan timing of the position detection pen in the scanning of the lower segment electrodes, and to detect the y-coordinate of the position of the position detection pen from both the upper or lower decision result and an output signal and scan timing of the position detection pen in the scanning of the common electrodes.

14. A display-integrated type tablet as claimed in claim 11, wherein the position detection control circuit is so arranged as to scan the upper segment electrodes and the lower segment electrodes simultaneously in parallel with an upper segment drive signal and a lower segment drive signal, which differ in phase from each other, respectively, and to scan the upper half of the common electrodes of the display panel and lower half of the common electrodes of the display panel simultaneously in parallel, and the coordinate detection circuit is so arranged as to decide whether the position detection pen exists in the upper half or in the lower half of the display panel from phase difference between the output signal of the position detection pen in the scanning of the upper segment electrodes and the lower segment electrodes and the upper segment drive signal or the lower segment drive signal and to detect the y-coordinate of the position of the position detection pen from both the upper or lower detection result and the output signal and scan timing of the position detection pen in the scanning of the common electrodes.

15. A display-integrated type tablet as claimed in claim 14, wherein the upper segment drive signal and the lower segment drive signal are high-frequency pulse signals of the same frequency which differ in phase from each other.

16. A display-integrated type tablet as claimed in claim 14, wherein the upper segment drive signal and the lower segment drive signal are high-frequency sine-wave signals of the same frequency which differ in phase from each other.

17. A display-integrated type tablet as claimed in claim 14, wherein the upper segment drive signal and the lower segment drive signal are single pulse signals which differ in phase from each other.

18. A display-integrated type tablet as claimed in claim 11, wherein the first segment electrodes and the second segment electrodes are opposed to each other so that they can lie on respective parallel straight lines.

19. A display-integrated type tablet having: a display panel having first electrodes and second electrodes; a first drive circuit for applying voltage to the first electrodes; a second drive circuit for applying voltage to the second electrodes; a detection pen to be electrostatically coupled with the first electrodes and the second electrodes; and means for amplifying an electrostatically induced voltage of the detection pen, wherein carried out by time sharing are display of an image with the display panel and coordinate detection for determining a position of the detection pen according to the electrostatically induced voltage, characterized in that the first drive circuit is provided with a plurality of driving integrated circuits connected in cascade by serial input/output terminals, the driving integrated circuits comprising: scan mode setting means for setting scan mode of the driving integrated circuits to a first mode for a display period and to a second mode for a coordinate detection period; the serial input/output terminal; a data input terminal for receiving display data during the display period; a shift data input/output terminal for receiving shift data during the coordinate detection period; a memory for memorizing data inputted from the data input terminal; a shift register for shifting the shift data inputted from the shift data input/output terminal; a driver for generating scan signals based on the shift data and the display data and outputting the scan signals to the first electrodes; and control means, wherein the control means cause the memory to memorize, in the first mode, the display data inputted from the data input terminal and thereafter to output the display data to the driver simultaneously in parallel, while the control means cause the shift register to shift and output, in the second mode, shift data inputted through the shift data input/output terminal to the driver so that the scan signal on the shift data can be successively serially inputted from the driver to the first electrodes.

20. A display-integrated type tablet as claimed in claim 19, wherein the pulse width of the shift data is greater than the cycle of a clock signal which transfers the shift data.

21. A display-integrated type tablet as claimed in claim 19, further comprising shift data control means for, when carrying out the scanning of the first drive circuit and the scanning of the second drive circuit by time sharing during the coordinate detection period, making shift data outputted from the final stage of a drive circuit to be scanned first and then inputted into the first stage of a drive circuit to be scanned second.

22. A display-integrated type tablet as claimed in claim 21, wherein the shift data control means serves to delay the shift data outputted from the final stage of the drive circuit to be scanned first and thereafter to input the same into the first stage of the drive circuit to be scanned second.

23. A display-integrated type tablet as claimed in claim 19, wherein the second drive circuit is an integrated circuit having the same construction as that of the driving integrated circuit forming the first drive circuit, and the scan mode setting means is provided by a plurality of integrated circuits, which are connected in cascade and which serve to set the scan mode normally to the second mode.

24. A display-integrated type tablet as claimed in claim 19, further comprising a multiplexer, wherein one of input terminals of the multiplexer receives a control signal for chip-selecting the driving integrated circuit of a first stage of the first drive circuit, the other of input terminals of the multiplexer receives the shift data, and an output terminal of the multiplexer is connected to the serial input/output terminal of the driving integrated circuit of the first stage so that the control signal and the shift data can be switchedly inputted in the serial input/output terminal of the driving integrated circuit in the first mode and the second mode respectively.

25. A display-integrated type tables device having: a display panel, in which display-use material is sandwiched between segment electrodes and common electrodes, orthogonally crossing each other, and which is driven by a duty-type drive method; a detection pen having at its tip an electrode to be electrostatically coupled with the segment electrodes and the common electrodes of the display panel; a segment drive circuit for driving the segment electrodes; a common drive circuit for driving the common electrodes; a display control circuit for controlling the segment drive circuit and the common drive circuit during a display period to display an image onto the display panel; a detection control circuit for controlling the segment drive circuit during a coordinate detection period to successively scan the segment electrodes of the display panel while controlling the common drive circuit to successively scan the common electrodes; an x-coordinate detection circuit for detecting the x-coordinate on the display panel specified by the tip of the detection pen from both the timing at which an output signal from the detection pen is generated and the timing at which the segment electrodes are scanned; and a y-coordinate detection circuit for detecting the y-coordinate on the display panel specified by the tip of the detection pen from both the timing at which an output signal from the detection pen is generated and the timing at which the common electrodes are scanned, wherein the segment electrodes are divided into two, one side segment electrodes belonging to one half region on one side of the display panel and the other side segment electrodes belonging to the other half region on the other side opposite to the aforementioned one side;

the common electrodes are divided into two, one side common electrodes belonging to one half region on the one side of the display panel and the other side common electrodes belonging to the other half region on the aforementioned other side;

the segment drive circuit is composed of a one side segment drive circuit for driving the one side segment electrodes and the other side segment drive circuit for driving the other side segment electrodes;

the common drive circuit is composed of a one side common drive circuit for driving the one side common electrodes and the other side common drive circuit for driving the other side common electrodes;

the one side common drive circuit and the other side common drive circuit have a shift register and a shift data feed path switching circuit for switching a shift data feed path so that shift data are inputted, in parallel mode, simultaneously into the two shift registers of the one side common drive circuit and the other side common drive circuit, both having the aforementioned shift registers; while shift data are inputted in serial mode, first only into the shift register of the one side common drive circuit, thereafter the shift data are outputted from the shift register of a final stage of the one side common drive circuit, and simultaneously or thereafter the shift data are inputted into the shift register of the other side common drive circuit; whereby;

the one side common drive circuit and the other side common drive circuit are driven in parallel in the parallel mode; the one side common drive circuit an the other side common drive circuit are driven in series in the serial mode, by switching of the shift data feed path effected by the shift data feed path switching circuit.

26. A display-integrated type table device as claimed in claim 25, wherein the shift data feed path switching circuit is so arranged that it switches the shift data feed path to the parallel mode side for the display period, while it switches the path to the serial mode side for the coordinate detection period, whereby the one side common drive circuit and the other side common drive circuit are driven in parallel during the display period to display an image simultaneously onto the side half region and the other side half region of the display panel, while the one side common drive circuit and the other side common drive circuit are driven in series during the coordinate detection period to scan the one side half region of the display panel and successively scan the other half region of the display panel.

27. A display-integrated type tablet device as claimed in claim 26, wherein the shift data feed path switching circuit is a multiplexer;

a shift data output terminal of the shift register of the one side common drive circuit is connected to one input terminal of the multiplexer and a shift data input terminal of the shift register of the one side common drive circuit is connected to the other input terminal of the multiplexer, while a shift data input terminal of the shift register of the other side common drive circuit is connected to an output terminal of the multiplexer.

28. A display-integrated type tabled device as claimed in claim 25, wherein the shift data feed path switching circuit is a multiplexer;

a shift data output terminal of the shift register of the one side common drive circuit is connected to one input terminal of the multiplexer and a shift data input terminal of the shift register of the one side common drive circuit is connected to the other input terminal of the multiplexer, while a shift data input terminal of the shift register of the other side common drive circuit is connected to an output terminal of the multiplexer.

29. A display-integrated type tablet device as claimed in claim 25, wherein the pulse width of the shift data in the coordinate detection period is made wider than the cycle of transfer clocks for the shift register.

30. A display-integrated type tablet device having: a display panel, in which display-use material is sandwiched between segment electrodes and common electrodes, orthogonally crossing each other, and which is driven by a duty-type drive method; a detection pen having at is tip an electrode to be electrostatically coupled with the segment electrodes and the common electrodes of the display panel; a segment drive circuit for driving the segment electrodes; a common drive circuit for driving the common electrodes; a display control circuit for controlling the segment drive circuit and the common drive circuit during a display period to display an image onto the display; a detection control circuit of controlling the segment drive circuit during a coordinate detection period to successively scan the segment electrodes of the display panel, while controlling the common drive circuit to successively scan the common electrodes; an x-coordinate detection circuit for detecting the x-coordinate on the display panel specified by the tip of the detection pen from both the timing at which an output signal from the detection pen is generated and the timing at which the segment electrodes are scanned; and a y-coordinate detection circuit for detecting the y-coordinate on the display panel specified by the tip of the detection pen from both the timing at which an output signal from the detection pen is generated and the timing at which the common electrodes are scanned, wherein the segment electrodes are divided into two, one side segment electrodes belonging to one half region on one side of the display panel and the other side segment electrodes belonging to the other half region on the other side opposite to the aforementioned one side, said one side segment electrodes being opposed to the other side segment electrodes in such a manner that the one side segment electrodes and the other side segment electrodes lie on parallel straight lines;

the segment drive circuit is composed of a one side segment drive circuit for driving the one side segment electrodes and the other side segment drive circuit for driving the other side segment electrodes, wherein the one side segment drive circuit and the other side segment drive circuit have the same structure, shape and dimension, and are opposed to each other, and yet have respectively a directional shift register provided with a control terminal for setting a shifting direction, whereby the one side segment electrodes and the other side segment electrodes are serially scanned in the same direction during the coordinate detection period by controlling the control terminals of the one side segment drive circuit and the other side segment drive circuit.

* * * * *